US012581368B2

(12) United States Patent
Jang et al.

(10) Patent No.: US 12,581,368 B2
(45) Date of Patent: *Mar. 17, 2026

(54) METHOD AND APPARATUS FOR TRANSMITTING DATA IN A MOBILE COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR); Sangbum Kim, Suwon-si (KR); Donggun Kim, Seoul (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,639

(22) Filed: Aug. 14, 2023

(65) Prior Publication Data

US 2023/0388864 A1 Nov. 30, 2023

Related U.S. Application Data

(63) Continuation of application No. 16/658,945, filed on Oct. 21, 2019, now Pat. No. 11,729,672, which is a (Continued)

(30) Foreign Application Priority Data

Feb. 3, 2017 (KR) ........................ 10-2017-0015783

(51) Int. Cl.
*H04W 28/26* (2009.01)
*H04W 28/02* (2009.01)
(Continued)

(52) U.S. Cl.
CPC ....... *H04W 28/26* (2013.01); *H04W 28/0268* (2013.01); *H04W 28/0278* (2013.01);
(Continued)

(58) Field of Classification Search
CPC ......... H04W 28/0215; H04W 28/0268; H04W 28/0278; H04W 28/26; H04W 36/0055;
(Continued)

(56) References Cited

U.S. PATENT DOCUMENTS 8,625,540 B2 * 1/2014 Uemura ........... H04W 56/0085
370/332
9,282,494 B2 3/2016 Folke et al.
(Continued)

FOREIGN PATENT DOCUMENTS

CN 101494884 A 7/2009
CN 102271408 A 12/2011
(Continued)

OTHER PUBLICATIONS

Communication pursuant to Article 94(3) EPC dated Jan. 19, 2024, in connection with European Application No. 22150188.5, 9 pages.
(Continued)

*Primary Examiner* — Diane D Mizrahi
*Assistant Examiner* — Jing Gao

(57) ABSTRACT

A communication method and system for converging a 5th-Generation (5G) communication system for supporting higher data rates beyond a 4th-Generation (4G) system with a technology for Internet of Things (IoT) is disclosed. The method and system may be applied to intelligent services based on the 5G communication technology and the IoT-related technology, including smart home, smart building, smart city, smart car, connected car, health care, digital education, smart retail, security and safety services. The
(Continued)

method and system relate to quickly and efficiently allocating uplink transmission resource to data of a terminal.

20 Claims, 79 Drawing Sheets

Related U.S. Application Data continuation of application No. 15/887,074, filed on Feb. 2, 2018, now Pat. No. 10,455,456.

(51) Int. Cl.

| | |
|---|---|
| H04W 36/24 | (2009.01) |
| H04W 72/12 | (2023.01) |
| H04W 72/1268 | (2023.01) |
| H04W 72/566 | (2023.01) |
| H04W 36/00 | (2009.01) |
| H04W 72/0453 | (2023.01) |

(52) U.S. Cl.
CPC ..... *H04W 36/249* (2023.05); *H04W 72/1215* (2013.01); *H04W 72/1268* (2013.01); *H04W 72/569* (2023.01); *H04W 28/0215* (2013.01); *H04W 36/0064* (2023.05); *H04W 72/0453* (2013.01)

(58) Field of Classification Search
CPC ......... H04W 72/0453; H04W 72/1215; H04W 72/1268; H04W 72/569; H04W 36/249; H04W 36/0064; H04W 36/00837; H04W 36/0027; H04W 36/0038; H04W 36/0058; H04W 36/26; H04W 36/305; H04W 36/362; H04W 36/0069; H04W 36/0085; H04W 36/30; H04W 36/08; H04W 36/0079; H04W 76/19; H04W 76/27; H04W 24/10; H04W 36/0061; H04W 36/00838; H04W 36/0072; H04W 36/302; H04W 24/02; H04W 36/0077; H04W 36/00835; H04W 36/00; H04W 76/15; H04W 24/08; H04W 36/0016; H04W 36/185; H04W 36/0033; H04W 76/30; H04W 76/20; H04W 36/0005; H04W 36/0094; H04W 76/18; H04W 36/36; H04W 36/0083; H04W 48/20; H04W 36/0088; H04W 84/06; H04W 36/087; H04W 36/085; H04W 88/08; H04W 36/32; H04W 36/00698; H04W 76/38; H04W 36/083; H04W 36/14; H04W 52/0206; H04W 36/322; H04W 36/00833; H04W 36/18; H04W 36/24; H04W 36/34; H04W 72/04; H04W 36/037; H04W 36/16; H04W 72/542; H04W 40/36; H04W 36/13; H04W 52/0229; H04W 36/326; H04W 4/029; H04W 28/12; H04W 52/0245; H04W 24/00; H04W 48/04; H04W 28/0236; H04W 28/0231; H04W 52/241; H04W 28/08; H04W 28/0861; H04W 28/0942; H04W 36/10
See application file for complete search history.

(56) References Cited

U.S. PATENT DOCUMENTS

| | | | |
|---|---|---|---|
| 9,980,308 B2 | 5/2018 | Park et al. | |
| 2009/0296660 A1* | 12/2009 | Weng ............... | H04W 36/0022 370/332 |
| 2010/0208696 A1 | 8/2010 | Lee et al. | |
| 2010/0272045 A1 | 10/2010 | Hsu | |
| 2011/0038335 A1 | 2/2011 | Kim et al. | |
| 2011/0170495 A1 | 7/2011 | Earnshaw et al. | |
| 2011/0267959 A1 | 11/2011 | Yi et al. | |
| 2012/0057547 A1 | 3/2012 | Lohr et al. | |
| 2012/0170532 A1* | 7/2012 | Kato ................ | H04W 36/0072 370/329 |
| 2013/0084878 A1 | 4/2013 | Chen et al. | |
| 2013/0107783 A1 | 5/2013 | Shaw | |
| 2013/0132854 A1 | 5/2013 | Raleigh et al. | |
| 2013/0303114 A1 | 11/2013 | Ahmad et al. | |
| 2014/0074641 A1 | 3/2014 | Wang | |
| 2014/0120921 A1* | 5/2014 | Keskitalo ........... | H04W 36/302 455/438 |
| 2014/0126545 A1 | 5/2014 | Tamura et al. | |
| 2014/0128092 A1 | 5/2014 | Xiong et al. | |
| 2014/0148174 A1* | 5/2014 | Teyeb ............... | H04W 52/0212 455/441 |
| 2015/0038148 A1* | 2/2015 | Park ...................... | H04W 36/08 455/437 |
| 2015/0172982 A1* | 6/2015 | Park ...................... | H04W 36/38 370/332 |
| 2015/0181481 A1* | 6/2015 | Masini .............. | H04W 36/0085 455/436 |
| 2015/0181493 A1* | 6/2015 | Park ...................... | H04W 36/36 455/436 |
| 2015/0271717 A1* | 9/2015 | Moon .................. | H04W 76/18 455/437 |
| 2016/0027112 A1 | 1/2016 | Smith et al. | |
| 2016/0037510 A1 | 2/2016 | Park et al. | |
| 2016/0057711 A1 | 2/2016 | Chen | |
| 2016/0174124 A1* | 6/2016 | Basu Mallick ... | H04W 36/0072 370/331 |
| 2018/0035339 A1* | 2/2018 | Mitsui .................. | H04W 72/04 |

FOREIGN PATENT DOCUMENTS

| | | |
|---|---|---|
| CN | 103517408 A | 1/2014 |
| CN | 103621139 A | 3/2014 |
| CN | 104202779 A | 12/2014 |
| EP | 0677463 A1 | 10/1995 |
| EP | 2343946 A2 | 7/2011 |
| KR | 10-1154780 | 6/2012 |
| WO | 2014000547 A1 | 1/2014 |
| WO | 2016120940 A1 | 8/2016 |

OTHER PUBLICATIONS

Office Action dated Feb. 6, 2019 in connection with European Patent Application No. 18 154 837.1, 9 pages.

Ericsson, "[Draft] LS on Contents of uplink grant," 3GPP TSG-RAN WG2 NR Ad Hoc, Jan. 17-19, 2017, 1 page, Tdoc R2-1700417.

Communication from a foreign patent office in a counterpart foreign application, ISA/KR, "International Search Report," International Application No. PCT/KR2018/001403, May 14, 2018, 4 pages.

Communication from a foreign patent office in a counterpart foreign application, European Patent Office, "European Search Report," Application No. EP 18154837.1, Jun. 15, 2018, 11 pages.

Ericsson, "Modelling of MAC with multiple numerologies," R2-1700408, 3GPP TSG-RAN WG2 NR Ad Hoc, Spokane, USA, Jan. 17-19, 2017, 3 pages.

Huawei, et al, "LCP with Multiple Numerologies," R2-1700085, 3GPP TSG-RAN WG2 Ad Hoc, Spokane, USA, Jan. 17-19, 2017, 3 pages.

OPPO, "Logical channel multiplexing and prioritization in NR," R2-1700049, 3GPP TSG-RAN WG2 NR Ad Hoc, Spokane, USA, Jan. 17-19, 2017, 4 pages.

Communication pursuant to Article 94(3) EPC in connection with European Application No. 18154837.1 dated Jul. 15, 2020, 9 pages.

Fujitsu, "MAC function for URLLC support," R2-1700115 (Update of R2-168232), 3GPP TSG-RAN WG2 NR Ad Hoc, Spokane, Washington, USA, Jan. 17-19, 2017, 3 pages.

The First Office Action dated Apr. 15, 2021 in connection with Chinese patent application No. 201880010275.X, 12 pages.

(56) References Cited

OTHER PUBLICATIONS

European Search Report dated Mar. 21, 2022, in connection with European Application No. 22150188.5, 11 pages.
ETRI, "Early HO CMD with Ping-Pong Avoidance, further information," R2-134432, 3GPP TSG-RAN WG2 #84, San Francisco, US, Nov. 11-15, 2013, 11 pages.
ETRI, "Improved recovery from RLF with Early HO CMD," R2-134433, 3GPP TSG-RAN WG2 #84, San Francisco, US, Nov. 11-15, 2013, 7 pages.
Examination report dated Sep. 1, 2022, in connection with Indian Application No. 202248021593, 7 pages.
The First Office Action dated Apr. 17, 2024, in connection with Chinese Application No. 202210053433.8, 24 pages.
Ericsson, "Conditional Handover," Tdoc R2-1700544, 3GPP TSG-RAN WG2 NR Ad Hoc, Spokane, USA, Jan. 17-19, 2017, 4 pages.
Decision of Patent dated Nov. 19, 2024, in connection with Korean Application No. 10-2017-0015783, 5 pages.
Rejection Decision dated Dec. 18, 2024, in connection with Chinese Application No. 202210053433.8, 16 pages.
Hearing Notice dated Dec. 31, 2025, in connection with Indian Application No. 202248021593, 2 pages.

* cited by examiner

FIG. 1EB

GW gNB1      gNB2

CU      CU

DU      DU

Phase 0 (1f-05)
UE is connected to gNB1

[1f-10]

| gNB 1 | | | |
|---|---|---|---|
| SRB1 | SRB2 | DRB1 | DRB2 |
| pdcp | pdcp | pdcp | pdcp |
| rlc | rlc | rlc | rlc |
| MAC | | | |
| PHY | | | |
| PCell (cell 1) | | SCell (cell 2) | |

[1f-15]

| PCell (cell 1) | | SCell (cell 2) | |
|---|---|---|---|
| PHY | | | |
| MAC | | | |
| rlc | rlc | rlc | rlc |
| pdcp | pdcp | pdcp | pdcp |
| SRB1 | SRB2 | DRB1 | DRB2 |
| UE | | | |

GW gNB1        gNB2

CU        CU

DU        DU

Phase 1 (1f-20)
DC is configured

[1f-25]

MCG to split
bearer reconfiguration

MCG to split
bearer reconfiguration

GW gNB1　　　gNB2

CU　　　CU

DU　　　DU

Phase 2 (1f-40)
PCell/PSCell role change
S1-U switch to gNB2
PDCP relocation (1f-45)

split to split reconfiguration w/
Activate reserved PDCP can continue w/o
reconfiguration

GW gNB1            gNB2

CU            DU

DU            DU

Phase 3 (1f-60)
DC is released

CONTINUE

Start (Target gNB operation) ~[1h-51]

receive from source gNB and transmit to UE received
PDCP PDUs as they are ~[1h-53]

Type 2 HO REQ is received and determines the COUNT
to be applied for the first PDCP SDU ~[1h-55]

process PDCP SDUs to PDCP PDUs for a DRB/SRB ~[1h-57]

End ~[1h-59]

Start (Target gNB operation)          [1k-51]

receive from source gNB and transmit to UE received PDCP PDUs as they are          [1k-53]

Type 2 HO REQ is received and determines the COUNT to be applied for the first PDCP SDU          [1k-55]

process PDCP SDUs to PDCP PDUs for a DRB/SRB          [1k-57]

End          [1k-59]

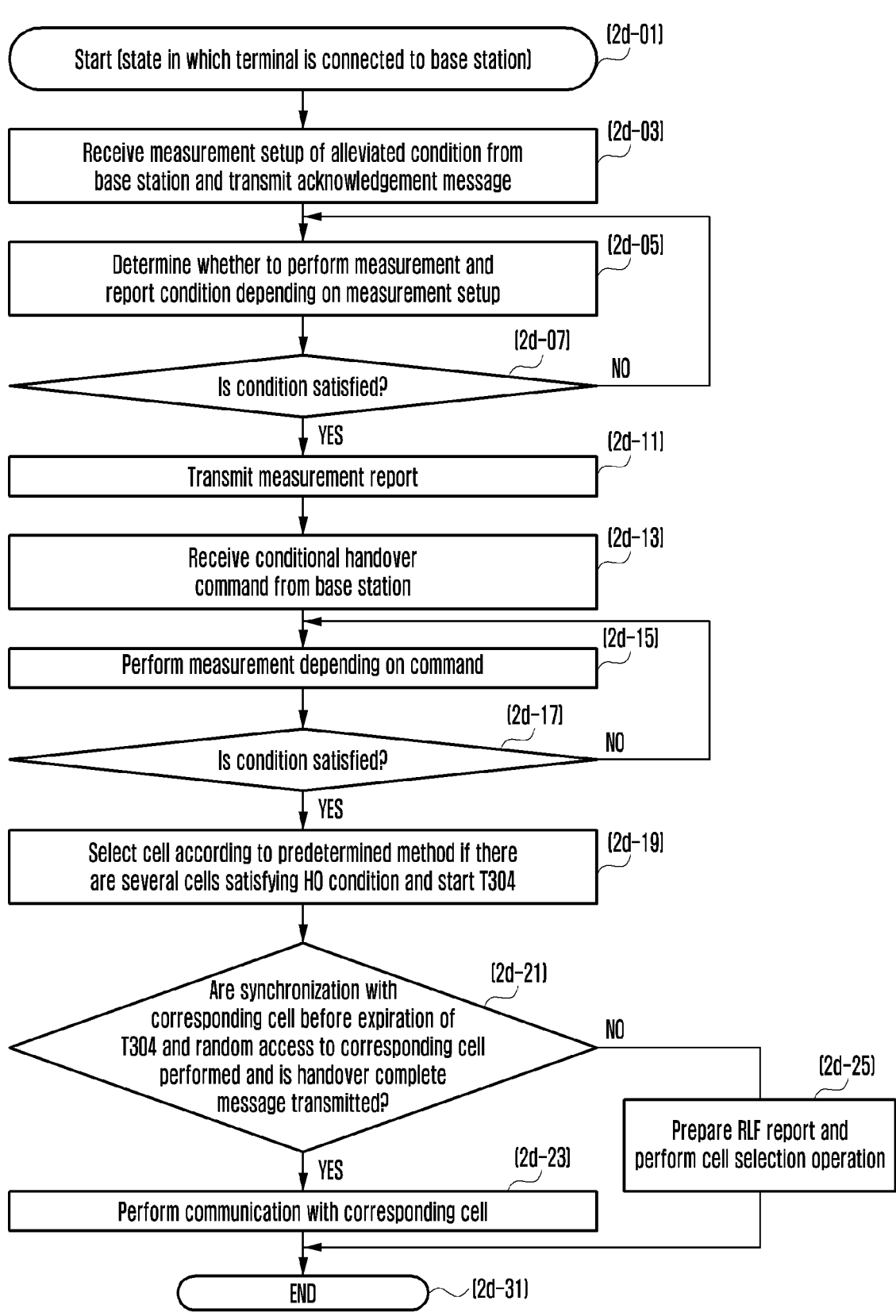

Start (state in which terminal is connected to base station) [2d-01]

Receive measurement setup of alleviated condition from base station and transmit acknowledgement message [2d-03]

Determine whether to perform measurement and report condition depending on measurement setup [2d-05]

Is condition satisfied? [2d-07] — NO

YES

Transmit measurement report [2d-11]

Receive conditional handover command from base station [2d-13]

Perform measurement depending on command [2d-15]

Is condition satisfied? [2d-17] — NO

YES

Select cell according to predetermined method if there are several cells satisfying HO condition and start T304 [2d-19]

Are synchronization with corresponding cell before expiration of T304 and random access to corresponding cell performed and is handover complete message transmitted? [2d-21] — NO Prepare RLF report and perform cell selection operation [2d-25]

YES

Perform communication with corresponding cell [2d-23]

END [2d-31]

FIG. 2E

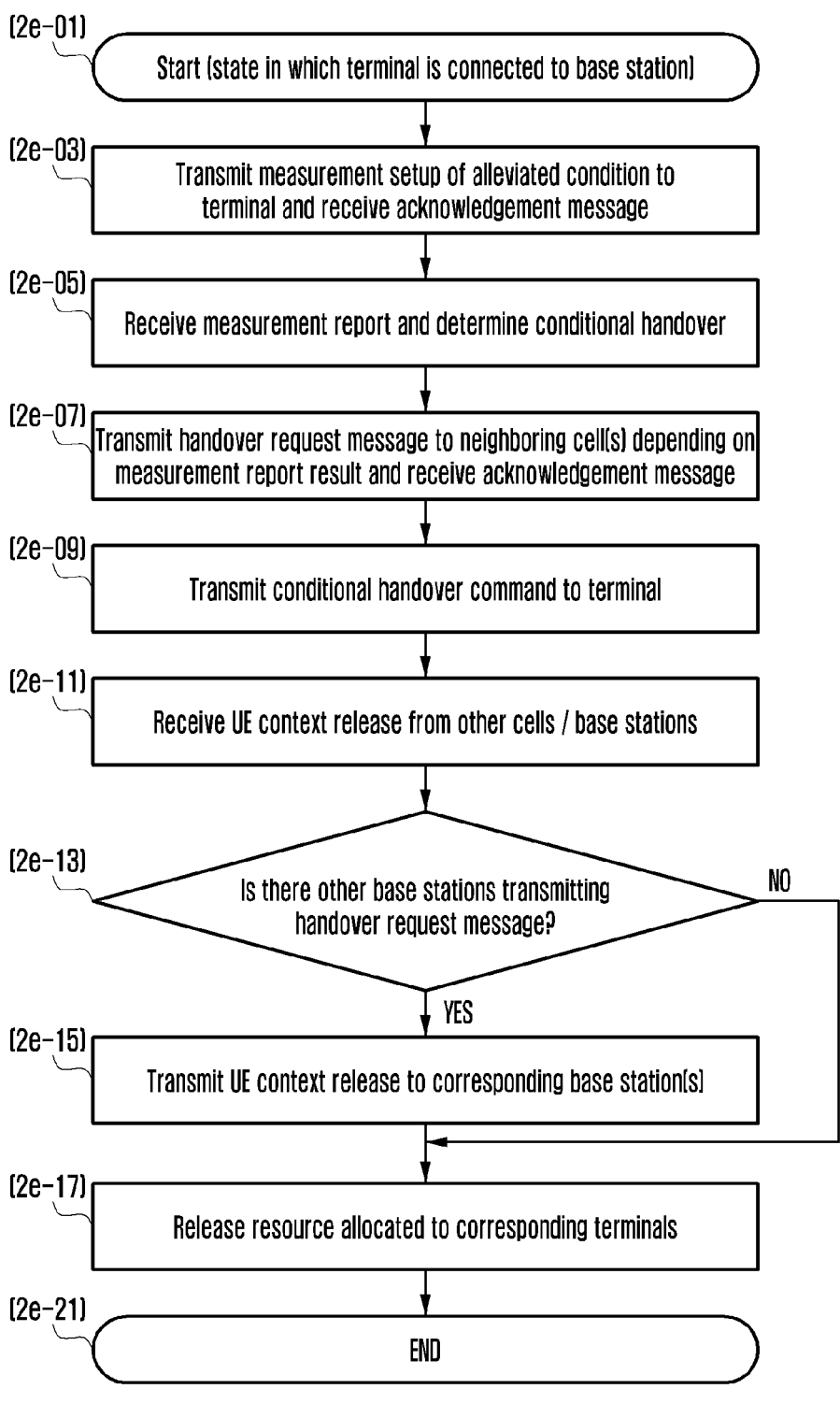

[2e-01]   Start (state in which terminal is connected to base station)

[2e-03]   Transmit measurement setup of alleviated condition to terminal and receive acknowledgement message

[2e-05]   Receive measurement report and determine conditional handover

[2e-07]   Transmit handover request message to neighboring cell(s) depending on measurement report result and receive acknowledgement message

[2e-09]   Transmit conditional handover command to terminal

[2e-11]   Receive UE context release from other cells / base stations

[2e-13]   Is there other base stations transmitting handover request message?

NO

YES

[2e-15]   Transmit UE context release to corresponding base station(s)

[2e-17]   Release resource allocated to corresponding terminals

[2e-21]   END

FIG. 2F 2f-10

RF processor 2f-20

Baseband processor 2f-40

Controller 2f-42

Multi-link processor 2f-30

Memory

FIG. 4G 4g-30 Backhaul communication unit 4g-52

Figure 4G:
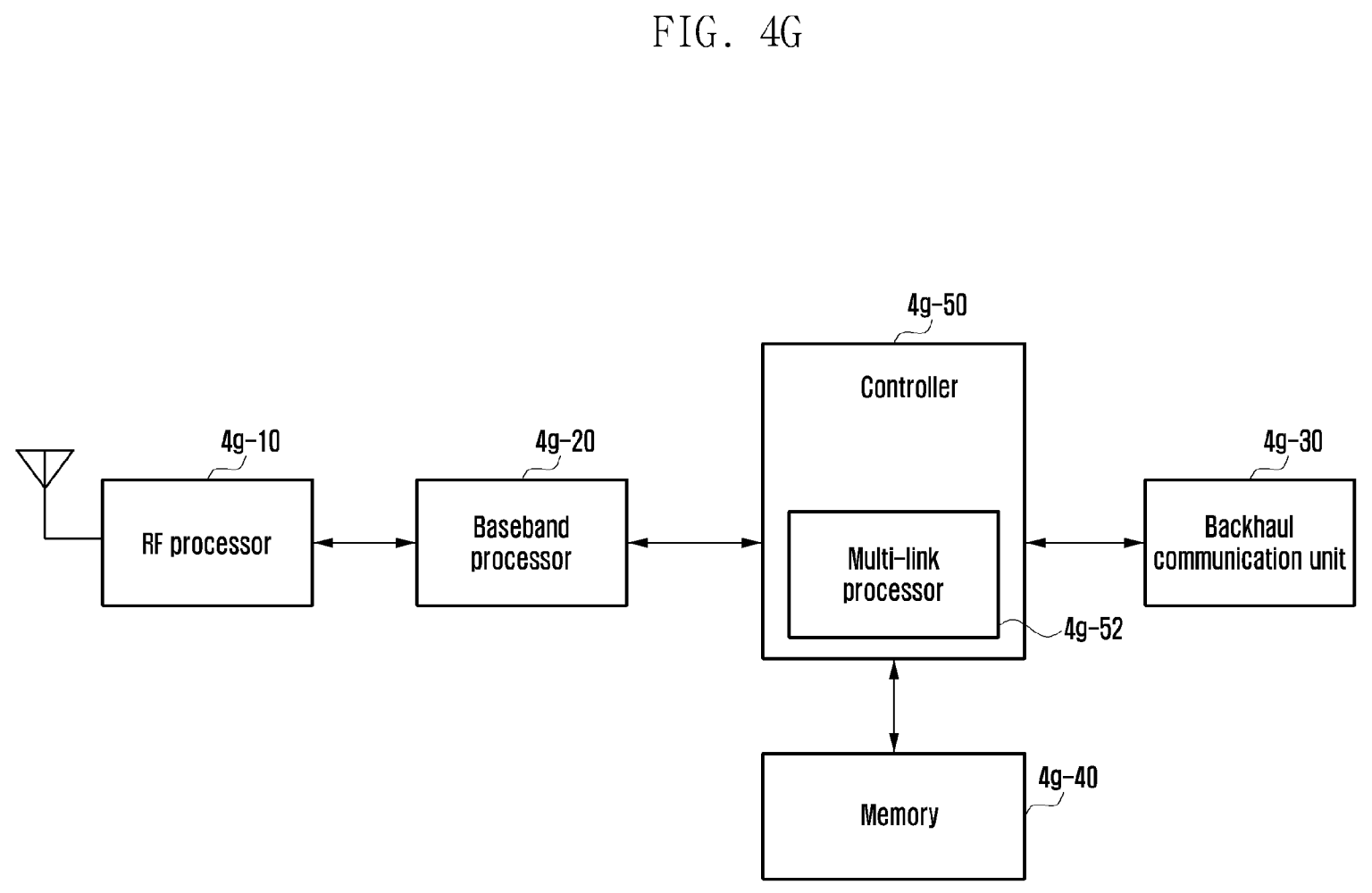

4g-50 Controller

Multi-link processor 4g-40 Memory 4g-20 Baseband processor 4g-10 RF processor

RF processor 5h-20

Baseband processor 5h-40

Controller 5h-42

Multi-link processor 5h-30

Memory

FIG. 5I 5i-30

Backhaul communication unit 5i-52

Figure 5I:
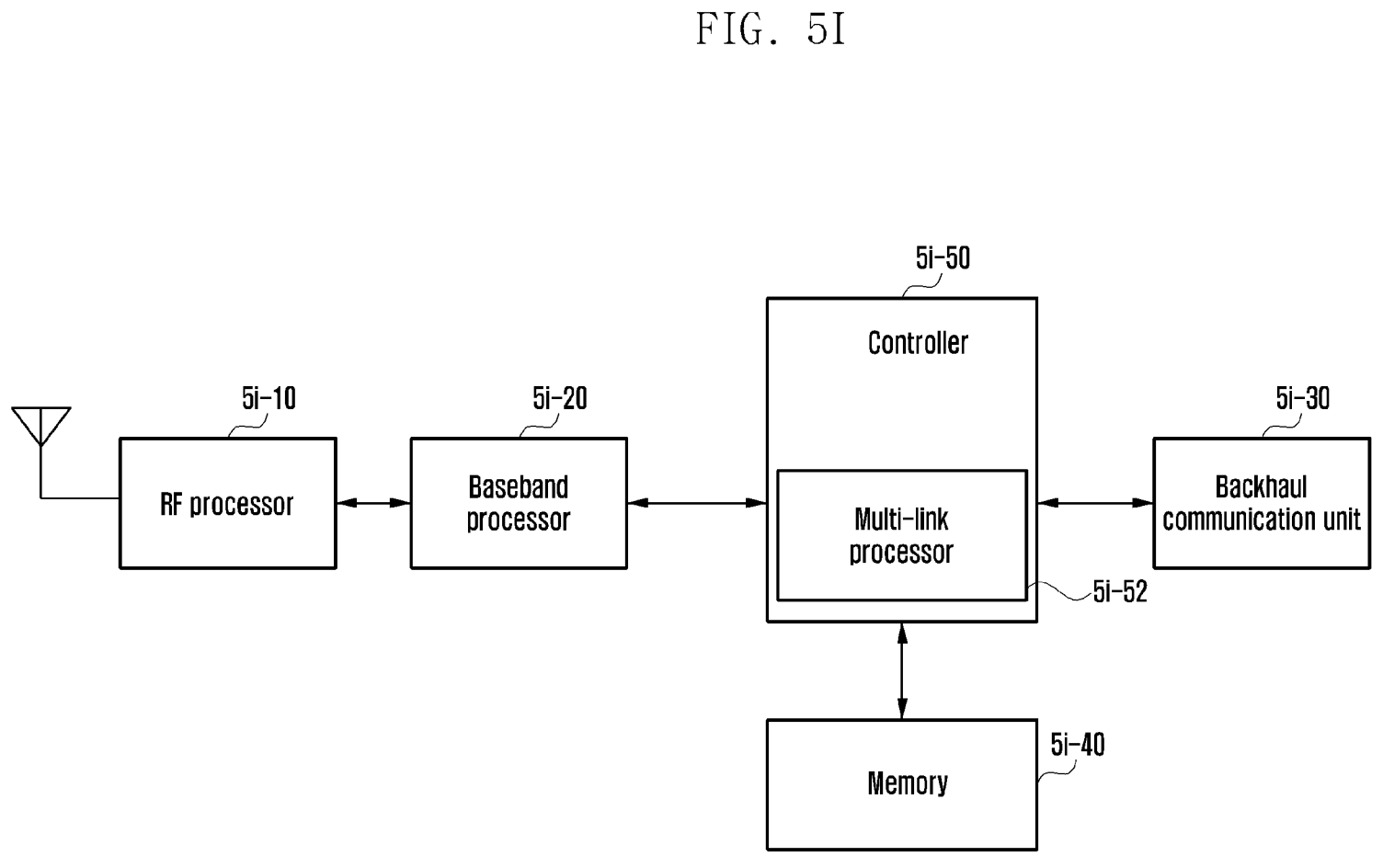

5i-50

Controller

Multi-link processor 5i-40

Memory 5i-20

Baseband processor 5i-10

RF processor 4-step RACH 6d-01 UE 6d-03 eNB 6d-05 Random Access Preamble 6d-10 Random Access Response (TA, T-RNTI, grant for msg3)

6d-15 Scheduled Transmission 6d-20 Contention Resolution

UL msg1    msg3

2 SF    5 SF    3 SF

DL msg2    msg4

FIG. 6E 2-step RACH

FIG. 7K 7k-10
RF processor 7k-20
Baseband processor 7k-40
Controller 7k-42
Multi-link processor 7k-30
Memory

FIG. 7L

METHOD AND APPARATUS FOR TRANSMITTING DATA IN A MOBILE COMMUNICATION SYSTEM

CROSS REFERENCED TO RELATED APPLICATIONS

This application is a continuation of application Ser. No. 16/658,945, filed Oct. 21, 2019, which is a continuation of application Ser. No. 15/887,074, filed Feb. 2, 2018, now U.S. Pat. No. 10,455,456, which claims priority to Korean Application No. 10-2017-0015783, filed Feb. 3, 2017, the disclosures of which are herein incorporated by reference in their entireties.

BACKGROUND

1. Field

Various embodiments of the present disclosure relate to a method for allocating an uplink transmission resource to data and transmitting the data in a mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, according to the development of long term evolution (LTE) and LTE-advanced, various methods for effectively performing communication in a mobile communication system have been attempted.

SUMMARY

The present disclosure relates to a case in which a security key used for data ciphering in a handover is changed. In a case where a security key used in a source cell and a security key used in a target cell are changed in a handover by applying the multiple connection method, the present disclosure is directed to provision of a method for solving a problem that a user data can be deciphered when it can be confirmed whether the user data is ciphered based on any of the security keys.

The present disclosure is directed to provision of a method of processing a handover related timer when a terminal based handover is performed in a wireless communication system.

The present disclosure is directed to provision of a method of setting up a handover related condition when a terminal based handover is performed in a wireless communication system.

The present disclosure is directed to provision of a method of processing data without a loss when a terminal based handover is performed in a wireless communication system.

The present disclosure is directed to provision of a logical channel prioritization (LCP) method for allocating data of a terminal to an uplink transmission resource in a current LTE system. The LCP method may include two steps. Such a LCP method increases complexity of the terminal, and in particular, the complexity may cause serious battery consumption and processing burden of the terminal in a new radio access technology or 5h which supports a high-speed high-capacity data transmission. In addition, a method for more efficiently allocating an uplink transmission resource is required to provide various services and satisfy various qualities of service (QoSs) in a next generation mobile communication system is used. Accordingly, the present disclosure proposes a method of allocating an uplink transmission resource suitable for a next generation mobile communication system to data of a terminal.

The present disclosure relates to a random access. Since a random access in the current LTE system includes four steps, a delay time occurs due to a message exchange between the terminal and the base station. A method for solving a problem that the LTE system is difficult to satisfy requirements of a next generation mobile communication system requiring a low delay time in a specific situation due to the random access is proposed.

Objects of the present disclosure are not limited to the above-mentioned objects. That is, other objects that are not mentioned may be obviously understood by those skilled in the art to which the present disclosure pertains from the following description.

In accordance with an aspect of the present disclosure, a method by a terminal comprises: identifying at least one logical channel for an uplink transmission, based on a first time duration for each logical channel and a second time duration for uplink resources, allocating the uplink resources to the identified at least one logical channel based on a predetermined order of priority, and transmitting data on the uplink resources, the data being generated from the at least one logical channel based on the allocation of the uplink resources.

In accordance with an aspect of the present disclosure, a terminal comprises a transceiver, and a controller coupled with the transceiver and configured to control to: identify at least one logical channel for an uplink transmission, based on a first time duration for each logical channel and a second time duration for uplink resources, allocate the uplink resources to the identified at least one logical channel based on a predetermined order of priority, and transmit data on the uplink resources, the data being generated from the at least one logical channel based on the allocation of the uplink resources.

According to an embodiment of the present disclosure, the present disclosure can transmit/receive data without the time interference when the terminal performs the handover operation by proposing the multiple connection based handover procedure with the target cell in the next generation mobile communication system.

In addition, according to another embodiment of the present disclosure, the present disclosure can reduce the handover failure probability by allowing the terminal to perform the handover according to the conditions received from the base station.

In addition, according to another embodiment of the present disclosure, the present disclosure can reduce the number of lost packets by allowing the terminal to perform the handover and perform the predetermined operation according to the conditions received from the base station.

In addition, according to another embodiment of the present disclosure, the present disclosure proposes the method of quickly and efficiently allocating uplink transmission resources to data of a terminal, thereby reducing the processing load and the battery consumption of the terminal in the next generation mobile communication system supporting high-speed and high-capacity and various data services and satisfying various quality of service (QoS) requirements.

In addition, according to another embodiment of the present disclosure, the present disclosure can reduce the delay time by allowing the terminal and the base station to use the 2-step random access according to the situation in the next generation mobile communication system.

The effects that may be achieved by the embodiments of the present disclosure are not limited to the above-mentioned objects. That is, other effects that are not mentioned may be obviously understood by those skilled in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1Eb is a diagram for explaining a packet ciphering method at the time of transmitting/receiving data in the LTE system referenced for an explanation of the present disclosure.

FIG. 1M is a block diagram illustrating the internal structure of the terminal according to the first embodiment of the present disclosure.

FIG. 1N is a block diagram illustrating an internal structure of a base station according to the first embodiment of the present disclosure.

FIG. 2D is a diagram illustrating an example of an operation sequence of the terminal according to the second embodiment of the present disclosure.

FIG. 2E is a diagram illustrating an example of an operation sequence of the base station according to the second embodiment of the present disclosure.

FIG. 2F is a diagram illustrating an example of a block diagram illustrating an internal structure of the terminal according to the second embodiment of the present disclosure.

FIG. 2G is a diagram illustrating an example of a block diagram illustrating an internal structure of the base station according to the second embodiment of the present disclosure.

FIG. 4F is a diagram illustrating an example of a block diagram illustrating an internal structure of the terminal according to the fourth embodiment of the present disclosure.

FIG. 4G is a diagram illustrating an example of a block diagram illustrating an internal structure of the base station according to the fourth embodiment of the present disclosure.

FIG. 5C is a diagram illustrating a structure of a next generation mobile communication system proposed in a fifth embodiment of the present disclosure.

FIG. 5H is a diagram illustrating the internal structure of the terminal according to the fifth embodiment of the present disclosure.

FIG. 5I is a diagram illustrating an internal structure of the base station in the wireless communication system according to the fifth embodiment of the present disclosure.

FIG. 6E is a diagram for explaining a 2-step random access process according to a sixth embodiment of the present disclosure.

FIG. 6H is a block diagram illustrating the internal structure of the terminal according to the sixth embodiment of the present disclosure.

FIG. 6I is a block diagram illustrating the internal structure of the base station according to the sixth embodiment of the present disclosure.

FIG. 7B is a diagram illustrating an example of a frame structure used in the next generation mobile communication system according to a seventh embodiment of the present disclosure.

FIG. 7K is a block diagram illustrating the internal structure of the terminal according to the seventh embodiment of the present disclosure.

FIG. 7L is a block diagram illustrating the internal configuration of the base station according to the seventh embodiment of the present disclosure.

DETAILED DESCRIPTION

Figure 1A:
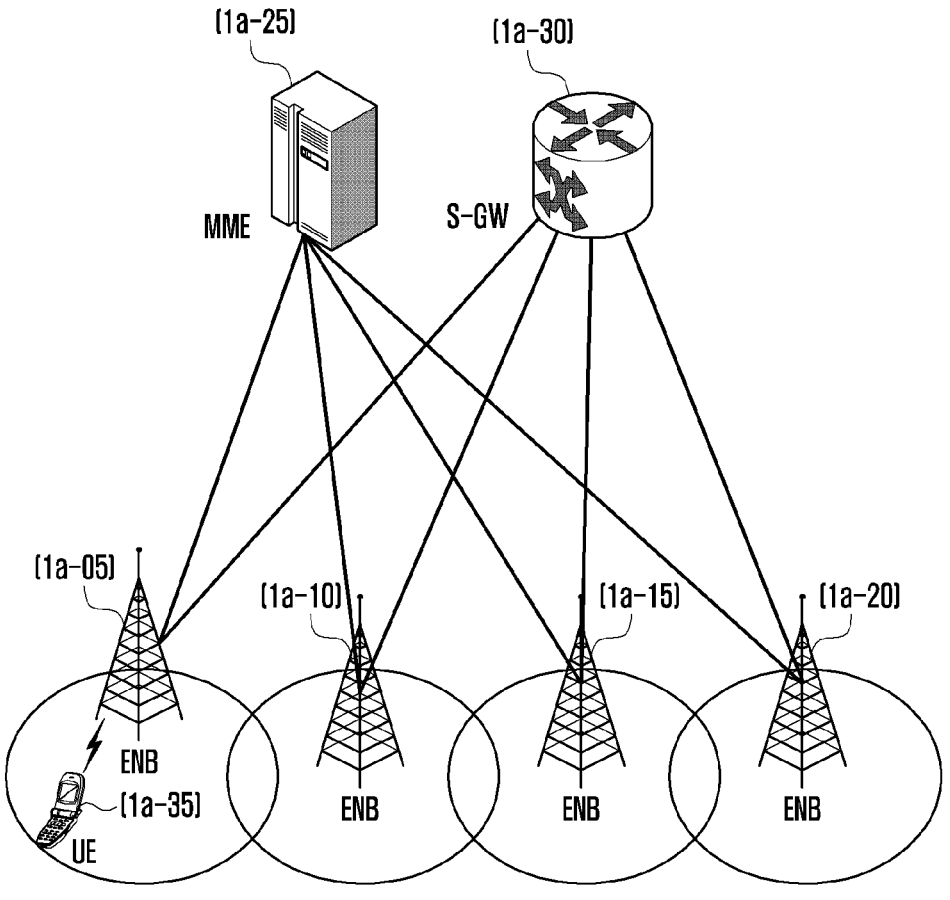
FIG. 1A is a diagram illustrating a structure of the existing LTE system.

Hereinafter, embodiments of the present disclosure will be described in detail with reference to the accompanying drawings. When it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

The methods according to the embodiments described in claims or specification of the present disclosure may be implemented in hardware, software, or a combination of hardware and software.

When the methods are implemented in the software, a computer readable storage medium storing at least one program (software module) may be provided. At least one programs stored in the computer readable storage medium is configured for execution by at least one processor within an electronic device. At least one program includes instructions that allow the electronic device to execute the methods according to the embodiments described in the claims or specification of the present disclosure.

The program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other types of optical storage devices, and a magnetic cassette. Alternatively, the programs may be stored in the memory that is configured of combinations of some or all of the memories. Further, each configuration memory may also be included in plural.

Further, the program may be stored in an attachable storage device that may be accessed through communication networks such as Internet, an intranet, a local area network (LAN), a wide LAN (WLAN), and a storage area network (SAN) or a communication network configured in a combination thereof. The storage device may access a device performing the embodiment of the present disclosure through an external port. Further, a separate storage device on the communication network may also access a device performing the embodiment of the present disclosure.

Hereafter, for convenience of explanation, the present disclosure uses terms and names defined in the 3rd generation partnership project long term evolution (3GPP LTE).

However, the present disclosure is not limited to the terms and names but may also be identically applied even to the system according to other standards. In particular, the present disclosure may be applied to 3GPP new radio (NR: 5G mobile communication standard).

First Embodiment

FIG. 1A is a diagram illustrating a structure of the existing LTE system.

Referring to FIG. 1A, the wireless communication system is configured to include a plurality of base stations 1a-05, 1a-10, 1a-15, and 1a-20, a mobility management entity (MME) 1a-25, a serving-gateway (S-GW) 1a-30. User equipment (hereinafter, UE or terminal) 1a-35 accesses an external network through the base stations 1a-05, 1a-10, 1a-15, and 1a-20 and the S-GW 1a-30.

The base stations 1a-05, 1a-10, 1a-15, and 1a-20 are access nodes of a cellular network and provide a radio access to terminals that are connected to a network. That is, in order to serve traffic of users, the base stations 1a-05, 1a-10, 1a-15, and 1a-20 collect state information such as a buffer state, an available transmission power state, a channel state, or the like of the terminals to perform scheduling, thereby supporting a connection between the terminals and a core network (CN). The MME 1a-25 is an apparatus for performing various control functions as well as a mobility management function for the terminal and is connected to a plurality of base stations, and the S-GW 1a-30 is an apparatus for providing a data bearer. Further, the MME 1a-25 and the S-GW 1a-30 may further perform authentication, bearer management or the like on the terminal connected to the network and may process packets that are to be received from the base stations 1a-05, 1a-10, 1a-15, and 1a-20 and packets that are to be transmitted to the base stations 1a-05, 1a-10, 1a-15, and 1a-20.

Figure 1B:
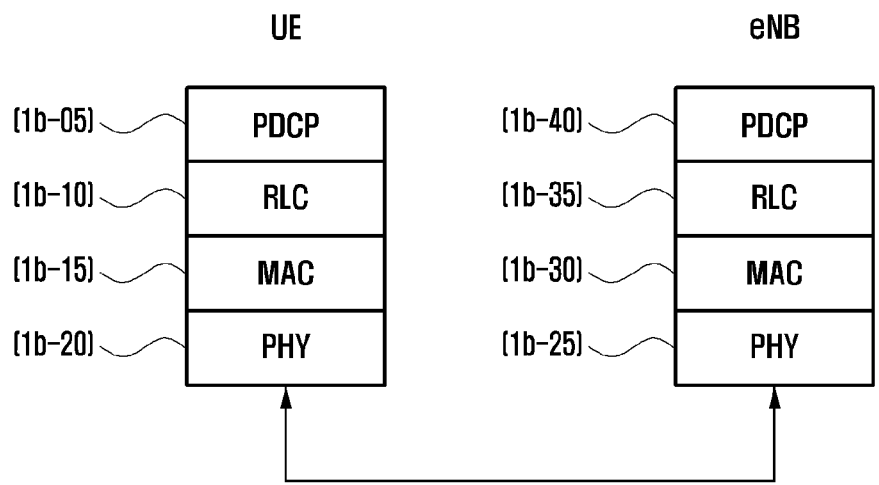
FIG. 1B is a diagram illustrating a radio protocol structure in the existing LTE system.

FIG. 1B is a diagram illustrating a radio protocol structure in the existing LTE system.

Referring to FIG. 1B, the radio protocol of the LTE system is configured to include packet data convergence protocols (PDCPs) 1b-05 and 1b-40, radio link controls (RLCs) 1b-10 and 1b-35, and medium access controls (MACs) 1b-15 and 1b-30 in the terminal and the eNB, respectively. The PDCPs 1b-05 and 1b-40 are in charge of operations such as IP header compression/decompression. The main functions of the PDCP are summarized as follows.

Header compression and decompression function (Header compression and decompression: ROHC only)

Transfer function of user data (Transfer of user data)

In-sequence delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

Radio link controls (hereinafter, referred to as RLCs) 1b-10 and 1b-35 reconfigure the PDCP packet data unit (PDU) to an appropriate size to perform an ARQ operation or the like. The main functions of the RLC are summarized as follows.

Data transfer function (Transfer of upper layer PDUs)

ARQ function (Error Correction through ARQ (only for AM data transfer))

Concatenation, segmentation, reassembly functions (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer))

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 1b-15 and 1b-30 are connected to several RLC layer devices configured in one terminal and perform an operation of multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 1b-20 and 1b-25 perform an operation of channel-coding and modulating upper layer data, making the upper layer data as an OFDM symbol and transmitting the OFDM symbol to a radio channel, or demodulating and channel-decoding the OFDM symbol received through the radio channel and transmitting the demodulated and channel-decoded OFDM symbol to the upper layer.

Although not illustrated in the present figure, a radio resource control (hereinafter, referred to as RRC) layer is present at each of the upper parts of the PDCP layer of the terminal and the base station, and the RRC layer may receive and transmit connection and measurement related control messages for a radio resource control.

Figure 1C:
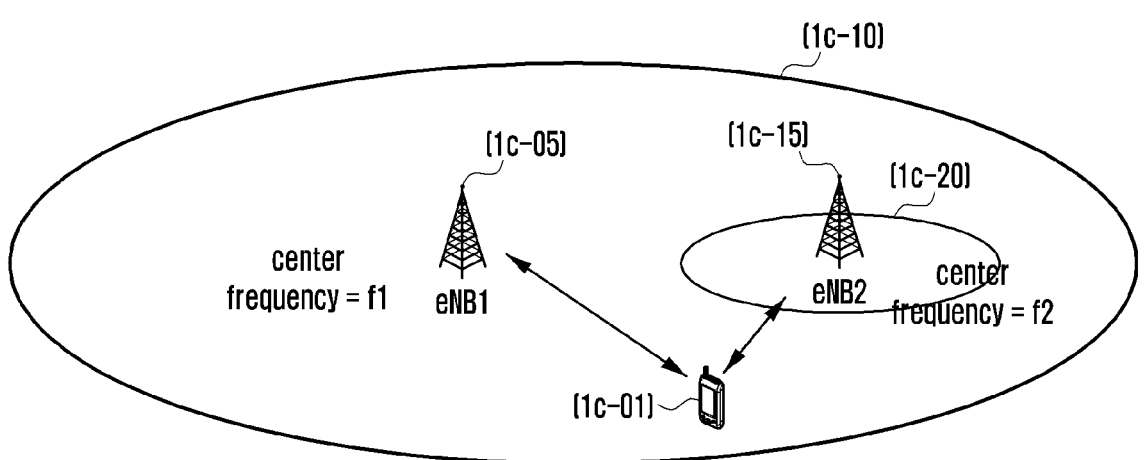
FIG. 1C is a diagram schematically illustrating a multiple connection operation of the existing LTE system.

FIG. 1C is a diagram schematically illustrating a multiple connection operation of the existing LTE system.

Referring to FIG. 1C, when the base station 1 1c-05 transmits/receives a carrier whose central frequency is f1 and the base station 2 (1c-15) transmits/receives a carrier whose central frequency is f2, if the terminal 1c-01 combines a carrier whose forward central frequency is f1 with a carrier whose forward central frequency is f2, one terminal may perform transmission/reception from two or more base stations. The LTE system supports the above operation and is referred to as dual connectivity (hereinafter, referred to as DC).

Hereinafter, in the embodiments of the present disclosure, receiving, by the terminal, data through any forward carrier or transmitting, from the terminal, the data through any uplink carrier reverse carrier have the same meaning as transmitting and receiving the data through a control channel and a data channel which are provided from a cell corresponding to a central frequency and a frequency band defining characteristics of the carriers. In the embodiments of the present disclosure, a set of serving cells controlled by the same base station is defined as a cell (CG). The cell group is again divided into a master cell group (MCG) and a secondary cell group (SCG). The MCG means a set of serving cells controlled by a base station (master eNB (MeNB)) that controls a primary cell (PC) cell, and the SCG means a set of serving cells controlled by a base station other than the base stations that control the PCell, that is, a secondary base station (secondary eNB (SeNB)) that controls only a secondary cell (SCell). The base station notifies of the terminal of whether a specific serving cell belongs to the MCG or the SCG while the corresponding serving cell is configured.

The PCell and the SCell are terms indicating a type of serving cells that are configured in the terminal. There are some differences between the PCell and the SCell. For example, the PCell is always in an activation state, but the SCell repeats the activation and deactivation states depending on the command of the base station. The mobility of the terminal is controlled based on the PCell, and the SCell may be understood as an additional serving cell for data transmission/reception. The PCell and the SCell in the embodiments of the present disclosure mean the PCell and the SCell defined in the LTE standard 36.331 or 36.321.

Referring back to FIG. 1C, if the base station 1 1c-05 is the MeNB and the base station 2 1c-15 is the SeNB, the serving cell 1c-10 having the central frequency of f1 is the serving cell belonging to the MCG, and the serving cell 1c-20 having the central frequency of f2 is the serving cell belonging to the SCG. In addition, it may be practically impossible to transmit a HARQ feedback and a CSI of the SCG SCells through a physical uplink control channel (PUCCH) of the PCell. The HARQ feedback should be delivered within a HARQ round trip time (RTT) (typically 8 ms) because the transmission delay between the MeNB and the SeNB may be longer than the HARQ RTT. Due to the above problem, a PUCCH transmission resource is configured in one of the SCells belonging to the SCG, that is, the primary SCell (PScell), and the HARQ feedback and the CSI for the SCG SCell are transmitted through the PUCCH.

Figure 1D:
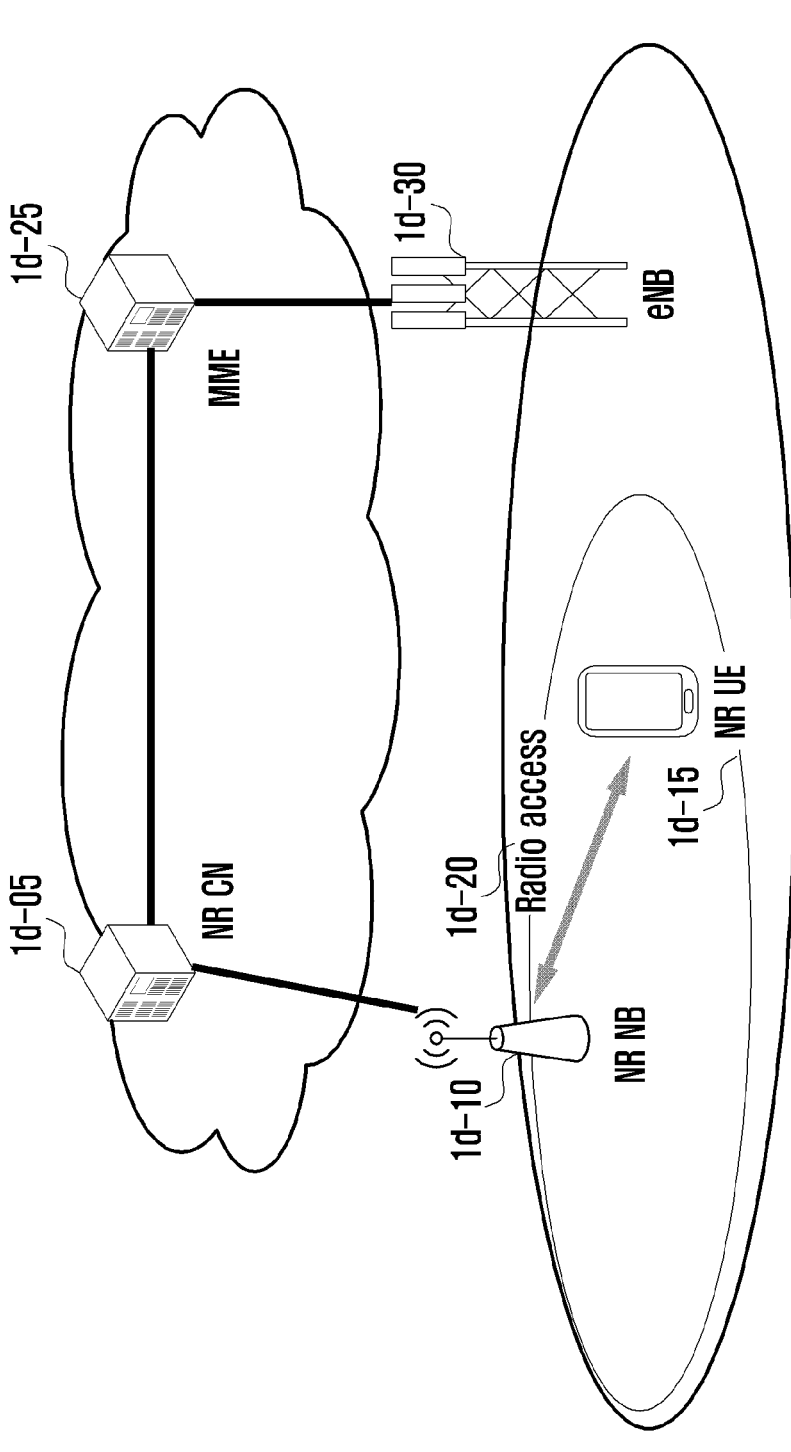
FIG. 1D is a diagram illustrating a structure of a next generation mobile communication system according to a first embodiment of the present disclosure.

FIG. 1D is a diagram illustrating a structure of a next generation mobile communication system according to a first embodiment of the present disclosure.

Referring to FIG. 1D, a radio access network of a next generation mobile communication system is configured to include a next generation base station (New radio node B, hereinafter NR gNB or NR base station) 1d-10 and a new radio core network (NR CN) 1d-05. The user terminal (new radio user equipment, hereinafter, NR UE or terminal) 1d-15 accesses an external network through the NR gNB 1d-10 and the NR CN 1d-05.

In FIG. 1D, the NR gNB 1d-10 corresponds to an evolved node B (eNB) of the existing LTE system. The NR gNB 1d-10 is connected to the NR UE 1d-10 by a radio channel and may provide a service superior to the existing node B.

In the next generation mobile communication system, since all user traffics are served through the shared channel, an apparatus for collecting state information such as a buffer state, an available transmission power state, and a channel state of the UEs to perform scheduling is required. Here, the NR gNB plays a role of the apparatus. One NR gNB 1d-10 typically includes a central unit (CU) for controlling a plurality of cells and supervising a control and signaling, and a distributed unit (DU) for taking charge of transmitting/receiving a signal. In order to realize the high-speed data transmission compared with the existing LTE, the NR gNB may have the existing maximum bandwidth or more, and may be additionally incorporated into a beam-forming technology by using orthogonal frequency division multiplexing (hereinafter, referred to as OFDM) as a radio access technology. Further, an adaptive modulation & coding (hereinafter, referred to as AMC) scheme for determining a modulation scheme and a channel coding rate depending on a channel state of the terminal is applied. The NR CN 1d-05 may perform functions such as mobility support, bearer configuration, QoS setup, and the like. The NR CN is an apparatus for taking charging of various control functions as well as a mobility management function for the terminal and is connected to a plurality of base stations. In addition, the next generation mobile communication system may interwork with the existing LTE system, and the NR CN is connected to the MME 1d-25 through the network interface. The MME is connected to the eNB 1d-30 which is the existing base station.

Figure 1E:
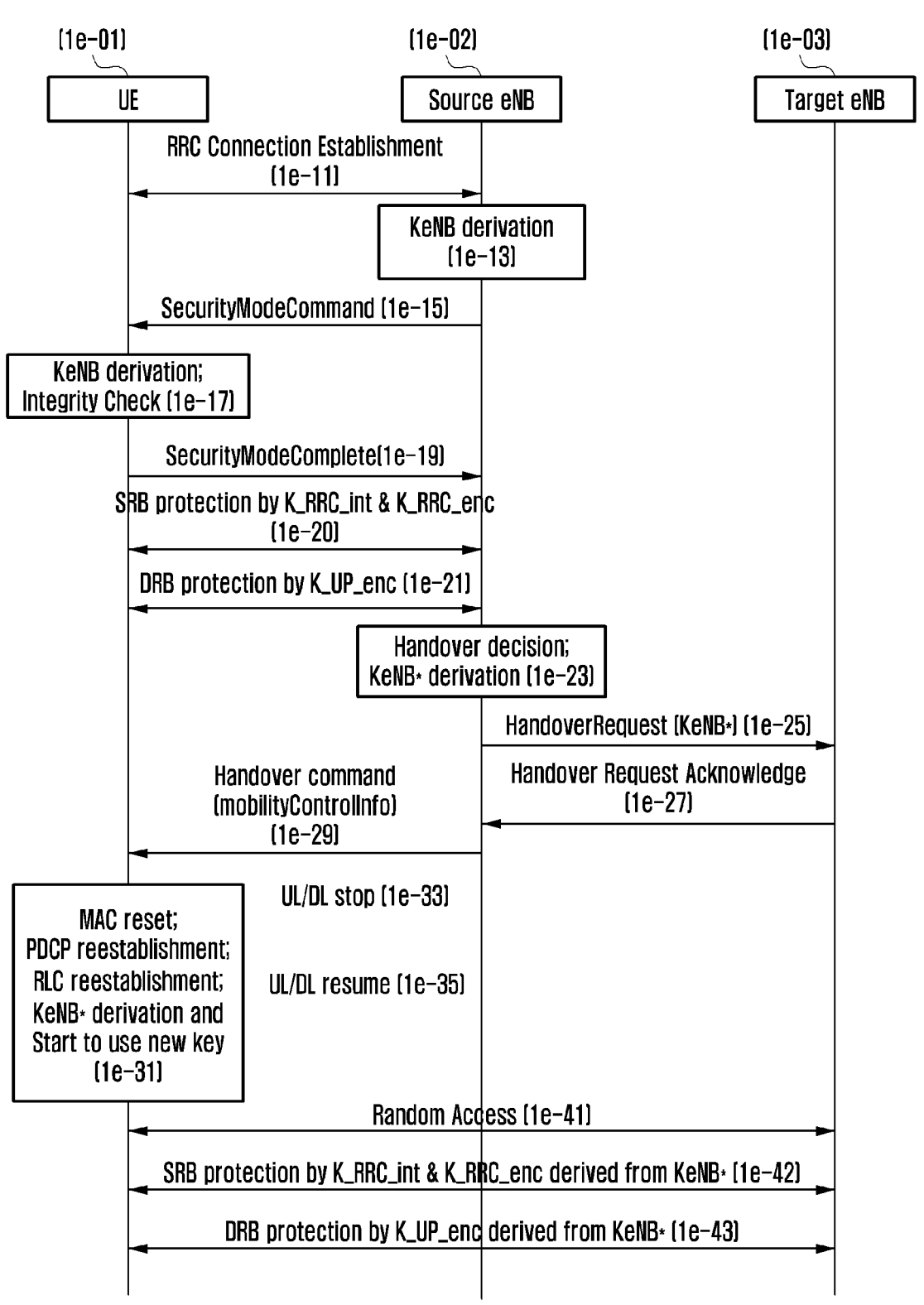
FIG. 1Ea is a diagram for explaining a handover procedure of an LTE system referenced for an explanation of the present disclosure.

FIG. 1Ea is a diagram for explaining a method for updating a security key in a handover procedure of the LTE system referenced for an explanation of the present disclosure.

The terminal in an idle mode performs a connection establishment with the currently staying (camping) cell (or base station) to enter a connected mode state in which the terminal may perform data communication with the base station (1e-11). This may be performed by transmitting an RRCConnnectionRequest message to the base station, receiving an RRCConnectionSetup message from the base station, and transmitting an RRCConnectionSetupComplete message to the base station again. Thereafter, although not illustrated in the present figure, the corresponding terminal receives a base station security key (KeNB) to be used by the corresponding base station from a core network apparatus (more specifically, mobility management entity (MME)). The KeNB is derived from KASME which is a security key between the terminal and the MME. Depending on a ciphering algorithm supported by the terminal in the KeNB, the base station generates a security key (K_RRC_enc) used for ciphering of a control message between the terminal and the base station, a security key (K_RRC_int) used for integrity check, and a security key (K_UP_enc) used for ciphering of a user data (1e-13). In addition, the base station notifies the terminal what ciphering algorithm is used through a SecurityModeCommand message 1e-15, such that terminal also generates the keys (K_RRC_enc) (K_RRC_int) (K_UP_enc) and identifies the integrity of the SecurityModeCommand by using the generated K_RRC_int (1e-17). If these pass the integrity check, the terminal generates a SecurityModeComplete message and transmits it to the base station (1e-19). Thereafter, the terminal and the base station communicate with each other using the (K_RRC_enc) (K_RRC_int) during the control message transmission/reception and performs packet ciphering/deciphering using the (K_UP_enc) during normal data transmission/reception (1e-20) (1e-21).

An example of the deciphering method performs the deciphering using the method illustrated in FIG. 1Eb, which is described in TS 33.401 which is the 3GPP standard document.

For example, by using the predetermined algorithm (EEA in FIG. 1Eb) in the packet ciphering method, in the case of the normal data, the corresponding algorithm uses a K_UP_enc value as KEY and inputs COUNT, BEARER, DIRECTION, LENGTH values as input values of the corresponding algorithm. The COUNT value is a combined value of Sequence Number (SN) of a PDCP layer and Hyper Frame Number, the BEARER value is an identifier of a 5-bit length bearer, the DIRECTION is determined depending on uplink (0) and downlink (1), and the LENGTH value refers to a packet length. The KEYSTREAM BLOCK and PLAIN-TEXT BLOCK thus generated are ciphered by being changed by an exclusive OR (XOR) operation, and even a receiving end generates the same KEYSTREAM BLOCK and performs the XOR operation with the deciphered packet, thereby performing the deciphering.

Thereafter, when the terminal moves to the vicinity of, for example, the target base station 1e-03, reports signals of neighbor base stations to the current base station, and determines a handover to the target base station based on the signals, the base station transmits KeNB* to be used by the target base station based on the KeNB (1e-23). Thereafter, a source base station transmits a HandoverRequest message to the target base station for requesting the handover of the terminal. At this time, the generated KeNB* is notified to the target base station (1e-25). When accepting the handover request, the target base station transmits a Handover Request Acknowledge message to the source base station to acknowledge the HandoverRequest (1e-27), such that the source base station commands the terminal to perform the handover to the target base station (1e-29).

The terminal which has received the handover command performs MAC initialization, PDCP re-establishment, and RLC re-establishment, generates KeNB* based on the KeNB to use the (K_RRC_enc) (K_RRC_int) (K_UP_enc) generated from the KeNB* (1e-31), (1e-33), and (1e-35). That is, to perform the communication with the target base station, the terminal performs a random access to the target base station to perform uplink synchronization (1e-41) and performs the following communications using the (K_RRC_enc) (K_RRC_int) (K_UP_enc) generated by the KeNB* (1e-42) (1e-43).

In the case of the handover in the existing LTE as described above, a time interruption occurs while the random access procedure to the target cell is performed, and a zero mobility interruption time without time interruption for eliminating the same is the requirement in the NR. In the present disclosure, the handover in the existing LTE is classified as a Type 1 handover and compared with the proposed method (Type 2 handover).

In the embodiment of the present disclosure, the target PCell to perform the handover is a serving cell configured in the terminal, which is defined as a Type 2 handover when the handover between the serving cells is performed. The Type 2 handover may be defined as a PCell change between serving cells. For the Type 2 handover, the following conditions should be satisfied.

1. At least one serving cell other than PCell should perform PUCCH connection establishment. This is because the uplink control channel for transmitting the HARQ feedback, the scheduling request, and the CSI is required.

2. Prior to performing the Type 2 handover, split bearers for all resource blocks (SRB1, SRB2, DRBs) other than SRB0 should be reconfigured.

In general, the Type 2 handover includes the following four steps.

1. Phase 0: Step of connecting the terminal to the PCell
2. Phase 1 (Preparing step): Step of configuring the additional PUCCH serving cell
3. Phase 2 (Executing step): Step of executing the Type 2 handover and changing the serving cell of the target base station to PCell. Here, the serving cell is not originally the PCell but should be a cell in which the PUCCH is configured.
4. Phase 3 (Arranging step) Releasing the previous PCell As the method for Type 2 handover, there are a handover using DC and RLC split bearers, a handover using DC and MAC split bearers, and an enhanced CA (eCA) based handover. Hereinafter, in the specification, the handover procedure using the DC and RLC split bearers will be described in detail.

Figure 1F:
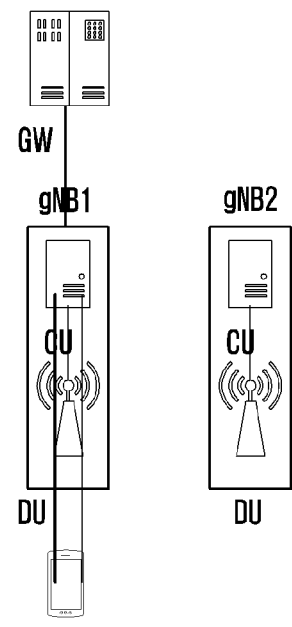
FIGS. 1Fa to 1Fd are diagrams for schematically explaining a handover operation and a protocol structure using a multiple connection and an RLC split bearer between different base stations according to a 1-1-th embodiment of the present disclosure.
Figure 1F:
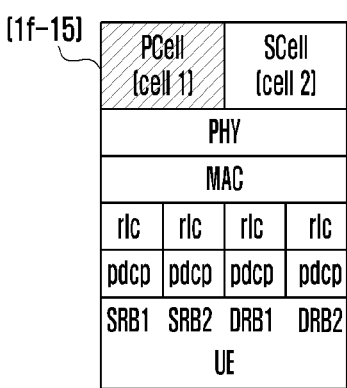
Figure 1F:
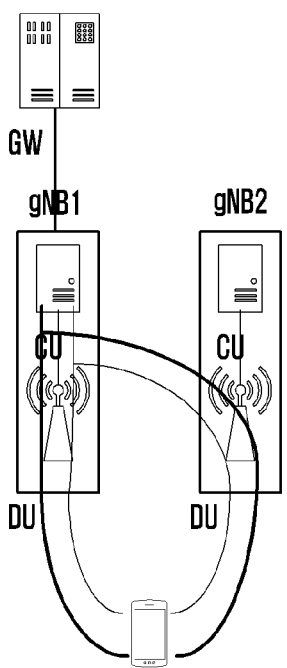
Figure 1F:
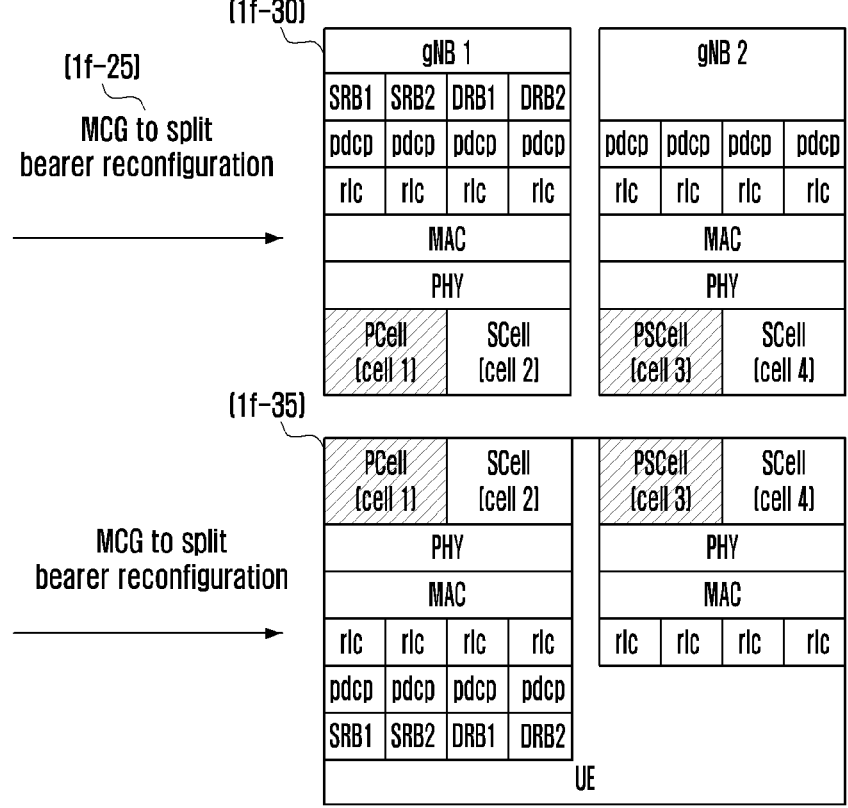
Figure 1F:
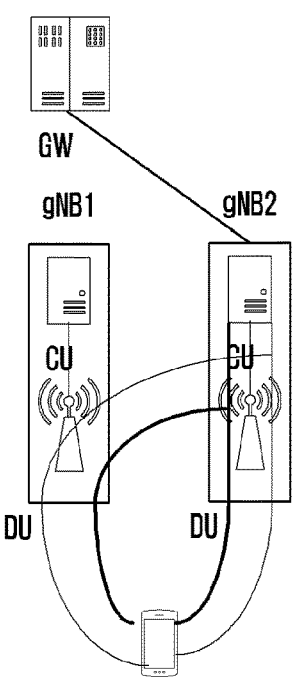
Figure 1F:
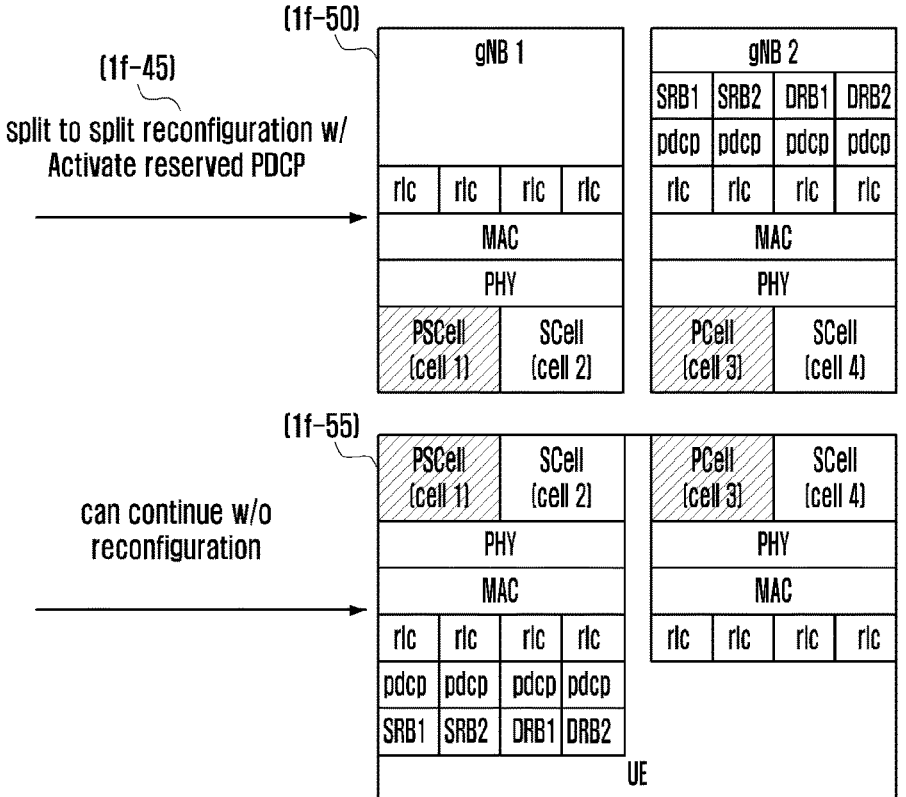
Figure 1F:
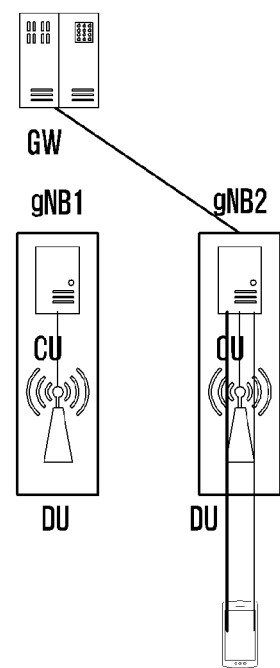
Figure 1F:
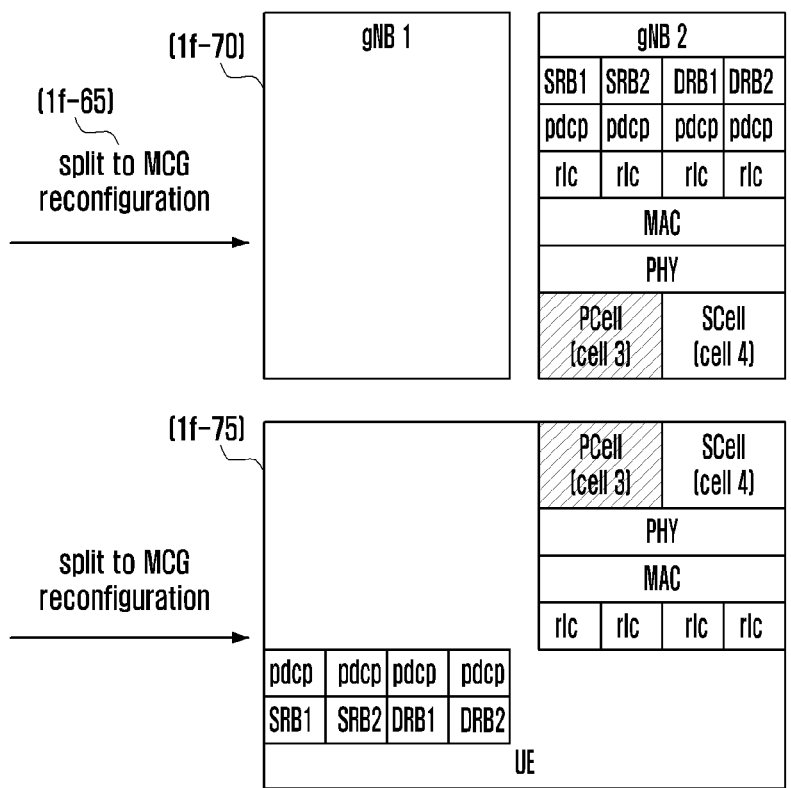

FIGS. 1Fa to 1Fd are diagrams for schematically explaining a handover operation and a protocol structure using a multiple connection and an RLC split bearer between different base stations according to a 1-1-th embodiment of the present disclosure.

The phase 0 is a step in which the terminal is connected to the gNB 1 in the NR system to perform basic data transmission/reception (1f-05). In the present disclosure, for ease of explanation, it is assumed that a gNB 1 includes one PCell and SCell. In this step, the gNB 1 configures a (master cell group) MCG bearer to which data is transmitted/received only to a serving cell of the MeNB, each PDCP device is connected to one RLC apparatus and the MAC and the RLC apparatus are connected to each other by a logical channel (1f-10). The terminal configures PDCP, RLC, MAC and the like depending the bearer configuration with the gNB 1, and receives a control signal and data through the PCell (Cell 1). In addition, the HARQ feedback, the scheduling request, and the CSI are transmitted to the PCell (Cell 1) through the PUCCH, and the data is transmitted/received through SCell (Cell 2). The SCell repeats an activation state and a deactivation state depending on the command of the base station (1f-15).

If the gNB 1 satisfies specific conditions and determines that the multiple connections for handover are required, the multiple connections are established in the phase 1 (1f-20). Thereafter, the gNB 1 additionally requests the SeNB to gNB 2, requests the PDCP establishment and the split bearer configuration to gNB 2, and configures the PDCP, the RLC, and the MAC depending on the bearer establishment. That is, the multiple connections with the gNB 2 including PSCell (Cell 3) and SCell (Cell 4) which are additional PUCCH serving cells are performed, and are re-established as the split bearer in the existing MCG bearer (1f-25 and 1f-30). This means that the PDCP apparatus of the gNB 1 is split and connected to two RLC apparatuses which are the gNB 1 and the gNB 2. As the multiple connections are performed, the terminal maintains the existing PDCP reordering operation and the RLC and MAC establishments of the gNB 1 for the SRB and the DRB, establishes the additional RLC in the gNB 2, and resets a new MAC (1f-35).

If the gNB 1 receives an event corresponding to the handover from the measurement report value of the terminal, for example, if the signal strength from the gNB 2 is better than the signal strength from the gNB 1 by a threshold value or more, it is in the Phase 2 step and performs an operation of changing roles of the PCell and the PSCell (1f-40). This step is reconfigured as the split bearer in the split bearer, and means S1-U is switched from the gNB 1 to the gNB 2 and the PDCP is readjusted (1f-45 and 1f-50). Therefore, the PDCP in the gNB 1 is released and the roles of the PCell and the PSCell are changed. The terminal does not greatly differ from the operation in the Phase 1, cancels a power headroom report (PHR), and adjusts a PH location at the PHR depending on the change in the PCell and the PSCell (1f-55).

If the gNB 2 receives the event associated with the multiple connection release of the gNB 1 from the measurement report value of the terminal, for example, if the signal strength from the gNB 1 is reduced to be the set threshold value or less, it is in the Phase 3 step to perform the operation of releasing the multiple connections (1f-60). In this step, the split bearer is reconfigured as the MCG bearer, and the bearer configuration in the gNB 1 is released depending on the SCG release request (1f-65 and 1f-70). Similarly, even the terminal releases the RLC and the MAC and performs the data transmission/reception in the newly established gNB 2 (1f-75).

Figure 1G:
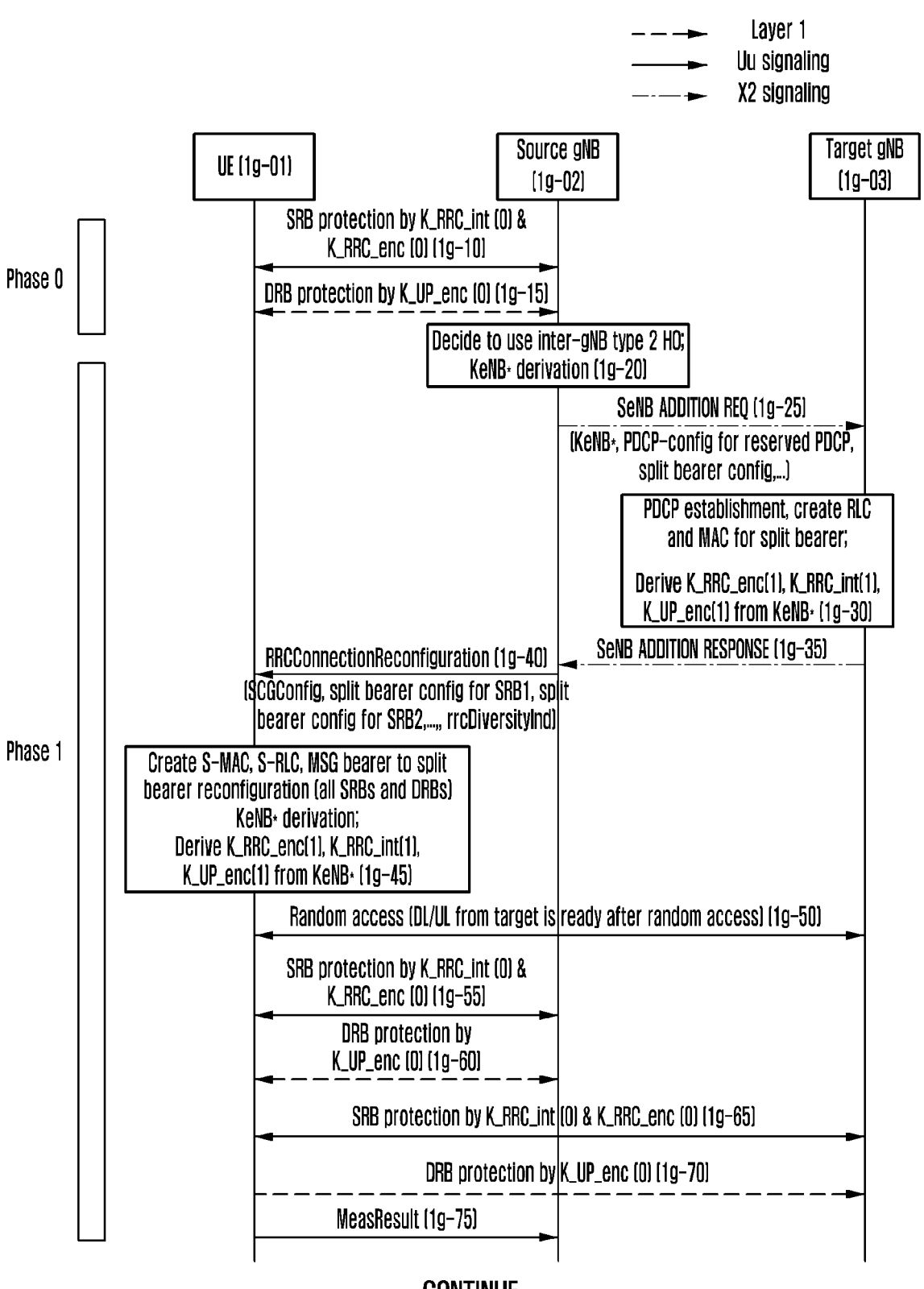
FIGS. 1Ga and 1Gb are diagrams for explaining a handover procedure using the multiple connection and the RLC split bearer according to the 1-1-th embodiment of the present disclosure.
Figure 1G:
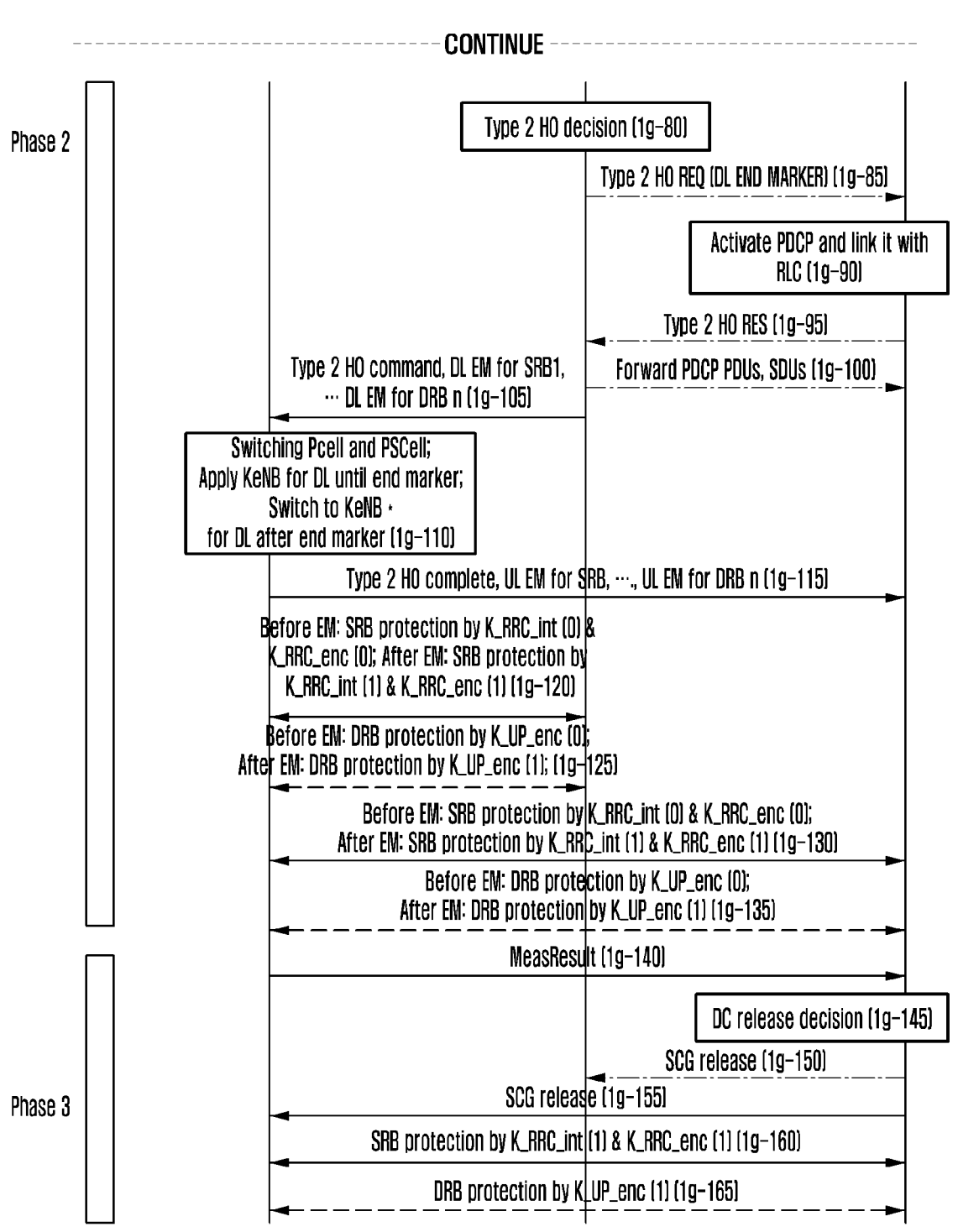

FIGS. 1Ga and 1Gb are diagrams for explaining a handover procedure using the multiple connection and the RLC split bearer according to the 1-1-th embodiment of the present disclosure. The handover procedure using the multiple connections between different base stations and the RLC split bearer will be described in detail through a signal flow by each phase.

First, the step (Phase 0) of receiving a downlink control signal and data in the state in which the terminal 1g-01 is connected to the source base station 1g-02 and transmitting an uplink control signal and data is assumed (1g-10). In the step, it is possible to receive the downlink control signal can be received through the PCell included in the source base station, transit the control signal through the uplink, and transmit/receive auxiliary data through the SCell depending on the command of the base station.

Accordingly, the control message for the source cell is subjected to integrity protection by K_RRC_int(0), and the deciphering is performed by K_RRC_enc(0) (1g-10). The integrity protection means inserting an additional separate code generated by a key of the K_RRC_int(0) at a transmitting end to identify whether the corresponding message is modulated and identifying whether to change the corresponding code by allowing the receiving end to decrypt the corresponding code based on the K_RRC_int(0). In addition, general data is ciphered/deciphered based on the K_UP_enc(0) to perform communication (1g-15).

Thereafter, the terminal measures neighboring cells depending on the configuration of the base station, and if the set conditions are satisfied, the terminal reports a result of measuring the source base station and the neighbor base stations to the corresponding source base station, such that it determines that the source base station performs the above-mentioned Type 2 HO and generates the KeNB* based on the KeNB (1g-20). Accordingly, the source base station requests the target base station to add the SeNB for the multiple connections through X2 signaling (1g-25). The request message includes the generated KeNB*, the PDCP establishment (no PDCP establishment in the additional request of the SeNB in the existing LTE) reserved for each added SCell, and the split bearer configuration information to perform the handover. The target base station receiving the request message performs the PDCP establishment, creates the RLC and the MAC for the split bearer, and generates K_RRC_enc(1), K_RRC_int(1), K_UP_enc(1) security keys from the received KeNB* (1g-30). The target base station transmits an SeNB additional response message to the source base station through X2 signaling (1g-35). The response message including the contents of the received SeNB additional request message may be retransmitted. If receiving the SeNB additional response message, the source base station transmits an RRCConnectionReconfiguration message to the terminal (1g-40). The message may include SCG configuration information of the target base station, split bearer configuration information for SRB and DRB, and RRC diversity configuration information. In the above step, the terminal which has received the RRC diversity configuration information transmits the PDCP SDU to the PCcell and the RLC of the PSCell until the RRC diversity setup is deactivated. The uplink RRC diversity may be deactivated when the SRB is re-established as the MCG bearer in the split bearer or explicitly indicated in an RRC message (e.g., handover command message). The terminal creates S-MAC and S-RLC for the SeNB depending on the received RRC message, and re-establishes the MSG bearer as the split bearer for the SRB and the DRB (1g-45). In addition, the terminal generates the K_RRC_enc(1), K_RRC_int(1), and K_UP_enc(1) security keys by deriving the KeNB* (1g-45). Thereafter, the terminal performs a random access procedure (1g-50) with the target base station, and performs the uplink and downlink transmission/reception to/from the source base station and the target base station (1g-55 to 1g-70). At this time, however, the new K_RRC_enc(1) K_RRC_int(1), and K_UP_enc(1) security keys are generated, but communication is still performed using the K_RRC_enc(0), K_RRC_int(0), and K_UP_enc security keys in this state. As described above, the terminal may transmit/receive data by being simultaneously connected to the source base station and the target base station through the Phase 1 step (1g-15 to 1g-70), and the time interruption does not occur during this process.

After the Phase 1 step, the additional measurement value may be received from the terminal depending on the set conditions (1g-75). The source base station determines the handover to the target base station depending on the measurement result value (Phase 2 step) (1g-80). To determine the handover, the terminal may include an event for the case where the signal strength from the source base station is reduced and the signal strength from the target base station is increased, and events may be reused in the LTE or a new event may be added. The source base station determines which of the packets is transmitted/received to/from each DRB using old keys (i.e., K_RRC_enc(0), K_RRC_int(0), K_UP_enc(0) security keys) while transmitting a Type 2 handover request to the target base station through the X2 signaling, such that the source base station transmits the Type 2 handover request to the target base station, including 'end marker' information for each bearer on whether a packet having any PDCP sequence number (PDCP SN) is transmitted using the old key (1g-85) and the target base station activates the PDCP and is connected to the corresponding RLC (1g-90). Thereafter, the target base station transmits a Type 2 handover response to the source base station through the X2 signaling (1g-95), and the source base station transmits the received PDCP SDU to the target base station through the X2 signaling depending on a value described in the end marker (1g-100). More specifically, for a value less than or equal to the PDCP SN value described in the transmitted end marker, the source base station still determines variable values such as a COUNT value or the like to apply the K_UP_enc(0) to the DRB and the K_RRC_enc(0) and the K_RCC_int(0) security keys, thereby performing the transmission. However, a packet having a value exceeding the PDCP SN value described in the delivered end marker is transmitted to the target base station as in (1-100). Meanwhile, the target base station may identify the PDCP SN and COUNT values of each bearer (i.e., SRB and DRBs) to be used by the target base station based on the end marker information of each bearer included in the Type 2 HO REQ (1g-85). In addition, by applying the K_UP_enc (1) security key derived from the KeNB* to the DRB and the K_RRC_enc(1) and K_RRC_int(1) security keys derived from the KeNB* to the SRB, the packet 1g-100 received from the source base station is transmitted if the handover complete message is received from the terminal.

In addition, the source base station transmits a Type 2 handover command to the terminal through an RRC message (RRConnectionReconfiguration) (1g-105). In this case, the RRC message including the 'end marker' notifying what packet the packets transmitted to each SRB and DRB using the old key is are notified to the downlink, and the configuration indicating the change of the role of the PCell and the PSCell included in the source base station and the target base station is explicitly or implicitly included. The terminal performs the Type 2 handover to the PSCell of the target base station (1g-110), applies the old key to the packet for a previous value of the 'end marker' according to the received 'end marker' information, and the packets for the next values are switched to new keys (i.e., K_RRC_enc(1), K_RRC_int(1), K_UP_enc(1) security keys) derived from the KeNB*. That is, the terminal maintains two sets of security keys, and determines which of the keys is applied depending on the PDCP sequence number (PDCP SN) information of the end markers received for each bearer and the PDCP SN value of the received packet.

In addition, after receiving the RRC message, the terminal sends a Type 2 handover complete RRC message to the PSCell of the source base station and the PCell of the target base station (1g-115). At this time, the Type2 handover complete RRC message including the 'end marker' information for each SRB and DRB for the uplink is transmitted. The terminal may perform continuous transmission while maintaining the existing Layer 1 transmission/reception by performing the Type 2 handover, and determines the security key to be applied according to the end marker information to be transmitted to the downlink and the uplink, thereby performing the data transmission/reception (1g-120 to 1g-135). The terminal may change the roles between the PCell of the source base station and the PSCell of the target base station according to the Phase 2 step (1g-75 to 1g-135) as described above and transmit/receive data by being simultaneously connected to two base stations even in the situation in which the security key is changed, and the time interruption does not occur during this process.

If the measurement value of the terminal after the Phase 2 step includes an event indicating the release of the source base station (1g-140), the target base station determines the multiple connection release of the source base station (Phase 3 step) (1g-145). The multiple connection release determination may be performed if the terminal determines that the signal strength from the source base station is less than a specific threshold and is unsuitable for performing communication. For this purpose, in the LTE, the events may be reused or the new event may be added. The target base station indicates the SCG release to the source base station through the X2 signaling (1g-150), and notifies the terminal of the SCG release through the RRC message (1g-155). Thereafter, the terminal and the target base station maintain the uplink and downlink transmission/reception depending on the above-mentioned new key (1g-160) (1g-165).

Figure 1H:
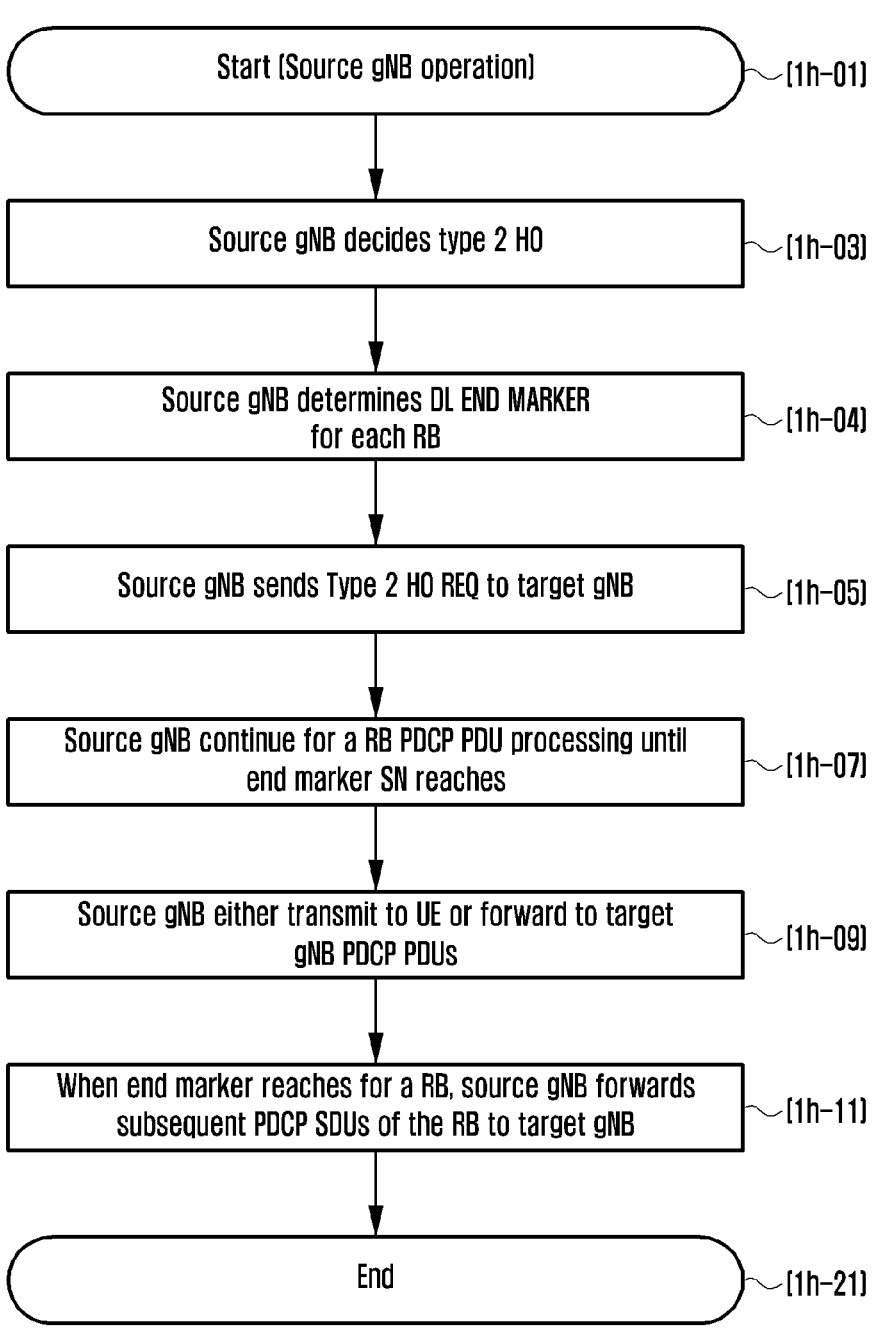
FIGS. 1Ha, 1Hb and 1Hc each are exemplary diagrams of an operation of a source base station, a target base station, and a terminal for downlink transmission/reception when the 1-1-th embodiment of the present disclosure is applied.
Figure 1H:
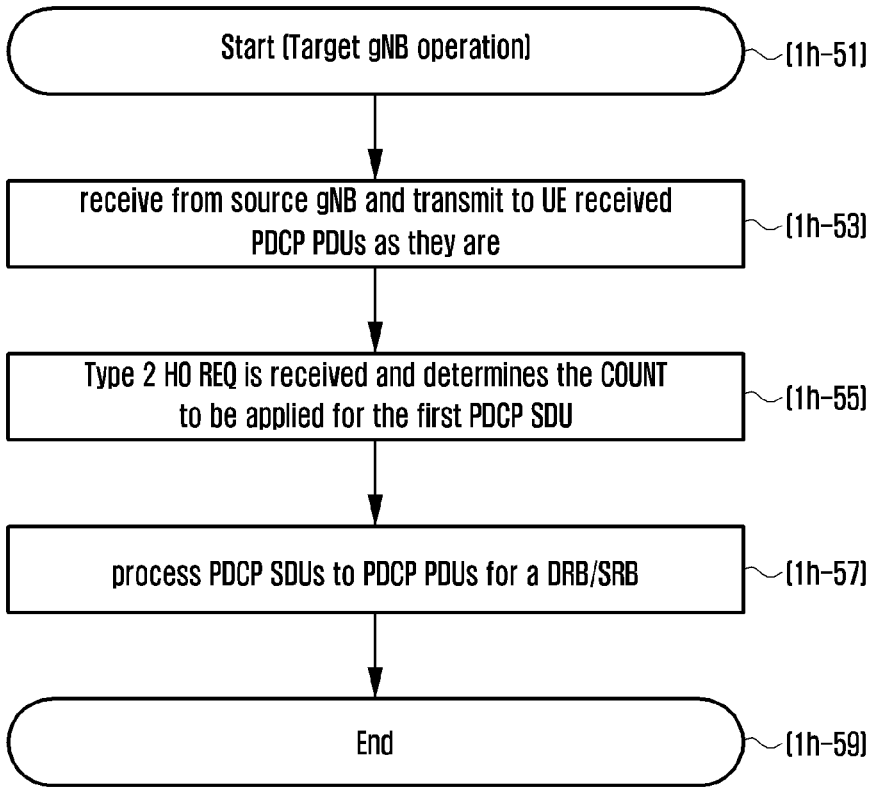
Figure 1H:
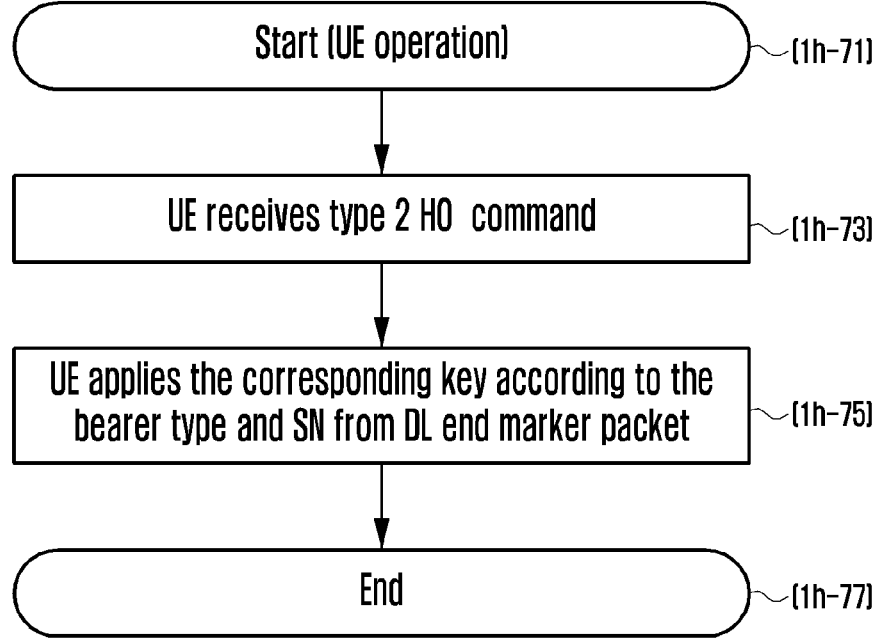

FIGS. 1Ha and 1Hb each are exemplary diagrams of an operation of a source base station, a target base station, and a terminal for downlink transmission/reception when the 1-1-th embodiment of the present disclosure is applied. For ease of explanation, in the operation, the operation in the Phase 2 of FIG. 1G will be mainly described.

First, the operation of the source base station is as follows. The source base station determines the Type 2 HO by the measurement report of the corresponding terminal (1h-03) and determines the SNs of the packets based on the previous security keys for each radio bearer (RB) of the corresponding terminal, thereby generating the end marker packet for the downlink (1h-04). Thereafter, the source base station transmits a Type 2 HO request message to the target base station, and the Type 2 HO Request message includes an end marker packet for the downlink (1h-05). Thereafter, the source base station continuously generates the PDCP PDU for the packets based on the determined previous security key (i.e., for packets having SNs smaller than the SN indicated in the end marker) (1h-07). That is, to cipher the corresponding PDCP SDU, the corresponding SN based COUNT and the above-mentioned input values are generated, the K_UP_enc derived from the KeNB is applied to the data radio bearer (DRB) to perform ciphering, and the K_RRC_enc and K_RRC_int derived from the KeNB is the signaling radio bearer to perform ciphering and integrity protection. The source base station transmits the packet to the terminal or performs forwarding to the target base station (1h-09). Thereafter, if the SNs of the packets of each radio bearer reach the value indicated in the end marker, the source base station transmits the subsequent PDCP packet to the target base station (1h-11).

Meanwhile, the operation of the source base station is as follows. If the target base station receives the PDCP PDU (i.e., the ciphered packet) from the source base station, the target base station directly transmits the PDCP PDU to the terminal as it is (1h-53). Next, if receiving the Type 2 HO Request message from the source base station, the PDCP SN and the COUNT value for the first PDCP SDU to which the new security key is to be applied is determined based on the downlink end marker information in the corresponding Type 2 HO Request (1h-55). Thereafter, the PDCP SDUs of the DRB and SRB are processed (1h-57). More specifically, the COUNT value is determined from the downlink end marker for DRBs, and ciphering is performed using the K_UP_enc security key derived from the KeNB*. Also, the COUNT value for the SRB is determined based on the downlink end marker for the SRBs, and the ciphering is performed using the K_RRC_enc and K_RRC_int security keys derived from the KeNB*.

Meanwhile, the operation of the terminal is as follows. The terminal receives a Type 2 HO command from the base station (1h-73). The Type 2 HO command includes the downlink end marker information, such that the terminal determines which of the security keys is applied to process the packet (1h-75). More specifically, the terminal applies the K_RRC_enc(0) and the K_RRC_int(0) to the PDCP PDU having a value smaller than the received downlink end marker information for the received SRB packet, and applies the K_RRC_enc(1) and the K_RRC_int(1) to the PDCP PDU having a value larger than the received downlink end marker information. In addition, the terminal applies the K_RRC_enc(0) to the PDCP PDU having a value smaller than the received downlink end marker information for the received DRB packet, and applies the K_RRC_enc(1) to the PDCP PDU having a value larger than the received downlink end marker information.

Figure 1I:
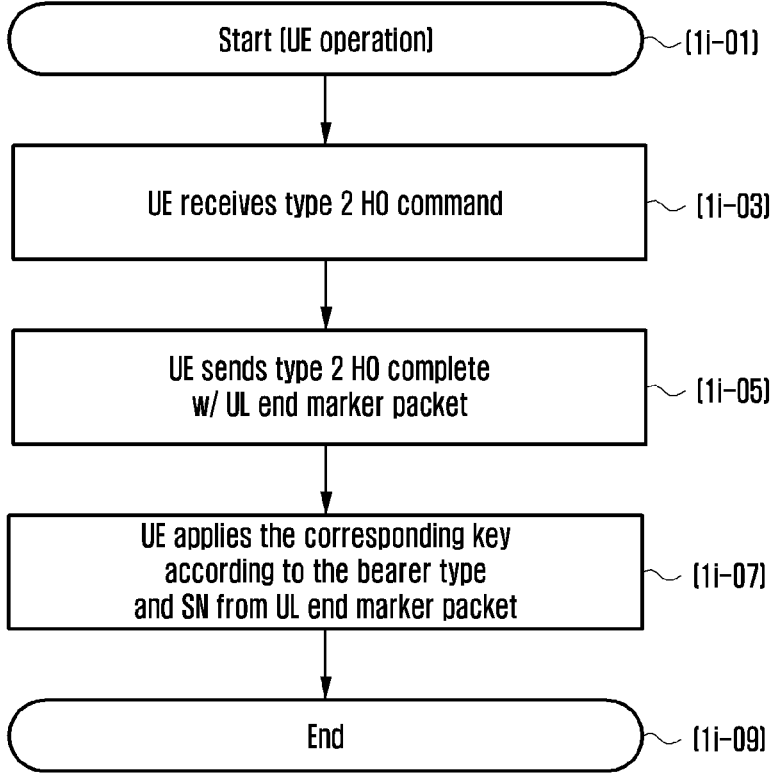
FIGS. 1Ia, 1Ib, and 1Ic each are exemplary diagrams of an operation of a terminal, a target base station, and a source base station for uplink transmission/reception when the 1-1-th embodiment of the present disclosure is applied.
Figure 1I:
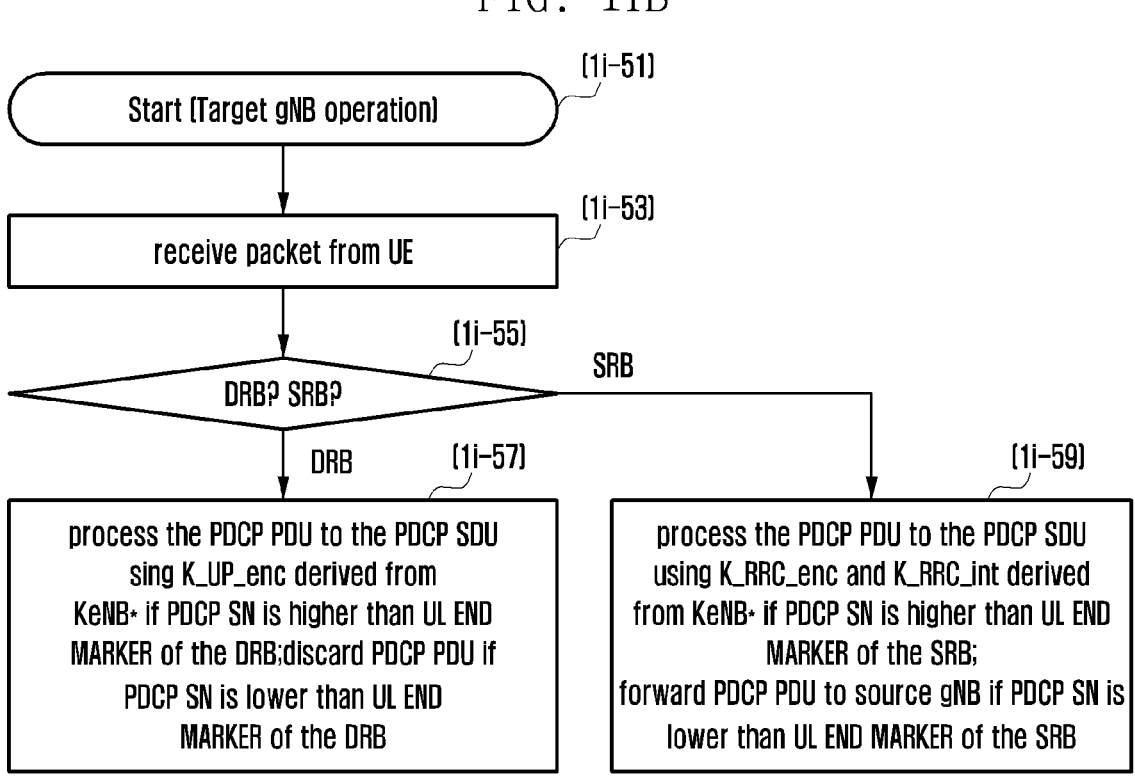
Figure 1I:
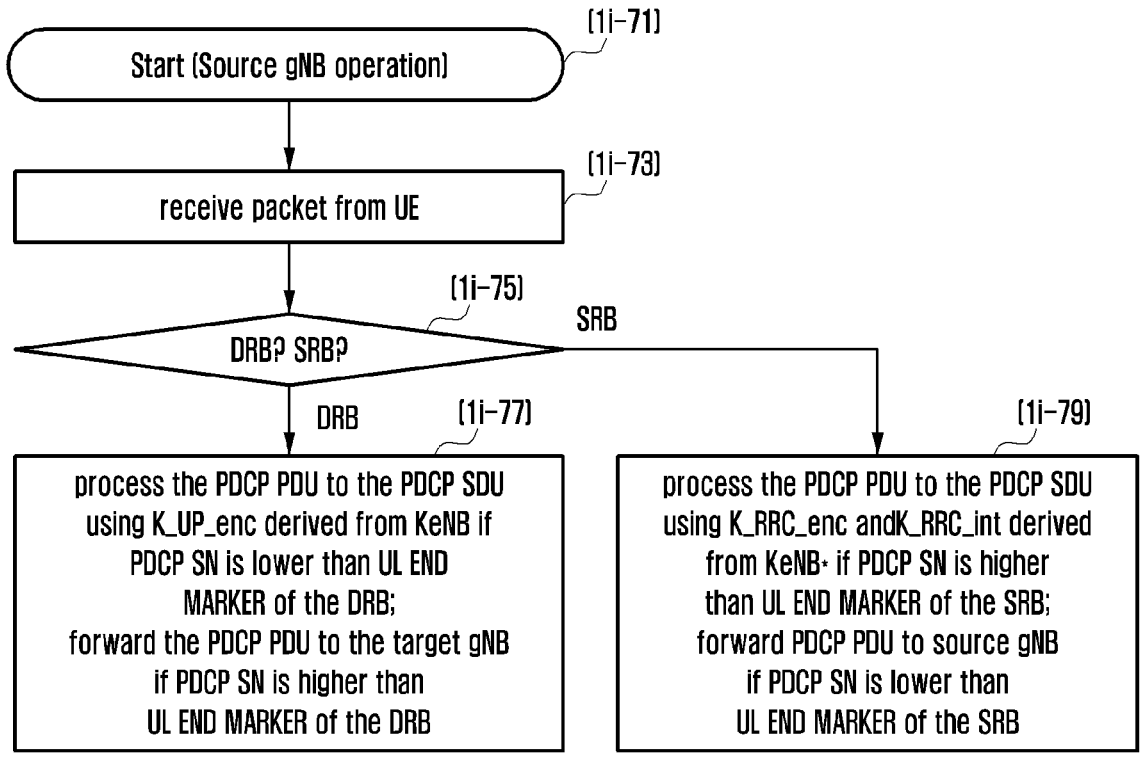

FIGS. 1Ia, 1Ib, and 1Ic each are exemplary diagrams of an operation of a source base station, a target base station, and a terminal for uplink transmission/reception when the 1-1-th embodiment of the present disclosure is applied. For ease of explanation, in the operation, the operation in the Phase 2 of FIG. 1G will be mainly described.

First of all, the operation of the terminal is as follows. The terminal receives the Type 2 HO command from the base station (1*h*-03). The Type 2 HO command includes the downlink end marker information, such that the terminal determines which of the security keys is applied to process the packet. In addition, a Type 2 HO complete message is transmitted as a response message to the Type 2 HO command, and it is determined to which of the packets for the uplink PDCP PDU which of the security keys is applied and the determined security key is transmitted to the base station (1*i*-05). That is, the uplink end marker information is transmitted. Accordingly, the terminal determines which of the security keys is applied to the uplink packet to process the packet (1*i*-07). More specifically, the terminal applies the K_RRC_enc(0) and the K_RRC_int(0) to the PDCP SDU having a value smaller than the transmitted downlink end marker information for the SRB packet to be transmitted, and applies the K_RRC_enc(1) and the K_RRC_int(1) to the PDCP SDU having a value larger than the transmitted downlink end marker information. In addition, the terminal applies the K_RRC_enc(0) to the PDCP SDU having a value smaller than the transmitted downlink end marker information for the DRB packet to be transmitted, and applies the K_RRC_enc(1) to the PDCP SDU having a value larger than the transmitted downlink end marker information. At this time, for the PDCP SDU having a value smaller than the transmitted downlink end marker information, the packet is transmitted only to the source base station. Since the target base station does not have the KeNB-based security key capable of deciphering the packet, the target base station is to prevent a so-called ping pong of transmitting the packet back to the source base station, deciphering the transmitted packet, and receiving the packet again.

Meanwhile, the operation of the target base station is as follows. The target base station receives the uplink packet from the terminal (1*i*-53) and determines whether the packet is the DRB packet or the SRB packet (1*i*-55). In the case of the DRB, the K_UP_enc security key derived from the KeNB* is used for the packet larger than the uplink end marker information received from the terminal to process the PDCP PDU using the PDCP SDU, and the packet having the SN smaller than the uplink end marker information received from the terminal is discarded (1*i*-57). In the case of the SRB, the K_UP_enc and K_RRC_int security keys received derived from the KeNB* is used for the packet larger than the uplink end marker information received from the terminal to process the PDCP PDU using the PDCP SDU, and the packet having the SN smaller than the uplink end marker information received from the terminal is transmitted to the source base station (1*i*-59).

Meanwhile, the operation of the source base station is as follows. The source base station receives the uplink packet from the terminal (1*i*-73) and determines whether the packet is the DRB packet or the SRB packet (1*i*-75). In the case of the DRB, the K_UP_enc security key derived from the KeNB* is used for the packet smaller than the uplink end marker information received from the terminal to process the PDCP PDU using the PDCP SDU, and the packet having the SN larger than the uplink end marker information received from the terminal is transmitted to the target base station (1*i*-77). In the case of the SRB, the K_UP_enc and K_RRC_int security keys derived from the KeNB* are used for the packet smaller than the uplink end marker information received from the terminal to process the PDCP PDU using the PDCP SDU, and the packet having the SN larger than the uplink end marker information received from the terminal is transmitted to the target base station (1*i*-79).

Figure 1J:
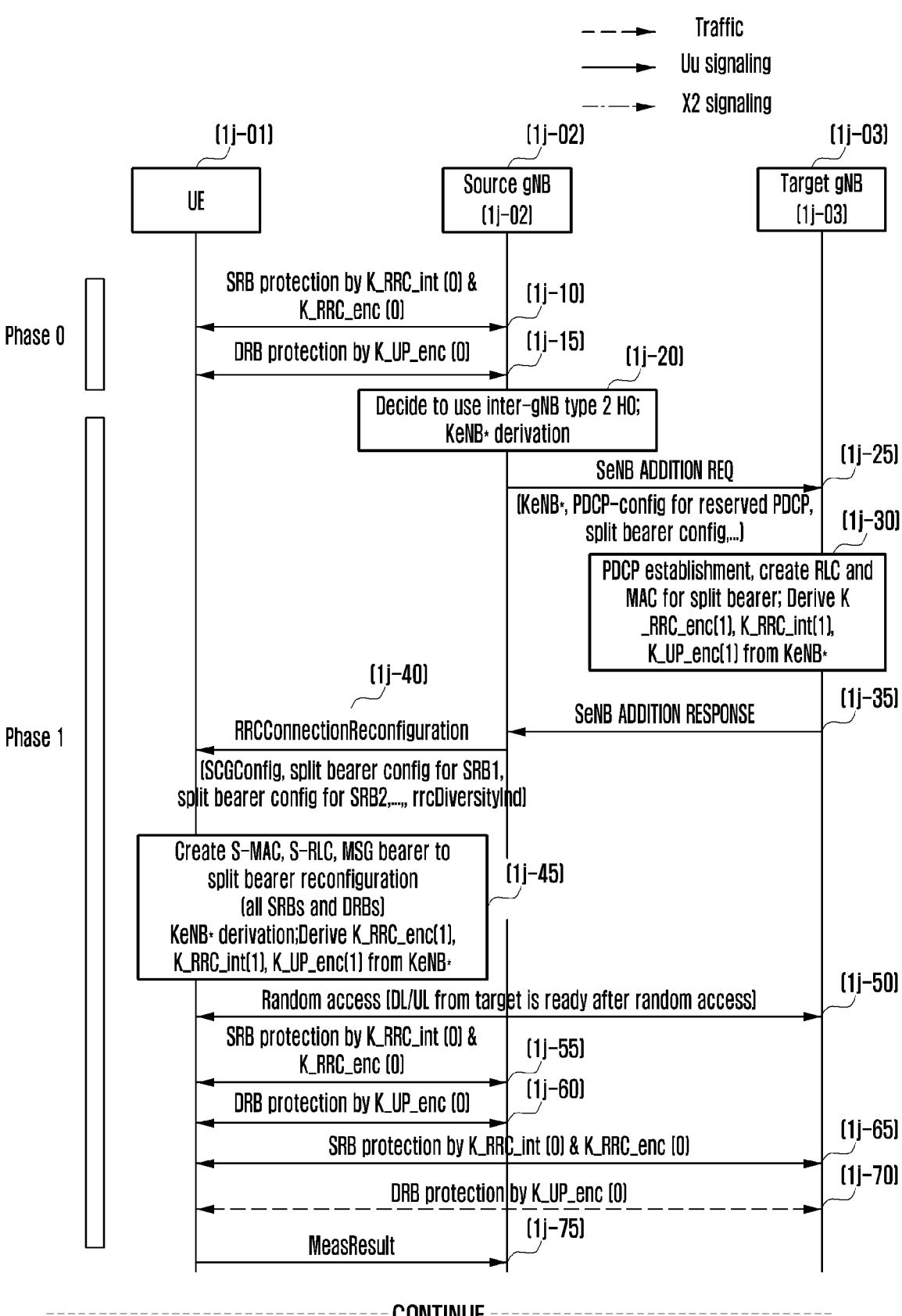
FIGS. 1Ja and 1Jb are diagrams illustrating an operation of performing a Type 2 handover procedure using the multiple connection and the RLC split bearer proposed according to 1-2-th embodiment of the present disclosure.
Figure 1J:
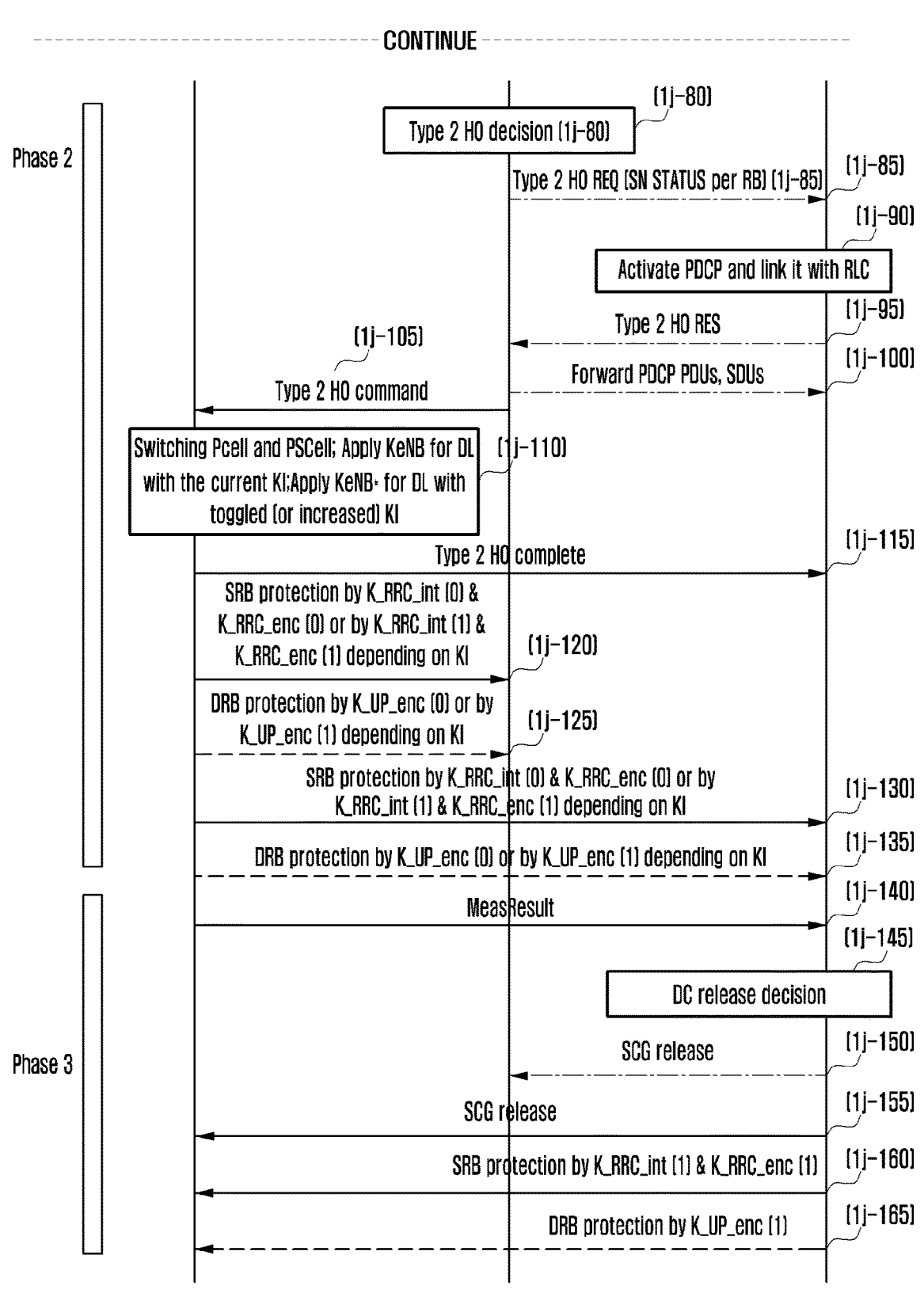

FIGS. 1Ja and 1Jb are diagrams illustrating an operation of performing a Type 2 handover procedure using the multiple connection and the RLC split bearer proposed according to 1-2-th embodiment of the present disclosure. Referring to FIG. 1J, the handover procedure using the multiple connections between different base stations and the RLC split bearer will be described in detail through a signal flow by each phase.

First, the step (Phase 0) of receiving a downlink control signal and data in the state in which the terminal is connected to the source base station 1*j*-02 and transmitting an uplink control signal and data is assumed. In the step, it is possible to receive the downlink control signal can be received through the PCell included in the source base station, transit the control signal through the uplink, and transmit/receive auxiliary data through the SCell depending on the command of the base station.

Accordingly, the control message for the source cell is subjected to the integrity protection by the K_RRC_int(0), and the deciphering is performed by K_RRC_enc(0) (1*g*-10). The integrity protection means inserting an additional separate code generated by a key of the K_RRC_int(0) at a transmitting end to identify whether the corresponding message is modulated and identifying whether to change the corresponding code by allowing the receiving end to decrypt the corresponding code based on the K_RRC_int(0). In addition, general data is ciphered/deciphered based on the K_UP_enc(0) to perform communication (1*j*-15).

Thereafter, the terminal measures neighboring cells depending on the configuration of the base station, and if the set conditions are satisfied, the terminal reports a result of measuring the source base station and the neighbor base stations to the corresponding source base station, such that it determines that the source base station performs the above-mentioned Type 2 HO and generates the KeNB* based on the KeNB (1*j*-20). Accordingly, the source base station requests the target base station to add the SeNB for the multiple connections through the X2 signaling (1*j*-25). The request message includes the generated KeNB*, the PDCP establishment (no PDCP establishment in the additional request of the SeNB in the existing LTE) reserved for each added SCell, and the split bearer configuration information to perform the handover. The target base station receiving the request message performs the PDCP establishment, creates the RLC and the MAC for the split bearer, and generates K_RRC_enc(1), K_RRC_int(1), K_UP_enc(1) security keys from the received KeNB* (1*j*-30) and transmits an SeNB additional response message to the source base station through X2 signaling (1*j*-35). The response message including the contents of the received SeNB additional request message may be retransmitted. When receiving the SeNB additional response message, the source base station transmits the RRCConnectionReconfiguration message to the terminal (1*j*-40). The message may include the SCG configuration information of the target base station, the split bearer configuration information for the SRB and DRB, and the RRC diversity configuration information. In the above step, the terminal which has received the RRC diversity configuration information transmits the PDCP SDU to the PCcell and the RLC of the PSCell until the RRC diversity setup is deactivated. The uplink RRC diversity may be deactivated when the SRB is re-established as the MCG bearer in the split bearer or explicitly indicated in the RRC message (e.g., handover command message). The terminal creates the S-MAC and the S-RLC for the SeNB depending on the received RRC message, and re-establishes the MSG bearer as the split bearer for the SRB and the DRB (1j-45). In addition, the terminal generates the K_RRC_enc(1), K_RRC_int(1), and K_UP_enc(1) security keys by deriving the KeNB* (1j-45). Thereafter, the terminal performs the random access procedure (1j-50) with the target base station, and performs the uplink and downlink transmission/reception to/from the source base station and the target base station (1j-55 to 1j-70). At this time, however, the new K_RRC_enc(1), K_RRC_int(1), and K_UP_enc(1) security keys are generated, but communication is still performed using the K_RRC_enc(0), K_RRC_int(0), and K_UP_enc security keys in this state. As described above, the terminal may transmit/receive data by being simultaneously connected to the source base station and the target base station through the Phase 1 step (1j-15 to 1j-70), and the time interruption does not occur during this process.

After the Phase 1 step, the additional measurement value may be received from the terminal depending on the set conditions (1j-75). The source base station determines the handover to the target base station depending on the measurement result value (Phase 2 step) (1j-80). The handover determination may include an event for the case where the signal strength from the source base station is reduced and the signal strength from the target base station is increased, and events may be reused in the LTE or a new event may be added. The source base station includes information SN STATUS on packet numbers transmitted to each bearer while transmitting the type 2 handover request to the target base station through the X2 signaling (1j-85) and the target base station activates the PDCP and is connected to the RCL (1j-90). Thereafter, the target base station transmits the Type 2 handover response to the source base station through the X2 signaling (1j-95), and the source base station transmits the received PDCP SDU to the target base station through the X2 signaling (1j-100). In addition, the source base station transmits the Type 2 handover command to the terminal through the RRC message (RRConnectionReconfiguration) (1j-105). At this time, the RRC message explicitly or implicitly includes a configuration instructing to change the roles of the PCell and the PSCell included in the source base station and the target base station. The terminal performs the Type 2 handover to the PSCell of the target base station (1j-110).

Meanwhile, in this embodiment, it is proposed that the PDCP layer of all packets transmitted to the SRB and the DRB include, for example, key indicator (KI) information. Therefore, the receiving end (i.e., base station or terminal) receiving the packet may identify whether the packet is subjected to the ciphering and the integrity protection based on any of the securities. The KI value currently used by the source base station may be a value that the base station sets based on the RRC message. Accordingly, the receiving end may determine whether to use the KeNB based security key or the KeNB* based security key using the received KI field.

In addition, after receiving the RRC message, the terminal sends a Type 2 handover complete RRC message to the PSCell of the source base station and the PCell of the target base station (1j-115). The terminal may perform continuous transmission while maintaining the existing Layer 1 transmission/reception by performing the Type 2 handover, and the receiving end determines the security key to be applied according to the K1 information included in all the packets, thereby performing the data transmission/reception (1j-120 to 1j-135). The terminal may change the roles between the PCell of the source base station and the PSCell of the target base station according to the Phase 2 step (1j-75 to 1j-135) as described above and transmit/receive data by being simultaneously connected to two base stations even in the situation in which the security key is changed, and the time interruption does not occur during this process.

If the measurement value of the terminal after the Phase 2 step includes an event indicating the release of the source base station (1j-140), the target base station determines the multiple connection release of the source base station (Phase 3 step) (1j-145). The measurement value may be performed if the terminal determines that the signal strength from the source base station is less than a specific threshold and is unsuitable for performing communication. For this purpose, in the LTE, the events may be reused or the new event may be added. The target base station indicates the SCG release to the source base station through the X2 signaling (1j-150), and notifies the terminal of the SCG release through the RRC message (1j-155). Thereafter, the terminal and the target base station maintain the uplink and downlink transmission/reception depending on the above-mentioned new key (1j-160) (1j-165).

Figure 1K:
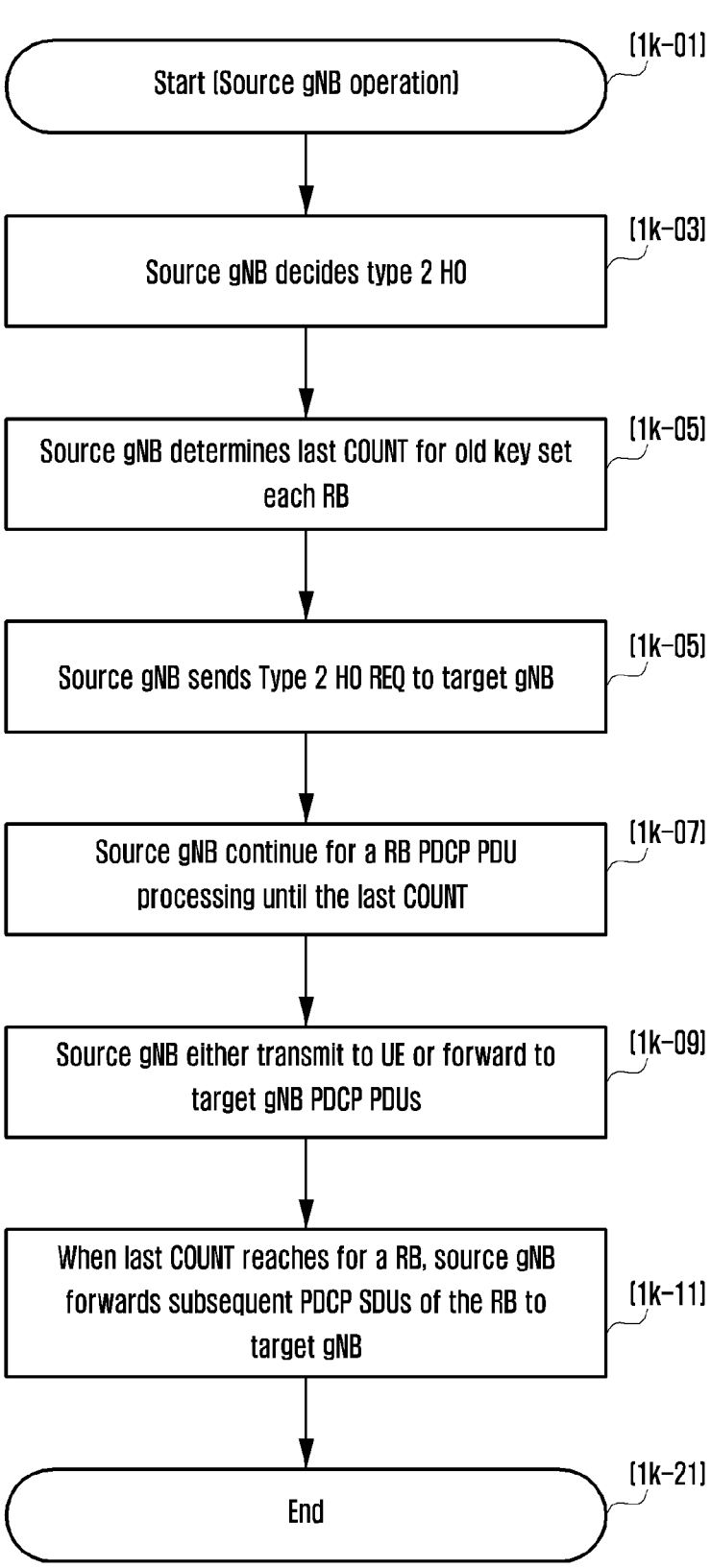
FIGS. 1Ka, 1Kb, and 1Kc each are diagrams illustrating an operation of a source base station, a target base station, and a terminal for downlink transmission/reception when the 1-2-th embodiment of the present disclosure is applied.
Figure 1K:
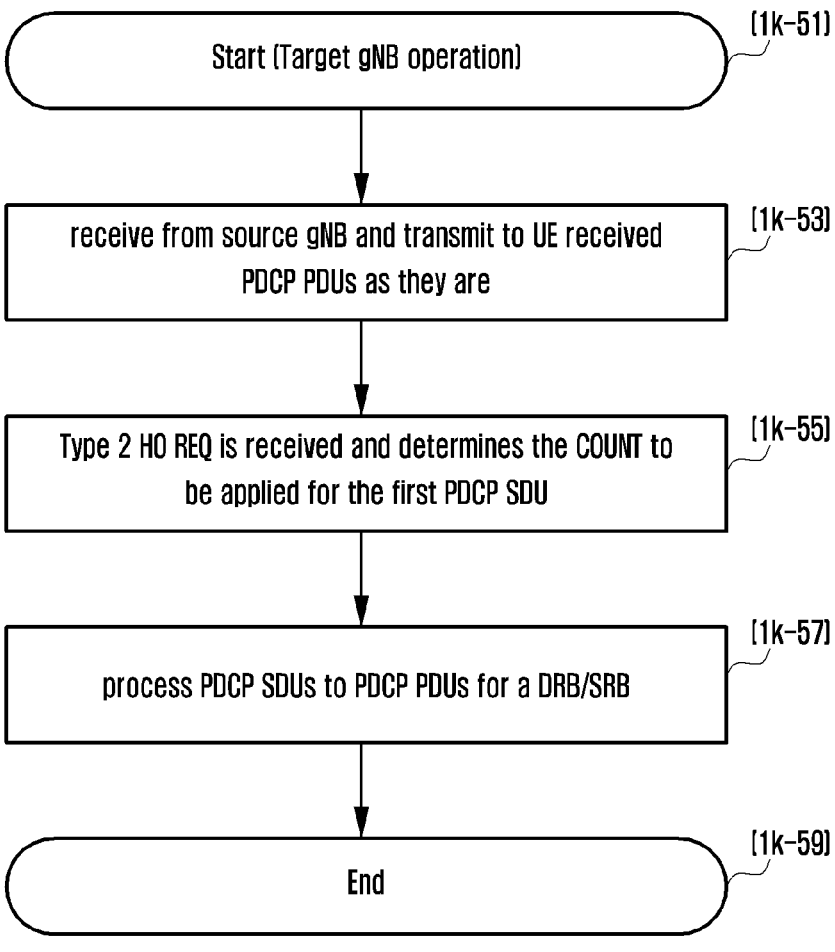
Figure 1K:
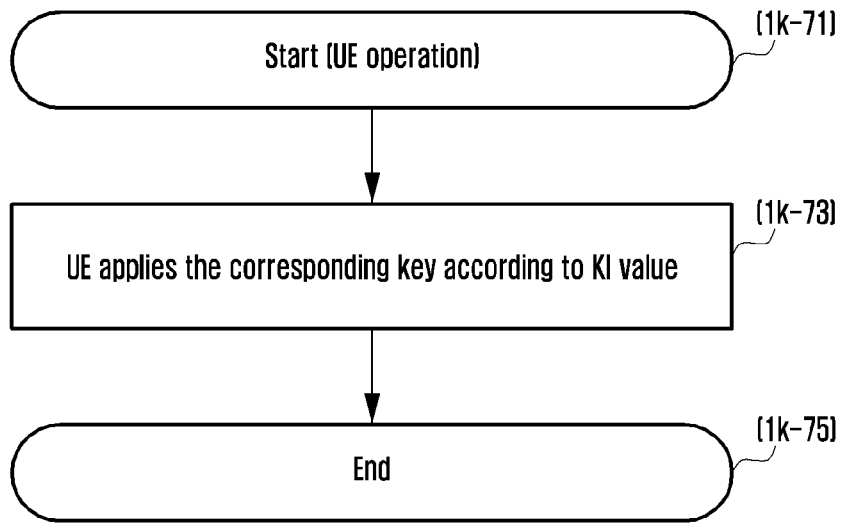
Figure 1L:
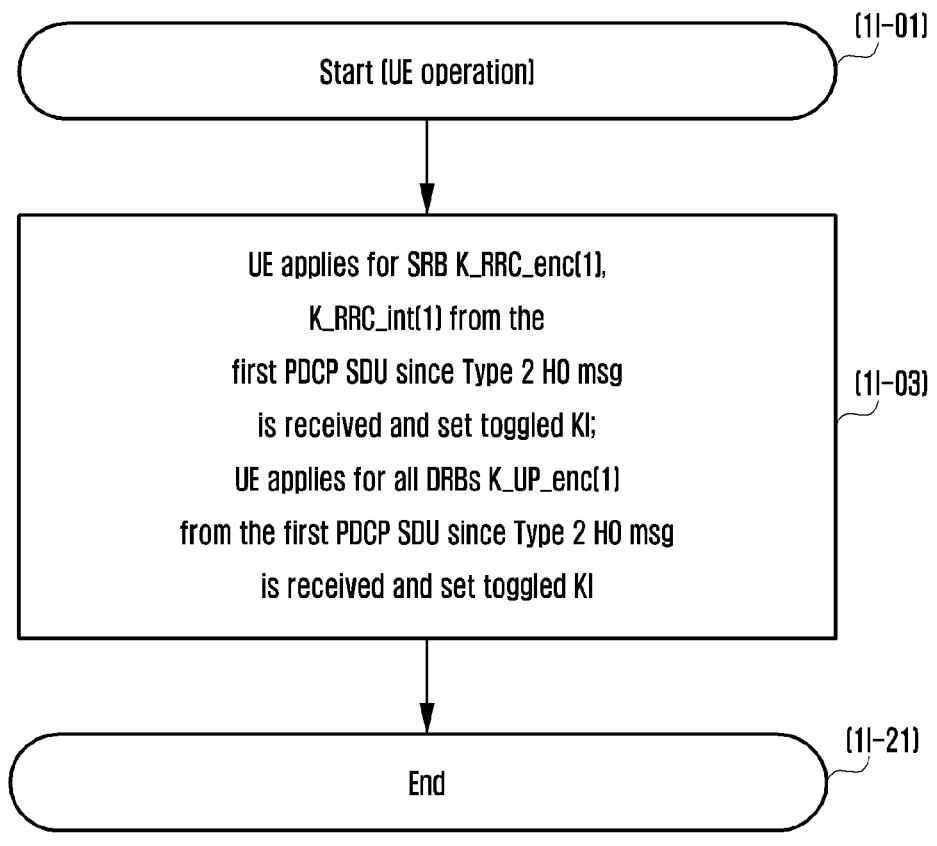
FIGS. 1La, 1Lb, and 1Lc each are diagrams illustrating an operation of a terminal, a target base station, and a source base station for uplink transmission/reception when the 1-2-th embodiment of the present disclosure is applied.
Figure 1L:
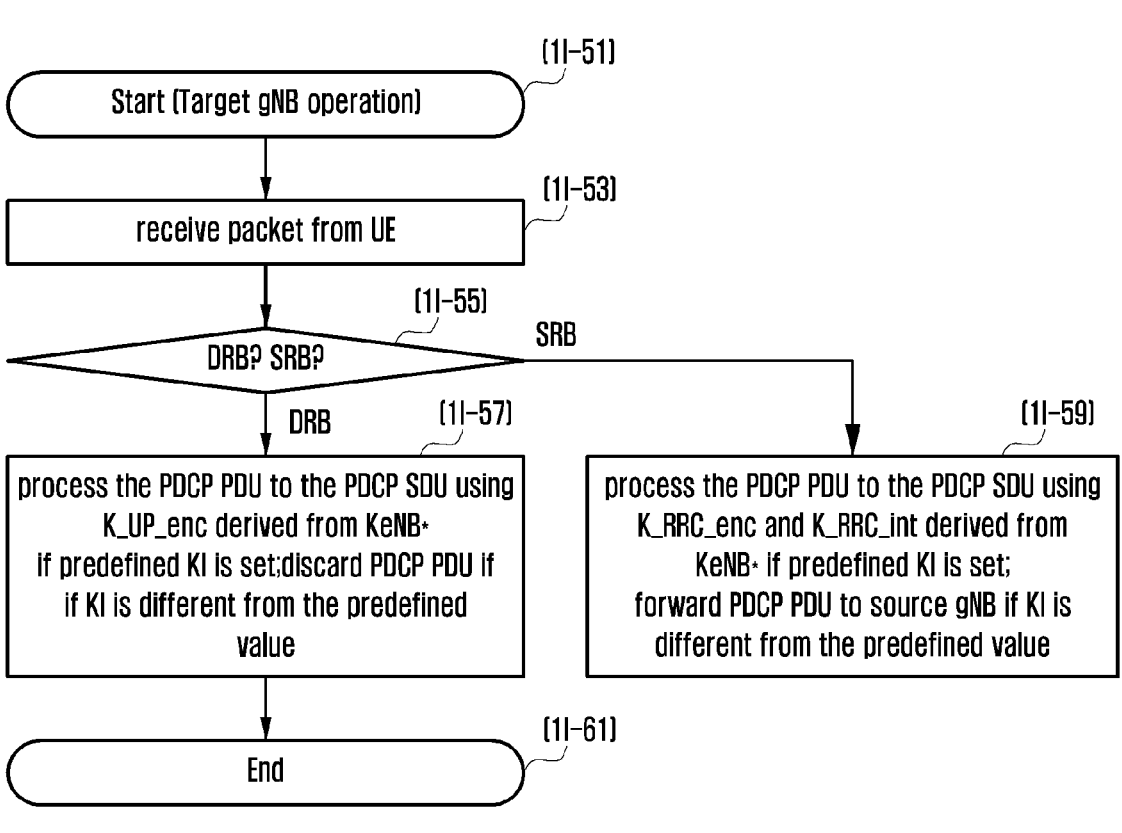
Figure 1L:
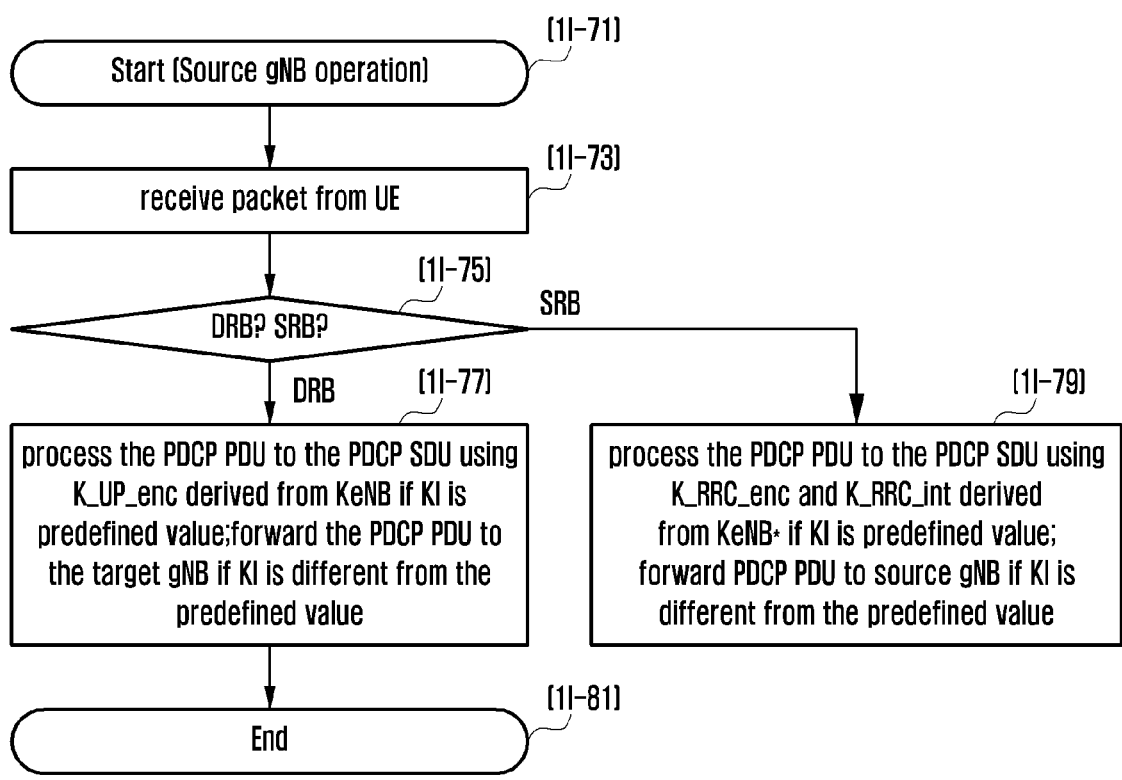

FIGS. 1Ka, 1Kb, and 1Kc each are diagrams illustrating an operation of a source base station, a target base station, and a terminal for downlink transmission/reception when the 1-2-th embodiment of the present disclosure is applied. For ease of explanation, in the operation, the operation in the Phase 2 of FIG. 1J will be mainly described.

First, the operation of the source base station is as follows. The source base station determines the Type 2 HO by the measurement report of the corresponding terminal (1k-03) and determines the SNs and the COUNT values of the packets based on the previous security keys for each radio bearer (RB) of the corresponding terminal (1k-04). Thereafter, the source base station transmits the Type 2 HO Request message to the target base station (1k-05). Thereafter, the source base station continuously generates the PDCP PDUs for the packets based on the determined previous security key (1k-07). That is, to cipher the corresponding PDCP SDU, the corresponding SN based COUNT and the above-mentioned input values are generated, the K_UP_enc derived from the KeNB is applied to the data radio bearer (DRB) to perform ciphering, and the K_RRC_enc and K_RRC_int derived from the KeNB is the signaling radio bearer to perform ciphering and integrity protection. In addition, the KI information is added to each packet to indicate whether it is ciphered based on any of the keys. The packet is transmitted to the terminal or forwarded to the target base station (1k-09). Thereafter, if the SNs of the packets of each radio bearer reach the determined value, the source base station transmits the subsequent PDCP packet to the target base station (1k-11).

Meanwhile, the operation of the source base station is as follows. If the target base station receives the PDCP PDU (i.e., the ciphered packet) from the source base station, the target base station directly transmits the PDCP PDU to the terminal as it is (1k-53). Thereafter, when receiving the Type 2 HO Request message from the source base station, the PDCP SN and the COUNT value for the first PDCP SDU to which the new security key is to be applied is determined based on the received SN Status value (1k-55). Thereafter, the PDCP SDUs of the DRB and SRB are processed (1k-57). More specifically, the COUNT value is determined from the SN STATUS for DRBs, and the ciphering is performed using the K_UP_enc security key derived from the KeNB*. Also, the COUNT value for the SRB is determined based on the SN STATUS for the SRBs, and the ciphering is performed using the K_RRC_enc and K_RRC_int security keys derived from the KeNB*.

Meanwhile, the operation of the terminal is as follows. The terminal receives the Type 2 HO command from the base station. As described above, the KI information is included in all packets, and thus the terminal processes the packet by determining whether to apply any of the security keys (1k-73). More specifically, for the received SRB packet, the terminal applies the K_RRC_enc(0) and the K_RRC_int(0) to the PDCP PDU in which the KI field is indicated to be deciphered based on the old security key and applies the K_RRC_enc(1) and the K_RRC_int(1) to the PDCP PDU in which the KI field is indicated to be deciphered based on a new security key. The KI field may be toggled to 0 or 1 in the case of 1 bit and may be represented by monotone increase (i.e., 00, 01 or 01 10 or 10 11 or 11 00) or the like in the case of 2 bits or more. In addition, for the received DRB packet, the terminal applies the K_RRC_enc(0) to the PDCP PDU in which the KI field is indicated to deciphered based on the old security key and applies the K_RRC_enc(1) to the PDCP PDU in which the KI field is indicated to be deciphered based on the new security key.

FIG. 1I is a diagram illustrating an example of the operations of the terminal, the target base station, and the source base station for the uplink transmission/reception when the 1-2-th embodiment of the present disclosure is applied. For ease of explanation, in the operation, the operation in the Phase 2 of FIG. 1J will be mainly described.

First of all, the operation of the terminal is as follows. When receiving the Type 2 HO command from the base station, the terminal notifies that for all subsequent uplink SRB packets, the KI field is deciphered based on the new key and applies the K_RRC_enc(1) and the K_RRC_int(1) derived from the KeNB* security key, and notifies that for all the uplink DRB packets, the KI field is deciphered based on the new key and applies the K_UP_enc(1) derived from the KeNB* security key (1I-03).

Meanwhile, the operation of the target base station is as follows. The target base station receives the uplink packet from the terminal (1l-53) and determines whether the packet is the DRB packet or the SRB packet (1l-55). In the case of the DRB, if it is determined that the packet is a packet generated based on the new security key from the KI field of the packet, the PDCP PDU is processed as the PDCP SDU using the K_UP_enc security key derived from the KeNB* and the packet having SN smaller than the uplink end marker information received from the terminal is discarded (1l-57). In the case of the SRB, if it is determined that the packet is a packet generated based on the new security key from the KI field of the packet, the PDCP PDU is processed as the PDCP SDU using the K_UP_enc and K_RRC_int security keys derived from the KeNB* and the packet having SN smaller than the uplink end marker information received from the terminal is transmitted to the source base station (1l-59).

Meanwhile, the operation of the source base station is as follows. The source base station receives the uplink packet from the terminal (1l-73) and determines whether the packet is the DRB packet or the SRB packet (1l-75). In the case of the DRB, if it is determined that the packet is a packet based on the old security key from the KI field of the packet, the PDCP PDU is processed as the PDCP SDU using the K_UP_enc security key derived from the KeNB* and the packet determined as the packet generated based on the new security key from the KI field of the packet is transmitted to the target base station (1l-77). In the case of the SRB, if it is determined that the packet is a packet based on the new security key from the KI field of the packet, the PDCP PDU is processed as the PDCP SDU using the K_RRC_enc and K_RRC_int security keys derived from the KeNB and the packet determined as the packet generated based on the new security key from the KI field of the packet is transmitted to the target base station (1l-79).

Figure 1M:
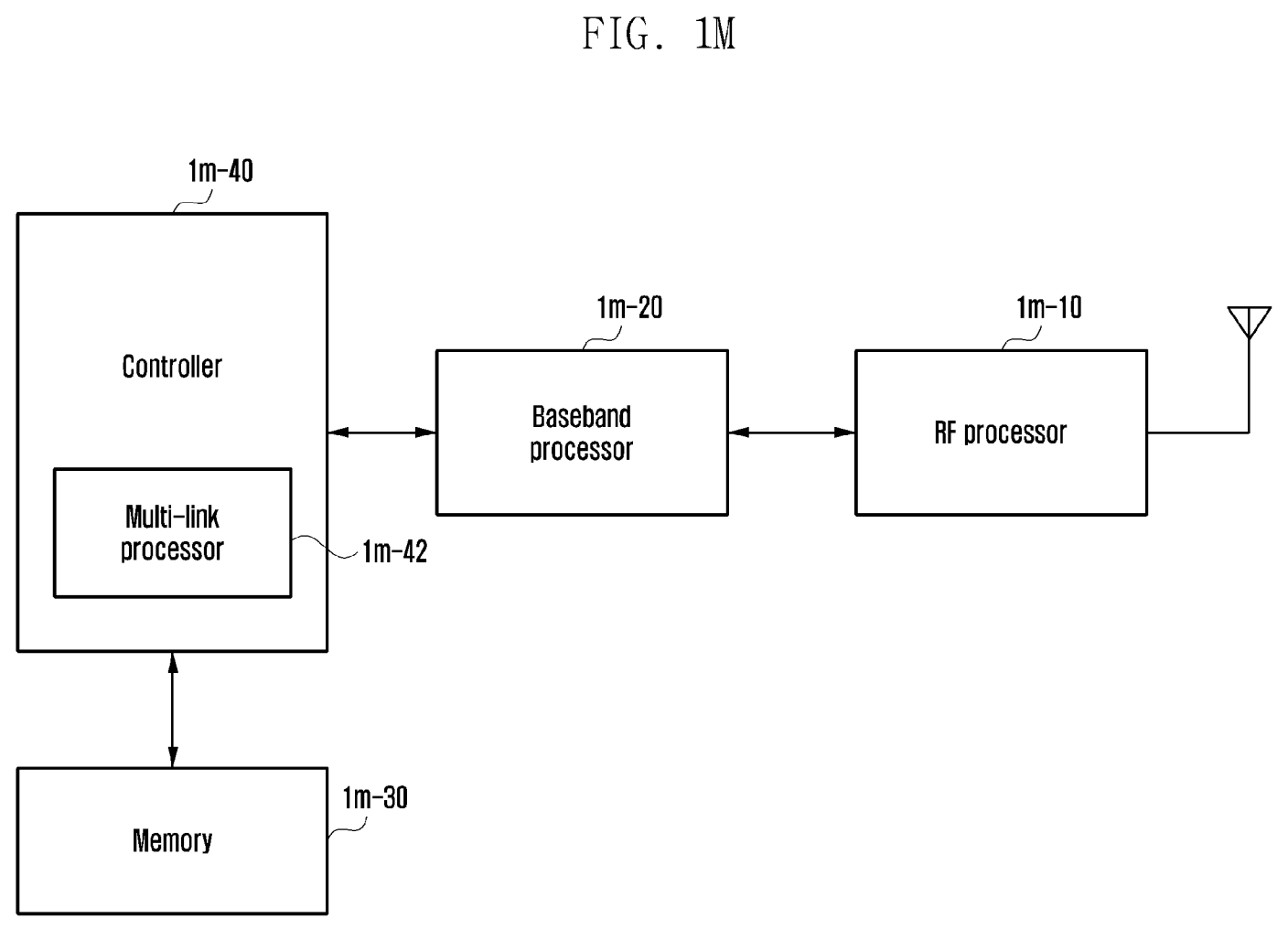

FIG. 1M is a block diagram illustrating the internal structure of the terminal according to the first embodiment of the present disclosure.

Referring to FIG. 1M, the terminal includes at least one of a radio frequency (RF) processor 1m-10, a baseband processor 1m-20, a memory 1m-30, and a controller 1m-40.

The RF processor 1m-10 serves to transmit/receive a signal through a radio channel, such as band conversion and amplification of a signal. That is, the RF processor 1m-10 up-converts a baseband signal provided from the baseband processor 1m-20 into an RF band signal and then transmits the RF band signal through an antenna and down-converts the RF band signal received through the antenna into the baseband signal. For example, the RF processor 1m-10 may include a transmitting filter, a receiving filter, an amplifier, a mixer, an oscillator, a digital to analog converter (DAC), an analog to digital converter (ADC), or the like. FIG. 1M illustrates only one antenna but the terminal may include a plurality of antennas. Further, the RF processor 1m-10 may include the plurality of RF chains. Further, the RF processor 1m-10 may perform beamforming. For the beamforming, the RF processor 1m-10 may adjust a phase and a size of each of the signals transmitted and received through a plurality of antennas or antenna elements. In addition, the RF processor may perform MIMO and may receive a plurality of layers when performing a MIMO operation.

The baseband processor 1m-20 performs a conversion function between the baseband signal and the bit string according to a physical layer standard of the system. For example, when data are transmitted, the baseband processor 1m-20 generates complex symbols by coding and modulating a transmitting bit string. Further, when data are received, the baseband processor 1m-20 recovers the received bit string by demodulating and decoding the baseband signal provided from the RF processor 1m-10. For example, according to the orthogonal frequency division multiplexing (OFDM) scheme, when data are transmitted, the baseband processor 1m-20 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 1m-20 divides the baseband signal provided from the RF processor 1m-10 in an OFDM symbol unit, recovers the signals mapped to the sub-carriers by a fast Fourier transform (FFT) operation, and then recovers the received bit string by the demodulation and decoding.

The baseband processor 1m-20 and the RF processor 1m-10 transmit and receive a signal as described above. Therefore, the baseband processor 1m-20 and the RF processor 1m-10 may be called a transmitter, a receiver, a transceiver, or a communication unit. Further, at least one of the baseband processor 1m-20 and the RF processor 1m-10 may include a plurality of communication modules to support a plurality of different radio access technologies. Further, at least one of the baseband processor 1m-20 and the RF processor 1m-10 may include different communication modules to process signals in different frequency bands. For example, different radio access technologies may include the wireless LAN (for example: IEEE 802.11), a cellular network (for example: LTE), or the like. Further, the different frequency bands may include a super high frequency (SHF) (for example: 2 NRHz, NRhz) band, a millimeter wave (for example: 60 GHz) band.

The memory 1*m*-30 stores data such as basic programs, application programs, and configuration information or the like for the operation of the terminal. In particular, the memory 1*m*-30 may store information associated with an access node performing wireless communication using a radio access technology. Further, the memory 1*m*-30 provides the stored data according to the request of the controller 1*m*-40.

The controller 1*m*-40 controls the overall operations of the terminal. For example, the controller 1*m*-40 transmits/receives a signal through the baseband processor 1*m*-20 and the RF processor 1*m*-10. Further, the controller 1*m*-40 records and reads data in and from the memory 1*m*-40. For this purpose, the controller 1*m*-40 may include at least one processor. For example, the controller 1*m*-40 may include a communication processor (CP) performing a control for communication and an application processor (AP) controlling an upper layer such as the application programs.

Figure 1N:
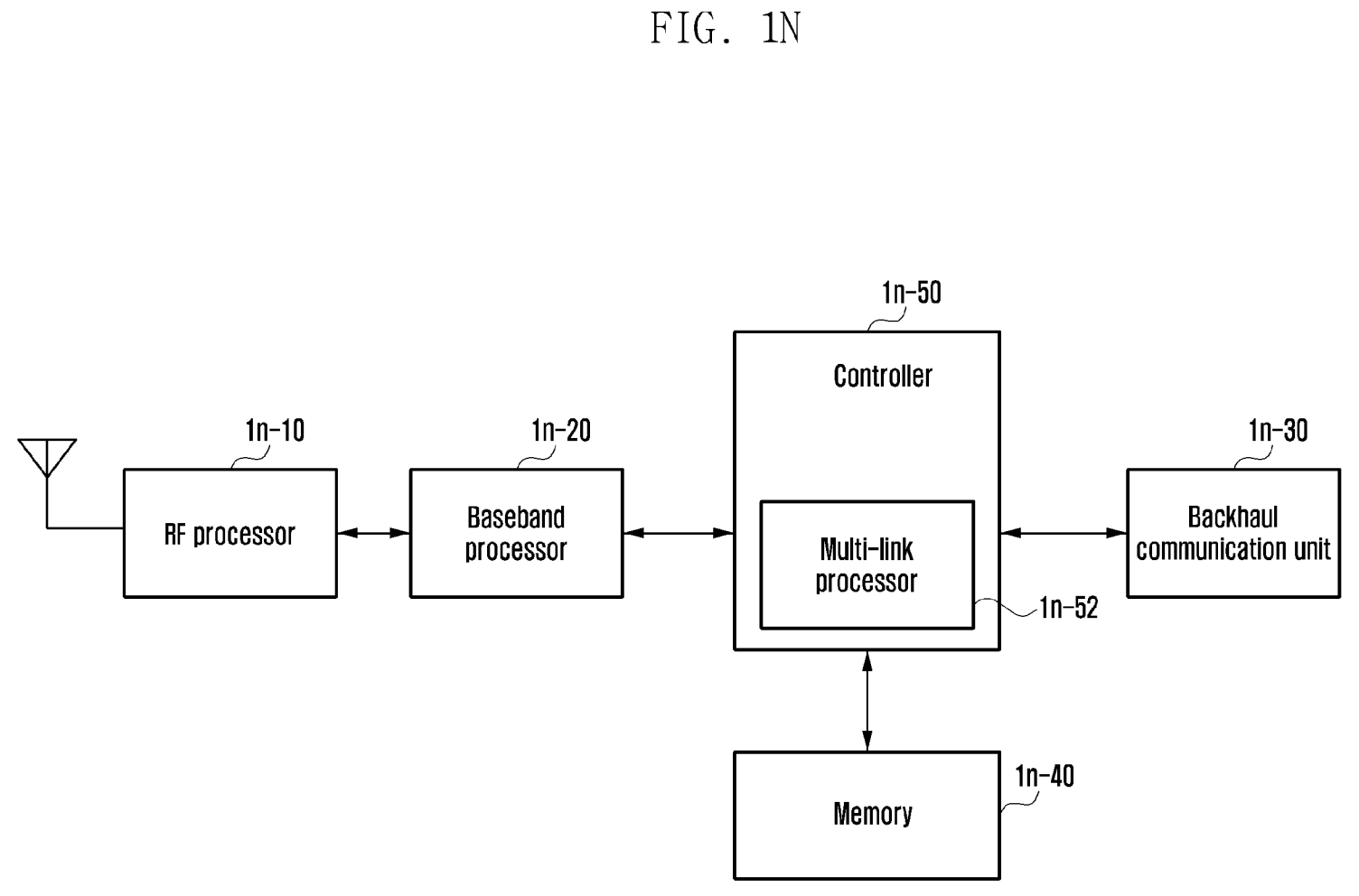

FIG. 1N is a block diagram illustrating an internal structure of a base station according to the first embodiment of the present disclosure.

As illustrated in FIG. 1N, the base station is configured to include an RF processor 1*n*-10, a baseband processor 1*n*-20, a backhaul communication unit 1*n*-30, a memory 1*n*-40, and a controller 1*n*-50.

The RF processor 1*n*-10 serves to transmit and receive a signal through a radio channel, such as band conversion and amplification of a signal. That is, the RF processor 1*n*-10 up-converts a baseband signal provided from the baseband processor 1*n*-20 into an RF band signal, transmits the RF band signal through an antenna and down-converts the RF band signal received through the antenna into the baseband signal. For example, the RF processor 1*n*-10 may include a transmitting filter, a receiving filter, an amplifier, a mixer, an oscillator, a DAC, an ADC, or the like. FIG. 1N illustrates only one antenna but the first access node may include a plurality of antennas. Further, the RF processor 1*n*-10 may include a plurality of RF chains. Further, the RF processor 1*n*-10 may perform the beamforming. For the beamforming, the RF processor 1*n*-10 may adjust a phase and a size of each of the signals transmitted/received through a plurality of antennas or antenna elements. The RF processor may perform a downward MIMO operation by transmitting one or more layers.

The baseband processor 1*n*-20 performs a conversion function between the baseband signal and the bit string according to the physical layer standard of the first radio access technology. For example, when data are transmitted, the baseband processor 1*n*-20 generates the complex symbols by coding and modulating the transmitted bit string. Further, when data are received, the baseband processor 1*n*-20 recovers the received bit string by demodulating and decoding the baseband signal provided from the RF processor 1*n*-10. For example, according to the OFDM scheme, when data are transmitted, the baseband processor 1*n*-gen-erates the complex symbols by coding and modulating the transmitting bit string, maps the complex symbols to the sub-carriers, and then performs the IFFT operation and the CP insertion to construct the OFDM symbols. Further, when data are received, the baseband processor 1*n*-divides the baseband signal provided from the RF processor 1*n*-10 in the OFDM symbol unit, recovers the signals mapped to the sub-carriers by the FFT operation, and then recovers the received bit string by the demodulation and decoding. The baseband processor 1*n*-20 and the RF processor 1*n*-10 transmit and receive a signal as described above. Therefore, the baseband processor 1*n*-20 and the RF processor 1*n*-10 may be called a transmitter, a receiver, a transceiver, a communication unit, or a radio communication unit.

The backhaul communication unit 1*n*-30 provides an interface for performing communication with other nodes within the network. That is, the backhaul communication unit 4*i*-30 converts bit strings transmitted from the main base station to other nodes, for example, an auxiliary base station, a core network, etc., into physical signals and converts the physical signals received from other nodes into the bit strings.

The memory 1*n*-40 stores data such as the basic programs, the application programs, and the configuration information for the operation of the main base station. In particular, the memory 1*n*-40 may store the information on the bearer allocated to the accessed terminal, the measured results reported from the accessed terminal, or the like. Further, the memory 1*n*-40 may store information that is a determination criterion on whether to provide the multiple connections to the terminal to the terminal or stop the multiple connections. Further, the memory 1*n*-40 provides the stored data according to the request of the controller 1*n*-50.

The controller 1*n*-50 controls the overall operations of the main base station. For example, the controller 1*n*-50 transmits/receives a signal through the baseband processor 1*n*-20 and the RF processor 1*n*-10 or the backhaul communication unit 1*n*-30. Further, the controller 1*n*-50 records and reads data in and from the memory 3*n*-40. For this purpose, the controller 1*n*-50 may include at least one processor.

Second Embodiment

Second to fourth embodiments related to the handover to be described below may be applied in the radio communication system alone or in combination.

Figure 2A:
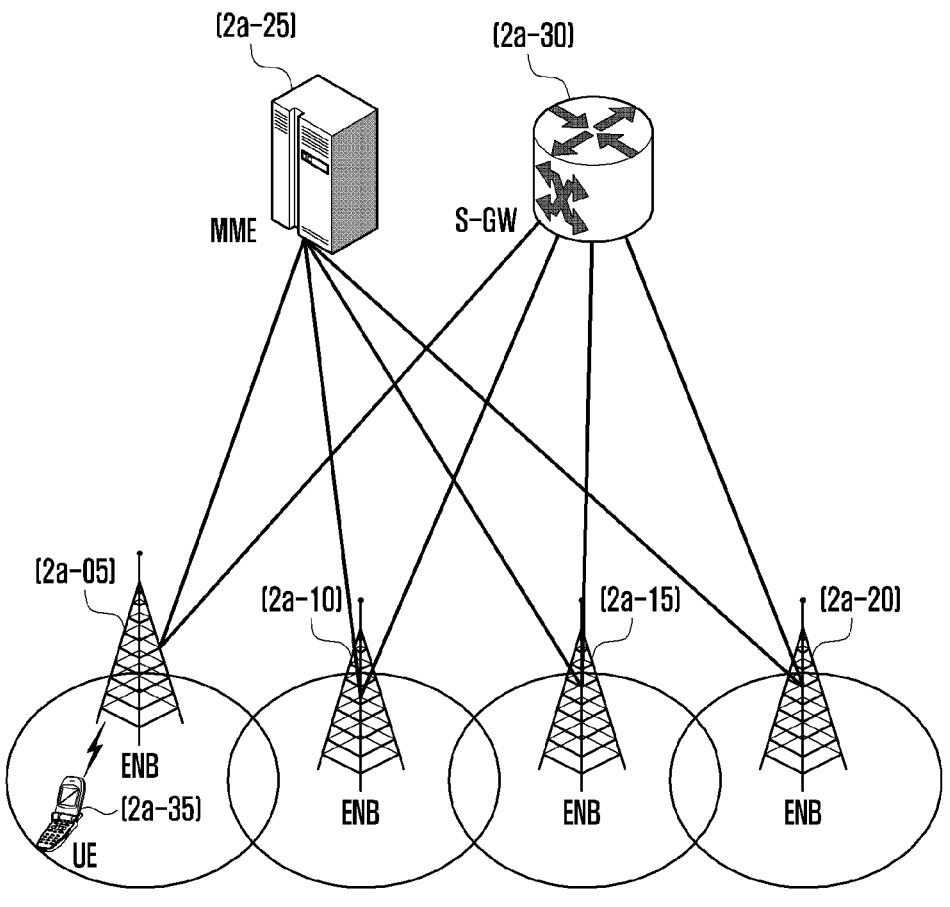
FIG. 2A is a diagram illustrating a structure of the existing LTE system.

FIG. 2A is a diagram illustrating a structure of the existing LTE system.

Referring to FIG. 2A, the wireless communication system is configured to include a plurality of base stations 2*a*-05, 2*a*-10, 2*a*-15, and 2*a*-20, a mobility management entity (MME) 2*a*-20, a serving-gateway (S-GW) 2*a*-30. The user equipment (hereinafter, UE or terminal) 2*a*-35 accesses an external network through the base stations 2*a*-05, 2*a*-10, 2*a*-15, and 2*a*-20 and the S-GW 2*a*-30.

The base stations 2*a*-05, 2*a*-10, 2*a*-15, and 2*a*-20 are access nodes of a cellular network and provide a radio access to terminals that are connected to a network. That is, in order to serve traffic of users, the base stations 2*a*-05, 2*a*-10, 2*a*-15, and 2*a*-20 collect state information such as a buffer state, an available transmission power state, a channel state, or the like of the terminals to perform scheduling, thereby supporting a connection between the terminals and a core network (CN). The MME 2*a*-25 is an apparatus for performing various control functions as well as a mobility management function for the terminal and is connected to a plurality of base stations, and the S-GW 2*a*-30 is an apparatus for providing a data bearer. Further, the MME 2*a*-25 and the S-GW 2*a*-30 may further perform authentication, bearer management, etc., on the terminal connected to the network and may process packets that are to be received from the base stations 2a-05, 2a-10, 2a-15, and 2a-20 and packets that are to be transmitted to the base stations 2a-05, 2a-10, 2a-15, and 2a-20.

Figure 2B:
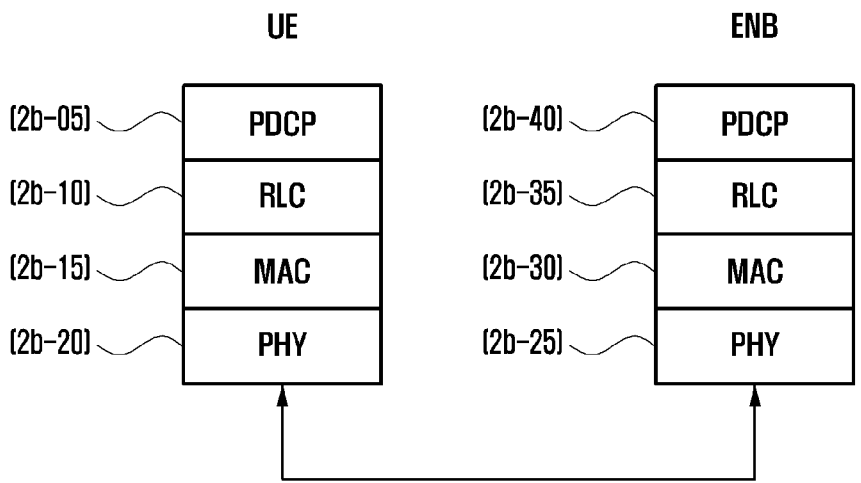
FIG. 2B is a diagram illustrating a radio protocol structure in the existing LTE system.

FIG. 2B is a diagram illustrating a radio protocol structure in the existing LTE system. The NR defined below may be partially different from the radio protocol structure in the present figure, but will be described for convenience of explanation of the present disclosure.

Referring to FIG. 2B, the radio protocol of the LTE system includes packet data convergence protocols (PDCPs) 2b-05 and 2b-40, radio link controls (RLCs) 2b-10 and 2b-35, and medium access controls (MMCs) 2b-15 and 2b-30 in the terminal and the ENB, respectively. The packet data convergence protocols (PDCPs) 2b-05 and 2b-40 performs operations such as compression/recovery of an IP header and the radio link controls (hereinafter, referred to as RLCs) 2b-10 and 2b-35 reconfigure the PDCP packet data unit (PDU) at an appropriate size. The MACs 2b-15 and 2b-30 are connected to several RLC layer apparatuses configured in one terminal and perform an operation of multiplexing RLC PDUs into an MAC PDU and demultiplexing the RLC PDUs from the MAC PDU. Physical layers 2b-20 and 2b-25 perform an operation of channel-coding and modulating upper layer data, making the upper layer data into an OFDM symbol and transmitting them to the radio channel, or demodulating and channel-decoding the OFDM symbol received through the radio channel and transmitting the demodulated and channel-decoded OFDM symbol to the upper layer. Further, the physical layer uses an HARQ (Hybrid ARQ) for additional error correction and the receiving end transmits whether to receive the packet transmitted from the transmitting end as 1 bit. This is called HARQ ACK/NACK information. The downlink HARQ ACK/NACK information on the uplink transmission may be transmitted through a physical hybrid-ARQ indicator channel (PHICH) physical channel and the uplink HARQ ACK/NACK information on the downlink transmission may be transmitted through a physical uplink control channel (PUCCH) or physical uplink shared channel (PUSCH) physical channel.

Although not illustrated in the present drawings, each radio resource control (hereinafter, referred to as RRC) layer is present at an upper part of the PDCP layer of the terminal and the base station, and the RRC layer may receive and transmit access and measurement related control messages for a radio resource control. For example, the terminal may be instructed to perform the measurement using the RRC layer message, and the terminal may report the measurement result to the base station using the RRC layer message.

Figure 2C:
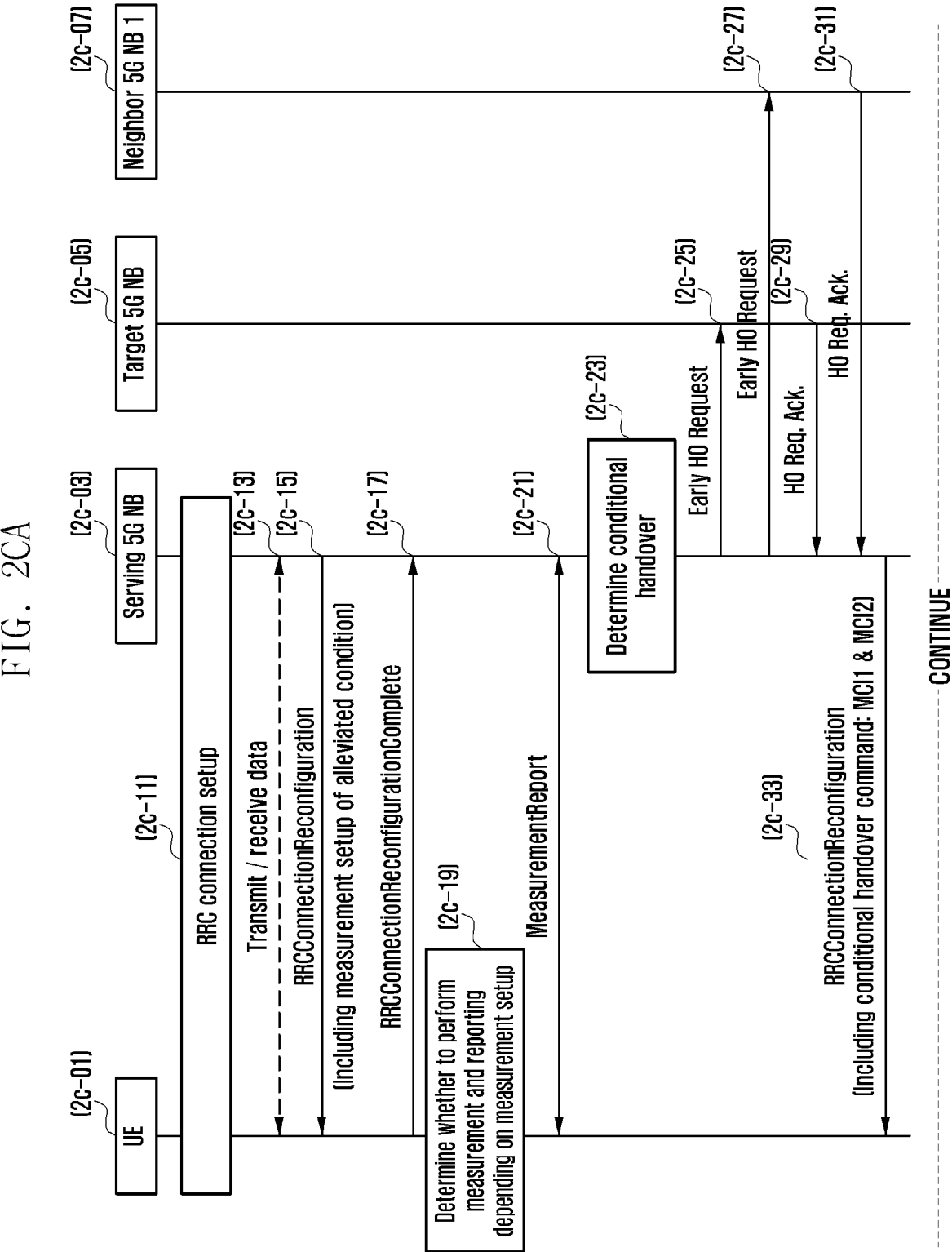
FIGS. 2Ca and 2Cb are diagrams illustrating an example of a message flow between the terminal and the base station according to the second embodiment of the present disclosure.
Figure 2C:
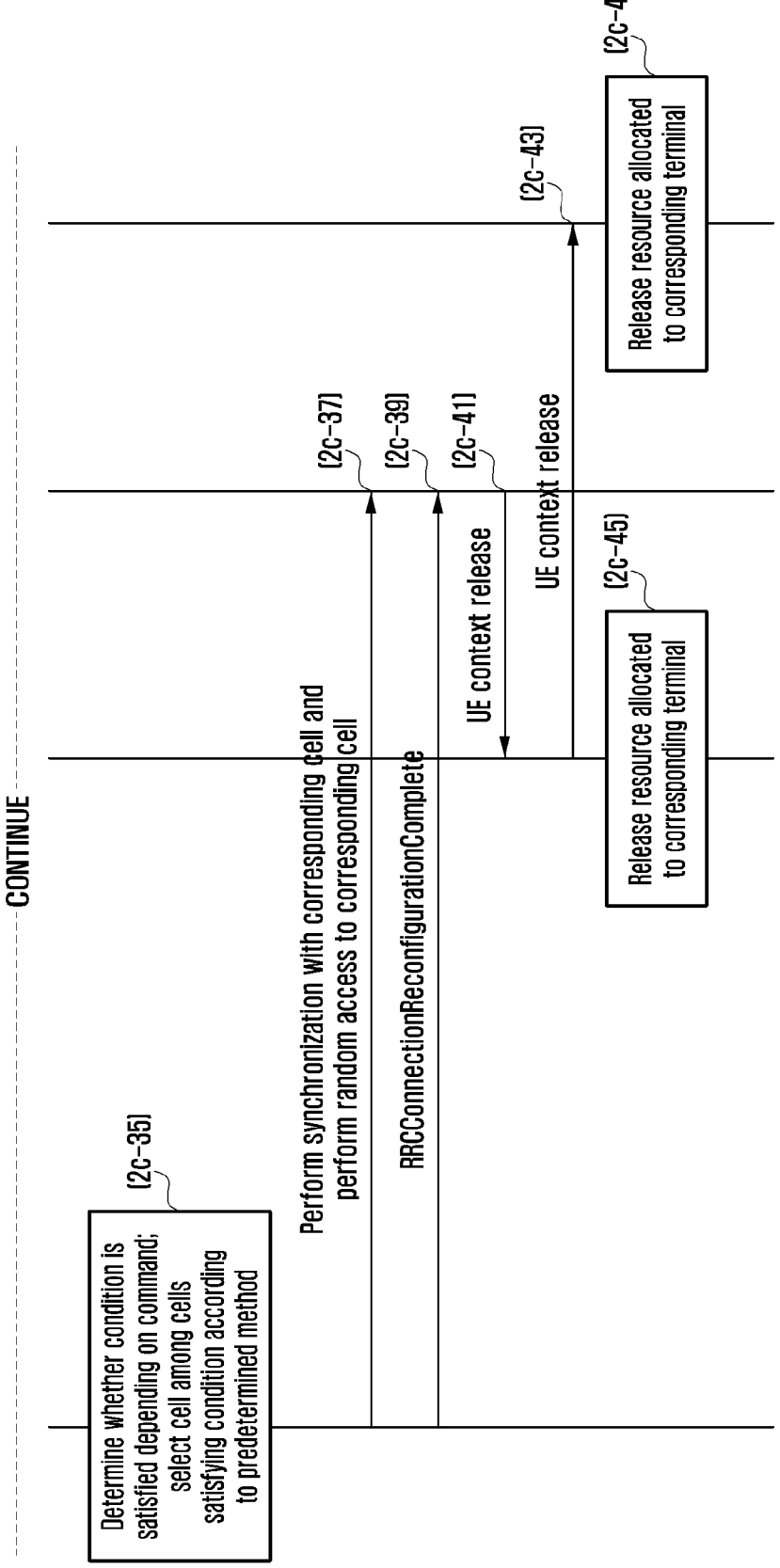

FIGS. 2Ca and 2Cb are diagrams illustrating an example of a message flow between the terminal and the base station according to the second embodiment of the present disclosure.

In FIGS. 2Ca and 2Cb, the terminal 2c-01 in an idle mode (RRC IDLE) performs the access to the base station 2c-03 because of the generation of the data to be transmitted or the like (2c-11). In the idle mode, data may not be transmitted because the terminal is not connected to the network for power saving or the like and a transition to a connected mode (RRC_CONNECTED) is required to transmit data. If the terminal succeeds the access procedure to the base station 2c-03, the terminal changes its state to the RRC_CONNECTED state, and the terminal in the connected mode can transmit and receive data to and from the base station 2c-13.

Thereafter, the base station sets a cell measurement around the terminal in the terminal (2c-15). The measurement setup may include a measurement object, a report configuration or the like. The measurement object may include information on which frequency is to be measured, and the report configuration may include setting such as periodically reporting the measurement result (e.g., received power intensity) to the base station or reporting the measurement result to the base station when the measurement result satisfies following conditions.

Event A1 (when the serving cell is better than the threshold)

Event A2 (when the serving cell is worse than the threshold)

Event A3 (when the neighboring cells are better than the offset from the primary cell (PCell))

Event A4 (when the serving cell is better than the threshold)

Event A5 (when the main serving cell (PCell) is lower than threshold value 1 and the neighboring cells are better than threshold value 2)

Event A6 (when the neighboring cells are better than the offset from the secondary cell (SCell))

In the present disclosure, when the event A3 among the above events is used, an offset value smaller than an offset value used in a general handover may be used. This allows the terminal to earlier perform the reporting to the base station, thereby preventing radio link failure (RLF) with the current base station 2c-03. When the event A5 among the events is used, for the same reason, as the threshold value 1, a value greater than a value used for a normal handover may be used, and as the threshold value 2, a value smaller than a value used for a normal handover may be used. The measurement setup may be transmitted using the RRConnectionReconfiguration message of the RRC layer. Thereafter, the terminal transmits an acknowledgment message for the configuration indication (2c-17), and may use the RRConnectionReconfigurationComplete message of the RRC layer.

The terminal which has received the measurement setup performs the measurement depending on the received setup to determine whether it meets the report configuration set by the base station (2c-19). If the report configuration is satisfied (i.e., for example, when the A3 or A5 is set, if the corresponding configuration is satisfied), the terminal reports the measurement result to the base station (2c-21). Accordingly, the base station determines whether to perform 'conditional handover' (2c-23). The conditional handover will be described below in detail. If it is determined to perform the conditional handover, the current base station transmits a handover request message to each of the base stations to prepare for handover to one or more neighboring cells of the terminal according to the information of the cells included in the measurement result (2c-25) (2c-27). The handover request message may include detailed information of the terminal to be handed over and information on the ciphering key that the terminal uses in the corresponding base station. Accordingly, the handover acknowledgement message is received from each base station (2c-29) (2c-31). The handover acknowledge message may include the identifier, the random access resource information or the like that the terminal uses in the corresponding cell.

Accordingly, the source base station 2c-03 transmits a conditional handover command to the terminal 2c-01 (2c-33). The conditional handover command does not command the terminal to perform the handover immediately but allows the terminal to determine a handover time when the handover condition included in the message is satisfied. The conditional handover command can be transmitted through the RRConnectionReconfiguration message of the RRC layer, and the conditional handover command message may include two types of mobility control information (MCI), that is, a plurality of MCI-1 and one MCI-2. The MCI-1 may include information (e.g., physical cell identifier or the like) on the corresponding target cells for each base station (i.e., (2c-05) (2c-07) in the drawings) and security key information in the corresponding target cell. In the present disclosure, for convenience of explanation, information to be transmitted for each target cell is collectively referred to as MCI-1 information, but may be separately transmitted to different signaling groups at the time of actual transmission. In addition, the MCI-2 is information commonly applied to all the transmitted target cells, and may include, for example, a T304 timer and the above-mentioned handover condition or the like. The T304 timer is a timer which is set to determine whether the handover is successfully completed within a predetermined time after the handover is performed. As the handover condition, the A3 event, the A5 event or the like as described above may be described.

The terminal which has received the conditional handover command determines whether the handover condition depending on the received command is satisfied (2c-35). If the predetermined condition is satisfied, the T304 timer as described above starts to be driven. That is, the T304 does not start immediately after the handover command is received but the T304 timer starts to be driven when the condition included in the handover command is satisfied. As the handover condition, there may be the A3 event, the A5 event or the like as described above, which may be described in more detail as follows.

A3 event: target>source+offset2 is continued for a predetermined period of time, or A5 event: source<threshold 1 & target>threshold 2 is continued for a predetermined period of time Thereafter, when there is one cell satisfying the above condition, the corresponding cell is selected as the target cell for performing the handover cell, and if there are a plurality of cells, the target cell for performing the handover is selected according to the predetermined method. As the predetermined method, a method for moving to the strongest signal strength or the best signal quality among the measurement results of the plurality of cells satisfying the conditions may be used, or a method for moving the first indicated cell among the cells satisfying the condition according to the order indicated by the base station within the MCI-1 within the handover command may be used. Thereafter, for the selected cell, the terminal derives the ciphering key to be used in the target cell according to the security information indicated within the MCI-1.

In addition, the terminal performs the synchronization on the selected cell and the downlink signal to perform the random access to perform the uplink synchronization and uplink transmission power with the corresponding cell (2c-37) and transmits a handover complete message to the corresponding cell (2c-39). The handover complete message may be transmitted using the RRCConnectionReconfigurationComplete message, and when the handover complete message transmission starts, the driven T304 stops.

The base station that has received the handover complete message transmits a command to release all information and resources (or contexts) of the corresponding terminal to the previous source cell 2c-03 (2c-41), and the source cell receiving the same transmits a command to release the context of the corresponding terminal to candidate target cells other than the target cell 2c-05 included in the handover command (2c-43). Each base station that has received cancels/releases the context of the corresponding terminal (2c-45) (2c-47).

Although not described in this figure, if the handover is not successfully completed before the driven T304 timer is expired, the terminal generates and stores a radio link failure report (RLF-report). When the terminal is successfully connected to the base station, if the network is notified that the terminal stores the RLF-report information and requests the RLF-report information, the stored information is reported to the network (base station). As the message that the network requests, a UEInformationRequest message of the RRC layer may be used, and as the message reported to the network, a UEInformationResponse message may be used as a message reported to the network. On the other hand, the RLF-report may include the measurement results of the most recent main cell (PCell, i.e., source cell), the measurement results of the target cells, the handover condition information received by the base station, or the like.

FIG. 2D is a diagram illustrating an example of an operation sequence of the terminal according to the second embodiment of the present disclosure.

In FIG. 2D, it is assumed that the terminal is in a connected mode (RRC_CONNECTED), and the terminal may transmit and receive data to/from the base station in the connection state (2d-01).

Thereafter, the terminal receives the cell measurement from the base station (2d-03). The measurement setup may include the measurement object, the report configuration or the like. The measurement object may include information on which frequency is to be measured, and the report configuration may include the setting such as periodically reporting the measurement result (e.g. received power intensity) to the base station and reporting the measurement result to the base station when the measurement result satisfies following conditions.

Event A1 (when the serving cell is better than the threshold)

Event A2 (when the serving cell is worse than the threshold)

Event A3 (when the neighboring cells are better than the offset from the primary cell (PCell))

Event A4 (when the serving cell is better than the threshold)

Event A5 (when the main serving cell (PCell) is lower than threshold value 1 and the neighboring cells are better than threshold value 2)

Event A6 (when the neighboring cells are better than the offset from the secondary cell (SCell))

As described above with reference to FIG. 2C, in the measurement condition, a value that is alleviated over the threshold/offset value used in the normal handover may be used, which causes the terminal to perform the reporting to the base station earlier, thereby preventing the radio rink failure (RLF) with the base station. Thereafter, the terminal transmits the acknowledgment message for the configuration indication, and may use the RRConnectionReconfigurationComplete message of the RRC layer.

Thereafter, the terminal which has received the measurement setup performs the measurement depending on the received setup to determine whether it meets the report configuration set by the base station (2d-05). Accordingly, if the report configuration is satisfied (i.e., for example, when the A3 or A5 is set, if the corresponding configuration is satisfied) (2d-05), the terminal reports the measurement result to the base station (2d-11). Thereafter, the terminal receives the conditional handover command from the base station (2*d*-13). The conditional handover command does not command the terminal to perform the handover immediately but allows the terminal to determine a handover time when the handover condition included in the message is satisfied. The conditional handover command may be transmitted through the RRConnectionReconfiguration message of the RRC layer, and the conditional handover command message may include two types of mobility control information (MCI), that is, a plurality of MCI-1 and one MCI-2. The MCI-1 may include the information (e.g., physical cell identifier or the like) on the corresponding target cells for each base station and the information on the security key information in the corresponding target cell. In the present disclosure, for convenience of explanation, information to be transmitted for each target cell is collectively referred to as MCI-1 information, but may be separately transmitted to different signaling groups at the time of actual transmission. In addition, the MCI-2 is information commonly applied to all the transmitted target cells, and may include, for example, the T304 timer and the above-mentioned handover condition or the like. The T304 timer is a timer which is set to determine whether the handover is successfully completed within a predetermined time after the handover is performed. As the handover condition, the A3 event, the A5 event or the like as described above may be described.

The terminal which has received the conditional handover command performs the measurement depending on the received command (2*d*-15) and determines whether the handover condition is satisfied (2*d*-17). If the predetermined condition is satisfied, the T304 timer as described above starts to be driven (2*d*-19). That is, the T304 does not start immediately after the handover command is received but the T304 timer starts to be driven when the condition included in the handover command is satisfied. As the handover condition, there may be the A3 event, the A5 event or the like as described above, which may be described in more detail as follows.

A3 event: target>source+offset2 is continued for a predetermined period of time, or A5 event: source<threshold 1 & target>threshold 2 is continued for a predetermined period of time Thereafter, when there is one cell satisfying the above condition, the corresponding cell is selected as the target cell for performing the handover cell, and if there are a plurality of cells, the target cell for performing the handover is selected according to the predetermined method. As the predetermined method, a method for moving to the strongest signal strength or the best signal quality among the measurement results of the plurality of cells satisfying the conditions may be used, or a method for moving the first indicated cell among the cells satisfying the condition according to the order indicated by the base station within the MCI-1 within the handover command may be used. Thereafter, for the selected cell, the terminal derives the ciphering key to be used in the target cell according to the security information indicated within the MCI-1.

In addition, the terminal performs the synchronization on the selected cell and the downlink signal to perform the random access to perform the uplink synchronization and uplink transmission power with the corresponding cell and transmits a handover complete message to the corresponding cell (2*d*-21). The handover complete message may be transmitted using the RRConnectionReconfigurationComplete message, and when the handover complete message transmission starts, the driven T304 stops. Thereafter, the terminal may perform data transmission/reception to/from the target cell (2*d*-23).

If the handover is not successfully completed before the driven T304 timer is expired, the terminal generates and stores a radio link failure report (RLF-report) (2*d*-25). When the terminal is successfully connected to the selected cell by using the cell selection operation later, if the network is notified that the terminal stores the RLF-report information and requests the RLF-report information, the stored information is reported to the network (base station). As the message that the network requests, a UEInformationRequest message of the RRC layer may be used, and as the message reported to the network, a UEInformationResponse message may be used as a message reported to the network. On the other hand, the RLF-report may include the measurement results of the most recent main cell (PCell, i.e., source cell), the measurement results of the target cells, the handover condition information received by the base station, or the like.

FIG. 2E is a diagram illustrating an example of an operation sequence of the base station according to the second embodiment of the present disclosure.

In FIG. 2E, it is assumed that one terminal is in a connected mode (RRC_CONNECTED), and the terminal may transmit and receive data to/from the base station in the connection state (2*e*-01).

Thereafter, the base station sets a cell measurement around the terminal in the terminal (2*e*-03). The measurement setup may include the measurement object, the report configuration or the like. The measurement object may include information on which frequency is to be measured, and the report configuration may include the setting such as periodically reporting the measurement result (e.g., received power intensity) to the base station and reporting the measurement result to the base station when the measurement result satisfies the following conditions.

Event A1 (when the serving cell is better than the threshold)

Event A2 (when the serving cell is worse than the threshold)

Event A3 (when the neighboring cells are better than the offset from the primary cell (PCell))

Event A4 (when the serving cell is better than the threshold)

Event A5 (when the main serving cell (PCell) is lower than threshold value 1 and the neighboring cells are better than threshold value 2)

Event A6 (when the neighboring cells are better than the offset from the secondary cell (SCell))

As described above with reference to FIG. 2C, in the measurement condition, a value that is alleviated over the threshold/offset value used in the normal handover may be used, which causes the terminal to perform the reporting to the base station earlier, thereby preventing the radio rink failure (RLF) with the base station. Thereafter, the base station receives the acknowledgment message for the configuration indication from the terminal, and may use the RRConnectionReconfigurationComplete message of the RRC layer.

Thereafter, the base station receives the reporting on the measurement result from the terminal and determines whether to perform the 'conditional handover' (2*e*-05). If it is determined to perform the conditional handover, the current base station transmits a handover request message to each of the base stations to prepare for handover to one or more neighboring cells of the terminal according to the information of the cells included in the measurement result, and receives the handover acknowledgment message from each base station (2*e*-07).

Accordingly, the base station transmits the conditional handover command to the terminal (2e-09). The conditional handover command does not command the terminal to perform the handover immediately but allows the terminal to determine a handover time when the handover condition included in the message is satisfied. The conditional handover command can be transmitted through the RRConnectionReconfiguration message of the RRC layer, and the conditional handover command message may include two types of mobility control information (MCI), that is, a plurality of MCI-1 and one MCI-2. The MCI-1 may include the information (e.g., physical cell identifier or the like) on the corresponding target cells for each base station and the information on the security key information in the corresponding target cell. In the present disclosure, for convenience of explanation, information to be transmitted for each target cell is collectively referred to as MCI-1 information, but may be separately transmitted to different signaling groups at the time of actual transmission. In addition, the MCI-2 is information commonly applied to all the transmitted target cells, and may include, for example, the T304 timer and the above-mentioned handover condition or the like. The T304 timer is a timer which is set to determine whether the handover is successfully completed within a predetermined time after the handover is performed. As the handover condition, the A3 event, the A5 event or the like as described above may be described.

Thereafter, when the terminal successfully completes the handover, the base station receives a command to release all the information and resources (or context) of the terminal from the corresponding base station (2e-11), and if there is other base stations within the handover command (2e-13), transmits a command to release the context of the corresponding terminal to the corresponding base station (2e-15) and delete/release the context of the corresponding terminal (2e-17).

Figure 2F:
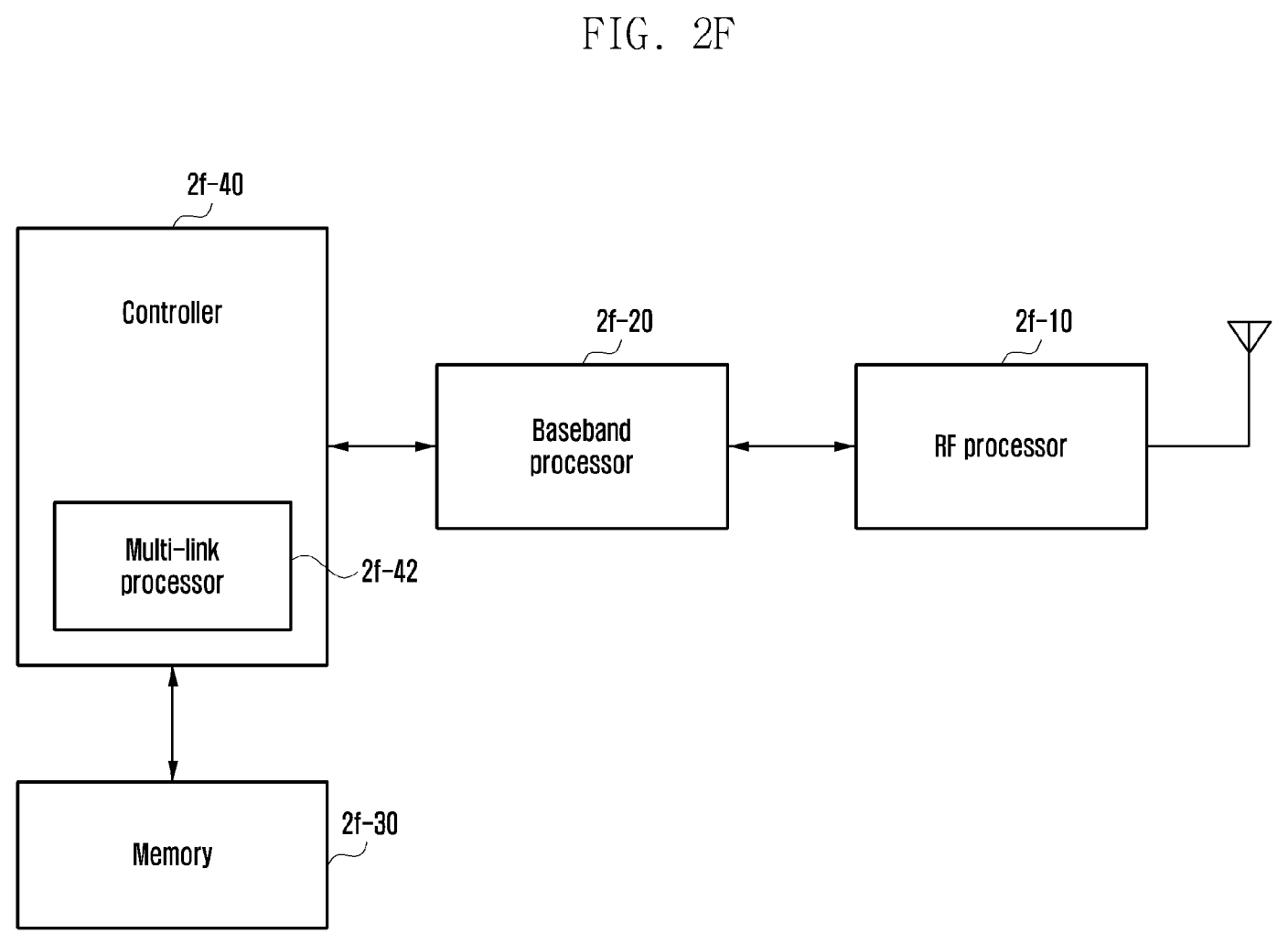

FIG. 2F is a diagram illustrating an example of a block diagram illustrating an internal structure of the terminal according to the second embodiment of the present disclosure.

Referring to FIG. 2F, the terminal includes a radio frequency (RF) processor 2f-10, a baseband processor 2f-20, a memory 2f-30, and a controller 2f-40.

The RF processor 2f-10 serves to transmit and receive a signal through a radio channel, such as band conversion and amplification of a signal. That is, the RF processor 2f-10 up-converts a baseband signal provided from the baseband processor 2f-20 into an RF band signal and then transmits the RF band signal through an antenna and down-converts the RF band signal received through the antenna into the baseband signal. For example, the RF processor 2f-10 may include a transmitting filter, a receiving filter, an amplifier, a mixer, an oscillator, a digital to analog converter (DAC), an analog to digital converter (ADC), or the like. FIG. 2F illustrates only one antenna but the terminal may include a plurality of antennas. Further, the RF processor 2f-10 may include a plurality of RF chains. Further, the RF processor 2f-10 may perform beamforming. For the beamforming, the RF processor 2f-10 may adjust a phase and a size of each of the signals transmitted and received through a plurality of antennas or antenna elements.

The baseband processor 2f-20 performs a conversion function between a baseband signal and a bit string according to a physical layer standard of a system. For example, when data are transmitted, the baseband processor 2f-20 generates complex symbols by coding and modulating a transmitted bit string. Further, when data are received, the baseband processor 2f-20 recovers the received bit string by demodulating and decoding the baseband signal provided from the RF processor 2f-10. For example, according to the orthogonal frequency division multiplexing (OFDM) scheme, when data are transmitted, the baseband processor 2f-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 2f-20 divides the baseband signal provided from the RF processor 2f-10 in an OFDM symbol unit and recovers the signals mapped to the sub-carriers by a fast Fourier transform (FFT) operation and then recovers the received bit string by the modulation and decoding.

The baseband processor 2f-20 and the RF processor 2f-10 transmit and receive a signal as described above. Therefore, the baseband processor 2f-20 and the RF processor 2f-10 may be called a transmitter, a receiver, a transceiver, or a communication unit. Further, at least one of the baseband processor 2f-20 and the RF processor 2f-10 may include different communication modules to process signals in different frequency bands. Further, different frequency bands may include a super high frequency (SHF) (for example: 2.5 GHz, 5 GHz) band, a millimeter wave (for example: 60 GHz) band.

The memory 2f-30 stores data such as basic programs, application programs, and configuration information for the operation of the terminal.

The controller 2f-40 controls the overall operations of the terminal. For example, the controller 2f-40 transmits and receives a signal through the baseband processor 2f-20 and the RF processor 2f-10. Further, the controller 1f-40 records and reads data in and from the memory 2f-40. For this purpose, the controller 2f-40 may include at least one processor. For example, the controller 2f-40 may include a communication processor (CP) performing a control for communication and an application processor (AP) controlling an upper layer such as the application programs. According to the embodiment of the present disclosure, the controller 2f-40 includes a multi-link processor 2f-42 that performs the processing to be operated in a multi-link mode. For example, the controller 2f-40 may control the terminal to perform the procedure illustrated in the operation of the terminal illustrated in FIG. 2F.

According to the embodiment of the present disclosure, the terminal receives the message commanding the measurement from the base station. The controller receiving the message performs the measurement depending on the measurement event and the condition and the handover command, which are set by the base station and performs the handover.

Figure 2G:
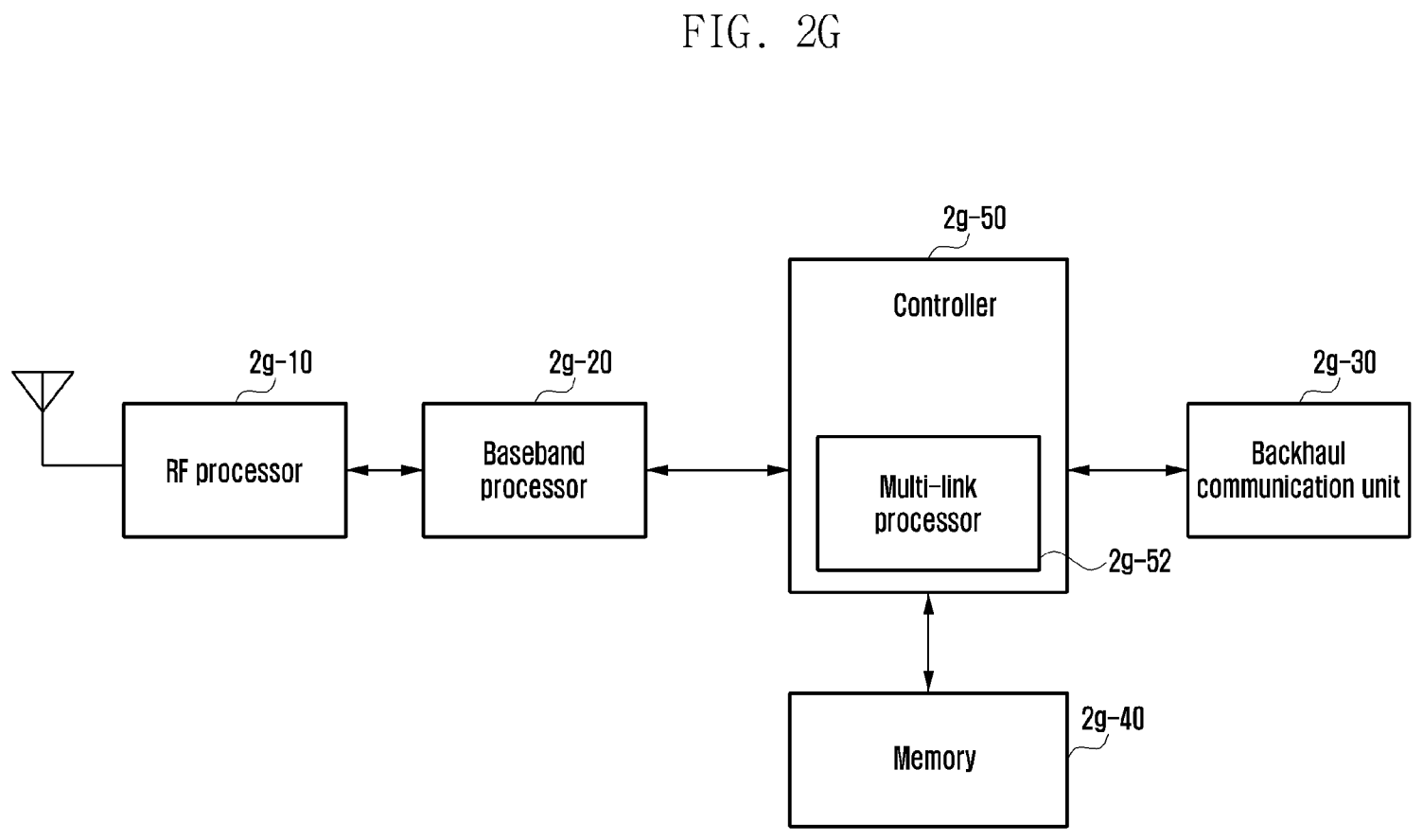

FIG. 2G is a diagram illustrating an example of a block diagram illustrating an internal structure of the base station according to the second embodiment of the present disclosure.

As illustrated in FIG. 2G, the base station is configured to include an RF processor 2g-10, a baseband processor 2g-20, a backhaul communication unit 2g-30, a memory 2g-40, and a controller 2g-50.

The RF processor 2g-10 serves to transmit/receive a signal through a radio channel, such as band conversion and amplification of a signal. That is, the RF processor 2g-10 up-converts a baseband signal provided from the baseband processor 2g-20 into an RF band signal and then transmits the baseband signal through an antenna and down-converts the RF band signal received through the antenna into the baseband signal. For example, the RF processor 2g-10 may include a transmitting filter, a receiving filter, an amplifier, a mixer, an oscillator, a DAC, an ADC, etc. FIG. 2G illustrates only one antenna but the base station may include a plurality of antennas. Further, the RF processor 2g-10 may include the plurality of RF chains. Further, the RF processor 2g-10 may perform the beamforming. For the beamforming, the RF processor 2g-10 may adjust a phase and a size of each of the signals transmitted and received through a plurality of antennas or antenna elements.

The baseband processor 2g-20 performs a conversion function between the baseband signal and the bit string according to the physical layer standard of the radio access technology. For example, when data are transmitted, the baseband processor 2g-20 generates complex symbols by coding and modulating a transmitting bit string. Further, when data are received, the baseband processor 2g-20 recovers the received bit string by demodulating and decoding the baseband signal provided from the RF processor 2g-10. For example, according to the OFDM scheme, when data are transmitted, the baseband processor 2g-20 generates the complex symbols by coding and modulating the transmitting bit string, maps the complex symbols to the sub-carriers, and then performs the IFFT operation and the CP insertion to configure the OFDM symbols. Further, when data are received, the baseband processor 2g-20 divides the baseband signal provided from the RF processor 2g-10 in an OFDM symbol unit and recovers the signals mapped to the sub-carriers by an FFT operation and then recovers the receiving bit string by the modulation and decoding. The baseband processor 2g-20 and the RF processor 2g-10 transmit and receive a signal as described above. Therefore, the baseband processor 2g-20 and the RF processor 2g-10 may be called a transmitter, a receiver, a transceiver, a communication unit, or a wireless communication unit.

The backhaul communication unit 2g-30 provides an interface for performing communication with other nodes within the network. That is, the backhaul communication unit 2g-30 converts bit strings transmitted from the base station to other nodes, for example, other access nodes (base station), a core network, etc., into physical signals and converts the physical signals received from other nodes into the bit strings.

The memory 2g-40 stores basic programs for the operation of the base station, application programs, data such as configuration information. In particular, the memory 2g-40 may store the information on the bearer allocated to the accessed terminal, the measured results reported from the accessed terminal, etc. Further, the memory 2g-40 may store information that is a determination criterion on whether to provide a multiple connection to the terminal or stop the multiple connection to the terminal. Further, the memory 2g-40 provides the stored data according to the request of the controller 2g-50.

The controller 2g-50 controls the overall operations of the base station. For example, the controller 2g-50 transmits/receives a signal through the baseband processor 2g-20 and the RF processor 5I-10 or the backhaul communication unit 2g-30. Further, the controller 2g-50 records and reads data in and from the memory 2g-40. For this purpose, the controller 2g-50 may include at least one processor.

According to the embodiment of the present disclosure, the controller 2g-50 allows the terminal to determine the measurement setup indication and the conditional handover command transmission and command the terminal to perform the same.

Third Embodiment

Figure 3A:
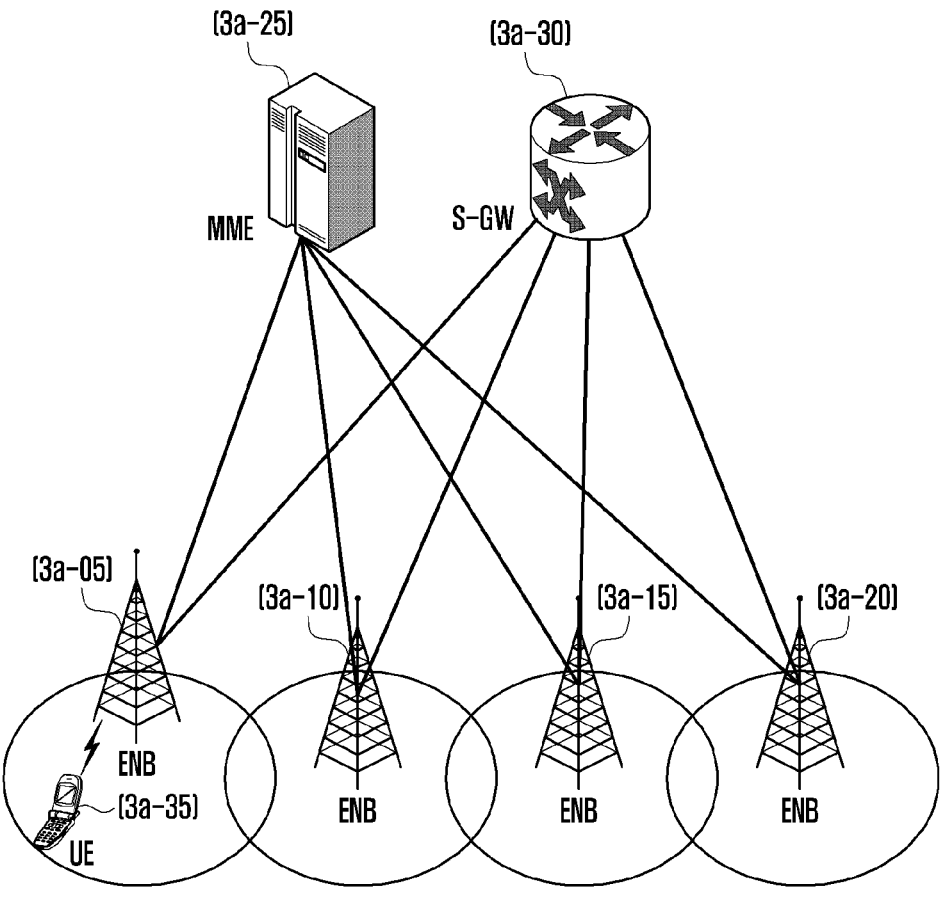
FIG. 3A is a diagram illustrating a structure of the existing LTE system.

FIG. 3A is a diagram illustrating a structure of the existing LTE system.

Referring to FIG. 3A, the wireless communication system is configured to include a plurality of base stations 3a-05, 3a-10, 3a-15, and 3a-20, a mobility management entity (MME) 3a-20, a serving-gateway (S-GW) 3a-30. The user equipment (hereinafter, UE or terminal) 3a-35 accesses an external network through the base stations 3a-05, 3a-10, 3a-15, and 3a-20 and the S-GW 3a-30.

The base stations 3a-05, 3a-10, 3a-15, and 3a-20 are access nodes of a cellular network and provide a radio access to terminals that are connected to a network. That is, in order to serve traffic of users, the base stations 3a-05, 3a-10, 3a-15, and 3a-20 collect state information such as a buffer state, an available transmission power state, a channel state, or the like of the terminals to perform scheduling, thereby supporting a connection between the terminals and a core network (CN). The MME 3a-25 is an apparatus for performing various control functions as well as a mobility management function for the terminal and is connected to a plurality of base stations, and the S-GW 3a-30 is an apparatus for providing a data bearer. Further, the MME 3a-25 and the S-GW 3a-30 may further perform authentication, bearer management, etc., on the terminal connected to the network and may process packets that are to be received from the base stations 3a-05, 3a-10, 3a-15, and 3a-20 and packets that are to be transmitted to the base stations 3a-05, 3a-10, 3a-15, and 3a-20.

Figure 3B:
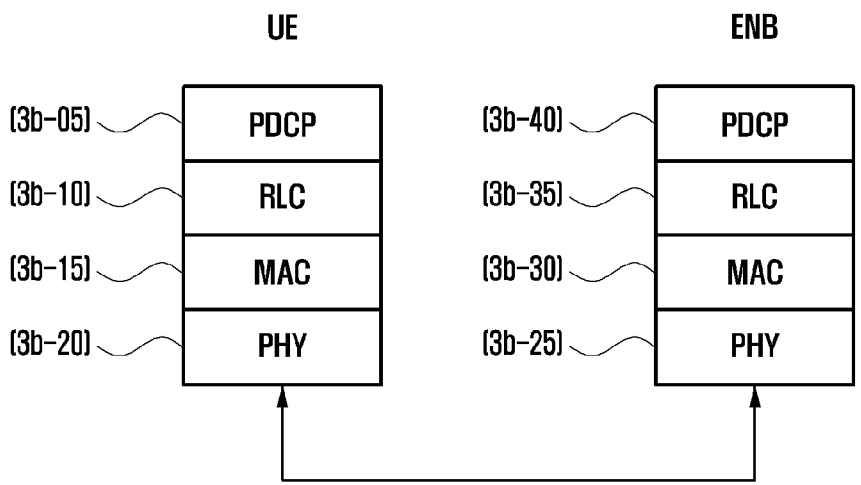
FIG. 3B is a diagram illustrating the radio protocol structure in the existing LTE system.

FIG. 3B is a diagram illustrating the radio protocol structure in the existing LTE system. The NR defined below may be partially different from the radio protocol structure in the present figure, but will be described for convenience of explanation of the present disclosure.

Referring to FIG. 3B, the radio protocol of the LTE system consists of packet data convergence protocols (PDCPs) 3b-05 and 3b-40, radio link controls (RLCs) 3b-10 and 3b-35, and medium access controls (MACs) 3b-15 and 3b-30 in the terminal and the ENB, respectively. The packet data convergence protocols (PDCPs) 3b-05 and 3b-40 performs operations such as compression/recovery of an IP header and the radio link controls (hereinafter, referred to as RLC) 3b-10 and 3b-35 reconfigure a PDCP packet data unit (PDU) at an appropriate size. The MACs 3b-15 and 3b-30 are connected to several RLC layer devices configured in one terminal and perform an operation of multiplexing RLC PDUs in an MAC PDU and demultiplexing the RLC PDUs from the MAC PDU. Physical layers 3b-20 and 3b-25 perform an operation of channel-coding and modulating upper layer data, making the upper layer data as an OFDM symbol and transmitting the OFDM symbol to a radio channel, or demodulating and channel-decoding the OFDM symbol received through the radio channel and transmitting the demodulated and channel-decoded OFDM symbol to the upper layer. Further, the physical layer uses an HARQ (Hybrid ARQ) for additional error correction and the receiving end transmits whether to receive the packet transmitted from the transmitting end as 1 bit. This is called HARQ ACK/NACK information. The downlink HARQ ACK/NACK information on the uplink transmission may be transmitted through a physical hybrid-ARQ indicator channel (PHICH) physical channel and the uplink HARQ ACK/NACK information on the downlink transmission may be transmitted through a physical uplink control channel (PUCCH) or physical uplink shared channel (PUSCH) physical channel.

Although not illustrated in the present drawings, each radio resource control (hereinafter, referred to as RRC) layer is present at an upper part of the PDCP layer of the terminal and the base station, and the RRC layer may receive and transmit access and measurement related control messages for a radio resource control. For example, the terminal may be instructed to perform the measurement using the RRC layer message, and the terminal may report the measurement result to the base station using the RRC layer message. The control message is transmitted/received through the signaling radio bearer (SRB) and may be subdivided into SRB0, SRB1, and SRB2 according to a type of messages and the state of the terminal.

Figure 3C:
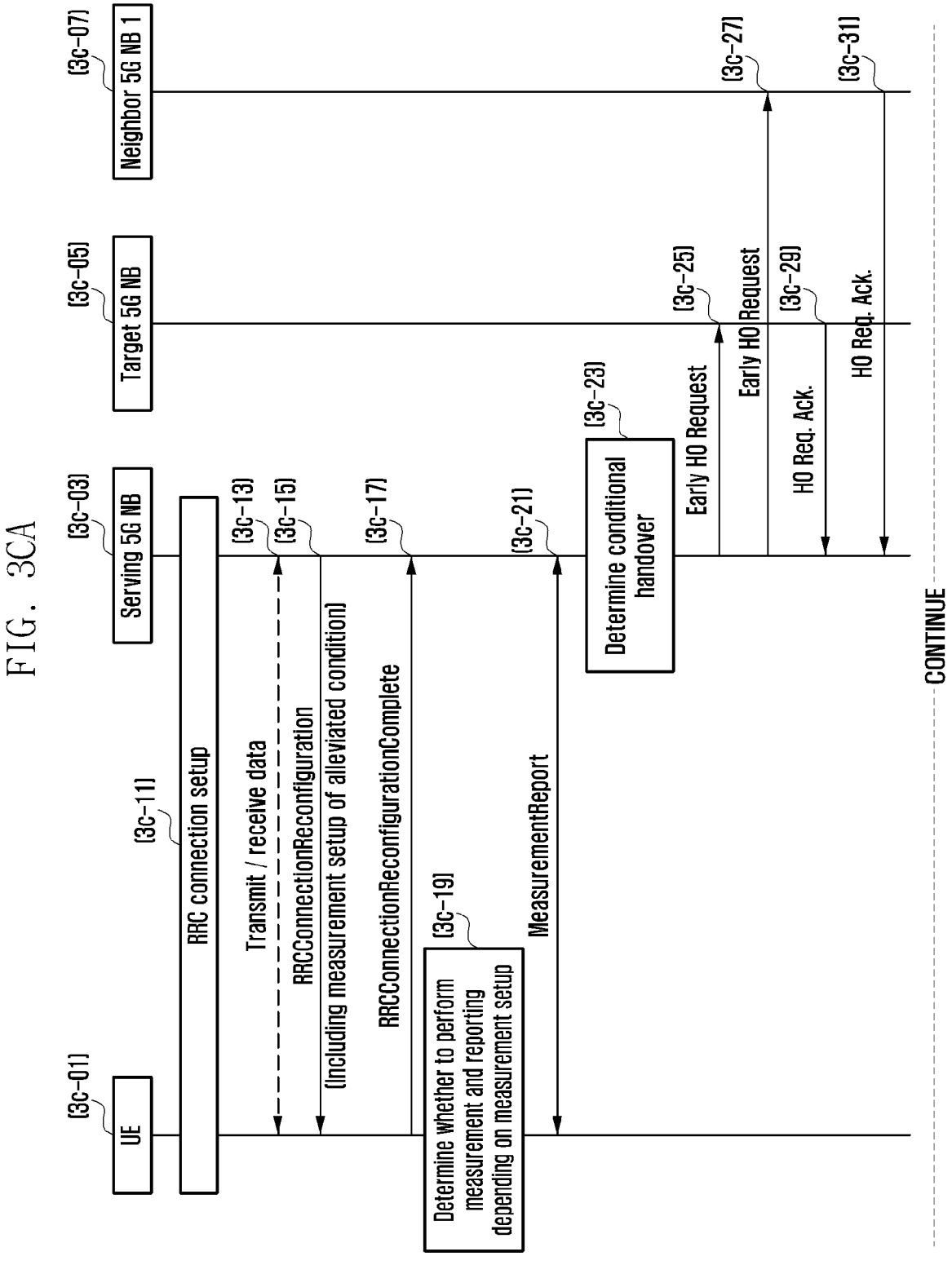
FIGS. 3Ca and 3Cb are diagrams illustrating an example of the message flow between the terminal and the base station according to a third embodiment of the present disclosure.
Figure 3C:
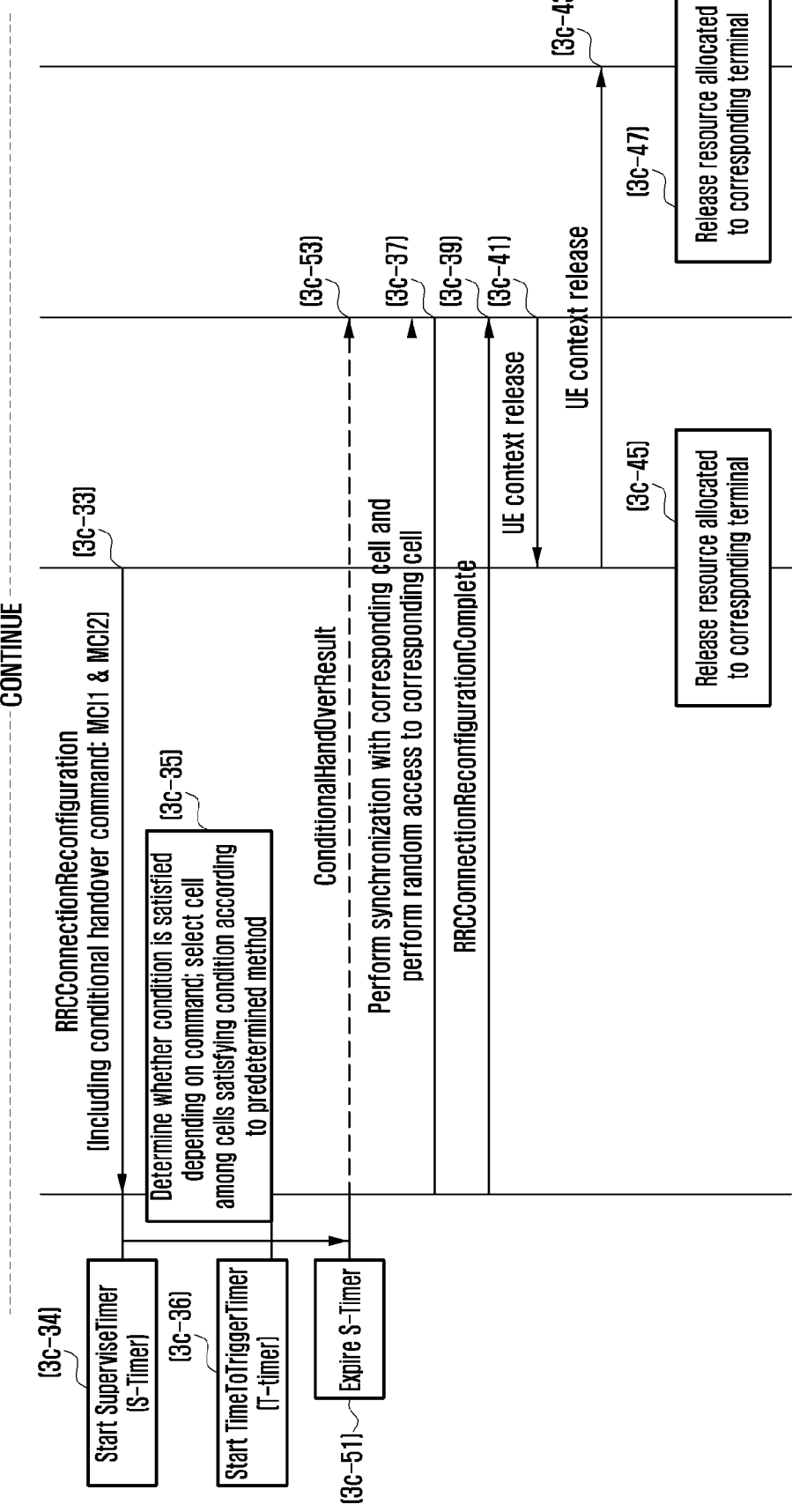

FIGS. 3Ca and 3Cb are diagrams illustrating an example of the message flow between the terminal and the base station according to a third embodiment of the present disclosure.

In FIGS. 3Ca and 3Cb, the terminal 3c-01 in the idle mode (RRC IDLE) performs the access to the base station 3c-03 because of the generation of the data to be transmitted or the like (3c-11). In the idle mode, data may not be transmitted because the terminal is not connected to the network for power saving or the like and a transition to a connected mode (RRC_CONNECTED) is required to transmit data. If the terminal succeeds the access procedure to the base station 3c-03, the terminal changes its state to the RRC_CONNECTED state, and the terminal in the connected mode can transmit and receive data to and from the base station (3c-13).

Thereafter, the base station sets a cell measurement around the terminal in the terminal (3c-15). The measurement setup may include the measurement object, the report configuration or the like. The measurement object may include information on which frequency is to be measured, and the report configuration may include the setting such as periodically reporting the measurement result (e.g., received power intensity) to the base station and reporting the measurement result to the base station when the measurement result satisfies following conditions.

Event A1 (when the serving cell is better than the threshold)

Event A2 (when the serving cell is worse than the threshold)

Event A3 (when the neighboring cells are better than the offset from the primary cell (PCell))

Event A4 (when the serving cell is better than the threshold)

Event A5 (when the main serving cell (PCell) is lower than threshold value 1 and the neighboring cells are better than threshold value 2)

Event A6 (when the neighboring cells are better than the offset from the secondary cell (SCell))

In the present disclosure, when the event A3 among the above events is used, an offset value smaller than an offset value used in a general handover may be used. This allows the terminal to earlier perform the reporting to the base station, thereby preventing radio link failure (RLF) with the current base station 3c-03. When the event A5 among the events is used, for the same reason, as the threshold value 1, a value greater than a value used for a normal handover may be used, and as the threshold value 2, a value smaller than a value used for a normal handover may be used. The measurement setup may be transmitted using the RRConnectionReconfiguration message of the RRC layer. Thereafter, the terminal transmits an acknowledgment message for the configuration indication (3c-17), and may use the RRConnectionReconfigurationComplete message of the RRC layer.

The terminal which has received the measurement setup performs the measurement depending on the received setup to determine whether it meets the report configuration set by the base station (3c-19). If the report configuration is satisfied (i.e., for example, when the A3 or A5 is set, if the corresponding configuration is satisfied), the terminal reports the measurement result to the base station (3c-21). Accordingly, the base station determines whether to perform 'conditional handover' (3c-23). The conditional handover will be described below in detail. If it is determined to perform the conditional handover, the current base station transmits a handover request message to each of the base stations to prepare for handover to one or more neighboring cells of the terminal according to the information of the cells included in the measurement result (3c-25) (3c-27). The handover request message may include detailed information of the terminal to be handed over and information on the ciphering key that the terminal uses in the corresponding base station. Accordingly, the handover acknowledgement message is received from each base station (3c-29) (3c-31). The handover acknowledge message may include the identifier, the random access resource information or the like that the terminal uses in the corresponding cell.

Accordingly, the source base station 3c-03 transmits a conditional handover command to the terminal 3c-01 (3c-33). The conditional handover command does not command the terminal to perform the handover immediately but allows the terminal to determine a handover time when the handover condition included in the message is satisfied. The conditional handover command can be transmitted through the RRConnectionReconfiguration message of the RRC layer, and the conditional handover command message may include two types of mobility control information (MCI), that is, a plurality of MCI-1 and one MCI-2. The MCI-1 may include information (e.g., physical cell identifier or the like) on the corresponding target cells for each base station (i.e., (3c-05) (3c-07) in the drawings) and security key information in the corresponding target cell. In the present disclosure, for convenience of explanation, information to be transmitted for each target cell is collectively referred to as MCI-1 information, but may be separately transmitted to different signaling groups at the time of actual transmission. In addition, the MCI-2 is information commonly applied to all the transmitted target cells, and may include, for example, the T304 timer and the above-mentioned handover condition or the like. The T304 timer is a timer which is set to determine whether the handover is successfully completed within a predetermined time after the handover is performed. As the handover condition, the A3 event, the A5 event or the like as described above may be described. In addition, in the present disclosure, the handover condition may include SuperviseTimer (S-Timer). The terminal drives the S-Timer immediately after receiving the conditional handover command. If the terminal fails to perform the handover since it does not meet the handover condition before the S-Timer expires, the terminal generates a conditional handover result (ConditionalHandOverResult) message and transmit it to the source base station. This will be described in detail later. The following description is a signaling example format for handover condition setting.

```
HandoverCondConfigNR ::=              SEQUENCE {
    triggerType                       CHOICE {
            eventA3                                   SEQUENCE {
                a3-Offset                                 OffsetNR,
            },
            eventA5                                   SEQUENCE {
                a5-Threshold1
    ThresholdNR,
                a5-Threshold2                             ThresholdNR
            },
        },
        superviseTimer                SuperviseTimer,
        timeToTrigger                     TimeToTrigger,
        ...
}
```

Accordingly, the terminal which has received the conditional handover command starts/drives the S-Timer (3c-34). Thereafter, the terminal performs the measurement depending on the received command and determines whether it meets the handover condition. As the handover condition, there may be the A3 event, the A5 event or the like as described above, which may be described in more detail as follows.

A3 Event: Identify whether there is a target cell that meets the condition of Mn (measurement value of neighboring cell)>Ms (measurement value of serving cell)+a3–Offset condition among the target cells included in the MCI-1. If so, TimeToTrigger timer (T-timer) starts to be drive (3c-36), a determination is made as to whether or not the condition is continuously satisfied while the T-timer is driven, or A5 Event: Identify if there is a target cell that meets both of the condition of Ms (measurement value of serving cell)<Threshold1 (threshold 1) & Mn (measurement value of neighboring cell)>Threshold2 (threshold 2) condition. If so, the TimeToTrigger timer (T-timer) starts to be drive (3c-36), a determination is made as to whether or not the condition is continuously satisfied while the T-timer is driven.

If the terminal satisfies the set A3 or A5 event, that is, the condition is satisfied until the T-timer expires, the terminal stops the S-timer and starts handover to the target cell. If there are a plurality of cells satisfying the above condition, the target cell to be handed over is selected according to the predetermined method. As the predetermined method, a method for moving to the strongest signal strength or the best signal quality among the measurement results of the plurality of cells satisfying the conditions may be used, or a method for moving the first indicated cell among the cells satisfying the condition according to the order indicated by the base station within the MCI-1 within the handover command may be used.

If the cell satisfying the above condition does not exist until the S-timer expires (or the event is not generated while the S-timer is driven) (3c-51), the terminal generates a ConditionalHandOverResult message and transmits it to the source base state 3c-03 (3c-53). The ConditionalHandOverResult control message is transmitted through the SRB1 among the signaling radio bearers, and the control message may include a measurement result of the primary cell (PCell) of the source base station, a measurement result of neighboring target cells included in the handover command message, a measurement result of neighboring cells having a better channel state than the target cells included in the handover command message at the target frequency (i.e., the frequency indicated by the MCI-1), and the like.

Thereafter, for the selected cell, the terminal derives the ciphering key to be used in the target cell according to the security information indicated within the MCI-1.

In addition, the terminal performs the synchronization on the selected cell and the downlink signal to perform the random access to perform the uplink synchronization and uplink transmission power with the corresponding cell (3c-37) and transmits a handover complete message to the corresponding cell (3c-39). The handover complete message may be transmitted using the RRCConnectionReconfigurationComplete message, and when the handover complete message transmission starts, the driven T304 stops.

The base station receiving the handover complete message transmits a command to release all information and resources (or contexts) of the corresponding terminal to the previous source cell 3c-03 (3c-41), and the source cell receiving the same transmits a command to release the context of the corresponding terminal to candidate target cells other than the target cell 3c-05 included in the handover command (3c-43). Each base station that has received cancels/releases the context of the corresponding terminal (3c-45) (3c-47).

Although not described in this figure, if the handover is not successfully completed before the driven T304 timer is expired, the terminal generates and stores a radio link failure report (RLF-report). When the terminal is successfully connected to the base station, if the network is notified that the terminal stores the RLF-report information and requests the RLF-report information, the stored information is reported to the network (base station). As the message that the network requests, a UEInformationRequest message of the RRC layer may be used, and as the message reported to the network, a UEInformationResponse message may be used as a message reported to the network. On the other hand, the RLF-report may include the measurement results of the most recent main cell (PCell, i.e., source cell), the measurement results of the target cells, the handover condition information received by the base station, or the like.

Figure 3D:
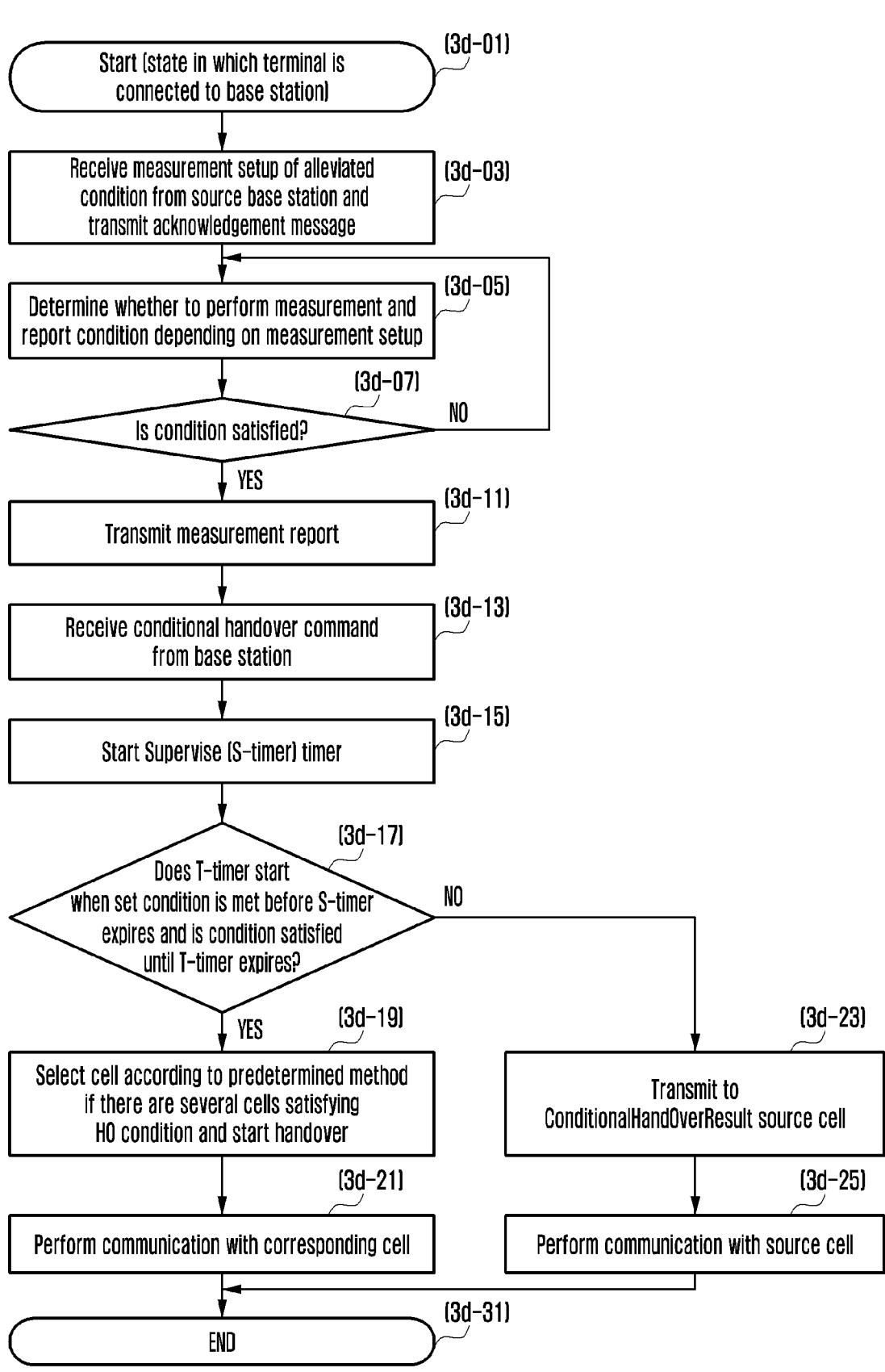
FIG. 3D is a diagram illustrating an example of the operation sequence of the terminal according to the third embodiment of the present disclosure.

FIG. 3D is a diagram illustrating an example of the operation sequence of the terminal according to the third embodiment of the present disclosure.

In FIG. 3D, it is assumed that the terminal is in a connected mode (RRC_CONNECTED), and the terminal may transmit and receive data to/from the base station in the connection state (3d-01).

Thereafter, the terminal receives the cell measurement from the base station (3d-03). The measurement setup may include the measurement object, the report configuration or the like. The measurement object may include information on which frequency is to be measured, and the report configuration may include the setup such as periodically reporting the measurement result (e.g., received power intensity) to the base station and reporting the measurement result to the base station when the measurement condition satisfies the following conditions.

Event A1 (when the serving cell is better than the threshold)

Event A2 (when the serving cell is worse than the threshold)

Event A3 (when the neighboring cells are better than the offset from the primary cell (PCell))

Event A4 (when the serving cell is better than the threshold)

Event A5 (when the main serving cell (PCell) is lower than threshold value 1 and the neighboring cells are better than threshold value 2)

Event A6 (when the neighboring cells are better than the offset from the secondary cell (SCell))

As described above with reference to FIG. 3C, in the measurement condition, a value that is alleviated over the threshold/offset value used in the normal handover may be information, but may be separately transmitted to different signaling groups at the time of actual transmission. In addition, the MCI-2 is information commonly applied to all the transmitted target cells, and may include, for example, the T304 timer and the above-mentioned handover condition or the like.

The T304 timer is a timer which is set to determine whether the handover is successfully completed within a predetermined time after the handover is performed. As the handover condition, the A3 event, the A5 event or the like as described above may be described. In addition, in the present disclosure, the handover condition may include SuperviseTimer (S-Timer). The terminal drives the S-Timer immediately after receiving the conditional handover command. If the terminal fails to perform the handover since it does not meet the handover condition before the S-Timer expires, the terminal generates a conditional handover result (ConditionalHandOverResult) message and transmit it to the source base station. This will be described in detail later. The following description is a signaling example format for handover condition setting.

```
HandoverCondConfigNR ::=                        SEQUENCE {
        triggerType                                 CHOICE{
                eventA3                                     SEQUENCE {
                        a3-Offset                                   OffsetNR,
                },
                eventA5                                     SEQUENCE {
                        a5-Threshold1
        ThresholdNR,
                        a5-Threshold2                               ThresholdNR
                },
        },
        superviseTimer                          SuperviseTimer,
        timeToTrigger                               TimeToTrigger,
        ...
}
``` used, which causes the terminal to perform the reporting to the base station earlier, thereby preventing the radio rink failure (RLF) with the base station. Thereafter, the terminal transmits the acknowledgment message for the configuration indication, and may use the RRConnectionReconfigurationComplete message of the RRC layer.

Thereafter, the terminal which has received the measurement setup performs the measurement depending on the received setup to determine whether it meets the report configuration set by the base station (3d-05). If the report configuration is satisfied (i.e., for example, when the A3 or A5 is set, if the corresponding configuration is satisfied), the terminal reports the measurement result to the base station (3d-11). Thereafter, the terminal receives the conditional handover command from the base station (3d-13). The conditional handover command does not command the terminal to perform the handover immediately but allows the terminal to determine a handover time when the handover condition included in the message is satisfied. The conditional handover command can be transmitted through the RRConnectionReconfiguration message of the RRC layer, and the conditional handover command message may include two types of mobility control information (MCI), that is, a plurality of MCI-1 and one MCI-2. The MCI-1 may include the information (e.g., physical cell identifier or the like) on the corresponding target cells for each base station and the information on the security key information in the corresponding target cell. In the present disclosure, for convenience of explanation, information to be transmitted for each target cell is collectively referred to as MCI-1

Accordingly, the terminal which has received the conditional handover command starts/drives the S-Timer (3d-15). Thereafter, the terminal performs the measurement depending on the received command and determines whether it meets the handover condition. As the handover condition, there may be the A3 event, the A5 event or the like as described above, which may be described in more detail as follows.

A3 Event: Identify if there is a target cell that meets the condition of Mn (measurement value of neighboring cell)>Ms (measurement value of serving cell)+a3−Offset condition among the target cells included in the MCI-1. If so, TimeToTrigger timer (T-timer) starts to be drive, a determination is made as to whether or not the condition is continuously satisfied while the T-timer is driven, or A5 Event: Identify if there is a target cell that meets both of the condition of Ms (measurement value of serving cell)<Threshold1 (threshold 1) & Mn (measurement value of neighboring cell)>Threshold2 (threshold 2) condition. If so, TimeToTrigger timer (T-timer) starts to be drive, a determination is made as to whether or not the condition is continuously satisfied while the T-timer is driven.

As described above, if the terminal satisfies the set A3 or A5 event before the driven S-Timer expires, that is, the terminal satisfies the condition until the T-timer expires (3d-17), the terminal stops the S-timer and starts handover to the corresponding target cell (3d-19). If there are a plurality of cells satisfying the above condition, the target cell to be handed over is selected according to the predetermined method. As the predetermined method, a method for moving to the strongest signal strength or the best signal quality among the measurement results of the plurality of cells satisfying the conditions may be used, or a method for moving the first indicated cell among the cells satisfying the condition according to the order indicated by the base station within the MCI-1 within the handover command may be used. Thereafter, the terminal performs the handover to the selected cell and performs communication with the corresponding cell (3d-21).

Meanwhile, if the cell satisfying the above condition does not exist until the S-timer expires (or the event is not generated while the S-timer is driven), the terminal generates the ConditionalHandOverResult message and transmits it to the source base state (3d-53). The ConditionalHandOverResult control message is transmitted through the SRB1 among the signaling radio bearers, and the control message may include a measurement result of the primary cell (PCell) of the source base station, a measurement result of neighboring target cells included in the handover command message, a measurement result of neighboring cells having a better channel state than the target cells included in the handover command message at the target frequency (i.e., the frequency indicated by the MCI-1), and the like. Thereafter, the terminal continuously communicates with the source cell (3d-25).

Figure 3E:
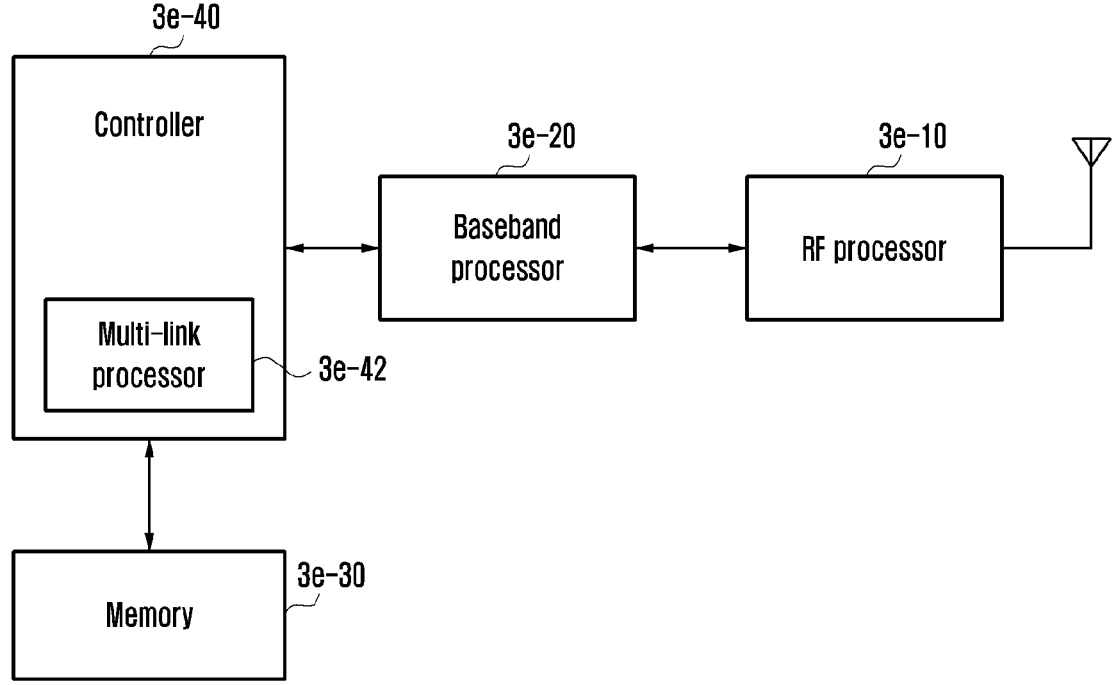
FIG. 3E is a diagram illustrating an example of a block diagram illustrating an internal structure of the terminal according to the third embodiment of the present disclosure.

FIG. 3E is a diagram illustrating an example of a block diagram illustrating an internal structure of the terminal according to the third embodiment of the present disclosure.

Referring to FIG. 3E, the terminal includes a radio frequency (RF) processor 3e-10, a baseband processor 3e-20, a memory 3e-30, and a controller 3e-40.

The RF processor 3e-10 serves to transmit and receive a signal through a radio channel, such as band conversion and amplification of a signal. That is, the RF processor 3e-10 up-converts a baseband signal provided from the baseband processor 3e-20 into an RF band signal and then transmits the RF band signal through an antenna and down-converts the RF band signal received through the antenna into the baseband signal. For example, the RF processor 3e-10 may include a transmitting filter, a receiving filter, an amplifier, a mixer, an oscillator, a digital to analog converter (DAC), an analog to digital converter (ADC), or the like. FIG. 3E illustrates only one antenna but the terminal may include a plurality of antennas. Further, the RF processor 3e-10 may include a plurality of RF chains. Further, the RF processor 3e-10 may perform beamforming. For the beamforming, the RF processor 3e-10 may adjust a phase and a size of each of the signals transmitted and received through a plurality of antennas or antenna elements.

The baseband processor 3e-20 performs a conversion function between a baseband signal and a bit string according to a physical layer standard of a system. For example, when data are transmitted, the baseband processor 3e-20 generates complex symbols by coding and modulating a transmitted bit string. Further, when data are received, the baseband processor 3e-20 recovers the received bit string by demodulating and decoding the baseband signal provided from the RF processor 3e-10. For example, according to the orthogonal frequency division multiplexing (OFDM) scheme, when data are transmitted, the baseband processor 3e-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 3e-20 divides the baseband signal provided from the RF processor 3e-10 in an OFDM symbol unit and recovers the signals mapped to the subcarriers by a fast Fourier transform (FFT) operation and then recovers the received bit string by the modulation and decoding.

The baseband processor 3e-20 and the RF processor 3e-10 transmit and receive a signal as described above. Therefore, the baseband processor 3e-20 and the RF processor 3e-10 may be called a transmitter, a receiver, a transceiver, or a communication unit. Further, at least one of the baseband processor 3e-20 and the RF processor 3e-10 may include different communication modules to process signals in different frequency bands. Further, different frequency bands may include a super high frequency (SHF) (for example: 2.5 GHz, 5 GHz) band, a millimeter wave (for example: 60 GHz) band.

The memory 3f-30 stores data such as basic programs, application programs, and configuration information for the operation of the terminal.

The controller 3e-40 controls the overall operations of the terminal. For example, the controller 3e-40 transmits and receives a signal through the baseband processor 3e-20 and the RF processor 3e-10. Further, the controller 3e-40 records and reads data in and from the memory 3e-40. For this purpose, the controller 3e-40 may include at least one processor. For example, the controller 3e-40 may include a communication processor (CP) performing a control for communication and an application processor (AP) controlling an upper layer such as the application programs. According to the embodiment of the present disclosure, the controller 3e-40 includes a multi-link processor 3e-42 that performs the processing to be operated in a multi-link mode. For example, the controller 3f-40 may control the terminal to perform the procedure illustrated in the operation of the terminal illustrated in FIG. 3e.

Figure 3F:
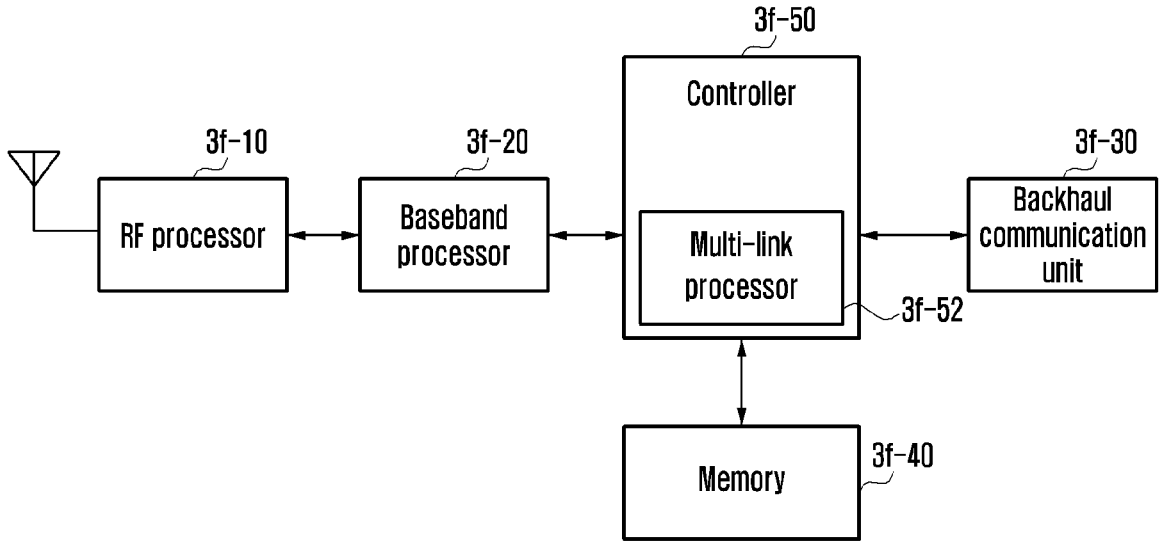
FIG. 3F is a diagram illustrating an example of a block diagram illustrating an internal structure of the base station according to the third embodiment of the present disclosure.

FIG. 3F is a diagram illustrating an example of a block diagram illustrating an internal structure of the base station according to the third embodiment of the present disclosure.

As illustrated in FIG. 3F, the base station is configured to include an RF processor 3f-10, a baseband processor 3f-20, a backhaul communication unit 3f-30, a memory 3f-40, and a controller 3f-50.

The RF processor 3f-10 serves to transmit and receive a signal through a radio channel, such as band conversion and amplification of a signal. That is, the RF processor 3f-10 up-converts a baseband signal provided from the baseband processor 3f-20 into an RF band signal and then transmits the RF band signal through an antenna and down-converts the RF band signal received through the antenna into the baseband signal. For example, the RF processor 3f-10 may include a transmitting filter, a receiving filter, an amplifier, a mixer, an oscillator, a DAC, an ADC, or the like. FIG. 15 illustrates only one antenna but the base station may include a plurality of antennas. Further, the RF processor 3f-10 may include a plurality of RF chains. Further, the RF processor 3f-10 may perform the beamforming. For the beamforming, the RF processor 3f-10 may adjust a phase and a size of each of the signals transmitted/received through a plurality of antennas or antenna elements.

The baseband processor 3f-20 performs a conversion function between the baseband signal and the bit string according to a physical layer standard of the radio access technology. For example, when data are transmitted, the baseband processor 3f-20 generates complex symbols by coding and modulating a transmitted bit string. Further, when data are received, the baseband processor 3f-20 recovers the received bit string by demodulating and decoding the baseband signal provided from the RF processor 3f-10. For example, according to the OFDM scheme, when data are transmitted, the baseband processor 3f-20 generates the complex symbols by coding and modulating the transmitting bit string, maps the complex symbols to the sub-carriers, and then performs the IFFT operation and the CP insertion to construct the OFDM symbols. Further, when data are received, the baseband processor 3f-20 divides the baseband signal provided from the RF processor 3f-10 in the OFDM symbol unit and recovers the signals mapped to the sub-carriers by the FFT operation and then recovers the receiving bit string by the modulation and decoding. The baseband processor 3f-20 and the RF processor 3f-10 transmit and receive a signal as described above. Therefore, the baseband processor 3f-20 and the RF processor 3f-10 may be called a transmitter, a receiver, a transceiver, or a communication unit.

The backhaul communication unit 3f-30 provides an interface for performing communication with other nodes within the network. That is, the backhaul communication unit 3f-30 converts bit strings transmitted from the base station to other access nodes (base station), a core network, etc., into physical signals and converts the physical signals received from other nodes into the bit strings.

The memory 3f-40 stores data such as basic programs, application programs, and setting information for the operation of the main base station. In particular, the storage unit 3f-40 may store the information on the bearer allocated to the accessed terminal, the measured results reported from the accessed terminal, etc. Further, the storage unit 3f-40 may store information that is a determination criterion on whether to provide a multiple connection to the terminal or stop the multiple connection to the terminal. Further, the storage unit 3f-40 provides the stored data according to the request of the controller 3f-50.

The controller 3f-50 controls the general operations of the base station. For example, the controller 3f-50 transmits/receives a signal through the baseband processor 3f-20 and the RF processor 3f-10 or the backhaul communication unit 3f-30. Further, the controller 3f-50 records and reads data in and from the memory 3f-40. For this purpose, the controller 3f-50 may include at least one processor.

According to the third embodiment of the present disclosure, the terminal receives the message commanding the measurement from the base station. The controller receiving the message performs the measurement depending on the measurement event and the condition and the handover command, which are set by the base station and performs the handover.

Fourth Embodiment

Figure 4A:
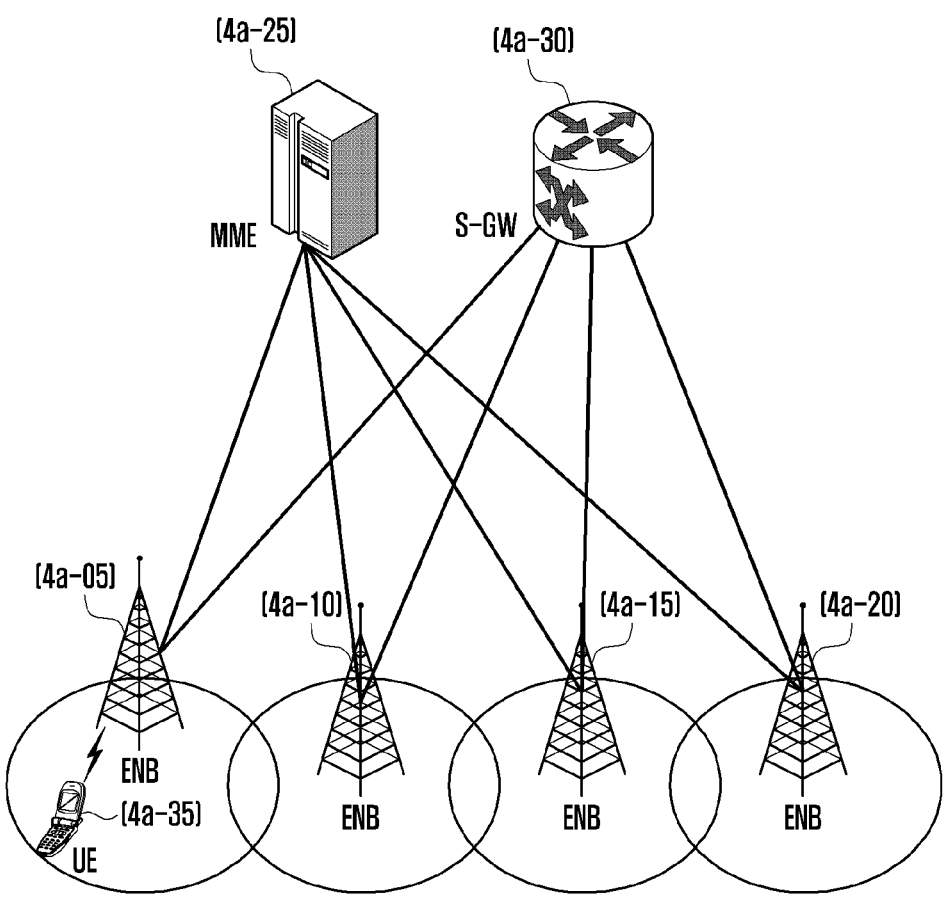
FIG. 4A is a diagram illustrating the structure of the existing LTE system.

FIG. 4A is a diagram illustrating the structure of the existing LTE system.

Referring to FIG. 4A, the wireless communication system is configured to include a plurality of base stations 4a-05, 4a-10, 4a-15, and 4a-20, a mobility management entity (MME) 4a-20, a serving-gateway (S-GW) 4a-30. The user equipment (hereinafter, UE or terminal) 4a-35 accesses an external network through the base stations 4a-05, 4a-10, 4a-15, and 4a-20 and the S-GW 4a-30.

The base stations 4a-05, 4a-10, 4a-15, and 4a-20 are access nodes of a cellular network and provide a radio access to terminals that are connected to a network. That is, in order to serve traffic of users, the base stations 4a-05, 4a-10, 4a-15, and 4a-20 collect state information such as a buffer state, an available transmission power state, a channel state, or the like of the terminals to perform scheduling, thereby supporting a connection between the terminals and a core network (CN). The MME 4a-25 is an apparatus for performing various control functions as well as a mobility management function for the terminal and is connected to a plurality of base stations, and the S-GW 4a-30 is an apparatus for providing a data bearer. Further, the MME 4a-25 and the S-GW 4a-30 may further perform authentication, bearer management, etc., on the terminal connected to the network and may process packets that are to be received from the base stations 4a-05, 4a-10, 4a-15, and 4a-20 and packets that are to be transmitted to the base stations 4a-05, 4a-10, 4a-15, and 4a-20.

Figure 4B:
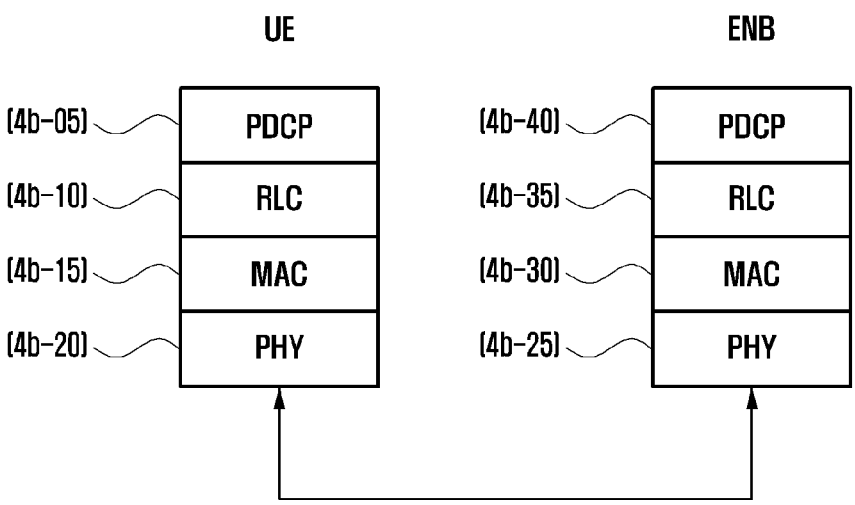
FIG. 4B is a diagram illustrating the radio protocol structure in the existing LTE system.

FIG. 4B is a diagram illustrating the radio protocol structure in the existing LTE system. The NR defined below may be partially different from the radio protocol structure in the present figure, but will be described for convenience of explanation of the present disclosure.

Referring to FIG. 4B, the radio protocol of the LTE system consists of packet data convergence protocols (PDCPs) 4b-05 and 4b-40, radio link controls (RLCs) 4b-10 and 4b-35, and medium access controls (MMCs) 4b-15 and 4b-30 in the terminal and the ENB, respectively. The packet data convergence protocols (PDCPs) 4b-05 and 4b-40 performs operations such as compression/recovery of an IP header and the radio link controls (hereinafter, referred to as RLC) 4b-10 and 4b-35 reconfigure a PDCP packet data unit (PDU) at an appropriate size. The MACs 4b-15 and 4b-30 are connected to several RLC layer devices configured in one terminal and perform an operation of multiplexing RLC PDUs in an MAC PDU and demultiplexing the RLC PDUs from the MAC PDU. Physical layers 4b-20 and 4b-25 perform an operation of channel-coding and modulating upper layer data, making the upper layer data as an OFDM symbol and transmitting the OFDM symbol to a radio channel, or demodulating and channel-decoding the OFDM symbol received through the radio channel and transmitting the demodulated and channel-decoded OFDM symbol to the upper layer. Further, the physical layer uses an HARQ (Hybrid ARQ) for additional error correction and the receiving end transmits whether to receive the packet transmitted from the transmitting end as 1 bit. This is called HARQ ACK/NACK information. The downlink HARQ ACK/NACK information on the uplink transmission may be transmitted through a physical hybrid-ARQ indicator channel (PHICH) physical channel and the uplink HARQ ACK/NACK information on the downlink transmission may be transmitted through a physical uplink control channel (PUCCH) or physical uplink shared channel (PUSCH) physical channel.

Although not illustrated in the present drawings, each radio resource control (hereinafter, referred to as RRC) layer is present at an upper part of the PDCP layer of the terminal and the base station, and the RRC layer may receive and transmit access and measurement related control messages for a radio resource control. For example, the terminal may be instructed to perform the measurement using the RRC layer message, and the terminal may report the measurement result to the base station using the RRC layer message.

Figure 4C:
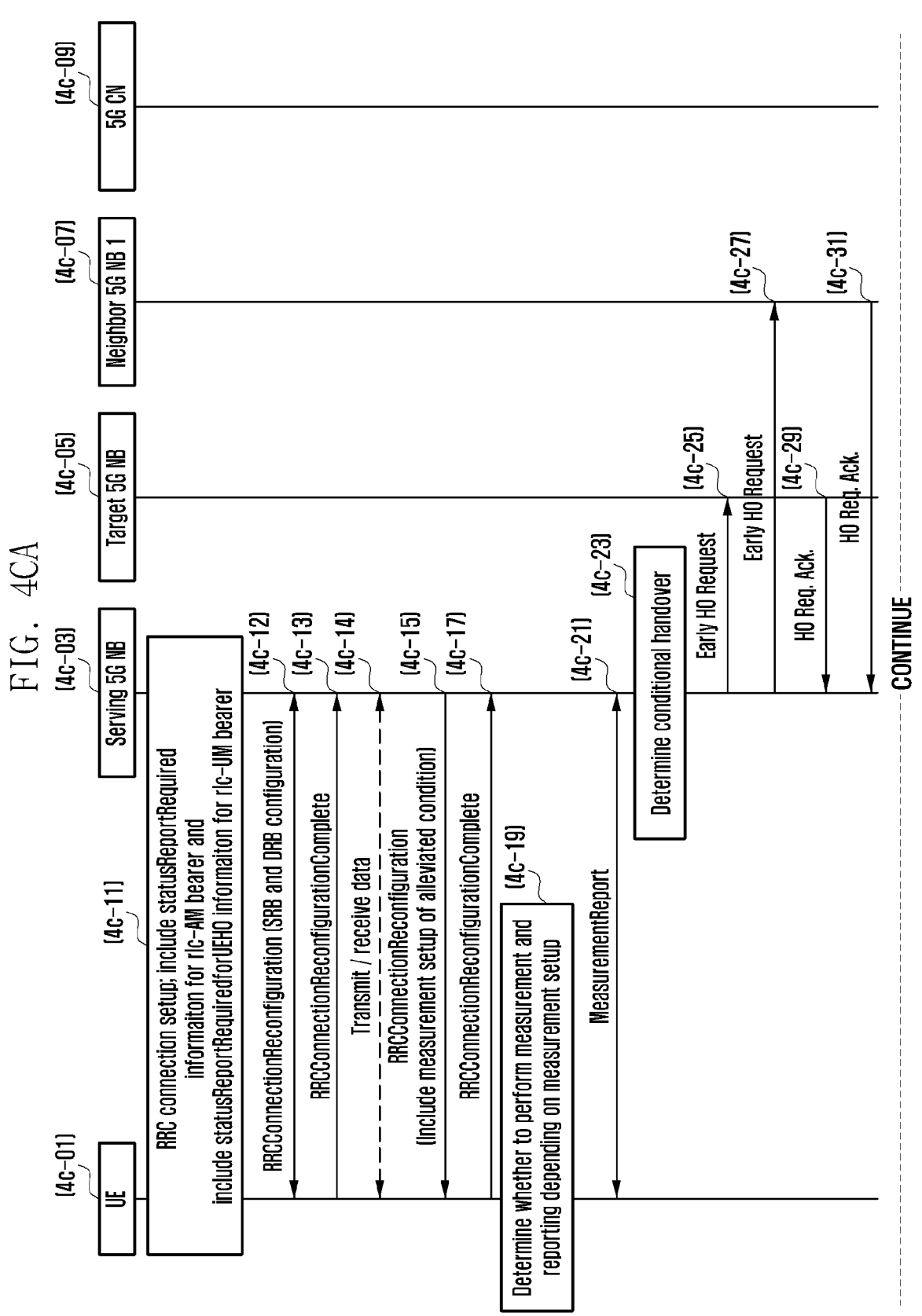
FIGS. 4Ca and 4Cb are diagrams illustrating an example of the message flow between the terminal and the base station according to a fourth embodiment of the present disclosure.
Figure 4C:
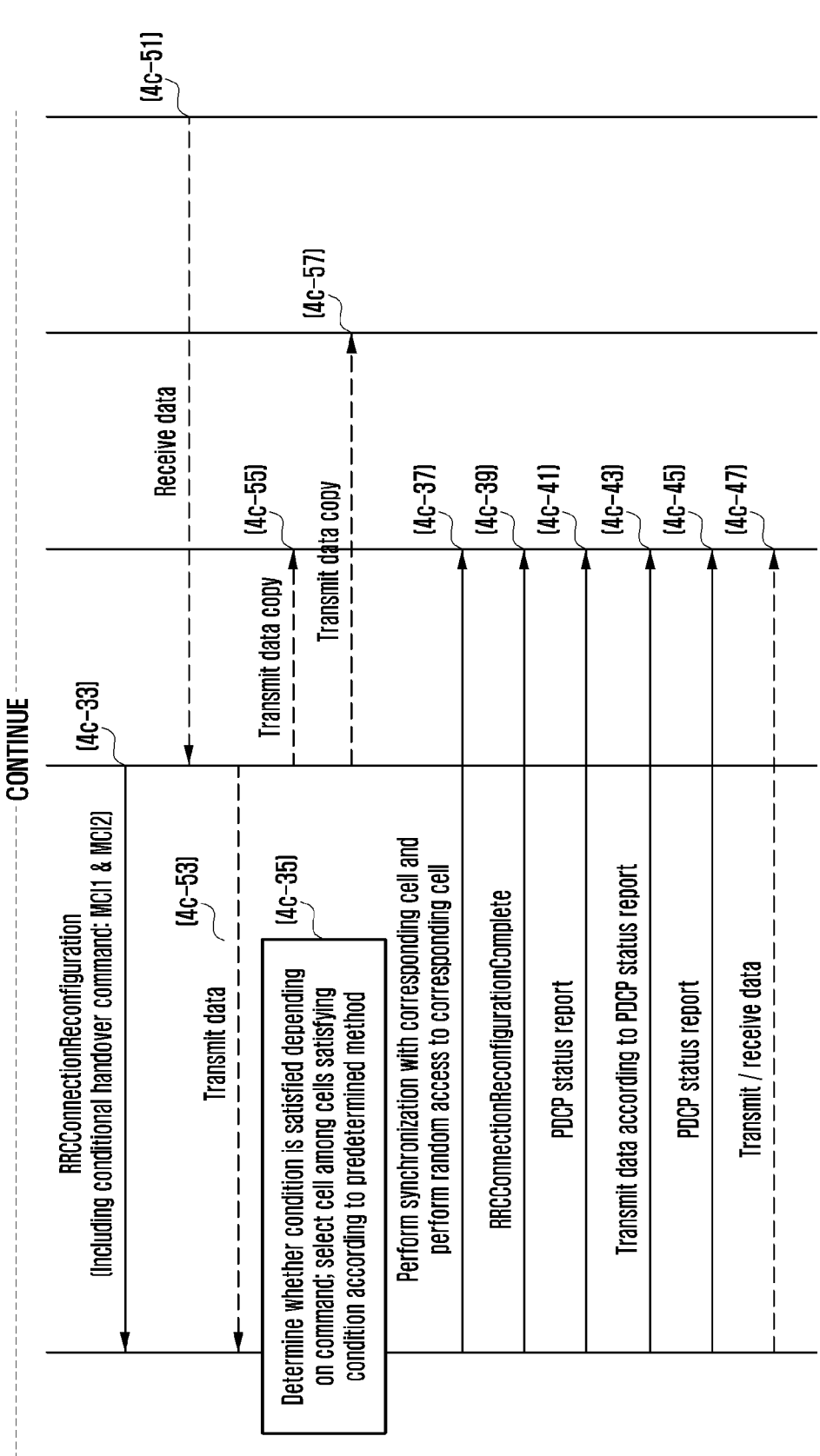

FIGS. 4Ca and 4Cb are diagrams illustrating an example of the message flow between the terminal and the base station according to a fourth embodiment of the present disclosure.

In FIGS. 4Ca and 4Cb, the terminal 4c-01 in the idle mode (RRC IDLE) performs the access to the base station 4c-03 because of the generation of the data to be transmitted or the like (4c-11). In the idle mode, data may not be transmitted because the terminal is not connected to the network for power saving or the like and a transition to a connected mode (RRC_CONNECTED) is required to transmit data. If the terminal succeeds in the access procedure to the base station 4c-03, the terminal changes its state to the connected mode (RRC_CONNECTED) state, and then the base station configures a data radio bearer (DRB) in the terminal for data transmission/reception (4c-12) and transmits the acknowledgement message therefor (4c-13), such that the terminal in the connected mode can perform the data transmission/reception to/from the base station (4c-14). For configuring the DRB, an RRConnectionReconfiguration message of the RRC layer may be used, and as the acknowledgement message, the RRConnectionReconfigurationComplete message may be used. Also, the DRB configuration may include the configuration information for the PDCP and RLC layers for each bearer. For example, the operation mode of the RLC layer, more specifically the acknowledgment mode (AM), the unacknowledgement mode (UM) and the like are indicated by the DRB configuration, and the RLC-AM bearer may include statusReportRequired information and the de-UM bearer may include StatusReportRequiredforUEHO information.

Thereafter, the base station sets a cell measurement around the terminal in the terminal (4c-15). The measurement setup may include the measurement object, the report configuration or the like. The measurement object may include information on which frequency is to be measured, and the report configuration may include the setting such as periodically reporting the measurement result (e.g., received power intensity) to the base station and reporting the measurement result to the base station when the measurement result satisfies the following conditions.

Event A1 (when the serving cell is better than the threshold)

Event A2 (when the serving cell is worse than the threshold)

Event A3 (when the neighboring cells are better than the offset from the primary cell (PCell))

Event A4 (when the serving cell is better than the threshold)

Event A5 (when the main serving cell (PCell) is lower than threshold value 1 and the neighboring cells are better than threshold value 2)

Event A6 (when the neighboring cells are better than the offset from the secondary cell (SCell))

In the present disclosure, when the event A3 among the above events is used, an offset value smaller than an offset value used in a general handover may be used. This allows the terminal to earlier perform the reporting to the base station, thereby preventing radio link failure (RLF) with the current base station 4c-03. When the event A5 among the events is used, for the same reason, as the threshold value 1, a value greater than a value used for a normal handover may be used, and as the threshold value 2, a value smaller than a value used for a normal handover may be used. The measurement setup may be transmitted using the RRConnectionReconfiguration message of the RRC layer. Thereafter, the terminal transmits an acknowledgment message for the configuration indication (4c-17), and may use the RRConnectionReconfigurationComplete message of the RRC layer.

The terminal which has received the measurement setup performs the measurement depending on the received setup to determine whether it meets the report configuration set by the base station (4c-19). If the report configuration is satisfied (i.e., for example, when the A3 or A5 is set, if the corresponding configuration is satisfied), the terminal reports the measurement result to the base station (4c-21). Accordingly, the base station determines whether to perform 'conditional handover' (4c-23). The conditional handover will be described below in detail. If it is determined to perform the conditional handover, the current base station transmits a handover request message to each of the base stations to prepare for handover to one or more neighboring cells of the terminal according to the information of the cells included in the measurement result (4c-25) (4c-27). The handover request message may include detailed information of the terminal to be handed over and information on the ciphering key that the terminal uses in the corresponding base station. Accordingly, the handover acknowledgement message is received from each base station (4c-29) (4c-31). The handover acknowledge message may include the identifier, the random access resource information or the like that the terminal uses in the corresponding cell.

Accordingly, the source base station 4c-03 transmits a conditional handover command to the terminal 4c-01 (4c-33). The conditional handover command does not command the terminal to perform the handover immediately but allows the terminal to determine a handover time when the handover condition included in the message is satisfied. The conditional handover command can be transmitted through the RRConnectionReconfiguration message of the RRC layer, and the conditional handover command message may include two types of mobility control information (MCI), that is, a plurality of MCI-1 and one MCI-2. The MCI-1 may include information (e.g., physical cell identifier or the like) on the corresponding target cells for each base station (i.e., (4c-05) (4c-07) in the drawings) and security key information in the corresponding target cell. In the present disclosure, for convenience of explanation, information to be transmitted for each target cell is collectively referred to as MCI-1 information, but may be separately transmitted to different signaling groups at the time of actual transmission. In addition, the MCI-2 is information commonly applied to all the transmitted target cells, and may include, for example, the T304 timer and the above-mentioned handover condition or the like. The T304 timer is a timer which is set to determine whether the handover is successfully completed within a predetermined time after the handover is performed. As the handover condition, the A3 event, the A5 event or the like as described above may be described.

In addition, the base station that has transmitted the handover command continuously transmits the data 4c-51 of the corresponding terminal received from the core network 4c-09 even after the handover command is transmitted (4c-53), and copies the PDCP SDU transmitted to the terminal and transmits it the target base stations (4c-55) (4c-57).

Meanwhile, the terminal which has received the conditional handover command determines whether the handover condition depending on the received command is satisfied (4c-35). If the predetermined condition is satisfied, the T304 timer as described above starts to be driven. That is, the T304 does not start immediately after the handover command is received but the T304 timer starts to be driven when the condition included in the handover command is satisfied. As the handover condition, there may be the A3 event, the A5 event or the like as described above, which may be described in more detail as follows.

A3 event: target>source+offset2 is continued for a predetermined period of time, or A5 event: source<threshold 1 & target>threshold 2 is
continued for a predetermined period of time Thereafter, when there is one cell satisfying the above
condition, the corresponding cell is selected as the target cell
for performing the handover cell, and if there are a plurality
of cells, the target cell for performing the handover is
selected according to the predetermined method. As the
predetermined method, a method for moving to the strongest
signal strength or the best signal quality among the measurement results of the plurality of cells satisfying the
conditions may be used, or a method for moving the first
indicated cell among the cells satisfying the condition
according to the order indicated by the base station within
the MCI-1 within the handover command may be used.

When the handover condition is satisfied as described
above, the data transmission/reception to/from the source
cell 4c-03 stops and the movement to the selected target cell
is made. In addition, for the selected cell, the terminal
derives the ciphering key to be used in the target cell
according to the security information indicated within the
MCI-1.

In addition, the terminal performs the synchronization on
the selected cell and the downlink signal to perform the
random access to perform the uplink synchronization and
uplink transmission power with the corresponding cell (4c-
37) and transmits a handover complete message to the
corresponding cell (4c-39). The handover complete message
may be transmitted using the RRCConnectionReconfigurationComplete message, and when the handover complete
message transmission starts, the driven T304 stops.

If the handover is successfully completed in the target cell
(for example, when transmission of the HO complete message starts or the random access succeeds if the target uses
the dedicated random access resource, the terminal may
trigger the PDCP status report-AM for the RLC-AM bearer
in which the statusReportRequiredforHO is configured and
transmit it to the base station and may trigger the PDCP
status report-AM for the RLC-UM bearer in which the
statusReportRequiredforUEHO is configured and transmit it
to the base station (4c-41). The PDCP status report-AM
consists of a first missing PDCP sequence number (FMS)
and BITMAT (packets which are successfully received or
are not successfully received after the FMS value are transmitted in a bitmap form, for example, 1 indicates the
reception success and 0 indicates reception failure), and the
PDCP status report-UM consists of only the FMS. According to the PDCP status report-AM and the PDCP status
report-UM information, the base station determines which
of the packets the terminal has received and determines
which of the received data 4c-55 the terminal is transmitted
and transmits it to the terminal (4c-43). In addition, the base
station also triggers the PDCP status report-AM for the
RLC-AM bearer in which the statusReportRequired is configured and transmits it to the terminal, and triggers the
PDCP status report-UM for the RLC-UM bearer in which
the statusReportRequiredForEHO is configured and transmits it to the terminal (4c-45). Accordingly, the terminal
deletes the PDCP SDU notified that the base station has
successfully received from the buffer, thereby preventing
unnecessary transmission. Thereafter, the terminal may perform the data transmission/reception to/from the target base
station (4c-47).

Figure 4D:
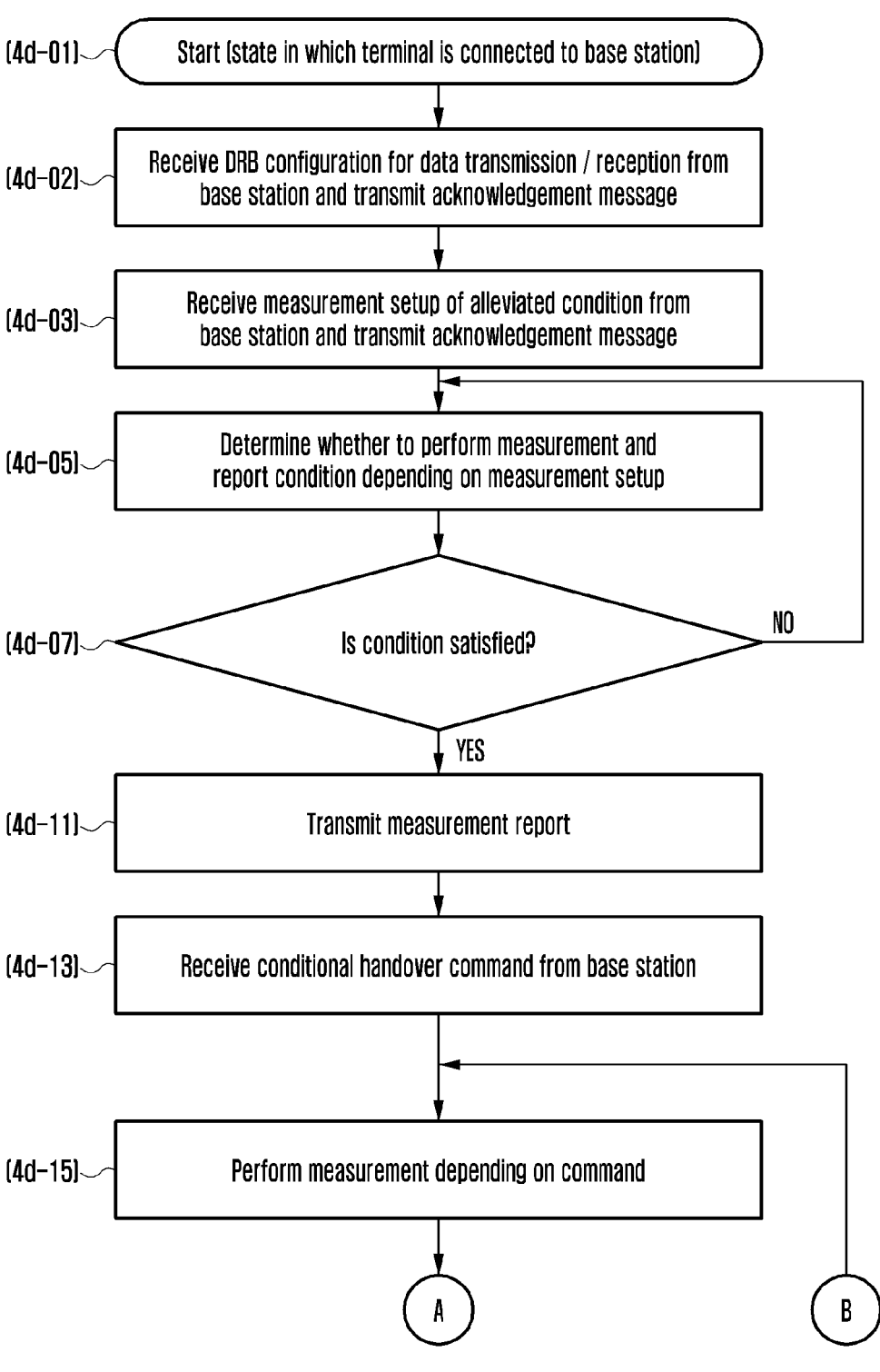
FIGS. 4Da and 4Db are diagrams illustrating an example of the operation sequence of the terminal according to the fourth embodiment of the present disclosure.
Figure 4D:
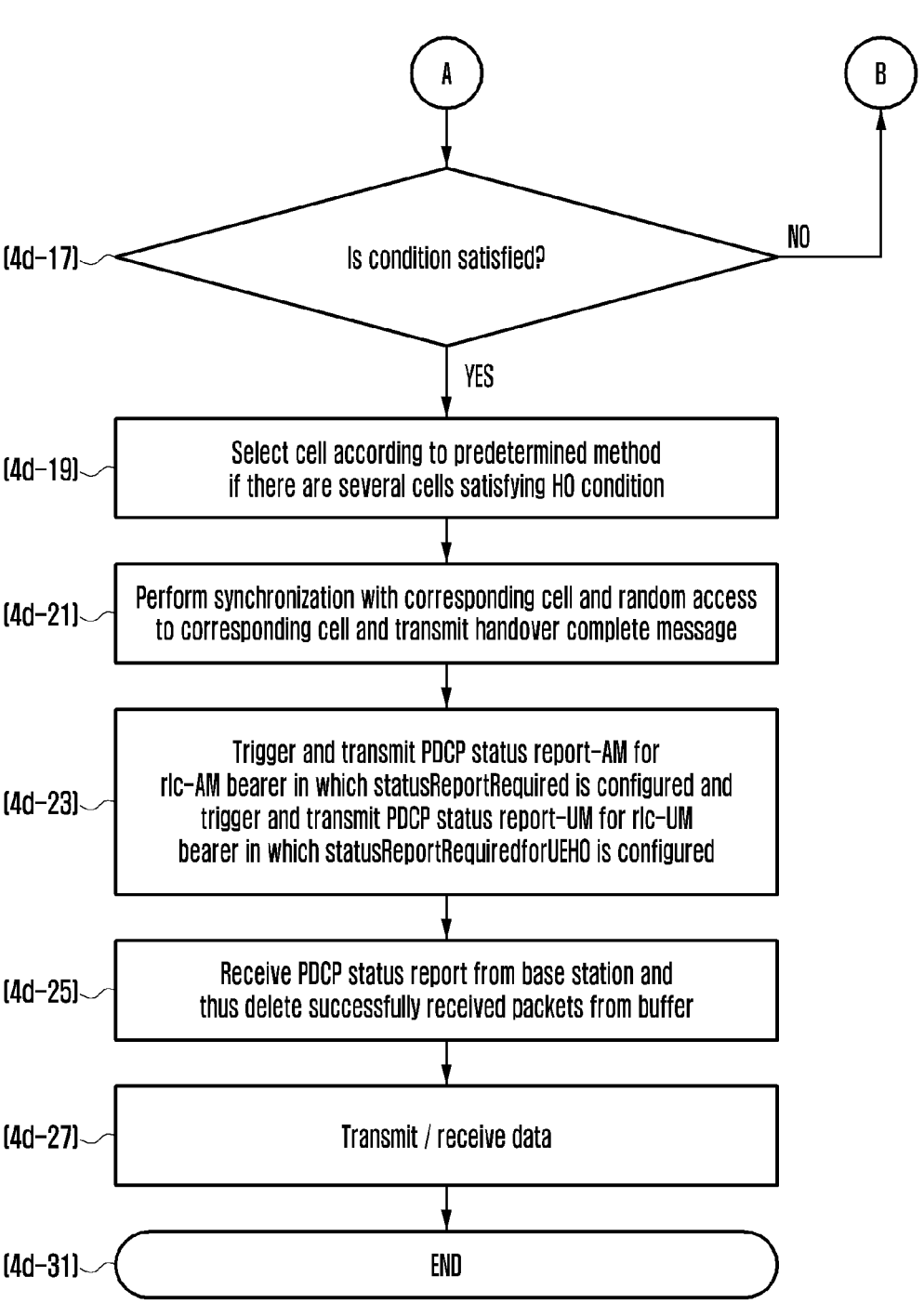

FIGS. 4Da and 4Db are diagrams illustrating an example
of the operation sequence of the terminal according to the
fourth embodiment of the present disclosure.

In FIGS. 4Da and 4Db, it is assumed that the terminal is
in the connected mode (RRC_CONNECTED) (4d-01).
Thereafter, the base station configures the data radio bearer
(DRB) in the terminal for the data transmission/reception
and transmits the acknowledgement message therefor (4c-
02), so that the terminal can perform the data transmission/
reception to/from the base station. For configuring the DRB,
an RRConnectionReconfiguration message of the RRC layer
may be used, and as the acknowledgement message, the
RRCConnectionReconfigurationComplete message may be
used. Also, the DRB configuration may include the configuration information for the PDCP and RLC layers for each
bearer. For example, the operation mode of the RLC layer,
more specifically the acknowledgment mode (AM), the
unacknowledgement mode (UM) and the like are indicated
by the DRB configuration, and the RLC-AM bearer may
include statusReportRequired information and the de-UM
bearer may include StatusReportRequiredforUEHO information.

Thereafter, the terminal receives the cell measurement
from the base station (4d-03). The measurement setup may
include the measurement object, the report configuration or
the like. The measurement object may include information
on which frequency is to be measured, and the report
configuration may include the setting such as periodically
reporting the measurement result (e.g., received power
intensity) to the base station or reporting the measurement
result to the base station when the measurement result
satisfies the following conditions.

Event A1 (when the serving cell is better than the threshold)

Event A2 (when the serving cell is worse than the threshold)

Event A3 (when the neighboring cells are better than the
offset from the primary cell (PCell))

Event A4 (when the serving cell is better than the threshold)

Event A5 (when the main serving cell (PCell) is lower
than threshold value 1 and the neighboring cells are
better than threshold value 2)

Event A6 (when the neighboring cells are better than the
offset from the secondary cell (SCell))

As described above with reference to FIG. 4C, in the
measurement condition, a value that is alleviated over the
threshold/offset value used in the normal handover may be
used, which causes the terminal to perform the reporting to
the base station earlier, thereby preventing the radio rink
failure (RLF) with the base station. Thereafter, the terminal
transmits the acknowledgment message for the configuration indication, and may use the RRConnectionReconfigurationComplete message of the RRC layer.

Thereafter, the terminal which has received the measurement setup performs the measurement depending on the
received setup to determine whether it meets the report
configuration set by the base station (4d-05). Accordingly, if
the report configuration is satisfied (i.e., for example, when
the A3 or A5 is set, if the corresponding configuration is
satisfied) (4d-07), the terminal reports the measurement
result to the base station (4d-11). Thereafter, the terminal
receives the conditional handover command from the base
station (4d-13). The conditional handover command does
not command the terminal to perform the handover immediately but allows the terminal to determine a handover time
when the handover condition included in the message is
satisfied. The conditional handover command can be transmitted through the RRConnectionReconfiguration message
of the RRC layer, and the conditional handover command message may include two types of mobility control information (MCI), that is, a plurality of MCI-1 and one MCI-2. The MCI-1 may include the information (e.g., physical cell identifier or the like) on the corresponding target cells for each base station and the information on the security key information in the corresponding target cell. In the present disclosure, for convenience of explanation, information to be transmitted for each target cell is collectively referred to as MCI-1 information, but may be separately transmitted to different signaling groups at the time of actual transmission. In addition, the MCI-2 is information commonly applied to all the transmitted target cells, and may include, for example, the T304 timer and the above-mentioned handover condition or the like. The T304 timer is a timer which is set to determine whether the handover is successfully completed within a predetermined time after the handover is performed. As the handover condition, the A3 event, the A5 event or the like as described above may be described.

The terminal which has received the conditional handover command performs the measurement depending on the received command (4d-15) and determines whether the handover condition is satisfied (4d-17). If the predetermined condition is satisfied, the T304 timer as described above starts to be driven (4d-19). That is, the T304 does not start immediately after the handover command is received but the T304 timer starts to be driven when the condition included in the handover command is satisfied. As the handover condition, there may be the A3 event, the A5 event or the like as described above, which may be described in more detail as follows.

A3 event: target>source+offset2 is continued for a predetermined period of time, or A5 event: source<threshold 1 & target>threshold 2 is continued for a predetermined period of time Thereafter, when there is one cell satisfying the above condition, the corresponding cell is selected as the target cell for performing the handover cell, and if there are a plurality of cells, the target cell for performing the handover is selected according to the predetermined method. As the predetermined method, a method for moving to the strongest signal strength or the best signal quality among the measurement results of the plurality of cells satisfying the conditions may be used, or a method for moving the first indicated cell among the cells satisfying the condition according to the order indicated by the base station within the MCI-1 within the handover command may be used. Thereafter, for the selected cell, the terminal derives the ciphering key to be used in the target cell according to the security information indicated within the MCI-1.

In addition, the terminal performs the synchronization on the selected cell and the downlink signal to perform the random access to perform the uplink synchronization and uplink transmission power with the corresponding cell and transmits a handover complete message to the corresponding cell (4d-21). The handover complete message may be transmitted using the RRCConnectionReconfigurationComplete message, and when the handover complete message transmission starts, the driven T304 stops.

When the handover is successfully completed in the target cell (for example, when transmission of the HO complete message starts or the random access succeeds if the target uses the dedicated random access resource, the terminal triggers the PDCP status report-AM for the RLC-AM bearer in which the statusReportRequiredforHO is configured and transmits it to the base station and transmits the PDCP status report-AM for the RLC-UM bearer in which the statusReportRequiredforUEHO is configured and transmits it to the base station (4d-23). The PDCP status report-AM includes a first missing PDCP sequence number (FMS) and BITMAT (packets which are successfully received or are not successfully received after the FMS value are transmitted in a bitmap form, for example, 1 indicates the reception success and 0 indicates reception failure), and the PDCP status report-UM includes only the FMS. Also, the PDCP status report-AM for the RLC-AM bearer in which the statusReportRequired is configured is received and the PDCP status report-UM for the RLC-UM bearer in which the statusReportRequiredForEHO is configured, such that the terminal deletes the PDCP SDU notifying that the base station successfully receives it from the buffer, thereby preventing the unnecessary transmission (4d-25). Thereafter, the terminal may perform the data transmission/reception to/from the target base station (4d-27).

Figure 4E:
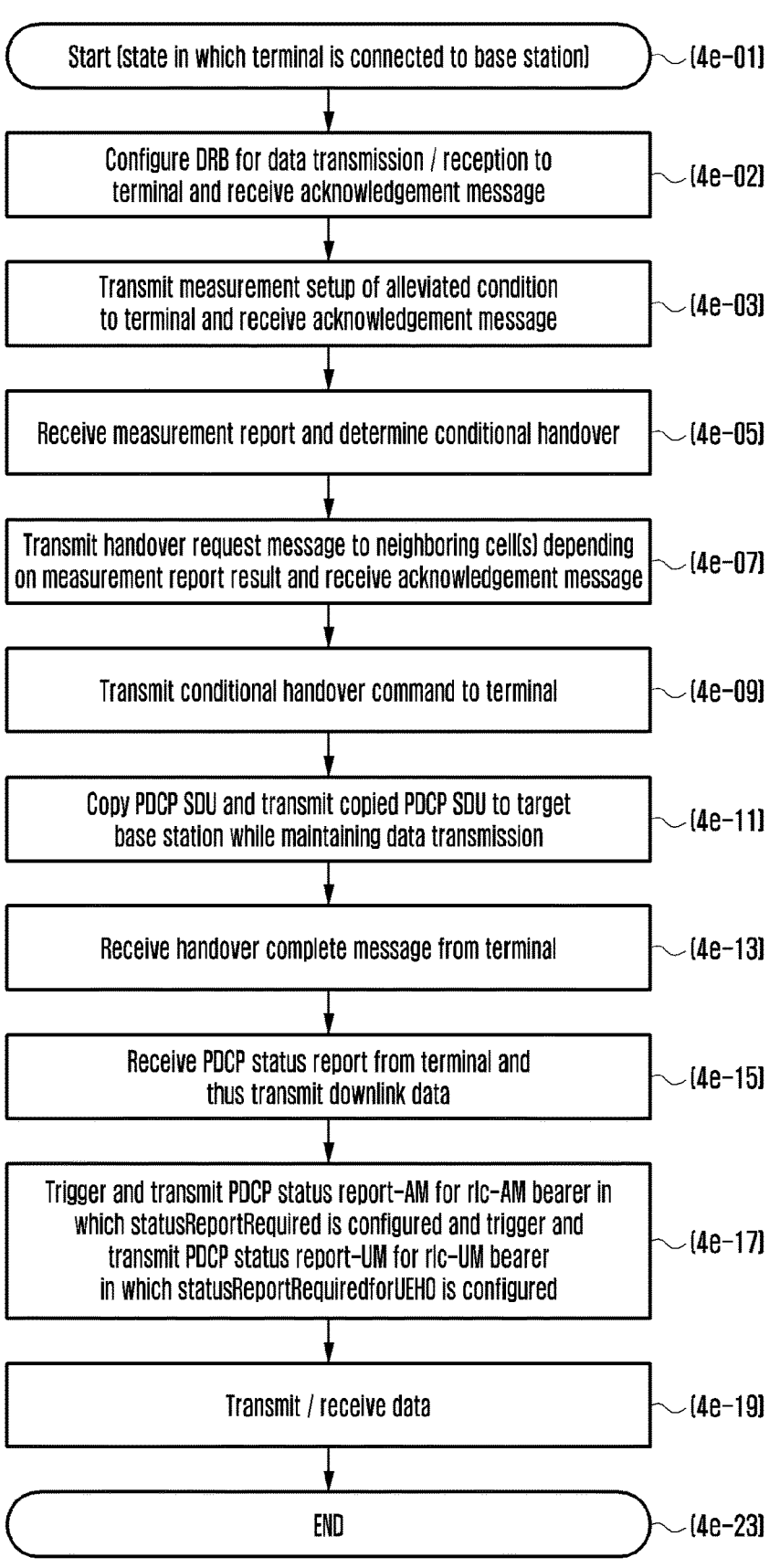
FIG. 4E is a diagram illustrating an example of the operation sequence of the base station according to the fourth embodiment of the present disclosure.

FIG. 4E is a diagram illustrating an example of the operation sequence of the base station according to the fourth embodiment of the present disclosure.

In FIG. 4E, it is assumed that one terminal is in the connected mode (RRC_CONNECTED). Thereafter, the base station configures the data radio bearer (DRB) in the terminal for the data transmission/reception and receives the acknowledgement message therefor, so that the terminal can perform the data transmission/reception to/from the base station (4c-02). For configuring the DRB, an RRConnectionReconfiguration message of the RRC layer may be used, and as the acknowledgement message, the RRCConnectionReconfigurationComplete message may be used. Also, the DRB configuration may include the configuration information for the PDCP and RLC layers for each bearer. For example, the operation mode of the RLC layer, more specifically the acknowledgment mode (AM), the unacknowledgement mode (UM), and the like is indicated by the DRB configuration and the RLC-AM bearer may include statusReportRequired information and the rlc-UM bearer may include StatusReportRequiredforUEHO information.

Thereafter, the base station sets a cell measurement around the terminal in the terminal (4e-03). The measurement setup may include the measurement object, the report configuration or the like. The measurement object may include information on which frequency is to be measured, and the report configuration may include the setting such as periodically reporting the measurement result (e.g., received power intensity) to the base station and reporting the measurement result to the base station when the measurement result satisfies following conditions.

Event A1 (when the serving cell is better than the threshold)

Event A2 (when the serving cell is worse than the threshold)

Event A3 (when the neighboring cells are better than the offset from the primary cell (PCell))

Event A4 (when the serving cell is better than the threshold)

Event A5 (when the main serving cell (PCell) is lower than threshold value 1 and the neighboring cells are better than threshold value 2)

Event A6 (when the neighboring cells are better than the offset from the secondary cell (SCell))

As described above with reference to FIG. 4C, in the measurement condition, a value that is alleviated over the threshold/offset value used in the normal handover may be used, which causes the terminal to perform the reporting to the base station earlier, thereby preventing the radio rink failure (RLF) with the base station. Thereafter, the base station receives the acknowledgment message for the configuration indication from the terminal, and may use the RRConnectionReconfigurationComplete message of the RRC layer.

Thereafter, the base station receives the reporting on the measurement result from the terminal and determines whether to perform the 'conditional handover' (4e-05). If it is determined to perform the conditional handover, the current base station transmits a handover request message to each of the base stations to prepare for handover to one or more neighboring cells of the terminal according to the information of the cells included in the measurement result, and receives the handover acknowledgment message from each base station (4e-07).

Accordingly, the base station transmits the conditional handover command to the terminal (4e-09). The conditional handover command does not command the terminal to perform the handover immediately but allows the terminal to determine a handover time when the handover condition included in the message is satisfied. The conditional handover command can be transmitted through the RRConnectionReconfiguration message of the RRC layer, and the conditional handover command message may include two types of mobility control information (MCI), that is, a plurality of MCI-1 and one MCI-2. The MCI-1 may include the information (e.g., physical cell identifier or the like) on the corresponding target cells for each base station and the information on the security key information in the corresponding target cell. In the present disclosure, for convenience of explanation, information to be transmitted for each target cell is collectively referred to as MCI-1 information, but may be separately transmitted to different signaling groups at the time of actual transmission. In addition, the MCI-2 is information commonly applied to all the transmitted target cells, and may include, for example, the T304 timer and the above-mentioned handover condition or the like. The T304 timer is a timer which is set to determine whether the handover is successfully completed within a predetermined time after the handover is performed. As the handover condition, the A3 event, the A5 event or the like as described above may be described.

Meanwhile, the base station continues to transmit the data (PDCP SDU) of the corresponding terminal received from the core network even after transmitting the handover command (i.e., maintains data transmission), and copies the PDCP SDU transmitted to the terminal and transmits the copied PDCP SDU to the target base stations (4e-11).

Thereafter, the target base station (at this time, the base station is changed but for convenience, the same flow chart is used) receives the handover complete message from the terminal (4e-13), receives the PDCP status report from the terminal, and thus transmits the downlink data (4e-15). The PDCP status report includes the PDCP status report-AM and the PDCP status report-AM as described above, and the PDCP status report-AM includes the first missing PDCP sequence number) and a BITMAP (packets which are successfully received or are not successfully received after the FMS value are transmitted in a bitmap form, for example, 1 indicates the reception success and 0 indicates reception failure), and the PDCP status report-UM includes only the FMS. In addition, the base station also transmits the PDCP status report-AM to the RLC-AM bearer in which the statusReportRequired is configured, and transmits the PDCP status report-UM to the RLC-UM bearer in which the statusReportRequiredForEHO is configured, such that the terminal prevents the unnecessary transmission (4e-17). Thereafter, the terminal may perform the data transmission/reception to/from the target base station (4d-19).

Figure 4F:
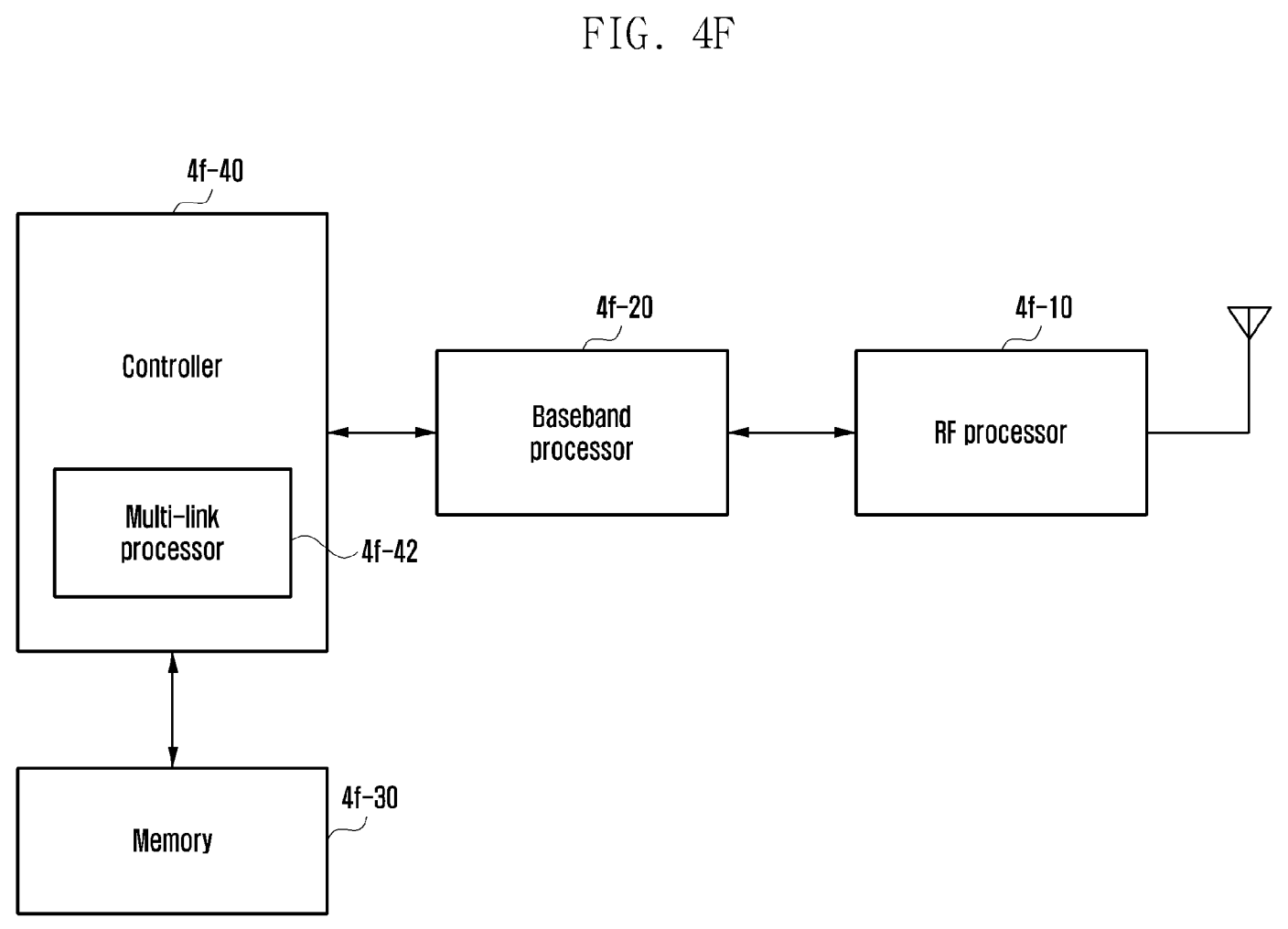

FIG. 4F is a diagram illustrating an example of a block diagram illustrating an internal structure of the terminal according to the fourth embodiment of the present disclosure.

Referring to FIG. 4F, the terminal includes a radio frequency (RF) processor 4f-10, a baseband processor 4f-20, a memory 4f-30, and a controller 4f-40.

The RF processor 4f-10 serves to transmit and receive a signal through a radio channel, such as band conversion and amplification of a signal. That is, the RF processor 4f-10 up-converts a baseband signal provided from the baseband processor 4f-20 into an RF band signal and then transmits the RF band signal through an antenna and down-converts the RF band signal received through the antenna into the baseband signal. For example, the RF processor 4f-10 may include a transmitting filter, a receiving filter, an amplifier, a mixer, an oscillator, a digital to analog converter (DAC), an analog to digital converter (ADC), or the like. FIG. 4F illustrates only one antenna but the terminal may include a plurality of antennas. Further, the RF processor 4f-10 may include a plurality of RF chains. Further, the RF processor 4f-10 may perform beamforming. For the beamforming, the RF processor 4f-10 may adjust a phase and a size of each of the signals transmitted and received through a plurality of antennas or antenna elements.

The baseband processor 4f-20 performs a conversion function between a baseband signal and a bit string according to a physical layer standard of a system. For example, when data are transmitted, the baseband processor 4f-20 generates complex symbols by coding and modulating a transmitted bit string. Further, when data are received, the baseband processor 4f-20 recovers the received bit string by demodulating and decoding the baseband signal provided from the RF processor 4f-10. For example, according to the orthogonal frequency division multiplexing (OFDM) scheme, when data are transmitted, the baseband processor 4f-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 4f-20 divides the baseband signal provided from the RF processor 4f-10 in an OFDM symbol unit and recovers the signals mapped to the sub-carriers by a fast Fourier transform (FFT) operation and then recovers the received bit string by the modulation and decoding.

The baseband processor 4f-20 and the RF processor 4f-10 transmit and receive a signal as described above. Therefore, the baseband processor 4f-20 and the RF processor 4f-10 may be called a transmitter, a receiver, a transceiver, or a communication unit. Further, at least one of the baseband processor 4f-20 and the RF processor 4f-10 may include different communication modules to process signals in different frequency bands. Further, different frequency bands may include a super high frequency (SHF) (for example: 2.5 GHz, 5 GHz) band, a millimeter wave (for example: 60 GHz) band.

The memory 4f-30 stores data such as basic programs, application programs, and configuration information for the operation of the terminal.

The controller 4f-40 controls the overall operations of the terminal. For example, the controller 4f-40 transmits and receives a signal through the baseband processor 4f-20 and the RF processor 4f-10. Further, the controller 4f-40 records and reads data in and from the memory 4f-40. For this purpose, the controller 4f-40 may include at least one processor. For example, the controller 4f-40 may include a communication processor (CP) performing a control for communication and an application processor (AP) controlling an upper layer such as the application programs. According to the embodiment of the present disclosure, the controller 4f-40 includes a multi-link processor 4f-42 that performs the processing to be operated in a multi-link mode. For example, the controller 4f-40 may control the terminal to perform the procedure illustrated in the operation of the terminal illustrated in FIG. 4F.

According to the embodiment of the present disclosure, the terminal receives the message commanding the measurement from the base station. The controller receiving the message performs the measurement depending on the measurement event and the condition and the handover command, which are set by the base station and performs the handover. In addition, after the handover complete message is transmitted, PDCP status report is transmitted, and the packets which are received and successfully transmitted/received are identified or identified by the base station.

FIG. 4G is a diagram illustrating an example of a block diagram illustrating an internal structure of the base station according to the fourth embodiment of the present disclosure.

As illustrated in FIG. 4G, the base station is configured to include an RF processor 4g-10, a baseband processor 4g-20, a backhaul communication unit 4g-30, a memory 4g-40, and a controller 4g-50.

The RF processor 4g-10 serves to transmit/receive a signal through a radio channel, such as band conversion and amplification of a signal. That is, the RF processor 4g-10 up-converts a baseband signal provided from the baseband processor 4g-20 into an RF band signal and then transmits the baseband signal through an antenna and down-converts the RF band signal received through the antenna into the baseband signal. For example, the RF processor 4g-10 may include a transmitting filter, a receiving filter, an amplifier, a mixer, an oscillator, a DAC, an ADC, etc. FIG. 4G illustrates only one antenna but the first access node may include a plurality of antennas. Further, the base station may include the plurality of RF chains. Further, the RF processor 4g-10 may perform the beamforming. For the beamforming, the RF processor 4g-10 may adjust a phase and a size of each of the signals transmitted and received through a plurality of antennas or antenna elements.

The baseband processor 4g-20 performs a conversion function between the baseband signal and the bit string according to the physical layer standard of the radio access technology. For example, when data are transmitted, the baseband processor 4g-20 generates complex symbols by coding and modulating a transmitting bit string. Further, when data are received, the baseband processor 4g-20 recovers the received bit string by demodulating and decoding the baseband signal provided from the RF processor 4g-10. For example, according to the OFDM scheme, when data are transmitted, the baseband processor 4g-20 generates the complex symbols by coding and modulating the transmitting bit string, maps the complex symbols to the sub-carriers, and then performs the IFFT operation and the CP insertion to configure the OFDM symbols. Further, when data are received, the baseband processor 4g-20 divides the baseband signal provided from the RF processor 4g-10 in an OFDM symbol unit and recovers the signals mapped to the sub-carriers by an FFT operation and then recovers the receiving bit string by the modulation and decoding. The baseband processor 4g-20 and the RF processor 4g-10 transmit and receive a signal as described above. Therefore, the baseband processor 4g-20 and the RF processor 4g-10 may be called a transmitter, a receiver, a transceiver, a communication unit, or a wireless communication unit.

The backhaul communication unit 4g-30 provides an interface for performing communication with other nodes within the network. That is, the backhaul communication unit 4g-30 converts bit strings transmitted from the base station to other nodes (e.g., base station), a core network, etc., into physical signals and converts the physical signals received from other nodes into the bit strings.

The memory 4g-40 stores basic programs for the operation of the base station, application programs, data such as configuration information. In particular, the memory 4g-40 may store the information on the bearer allocated to the accessed terminal, the measured results reported from the accessed terminal, etc. Further, the memory 4g-40 may store information that is a determination criterion on whether to provide a multiple connection to the terminal or stop the multiple connection to the terminal. Further, the memory 4g-40 provides the stored data according to the request of the controller 4g-50.

The controller 4g-50 controls the overall operations of the base station. For example, the controller 4g-50 transmits/receives a signal through the baseband processor 4g-20 and the RF processor 4g-10 or the backhaul communication unit 4g-30. Further, the controller 4g-50 records and reads data in and from the memory 4g-40. For this purpose, the controller 4g-50 may include at least one processor.

According to the embodiment of the present disclosure, the controller 4g-50 allows the terminal to determine the measurement setup indication and the conditional handover command transmission and command the terminal to perform the same. The same packet as the packet transmitted to the downlink through the backhaul communication unit 4g-30 during the handover is transmitted to the candidate target base station. In addition, after the handover complete message is received from the terminal, the PDCP status report is transmitted, and the packets which are received and successfully transmitted/received are identified or identified by the base station.

Fifth Embodiment

Figure 5A:
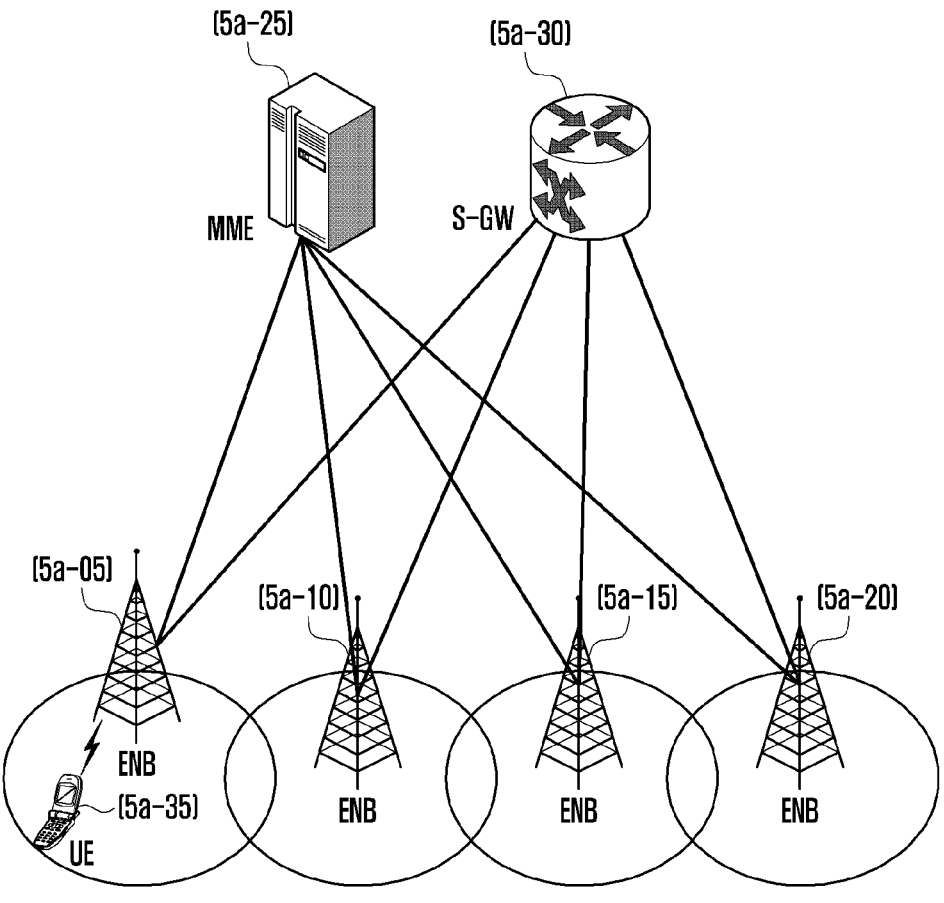
FIG. 5A is a diagram illustrating the structure of the existing LTE system.

FIG. 5A is a diagram illustrating the structure of the existing LTE system.

As illustrated in FIG. 5A, a radio access network of an LTE system is configured to include next generation base stations (evolved node B, hereinafter, ENB, Node B, or base station) 5a-05, 5a-10, 5a-15, and 5a-20, a mobility management entity (MME) 5a-25, and a serving-gateway (S-GW) 5a-30. User equipment (hereinafter, UE or terminal) 5a-35 accesses an external network through the ENBs 5a-05 to 5a-20 and the S-GW 5a-30.

In FIG. 5A, the ENBs 5a-05 to 5a-20 correspond to the existing node B of the UMTS system. The ENB is connected to the UE 5a-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel state of the terminals is required. Here, the ENBs 5a-05 to 5a-20 take charge of the collecting and scheduling. One ENB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation & coding (hereinafter, referred to as AMC) scheme for determining a modulation scheme and a channel coding rate depending on a channel state of the terminal is applied. The S-GW 5a-30 is an apparatus for providing a data bearer and generates or removes the data bearer according to the control of the MME 5a-25. The MME is an apparatus for performing a mobility management function for the terminal and various control functions and is connected to a plurality of base stations.

Figure 5B:
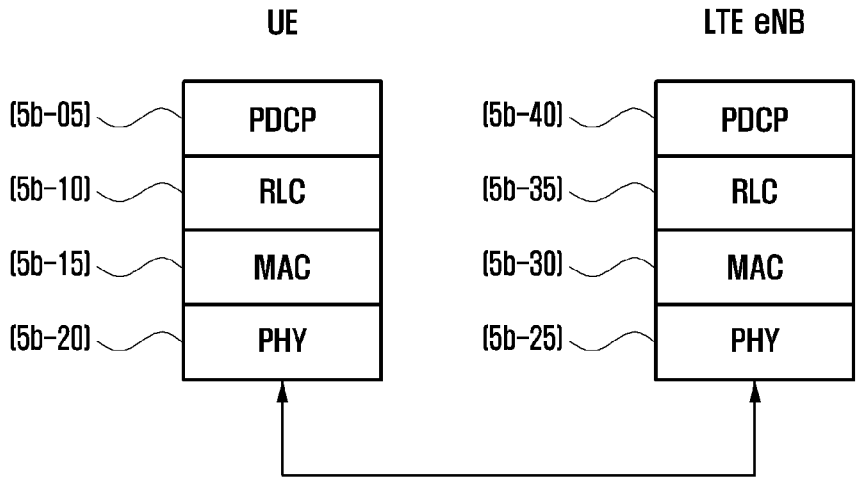
FIG. 5B is a diagram illustrating the radio protocol structure in the existing LTE system.

FIG. 5B is a diagram illustrating the radio protocol structure in the existing LTE system.

Referring to FIG. 5B, the radio protocol of the LTE system is configured to include packet data convergence protocols (PDCPs) 5b-05 and 5b-40, radio link controls (RLCs) 5b-10 and 5b-35, and medium access controls (MACs) 5b-15 and 5b-30, respectively, in the terminal and the ENB, respectively. The packet data convergence protocols (PDCPs) 5b-05 and 5b-40 are in charge of operations such as IP header compression/decompression. The main functions of the PDCP are summarized as follows.

Header compression and decompression function (Header compression and decompression: ROHC only)

Transfer function of user data (Transfer of user data)

In-sequence delivery function (In-sequence delivery of upper layer PDUs at PDCP re-establishment procedure for RLC AM)

Reordering function (For split bearers in DC (only support for RLC AM): PDCP PDU routing for transmission and PDCP PDU reordering for reception)

Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

The radio link controls (hereinafter, referred to as RLCs) 5b-10 and 5b-35 reconfigure the PDCP packet data unit (PDU) to an appropriate size to perform the ARQ operation or the like. The main functions of the RLC are summarized as follows.

Data transfer function (Transfer of upper layer PDUs)

ARQ function (Error Correction through ARQ (only for AM data transfer))

Concatenation, segmentation, reassembly functions (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 5b-15 and 5b-30 are connected to several RLC layer devices configured in one terminal and perform an operation of multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 5b-20 and 5b-25 perform an operation of channel-coding and modulating upper layer data, making the upper layer data as an OFDM symbol and transmitting the OFDM symbol to a radio channel, or demodulating and channel-decoding the OFDM symbol received through the radio channel and transmitting the demodulated and channel-decoded OFDM symbol to the upper layer.

Figure 5C:
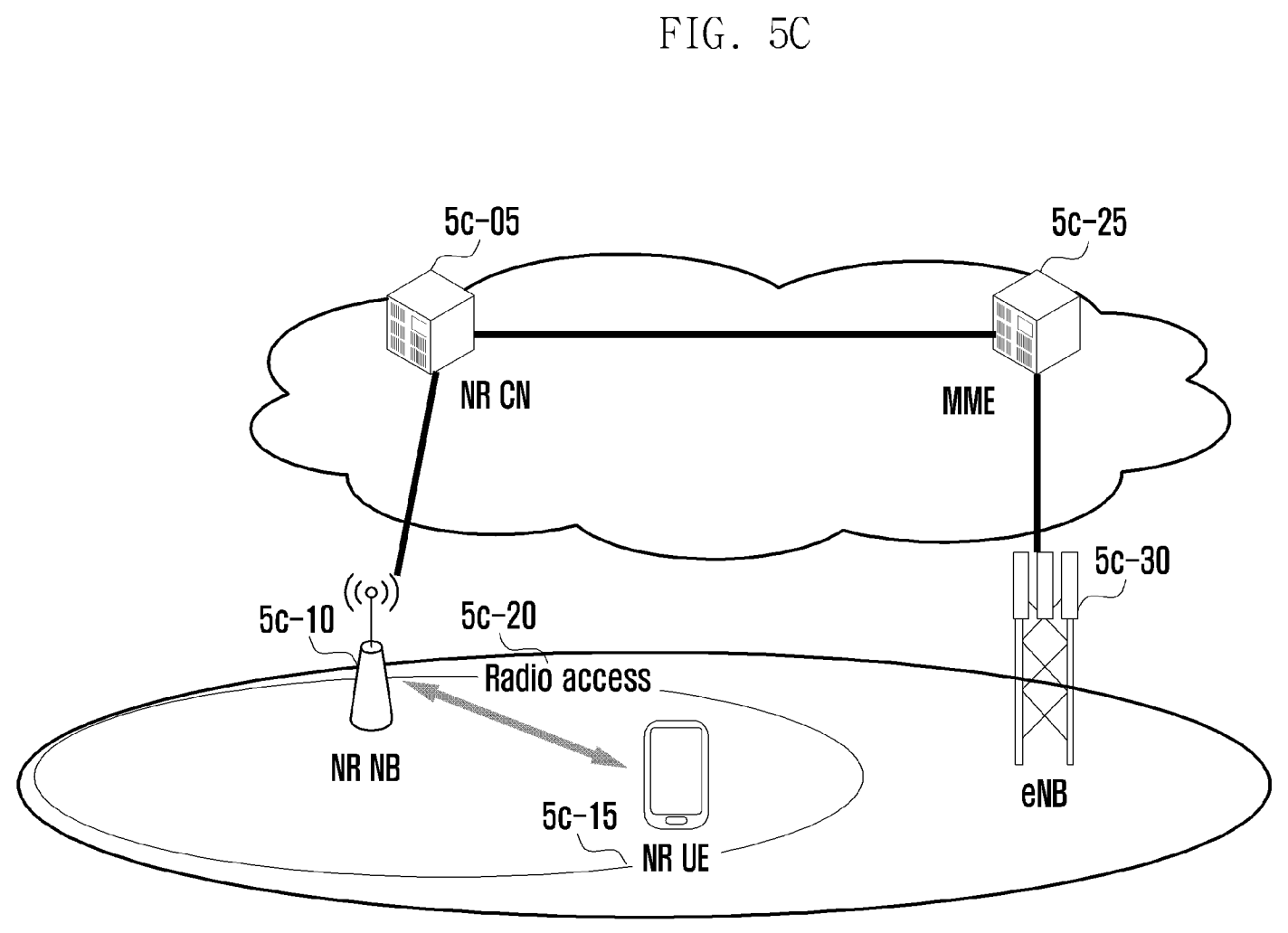

FIG. 5C is a diagram illustrating a structure of a next generation mobile communication system proposed in a fifth embodiment of the present disclosure.

Referring to FIG. 5C, a radio access network of a next generation mobile communication system (hereinafter referred to as NR or 5G) is configured to include a next generation base station (New radio node B, hereinafter NR gNB or NR base station) 5c-10 and a new radio core network (NR CN) 5c-05. The user terminal (new radio user equipment, hereinafter, NR UE or UE) 5c-15 accesses the external network through the NR gNB 5c-10 and the NR CN 5c-05.

In FIG. 5C, the NR gNB 5c-10 corresponds to an evolved node B (eNB) of the existing LTE system. The NR gNB is connected to the NR UE 5c-15 via a radio channel and may provide a service superior to the existing node B. In the next generation mobile communication system, since all user traffics are served through a shared channel, an apparatus for collecting state information such as a buffer state, an available transmission power state, and a channel state of the UEs to perform scheduling is required. The NR NB 5c-10 may serve as the device. One NR gNB generally controls a plurality of cells. In order to realize high-speed data transmission compared with the current LTE, the NR gNB may have an existing maximum bandwidth or more, and may be additionally incorporated into a beam-forming technology may be applied by using orthogonal frequency division multiplexing (hereinafter, referred to as OFDM) as a radio access technology. Further, an adaptive modulation & coding (hereinafter, referred to as AMC) scheme for determining a modulation scheme and a channel coding rate depending on a channel state of the terminal is applied. The NR CN 5c-05 may perform functions such as mobility support, bearer setup, QoS setup, and the like. The NR CN is a device for performing a mobility management function for the terminal and various control functions and is connected to a plurality of base stations. In addition, the next generation mobile communication system can interwork with the existing LTE system, and the NR CN is connected to the MME 5c-25 through the network interface. The MME is connected to the eNB 5c-30 which is the existing base station.

Figure 5D:
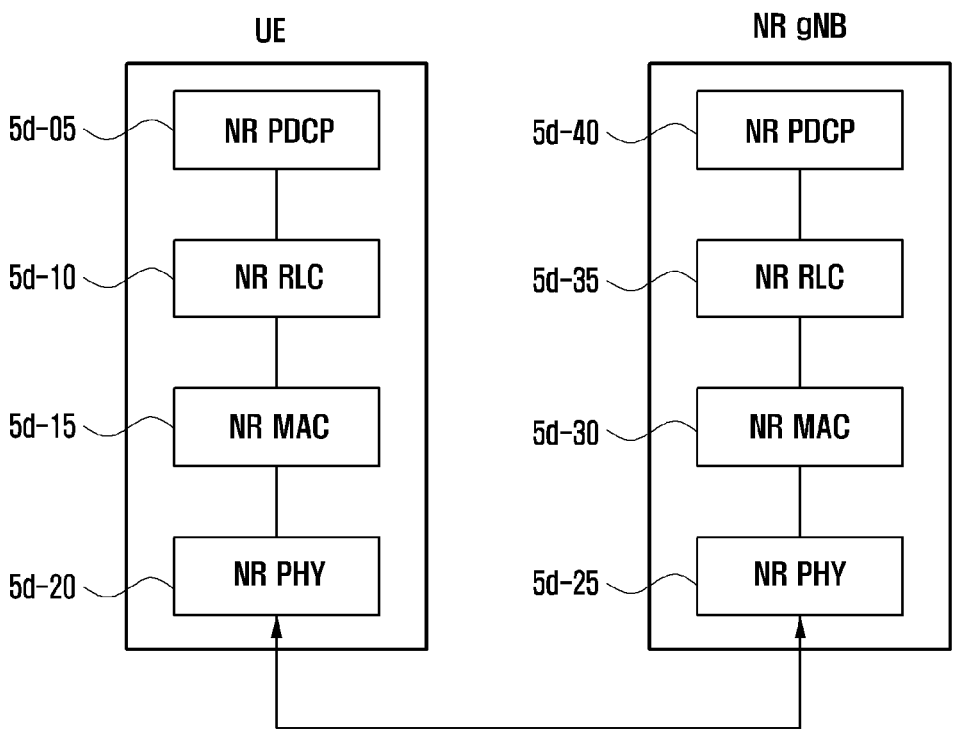
FIG. 5D is a diagram illustrating the radio protocol structure in the next generation mobile communication system proposed in the fifth embodiment of the present disclosure.

FIG. 5D is a diagram illustrating the radio protocol structure in the next generation mobile communication system proposed in the fifth embodiment of the present disclosure.

Referring to FIG. 5D, the radio protocol of the next generation mobile communication system is configured to include NR PDCPs 5d-05 and 5d-40, NR RLCs 5d-10 and 5d-35, and NR MACs 5d-15 and 5d-30 in the terminal and the NR base station. The main functions of the NR PDCPs 5d-05 and 5d-40 may include some of the following functions.

Header compression and decompression function (Header compression and decompression: ROHC only)

Transfer function of user data (Transfer of user data)

In-sequence delivery function (In-sequence delivery of upper layer PDUs)

Reordering function (PDCP PDU reordering for reception)

Duplicate detection function (Duplicate detection of lower layer SDUs)

Retransmission function (Retransmission of PDCP SDUs)

Ciphering and deciphering function (Ciphering and deciphering)

Timer-based SDU discard function (Timer-based SDU discard in uplink)

In this case, the reordering function of the NR PDCP apparatus refers to a function of reordered PDCP PDUs received in a lower layer in order based on a PDCP sequence number (SN) and may include a function of transferring data to the upper layer in the reordered order, a function of recording PDCP PDUs lost by the reordering, a function of reporting a state of the lost PDCP PDUs to a transmitting side, and a function of requesting a retransmission of the lost PDCP PDUs.

The main functions of the NR RLCs 5d-10 and 5d-35 may include some of the following functions.

Data transfer function (Transfer of upper layer PDUs)

In-sequence delivery function (In-sequence delivery of upper layer PDUs)

Out-of-sequence delivery function (Out-of-sequence delivery of upper layer PDUs)

ARQ function (Error correction through HARQ)

Concatenation, segmentation, reassembly function (Concatenation, segmentation and reassembly of RLC SDUs)

Re-segmentation function (Re-segmentation of RLC data PDUs)

Reordering function (Reordering of RLC data PDUs)

Duplicate detection function (Duplicate detection)

Error detection function (Protocol error detection)

RLC SDU discard function (RLC SDU discard)

RLC re-establishment function (RLC re-establishment)

In the above description, the in-sequence delivery function of the NR RLC apparatus refers to a function of delivering RLC SDUs received from a lower layer to an upper layer in order, and may include a function of reassembling and transferring an original one RLC SDU which is divided into a plurality of RLC SDUs and received, a function of rearranging the received RLC PDUs based on the RLC sequence number (SN) or the PDCP sequence number (SN), a function of recording the RLC PDUs lost by the reordering, a function of reporting a state of the lost RLC PDUs to the transmitting side, a function of requesting a retransmission of the lost RLC PDUs, a function of transferring only the SLC SDUs before the lost RLC SDU to the upper layer in order when there is the lost RLC SDU, a function of transferring all the received RLC SDUs to the upper layer before a predetermined timer starts if the timer expires even if there is the lost RLC SDU, or a function of transferring all the RLC SDUs received until now to the upper layer in order if the predetermined timer expires even if there is the lost RLC SDU. The NR RLC layer may not include the concatenation function and may perform the function in the NR MAC layer or may be replaced by the multiplexing function of the NR MAC layer.

In this case, the out-of-sequence delivery function of the NR RLC apparatus refers to a function of directly delivering the RLC SDUs received from the lower layer to the upper layer regardless of order, and may include a function of reassembling and transferring an original one RLC SDU which is divided into several RLC SDUs and received, and a function of storing and reordering the RLC SN or the PDCP SP of the received RLC PDUs to record the lost RLC PDUs.

The NR MACs 5d-15 and 5d-30 may be connected to several NR RLC layer apparatus configured in one terminal, and the main functions of the NR MAC may include some of the following functions.

Mapping function (Mapping between logical channels and transport channels)

Multiplexing and demultiplexing function (Multiplexing/demultiplexing of MAC SDUs)

Scheduling information reporting function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

The NR PHY layers 5d-20 and 5d-25 may perform an operation of channel-coding and modulating upper layer data, making the upper layer data as an OFDM symbol and transmitting the OFDM symbol to a radio channel, or demodulating and channel-decoding the OFDM symbol received through the radio channel and transmitting the demodulated and channel-decoded OFDM symbol to the upper layer.

Figure 5E:
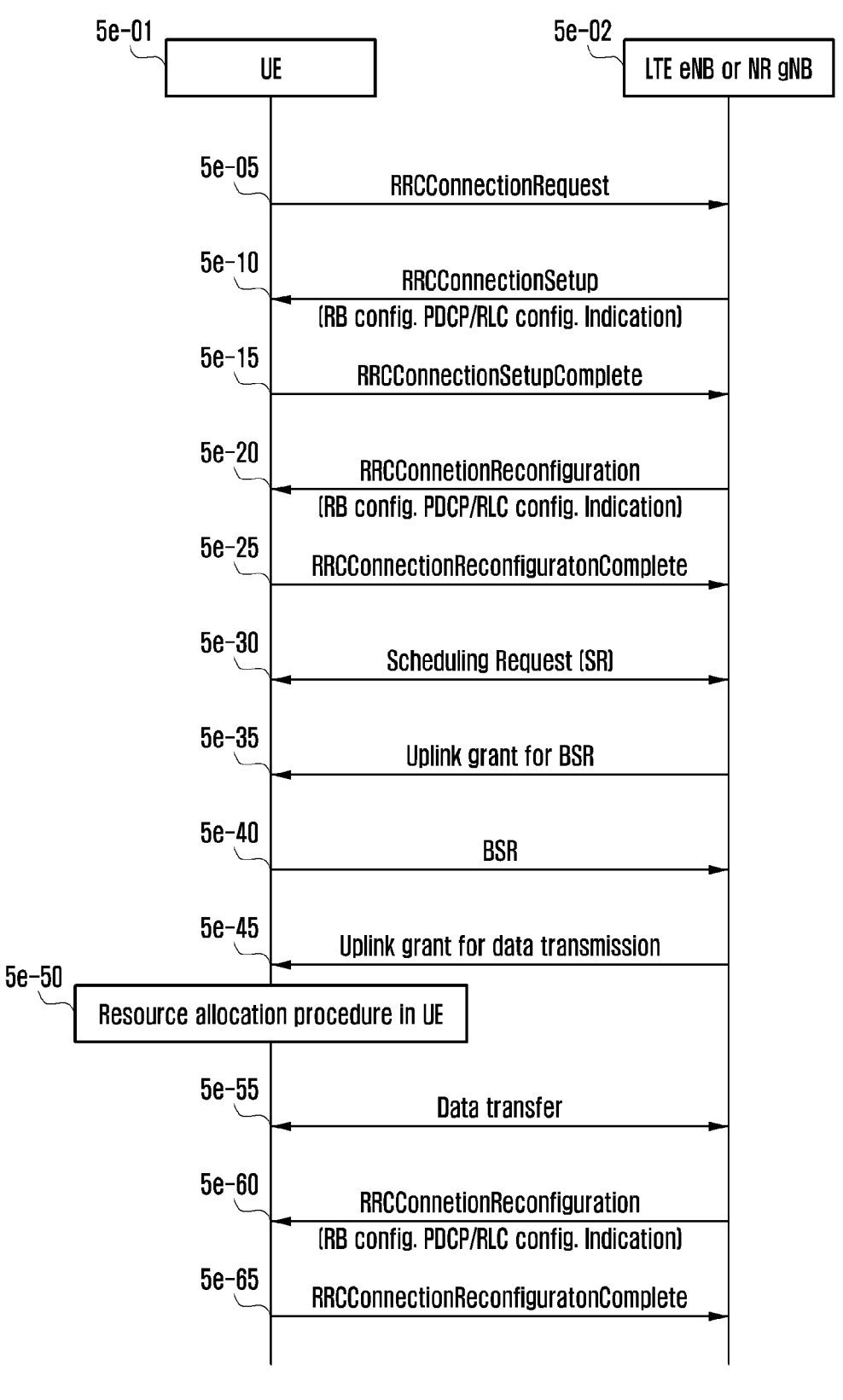
FIG. 5E is a diagram illustrating a process in which the terminal is allocated an uplink transmission resource to transmit data, again allocates the allocated transmission resource to data, and transmits the data to an uplink, after the terminal performs an RRC connection establishment with a network in the next generation mobile communication system according to the fifth embodiment of the present disclosure.

FIG. 5E is a diagram illustrating a process in which the terminal is allocated an uplink transmission resource to transmit data, again allocates the allocated transmission resource to data, and transmits the data to an uplink, after the terminal performs an RRC connection establishment with a network in the next generation mobile communication system according to the fifth embodiment of the present disclosure.

In FIG. 5E, if data to be transmitted are generated, a terminal 5e-01 (hereinafter, referred to as an idle mode UE or an idle state terminal) in which no connection is currently established performs an RRC connection establishment procedure with the LTE base station or the NR base station 5e-02. The terminal establishes uplink transmission synchronization with the base station through a random access procedure and transmits an RRCConnectionRequest message to the base station (5e-05). The message may include a cause for establishing the connection with an identifier of the terminal.

The base station transmits an RRCConnectionSetup message to allow the terminal to set the RRC connection (5e-10). The message may include RRC connection configuration information, configuration information of each layer, and the like. In other words, it may include configuration information on the PHY or NR PHY apparatus, the MAC or NR MAC apparatus, the RLC or NR RLC apparatus, the PDCP or the NR PDCP apparatus, and the information instructing the setting for the specific functions among the functions (functions for each layer described in FIG. 5B or 5D) supported by the layer apparatuses. In addition, the message may include the configuration information to be configured for each logical channel when the data radio bearer (DRB) is configured. The configuration information may include the following information for each logical channel.

LogicalChannelConfig: Configuration information for each logical channel

Priority (Priority of logical channel used when a TTI length is fixed to one)

PriorityForFirstTTI: Priority of the corresponding logical channel to be applied in a first TTI length (first type TTI)

PriorityForSecondTTI: Priority of the corresponding logical channel to be applied in a second TTI length (second type TTI)

PriorityForThirdTTI: Priority of the corresponding logical channel to be applied in a third TTI length (third type TTI)

. . .

MaximumTTI: The maximum TTI for which this logical channel should be supported at a minimum PrioritisedBitRate: Prioritized bit rate of the corresponding logical channel buketSizeDuration: The maximum bucket size of the corresponding logical channel.

TTIforPBR: TTI to apply PBR to the corresponding logical channel

In the next generation communication system of the present disclosure, the time duration, for example, the transmission time interval (TTI) may have various lengths and may have a predetermined number of types. If the TTI may have three kinds of lengths, the network may assign priority to each TTI length type. For example, PriorityForFirstTTI, PriorityForSecondTTI, PriorityForThirdTTI, and the like indicate priority in each TTI length for the corresponding logical channel. That is, if the uplink transmission resource is set to be a TTI having a first length, the priority of the corresponding logical channel is defined as the PriorityForFirstTTI. If the uplink transmission resource is set to be a TTI having a second length, the priority of the corresponding logical channel is defined as the PriorityForSecondTTI.

The MaximumTTI may be used to determine whether to include the corresponding logical channel in a candidate group to which a resource will be allocated in the uplink transmission resource allocation procedure of the terminal. That is, MaximumTTI is the maximum TTI to be secured in each logical channel. For example, when the maximum TTI of one logical channel is set to be 0.5 ms, the logical channel may be allocated transmission resources only when the TTI of the uplink transmission resource is set to be smaller than 0.5 ms. That is, if the TTI of the uplink transmission resource is set to be X ms, the terminal may allocate the uplink transmission resources only to the logical channels having the MaximumTTI larger than or equal to X ms. Therefore, the terminal may consider only the logical channels having the MaximumTTI larger than or equal to X ms in the uplink transmission resource allocation procedure.

In this case, the PrioritizedBitRate (PBR) may be added to a token Bj of each logical channel every TTI or a predetermined period at a bit rate prioritized for each logical channel. The token is a value maintained by the terminal for each logical channel, and can represent the minimum transmission amount that each logical channel may transmit as the uplink transmission resource. Even though the PBR is continuously added to the token, the token value of each logical channel may not exceed the buketSizeDuration (BSD). The BSD represents the maximum value of the tokens of each logical channel.

The TTIforPBR may be information indicating the TTI to which PBR is applied for each logical channel. That is, if the TTI of the uplink transmission resource is set to be the TTIforPBR, the PBR may be applied to the logical channel. That is, the token for the logical channel is reflected depending on the priority, and the uplink transmission resource corresponding to the data may be allocated.

The terminal establishing the RRC connection transmits an RRCConnetionSetupComplete message to the base station (5e-15).

The base station transmits an RRCConnectionReconfiguration message to the terminal to configure the data radio bearer (DRB) (5e-20). The message may include the configuration information of each layer and the like. In other words, it may include configuration information on the PHY or NR PHY apparatus, the MAC or NR MAC apparatus, the RLC or NR RLC apparatus, the PDCP or NR PDCP apparatus, and the information indicating the setting for the specific functions among the functions (functions for each layer described in FIG. 5B or 5D) supported by the layer apparatuses. In addition, the message may include the configuration information to be configured for each logical channel when the data radio bearer (DRB) is configured. The configuration information may include information for each logical channel as follows.

LogicalChannelConfig: Configuration information for each logical channel

Priority (Priority of logical channel used when the TTI length is fixed to one)

PriorityForFirstTTI: Priority of the corresponding logical channel to be applied in the first TTI length (first type TTI)

PriorityForSecondTTI: Priority of the corresponding logical channel to be applied in the second TTI length (second type TTI)

PriorityForThirdTTI: Priority of the corresponding logical channel to be applied in the third TTI length (third type TTI)

. . .

MaximumTTI: Maximum TTI for which the corresponding logical channel should be supported at a minimum PrioritisedBitRate: Prioritized bit rate of the corresponding logical channel buketSizeDuration: buketSizeDuration: Maximum bucket size of the corresponding logical channel.

TTIforPBR: TTI to apply PBR to the corresponding logical channel

As described above, in the next generation communication system of the present disclosure, the TTI may have various lengths and may have a predetermined number of types. If the TTI may have three kinds of lengths, the network may assign priority to each TTI length type. For example, PriorityForFirstTTI, PriorityForSecondTTI, PriorityForThirdTTI, and the like indicate priority in each TTI length for the corresponding logical channel. That is, if the uplink transmission resource is set to be the TTI having the first length, the priority of the corresponding logical channel is defined as the PriorityForFirstTTI. If the uplink transmission resource is set to be the TTI having the second length, the priority of the corresponding logical channel is defined as the PriorityForSecondTTI.

The MaximumTTI may be used to determine whether to include the corresponding logical channel in a candidate group to which a resource will be allocated in the uplink transmission resource allocation procedure of the terminal. That is, the MaximumTTI is the maximum TTI to be secured in each logical channel. For example, when the maximum TTI of one logical channel is set to be 0.5 ms, the logical channel may be allocated transmission resources only when the TTI of the uplink transmission resource is set to be smaller than 0.5 ms. That is, if the TTI of the uplink transmission resource is set to be X ms, the terminal may allocate the uplink transmission resources only to the logical channels having the maximumTTI larger than or equal to X ms. Therefore, the terminal may consider only the logical channels having the MaximumTTI larger than or equal to X ms in the uplink transmission resource allocation procedure.

In this case, the PrioritizedBitRate (PBR) may be added to a token Bj of each logical channel every TTI or a predetermined period at a bit rate prioritized for each logical channel. The token is a value maintained by the terminal for each logical channel, and can represent the minimum transmission amount that each logical channel may transmit as the uplink transmission resource. Even though the PBR is continuously added to the token, the token value of each logical channel may not exceed the buketSizeDuration (BSD). The BSD represents the maximum value of the tokens of each logical channel.

The TTIforPBR may be information indicating the TTI to which PBR is applied for each logical channel. That is, if the TTI of the uplink transmission resource is set to be the TTIforPBR, the PBR may be applied to the logical channel. That is, the token for the logical channel is reflected depending on the priority, and the uplink transmission resource corresponding to the data may be allocated. The TTIforPBR may be set as the same value for all logical channels or may be set to be different values. The message includes the configuration information of the DRB to be processed by the user data and the resource allocation information of the physical uplink control channel (PUCCH) for the scheduling request (SR).

The terminal configures the DRB by applying the information, configures the functions of each layer, and transmits the RRCConnectionReconfigurationComplete message to the base station (5e-25). The terminal completing the DRB configuration with the base station may generate data to be transmitted to the uplink. The terminal first transmits the scheduling request (SR) to the base station using the physical uplink control channel (PUCCH) to request the resource required for a buffer status report (BSR) transmission (5e-30). The SR transmission may fail according to the channel condition, and if the required resources are not allocated even after the predetermined number of transmissions is attempted, the terminal performs the random access process. Meanwhile, even when the PUCCH is not allocated in the RRC connection reconfiguration message, the terminal performs the random access process. In step 5e-30, the base station which successfully receives the SR schedules the uplink transmission resource for transmitting the buffer status report (BSR) to the terminal (5e-35). The BSR is used to notify the base station how many the terminal has a transmission data.

The terminal transmits the BSR using the allocated uplink transmission resources (5e-40). If the allocated radio resources remains even after transmitting the BSR, the data may be transmitted together. The base station allocates the uplink transmission resource (uplink grant) for transmitting the uplink data (5e-45). The terminal may know the size of the MAC PDU to be transmitted through the uplink transmission resource. The terminal performs the uplink transmission resource allocation procedure in consideration of the priority, the PBR, the BSD, the maximum TTI, the TTIforPBR and the like included in the LogicalChannelConfig which is received in the steps 5e-10 or 5e-20 to allocate the uplink transmission resource to each logical channel and generate the MAC PDU to be transmitted to the uplink. That is, when a plurality of logical channels are configured in the terminal, the terminal considers the configuration information for each logical channel and the amount of data stored in the logical channel and performs the uplink transmission resource allocation procedure to determine the size of the RLC PDUs for each logical channel and generate the MAC PDU based on the determined size. The logical channel refers to the PDCP layer configured to process data of a specific service or an apparatus for processing the PDCP layer and an RLC layer or an apparatus for processing the RLC layer, and the transmission buffer is provided for each logical channel. The generated MAC PDU is transmitted to the base station through the uplink transmission resource allocated from the base station (5e-55).

Here, the MAC PDU refers to a data unit in which the RLC PDUs (MAC SDUs) of the upper layer is multiplexed in the MAC layer responsible for multiplexing as shown in FIG. 5D, and the RLC PDU is a data unit provided by the upper layer of the layer responsible for the multiplexing.

The base station may again transmit the RRCConnectionReconfiguration message to the terminal, if necessary, while transmitting and receiving data (5e-60), and again configure the configuration information of each layer of the terminal. In other words, it may include the configuration information on the PHY or NR PHY apparatus, the MAC or NR MAC apparatus, the RLC or NR RLC apparatus, the PDCP or NR PDCP apparatus, and the information indicating the setting for the specific functions among the functions (functions for each layer described in FIG. 5B or 5D) supported by the layer apparatuses. In addition, the message may include the configuration information to be configured for each logical channel when the data radio bearer (DRB) is configured. The configuration information may include information for each logical channel as follows.

LogicalChannelConfig: Configuration information for each logical channel

Priority (Priority of logical channel used when the TTI length is fixed to one)

PriorityForFirstTTI: Priority of the corresponding logical channel to be applied in the first TTI length (first type TTI)

PriorityForSecondTTI: Priority of the corresponding logical channel to be applied in the second TTI length (second type TTI)

PriorityForThirdTTI: Priority of the corresponding logical channel to be applied in the third TTI length (third type TTI)

. . .

MaximumTTI: Maximum TTI for which the corresponding logical channel should be supported at a minimum PrioritisedBitRate: Prioritized bit rate of the corresponding logical channel buketSizeDuration: The maximum bucket size of the corresponding logical channel.

TTIforPBR: TTI to apply PBR to the corresponding logical channel

As described above, in the next generation communication system of the present disclosure, the TTI may have various lengths and may have a predetermined number of types. If the TTI may have three kinds of lengths, the network may assign priority to each TTI length type. For example, PriorityForFirstTTI, PriorityForSecondTTI, PriorityForThirdTTI, and the like indicate priority in each TTI length for the corresponding logical channel. That is, if the uplink transmission resource is set to be the TTI having the first length, the priority of the corresponding logical channel is defined as the PriorityForFirstTTI. If the uplink transmission resource is set to be a TTI having a second length, the priority of the corresponding logical channel is defined as the PriorityForSecondTTI.

The MaximumTTI may be used to determine whether to include the corresponding logical channel in a candidate group to which a resource will be allocated in the uplink transmission resource allocation procedure of the terminal. That is, the MaximumTTI is the maximum TTI to be secured in each logical channel. For example, when the maximum TTI of one logical channel is set to be 0.5 ms, the logical channel may be allocated transmission resources only when the TTI of the uplink transmission resource is set to be smaller than 0.5 ms. That is, if the TTI of the uplink transmission resource is set to be X ms, the terminal may allocate the uplink transmission resources only to the logical channels having the maximumTTI larger than or equal to X ms. Therefore, the terminal may consider only the logical channels having the MaximumTTI larger than or equal to X ms in the uplink transmission resource allocation procedure.

In this case, the PrioritizedBitRate (PBR) may be added to a token Bj of each logical channel every TTI or a predetermined period at a bit rate prioritized for each logical channel. The token is a value maintained by the terminal for each logical channel, and can represent the minimum transmission amount that each logical channel may transmit as the uplink transmission resource. Even though the PBR is continuously added to the token, the token value of each logical channel may not exceed the buketSizeDuration (BSD). The BSD represents the maximum value of the tokens of each logical channel.

The TTIforPBR may be information indicating the TTI to which PBR is applied for each logical channel. That is, if the TTI of the uplink transmission resource is set to be the TTIforPBR, the PBR may be applied to the logical channel. That is, the token for the logical channel is reflected depending on the priority, and the uplink transmission resource corresponding to the data may be allocated.

Upon completion of the setting of apparatuses of each layer according to the message, the terminal transmits an RRCConnection ReconfigurationComplete message to the base station (5e-65).

In the next generation mobile communication system, since the TTI may have various lengths, the terminal should be able to recognize the TTI of the uplink transmission resource (uplink grant). The TTI of the uplink transmission resource may include the information in the uplink transmission resource when the base station allocates the uplink transmission resource or the base station may indicate the TTI of the uplink transmission resource using the DCI (Downlink Control Information) of the PDCCH. Alternatively, the base station does not separately indicate the TTI of the uplink transmission resource, and the terminal may also consider that the TTI of the downlink transmission resource indicating the uplink transmission resource and the TTI of the uplink transmission resource are the same.

Figure 5F:
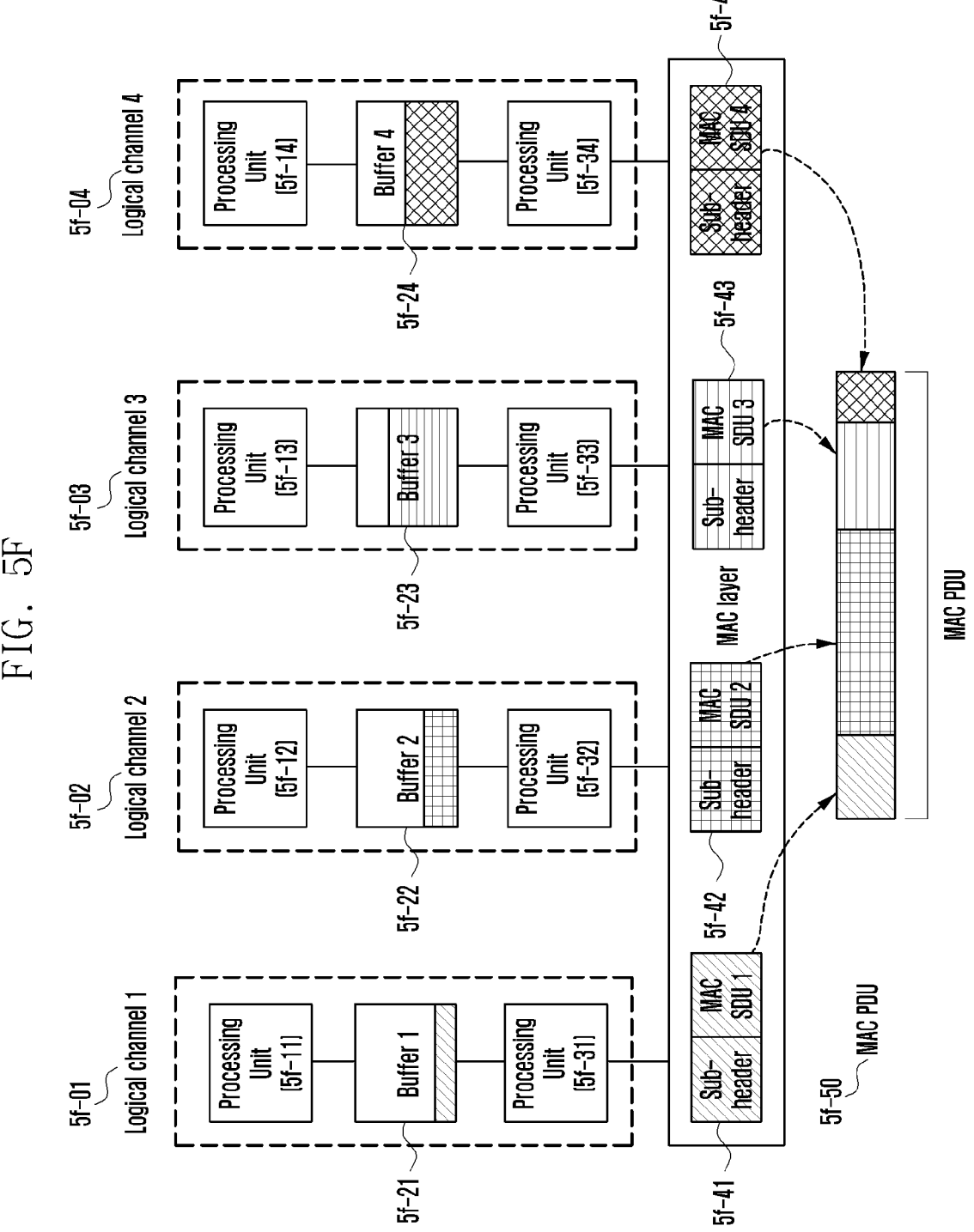
FIG. 5F is a diagram illustrating a concept of a procedure of allocating an uplink transmission resource of the terminal according to the fifth embodiment of the present disclosure.

FIG. 5F is a diagram illustrating a concept of a procedure of allocating an uplink transmission resource of the terminal according to the fifth embodiment of the present disclosure.

FIG. 5F is a diagram for explaining the uplink transmission resource allocation procedure for determining the size of the RLC PDUs for each logical channel to configure the MAC PDU in the next generation communication system according to the fifth embodiment of the present disclosure. if there are four different kinds of data to be transmitted from the terminal to the uplink, as shown in FIG. 5F, a logical channel 1 5f-01, a logical channel 2 5f-02, a logical channel 3 5f-03, and a logical channel 4 5f-04 may be configured. Each transmission buffer 5f-21, 5f-22, 5f-23, and 5f-24 may be provided for each logical channel, and processing units 5f-11, 5f-12, 5f-13, and 5f-14 which processes data from the upper layer and stores the RLC SDUs in the buffer are present. There are processing apparatuses 5f-31, 5f-32, 5f-33, and 5f-34 which performs the pre-processing for each logical channel to transmit the RLC PDUs to the MAC layer and there are MAC apparatuses 5f-41, 5f-42, 5f-43, and 5f-44 which generate MAC SDUs and MAC subheaders corresponding thereto in advance. Then, the terminal may select pre-generated MAC SDUs corresponding to the size of the transmission resources for each logical channel determined according to the uplink transmission resource allocation procedure, and if necessary (when the size of the MAC SDU and the MAC subheader subsequently selected is larger than the size of the transmission resources remaining after the MAC SDUs generated in advance are filled), may segment the MAC SDUs and select them corresponding to the transmission resource size. The segmentation may be performed by the request of the RLC layer or directly performed at the MAC layer. Only when the size of the remaining transmission resources is larger than a predetermined X byte, the segmentation may be performed and when the size of the remaining transmission resources is smaller than the predetermined X bye, the padding may be added.

A first example of allocating the uplink transmission resource of the present disclosure is as follows.

The terminal may obtain the configuration information on the priority, the PBR, and the BSD of each logical channel through the RRC configuration message 5e-10 or the RRC connection reconfiguration message 5e-20 and 5e-60 shown in FIG. 5E (PBR and BSD may be specified as the prioritisedBitRate and bucketSizeDuration variables of the RRC message). The lower the priority value, the higher the priority becomes. The terminal may perform the first example of the uplink transmission resource allocation procedure using the information. The first example logically consists of a kind of token bucket model. Each logical channel has a token value of Bj and has a bucket including the token (j is an index representing each logical channel). The logical channel 1, the logical channel 2, the logical channel 3, and the logical channel 4 each have tokens B1, B2, B3, and B4, and each token is included in bucket 1, bucket 2, bucket 3, bucket 4. The token indicates the size of a resource that can be occupied by each logical channel when the terminal receives the uplink transmission resource, and the token is added by PBRxTTI every transmission time interval (TTI). However, even if the token value is increased by PBRxTTI every TTI, it may not exceed the BSD which is the maximum size of each bucket. Therefore, if the token value of the bucket reaches or exceeds the BSD value, the PBRxTTI value is not added every TTI, and the BSD value is maintained.

The procedure of the first example proceeds in two steps, having the configuration information and the rule as described above. In the first step, the terminal allocates uplink transmission resources to each logical channel in consideration of the priorities and token values of each logical channel. In other words, in the first step, each logical channel may occupy the uplink transmission resources only by the token value depending on the priority. In this step, the logical channels subtract their current token values by the resource size occupied in the uplink transmission resource.

In the first step, if there are resources remaining after all the logical channels occupy the uplink transmission resources by the token value, the second step proceeds. In this second step, the logical channels occupy the remaining uplink transmission resource remaining depending on the priority. In the step, the resource allocation procedure is performed depending on the priority until the buffers of each logical channel are emptied or all the uplink transmission resources are used. In the second step, the resource occupied by each logical channel is not subtracted from the token.

In order to represent the first example of the procedure for allocating the uplink transmission resource by more specific pseudo code, the following variables are defined. The following pseudo codes can be given as a sample of the example, and variously changed having the same meaning.

1. It is assumed that the total number of logical channels of the terminal is K.
2. The terminal receiving the uplink transmission resource calculates it and represents its size as a variable called UplinkGrant.
3. Logical channels are arranged depending on priority and mapped to LC_j variables (j=1, 2, . . . , j have a value of a natural number, and the lower the value, the higher the priority becomes. For example, the priority is as LC_1>LC_2>LC_3>LC_4).
4. The values of each token of the logical channels mapped to each LC_j is represented by Bj, the data size remaining in each buffer is represented by Buffer_j, and the maximum size of each buffer is represented by BSDj. In addition, the resource allocated to each logical channel is represented by LC_grant_j.

The pseudo codes for the first example of the procedure of allocating the uplink transmission resource using the variables are as follows.

TABLE 1

One example of token update procedure

```
% The procedure of updating the token is performed every TTI as follows.
% If necessary, the update procedure may be received every predetermined interval, and may be
updated every time the uplink transmission resource is allocated. (the update is performed only
when the uplink transmission resource is received, or the time interval difference between the
time to receive the uplink transmission resource and the time to previously receive the uplink
transmission resource is represented by the TTI, and the update may be performed at a time by
multiplying the PRB by the difference.)
01      For j=1 to K
02           If Bj < BSDj,
03                Bj = Bj + PBRxTTI
04           else
05                Bj = BSDj
06           end
07      end
```

TABLE 2

One example of procedure of allocating uplink transmission resource of first step among two steps of first example

```
% If the uplink transmission resource (uplink grant) is allocated, the terminal performs the first
step of the procedure of the first embodiment as follows.
% In the early stage, the resource allocated to each local channel is set as LC_grant = 0, j = 1, 2,
..., K
01      For j = 1 to K
02           If UplinkGrant >= Bj
03                UplinkGrant = UplinkGrant – Bj;
04                LC_grant_j = LC_grant_j + Bj;
05                Bj = 0;
06           else
07                LC_grant_j = LC_grant_j + UplinkGrant;
08                Bj = Bj – UplinkGrant;
09                UplinkGrant = 0;
10                break;
11           end
12      end
```

TABLE 3

One example of procedure of allocating uplink transmission resource of second step among two steps of first example

```
% The first step is performed and if the uplink transmission resource remains, the following two
steps are performed
01          If UplinkGrant > 0
02                  For j = 1 to K
03                          If UplinkGrant >= Buffer_j
04                                  UplinkGrant = UplinkGrant − Buffer_j;
05                                  LC_grant_j = LC_grant_j + Buffer_j;
06                                  Buffer_j = 0;
07                          else
08                                  LC_grant_j = LC_grant_j + UplinkGrant;
09                                  Buffer_j = Buffer_j − UplinkGrant;
10                                  UplinkGrant = 0;
11                                  break;
12                          end
13                  end
14          end
```

The procedure of the first example is an uplink transmission resource allocation scheme suitable for the case in which the TTI length is fixed to one. In the next generation mobile communication system of the present disclosure, the length of the TTI is not fixed and may be variously set. For example, a TTI having a very short length may be set to support an ultra reliable low latency communication (URLLC) service. Therefore, since the length of the TTI may be changed dynamically, it is necessary to perform the procedure of allocating the uplink transmission resource in consideration of the same.

In the next generation mobile communication system, since the TTI may have various lengths, the terminal should be able to recognize the TTI of the uplink transmission resource (uplink grant). The TTI of the uplink transmission resource may include the information in the uplink transmission resource when the base station allocates the uplink transmission resource or the base station may indicate the TTI of the uplink transmission resource using the DCI (downlink control information) of the PDCCH. Alternatively, the base station does not separately indicate the TTI of the uplink transmission resource, and the terminal may consider that the TTI of the downlink transmission resource indicating the uplink transmission resource and the TTI of the uplink transmission resource are the same.

A second example of allocating the uplink transmission resource of the present disclosure is as follows.

The terminal may obtain the configuration information on the priority, the PBR (PrioritisedBitRate), the BSD (buketSizeDuration), the TTIforPBR of each logical channel through the RRC configuration message 5e-10 or the RRC-ConnectionReconfiguration message 5e-20 and 5e-60 shown in FIG. 5E (PBR and BSD may be specified as the prioritisedBitRate and bucketSizeDuration variables of the RRC message). For example, the lower the priority value, the higher the priority may be. The terminal may perform the example of the uplink transmission resource allocation procedure using the information.

Like the first example, the second example is also logically formed of a kind of token bucket model. Each logical channel has a token value of Bj and has a bucket including the token (j is an index representing each logical channel). The logical channel 1, the logical channel 2, the logical channel 3, and the logical channel 4 each have the tokens B1, B2, B3, and B4, and each token is included in bucket 1, bucket 2, bucket 3, bucket 4. The token indicates the size of a resource that can be occupied by each logical channel when the terminal receives the uplink transmission resource, and the token is added by PBRxTTI every transmission time interval (TTI). If necessary, the update procedure may be performed every predetermined interval, and may be updated every time the uplink transmission resource is allocated. (the update is performed only when the uplink transmission resource is performed, or the time interval difference between the time to receive the uplink transmission resource and the time to previously receive the uplink transmission resource is represented by the TTI, and the update may be performed at a time by multiplying the PBR by it.) However, even if the token value is increased by PBRxTTI, it may not exceed the BSD which is the maximum size of each bucket. Therefore, if the token value of the bucket reaches or exceeds the BSD value, the BSD value is maintained.

The procedure of the second example proceeds in one step, having the configuration information and the rule as described above. The terminal allocates the uplink transmission resources to each logical channel in consideration of the priorities and token values of each logical channel. Describing in detail, first, the uplink transmission resource is allocated depending on the priority by reviewing the priority between the logical channels having the positive token value. In the above description, when the uplink resources are allocated, resources are not allocated by the token value but the uplink transmission resources are allocated depending on the priority by the amount of transmittable data of each logical channel. The process is performed on the logical channels having the token value of the positive number depending on the priority, and if the uplink transmission resource remains, the same process is also performed on the logical channels having the negative token value depending on the priority. In this process, the size of the uplink resources allocated to each logical channel is subtracted from the token values of each logical channel. By performing such a subtraction procedure, it is possible to prevent the transmission resource from being monopolized every time the logical channel having the higher priority receives an uplink transmission resource. That is, if the token value is negative, even if the priority is high, the uplink transmission resource lower than the logical channel having the token value of the positive number may be allocated.

That is, the first example allocates only the uplink transmission resources only to the logical channels having the positive token value in the first step depending on the priority, and again allocates the uplink transmission resource to all the logical channels depending on the priority by the transmittable amount of data regardless of the token value in the second step. The token value is subtracted by the size of the transmission resource allocated in the first step. However, the second example includes one step, and allocates the uplink transmission resource by the transmittable amount of data from the logical channels having the positive token value depending on the priority, and then allocates the uplink transmission resource to the logical channels having the negative token value by the transmittable amount of data depending on the priority. The token value is subtracted by the size of the transmission resource allocated.

The pseudo codes for the second example of the procedure of allocating the uplink transmission resource are as follows. The token update procedure may use the pseudo codes as shown in the above Table 1 as an example.

First of all, the terminal may obtain the configuration information on the priority, the MaximumTTI, the PBR (PrioritisedBitRate), the BSD (buketSizeDuration), the TTI-forPBR of each logical channel through the RRC configuration message 5e-10 or the RRCConnectionReconfiguration message 5e-20 and 5e-60 shown in FIG. 5E (PBR and BSD may be specified as the prioritisedBitRate and bucketSizeDuration variables of the RRC message). The lower the priority value, the higher the priority becomes. The terminal may perform the third example of the uplink transmission resource allocation procedure using the information.

The third example is also formed of the same token bucket model as the first example. That is, the token update procedure as shown in the above Table 1 may be performed, and the procedure of two steps may be performed as in the above Tables 2 ad 3 to allocate the uplink transmission resource.

TABLE 4

One example of procedure of allocating uplink transmission resource of second example

```
% Bj value should be updated and therefore original value is temporarily stored in Tj variable.
01          For j = 1 to K
02               Tj = Bj;
03               If Tj > 0
04                    If UplinkGrant >= Buffer_j
05                         UplinkGrant = UplinkGrant – Buffer_j;
06                         LC_grant_j = LC_grant_j + Buffer_j;
07                         Bj = Bj – Buffer_j;
08                         Buffer_j = 0;
09                    else
10                         LC_grant_j = LC_grant_j + UplinkGrant;
11                         Buffer_j = Buffer_j – UplinkGrant;
12                         Bj = Bj – UplinkGrant;
13                         UplinkGrant = 0;
14                         break;
15               end
16          end
17          If UplinkGrant > 0
18               For j = 1 to K
19                    If Tj <= 0
20                         If UplinkGrant >= Buffer_j
21                         UplinkGrant = UplinkGrant – Buffer_j;
22                         LC_grant_j =LC_grant_j + Buffer_j;
23                         Bj = Bj – Buffer_j;
24                         Buffer_j = 0;
25                    else
26                         LC_grant_j = LC_grant_j + UplinkGrant;
27                         Buffer_j = Buffer_j – UplinkGrant;
28                         Bj = Bj – UplinkGrant;
29                         UplinkGrant = 0;
30                         break;
31                    end
32               end
33          end
```

In the next generation mobile communication system, since the TTI may have various lengths, the terminal should be able to recognize the TTI of the uplink transmission resource (uplink grant). The TTI of the uplink transmission resource may include the information in the uplink transmission resource when the base station allocates the uplink transmission resource or the base station may indicate the TTI of the uplink transmission resource using the DCI (downlink control information) of the PDCCH. Alternatively, the base station does not separately indicate the TTI of the uplink transmission resource, and the terminal may consider that the TTI of the downlink transmission resource indicating the uplink transmission resource and the TTI of the uplink transmission resource are the same.

A third example of allocating the uplink transmission resource of the present disclosure is as follows.

The difference of the third example is that the logical channel is first selected and the first example is performed on the selected logical channels. That is, the first example applies the first step to the logical channels having the positive token value among all the logical channels, and again applies the second step to all the logical channels. However, the third example applies the first step to the logical channels having the positive token value among the selected logical channels, and again applies the second step to the selected logical channels.

When the logical channels are selected in the third example, the maximum TTI value received through the RRC configuration message 5e-10 or the RRCConnectionReconfiguration message 5e-20 and 5e-60 shown in FIG. 5E may be applied. The MaximumTTI may be used to determine whether to include the corresponding logical channel in a candidate group to which a resource will be allocated in the uplink transmission resource allocation procedure of the terminal. That is, the MaximumTTI is the maximum TTI to be secured in each logical channel. For example, when the maximum TTI of one logical channel is set to be 0.5 ms, the logical channel may be allocated transmission resources only when the TTI of the uplink transmission resource is set to be smaller than 0.5 ms. That is, if the TTI of the uplink transmission resource is set to be X ms, the terminal may allocate the uplink transmission resources only to the logical channels having the maximumTTI larger than or equal to X ms. Therefore, the terminal may consider only the logical channels having the MaximumTTI larger than or equal to X ms in the uplink transmission resource allocation procedure.

In the third example, the terminal first compares the MaximumTTI values of the logical channels with the TTI of the currently received uplink transmission resource, and selects the logical channels having the MaximumTTI value larger than the TTI of the currently received uplink transmission resource. The first example applies to the selected logical channels. That is, the third example applies the first step as shown in the above Table 2 to the logical channels having the positive token value among the selected logical channels, and again applies the second step as shown in the above Table 3 to the selected logical channels.

In the next generation mobile communication system, since the TTI may have various lengths, the terminal should be able to recognize the TTI of the uplink transmission resource (uplink grant). The TTI of the uplink transmission resource may include the information in the uplink transmission resource when the base station allocates the uplink transmission resource or the base station may indicate the TTI of the uplink transmission resource using the DCI (downlink control information) of the PDCCH. Alternatively, the base station does not separately indicate the TTI of the uplink transmission resource, and the terminal may consider that the TTI of the downlink transmission resource indicating the uplink transmission resource and the TTI of the uplink transmission resource are the same.

A fourth example of allocating the uplink transmission resource of the present disclosure is as follows.

First of all, the terminal may obtain the configuration information on the priorities (PriorityForFirstTTI, Priority-ForSecondTTI, PriorityForThirdTTI), PrioritisedBitRate (PBR), and buketSizeDuration (BSD) for each TTI of each logical channel through the RRCConfigurationMessage 5*e*-10 or the RRC connection reconfiguration message 5*e*-20 and 5*e*-60 shown in FIG. 5E (PBR and BSD may be specified as the prioritisedBitRate and bucketSizeDuration variables of the RRC message). The lower the priority value, the higher the priority becomes. The terminal may perform the fourth example of the uplink transmission resource allocation procedure using the information.

In the next generation mobile communication system, since the TTI may have various lengths, the terminal should be able to recognize the TTI of the uplink transmission resource (uplink grant). The TTI of the uplink transmission resource may include the information in the uplink transmission resource when the base station allocates the uplink transmission resource or the base station may indicate the TTI of the uplink transmission resource using the DCI (downlink control information) of the PDCCH. Alternatively, the base station does not separately indicate the TTI of the uplink transmission resource, and the terminal may consider that the TTI of the downlink transmission resource indicating the uplink transmission resource and the TTI of the uplink transmission resource are the same.

The fourth example differently reflects the priorities of the respective logical channels depending on the TTI length set in the uplink transmission resource. That is, the priorities (PriorityForFirstTTI, PriorityForSecondTTI, PriorityForThirdTTI, and the like) for each TTI of each logical channel are received through the RRC configuration message 5*e*-10 or the RRCConnectionConfiguration message 5*e*-20 and 5*e*-60 are received, and if the TTI length set in the uplink transmission resource corresponds to the first length, each logical channel may apply PriorityForFirstTTI as the priority and if the TTI length set in the uplink transmission resource corresponds to the promised second length, each logical channel may apply the PriorityForSecondTTI as the priority. The priorities of each logical channel are determined depending on the TTI length set in the uplink transmission resource as described above, and the procedure of allocating the uplink transmission resource by applying the first example as the same method depending on the determined priority is the fourth example.

A fifth example of allocating the uplink transmission resource of the present disclosure is as follows.

First of all, the terminal may obtain the configuration information on the priorities (PriorityForFirstTTI, Priority-ForSecondTTI, PriorityForThirdTTI) for each TTI of each logical channel, the MaximumTTI, the PrioritisedBitRate (PBR), and the buketSizeDuration (BSD) through the RRC configuration message 5*e*-10 or the RRC connection reconfiguration message 5*e*-20 and 5*e*-60 shown in FIG. 5E (PBR and BSD may be specified as the prioritisedBitRate and bucketSizeDuration variables of the RRC message). For example, the lower the priority value, the higher the priority may be. The terminal may perform the fifth example of the uplink transmission resource allocation procedure using the information.

In the next generation mobile communication system, since the TTI may have various lengths, the terminal should be able to recognize the TTI of the uplink transmission resource (uplink grant). The TTI of the uplink transmission resource may include the information in the uplink transmission resource when the base station allocates the uplink transmission resource or the base station may indicate the TTI of the uplink transmission resource using the DCI (downlink control information) of the PDCCH. Also, the base station does not separately indicate the TTI of the uplink transmission resource, and the terminal may consider that the TTI of the downlink transmission resource indicating the uplink transmission resource and the TTI of the uplink transmission resource are the same.

The fifth embodiment differently reflects the priorities of the respective logical channels depending on the TTI length set in the uplink transmission resource. That is, the priorities (PriorityForFirstTTI, PriorityForSecondTTI, PriorityForThirdTTI, and the like) for each TTI of each logical channel are received through the RRC configuration message 5*e*-10 or the RRCConnectionConfiguration message 5*e*-20 and 5*e*-60 are received, and if the TTI length set in the uplink transmission resource corresponds to the first length, each logical channel may apply PriorityForFirstTTI as the priority and if the TTI length set in the uplink transmission resource corresponds to the promised second length, each logical channel may apply the PriorityForSecondTTI as the priority. The priorities of each logical channel are determined depending on the TTI length set in the uplink transmission resource as described above, and the procedure of allocating the uplink transmission resource by applying the third example as the same method depending on the determined priority is the fifth example. That is, when the logical channels are selected using the Maximum TTI value and the first example is applied to the selected logical channels, priorities of each logical channel depending on the TTI of the UL transmission resource is applied.

A sixth example of allocating the uplink transmission resource of the present disclosure is as follows.

First of all, the terminal may obtain the configuration information on the priorities (PriorityForFirstTTI, Priority-ForSecondTTI, PriorityForThirdTTI) for each TTI of each logical channel, the MaximumTTI, the PrioritisedBitRate (PBR), and the buketSizeDuration (BSD), the TTIforPBR through the RRC configuration message 5e-10 or the RRC connection reconfiguration message 5e-20 and 5e-60 shown in FIG. 5E (PBR and BSD may be specified as the prior-itisedBitRate and bucketSizeDuration variables of the RRC message). For example, the lower the priority value, the higher the priority may be. The terminal may perform the sixth embodiment of the uplink transmission resource allo-cation procedure using the information.

The sixth example applies a method for applying a TTIforPBR value to each logical channel, in which the TTIforPBR value may be set as a predetermined TTI length. If the TTIforPBR value set in the logical channel is set as the same value as the TTI length of the uplink transmission resource, the logical channel may be allocated resources only by the token value when the uplink transmission resource is allocated depending on the priority. If the TTI-forPBR value set in the logical channel is set to be a value different from the TTI length of the uplink transmission resource, the logical channel may be allocated resources by the transmittable amount of data when the uplink transmis-sion resource is allocated depending on the priority. The sixth example may be applied to the first, second, third, fourth, and fifth examples.

A seventh example of allocating the uplink transmission resource of the present disclosure is as follows.

First of all, the terminal may obtain the configuration information on the priorities (PriorityForFirstTTI, Priority-ForSecondTTI, PriorityForThirdTTI) for each TTI of each logical channel, the MaximumTTI, the PrioritisedBitRate (PBR), and the buketSizeDuration (BSD), the TTIforPBR through the RRC configuration message 5e-10 or the RRC connection reconfiguration message 5e-20 and 5e-60 shown in FIG. 5E (PBR and BSD may be specified as the prior-itisedBitRate and bucketSizeDuration variables of the RRC message). The lower the priority value, the higher the priority becomes. The terminal may perform the seventh example of the uplink transmission resource allocation pro-cedure using the information.

The seventh example is a method for applying a TTI-forPBR to all logical channels, in which the TTIforPBR value is set to be a predetermined TTI length, and all logical channels may have the same value. If the set TTIforPBR value is set to be the same value as the TTI length of the uplink transmission resource, the procedure of allocating the uplink transmission resource may be performed by applying the first example. If the TTIforPBR value set in the logical channel is set to be a value different from the TTI length of the uplink transmission resource, the procedure of allocating the uplink transmission resource may be performed by applying the second example. The seventh example may be applied to the first, second, third, fourth, and fifth examples.

An eighth example of allocating the uplink transmission resource of the present disclosure is as follows.

First of all, the terminal may obtain the configuration information on the priorities (PriorityForFirstTTI, Priority-ForSecondTTI, PriorityForThirdTTI) for each TTI of each logical channel, the MaximumTTI, the PrioritisedBitRate (PBR), and the buketSizeDuration (BSD), the TTIforPBR through the RRC configuration message 5e-10 or the RRC connection reconfiguration message 5e-20 and 5e-60 shown in FIG. 5E (PBR and BSD may be specified as the prior-itisedBitRate and bucketSizeDuration variables of the RRC message). The lower the priority value, the higher the priority becomes. The terminal may perform the eighth example of the uplink transmission resource allocation pro-cedure using the information.

In the next generation mobile communication system of the present disclosure, since the TTI may have various lengths, the terminal should be able to recognize the TTI of the uplink transmission resource (uplink grant). The TTI of the uplink transmission resource may include the informa-tion in the uplink transmission resource when the base station allocates the uplink transmission resource or the base station may indicate the TTI of the uplink transmission resource using the DCI (downlink control information) of the PDCCH. Alternatively, the base station does not sepa-rately indicate the TTI of the uplink transmission resource, and the terminal may consider that the TTI of the downlink transmission resource indicating the uplink transmission resource and the TTI of the uplink transmission resource are the same.

In the eighth example, the type of the TTI length may have a predetermined number of branches, for example, three branches. The three TTIs such as TTI 1 (short TTI), TTI 2 (medium TTI), and TTI 3 (long TTI) may be set to be the length of the TTI of the uplink transmission resource. When the uplink transmission resource is set to be each TTI, the procedure of the eighth example is as follows.

When the TTI length of the uplink transmission resource is set to be the TTI 1, the procedure of allocating an uplink transmission resource is performed on all radio bearers (RBs) and all MAC control element (MAC CEs). The priority may be determined in the order of URLLC DRB>BSR/PHR>SRB>non-URLLC DRB. Also, the proce-dure shown in Table 3 can be performed depending on the priority. Alternatively, the second example as shown in Table 4 may be performed depending on the priority. When the TTI length is set to be the TTI 1, the URLLC data is transmitted first, and to prevent the non-URLLC data from being transmitted first, it is excluded that the token value is allocated first as in the first step of the first example.

When the TTI length of the uplink transmission resource is set to be the TTI 2, the procedure of allocating an uplink transmission resource is performed on all radio bearers (RBs) and all MAC control element (MAC CEs). The priority may be determined in the order of CCCH SDU>BSR/PHR>SRB>non-URLLC DRB>URLLC DRB. Also, the procedure shown in Table 3 can be performed depending on the priority. Alternatively, the second example as shown in Table 4 may be performed depending on the priority. When the TTI length is set to be the TTI 2, the priority of the URLLC data is allocated lower.

When the TTI length of the uplink transmission resource is set to be the TTI 3, the procedure of allocating an uplink transmission resource is performed on all radio bearers (RBs) and all MAC control element (MAC CEs) other than the URLLC data. The priority may be determined in the order of CCCH SDU>BSR/PHR>SRB>non-URLLC DRB. Also, the procedure as described in the first example may be performed depending on the priority. When the TTI length is set to be the TTI 3, the URLLC data is not transmitted.

A ninth example of allocating the uplink transmission resource of the present disclosure is as follows.

If the first transmission resource is allocated through the uplink transmission resource (UL grant), the DCI indicating the short TTI is received, or the first transmission resource is received, the procedure as shown in the above Table 3 is performed according to the first priority combination or the second example as shown in the following Table 4 may be performed.

If the second transmission resource is allocated through the uplink transmission resource (UL grant), the DCI indicating the long TTI is received, or the second transmission resource is received, the procedure such as the first example is performed according to the second priority combination.

In the above description, the first priority combination has a structure having a first DRB set (DRBs specified by the RRC, a set of DRBs processing URLLC traffic) having the highest priority, a BSR/PHR having the second highest priority, an SRB having the third highest priority, and the remaining DRBs have the lowest priority.

The second priority combination is a structure having the BSR/PHR having the highest priority, the SRB has the second highest priority, and the DRBs having the lowest priority other than the first DRB. The first DRB set is not considered in the second priority combination.

Figure 5G:
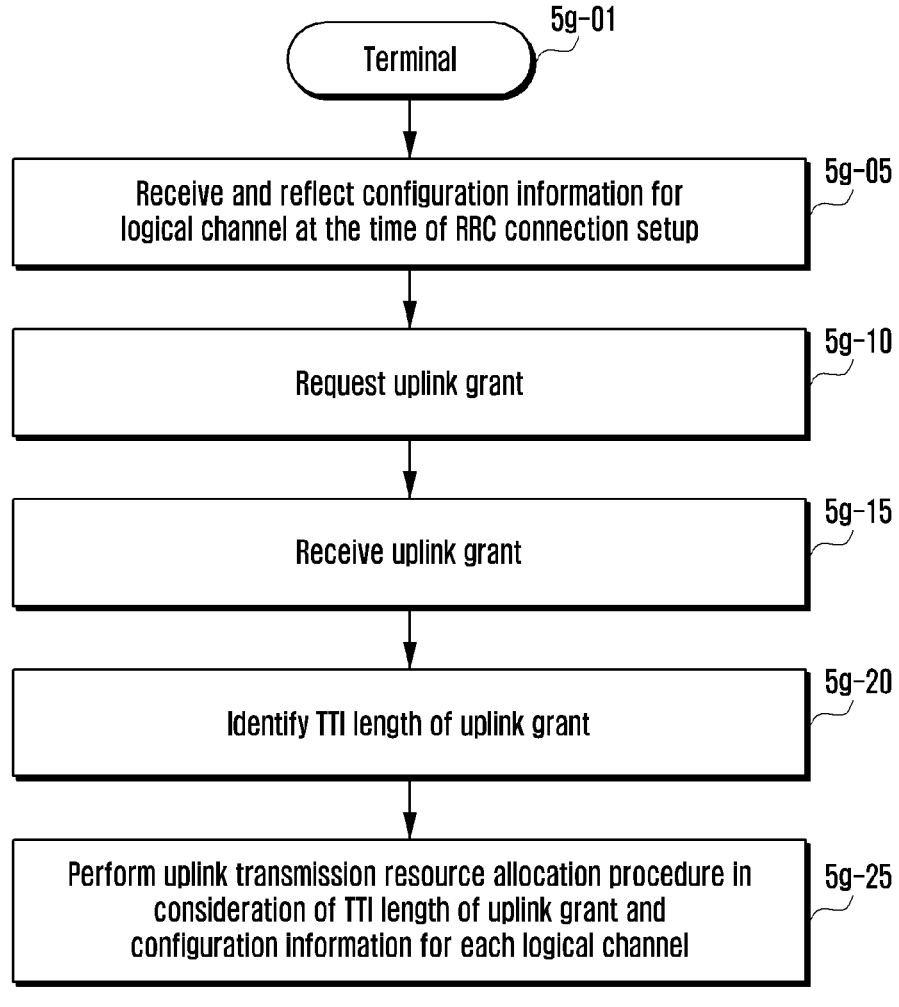
FIG. 5G is a diagram illustrating the operation of the terminal according to the fifth embodiment of the present disclosure.

FIG. 5G is a diagram illustrating the operation of the terminal according to the fifth embodiment of the present disclosure.

In FIG. 5G, a terminal 5g-01 may establish the RRC connection if a predetermined reason for connecting to the network occurs. The RRC connection is established through the procedure described in FIG. 5E, the configuration information for each logical channel is received, and the terminal may reflect the configuration information on each logical channel (5g-05). If the terminal needs to transmit data for a predetermined reason, as described with reference to FIG. 5E, it may make a scheduling request, allocate the transmission resources for the BSR, send the BSR, and receive the uplink transmission resource (uplink grant) (5g-10 and 5g-15). When the terminal receives the uplink transmission resource, the TTI length of the uplink transmission resource is identified (5g-20). The TTI of the uplink transmission resource may include the information in the uplink transmission resource when the base station allocates the uplink transmission resource or the base station may indicate the TTI of the uplink transmission resource using the DCI (downlink control information) of the PDCCH. Alternatively, the base station does not separately indicate the TTI of the uplink transmission resource, and the terminal may consider that the TTI of the downlink transmission resource indicating the uplink transmission resource and the TTI of the uplink transmission resource are the same.

The terminal performs the uplink transmission resource allocation procedure to allocate the received uplink transmission resource to the respective logical channels. The terminal performs the suitable procedures in the first, second, third, fourth, fifth, sixth, seventh, and eighth examples by reflecting the TTI length of the uplink transmission resource and the configuration information set in each logical channel (5g-25).

Figure 5H:
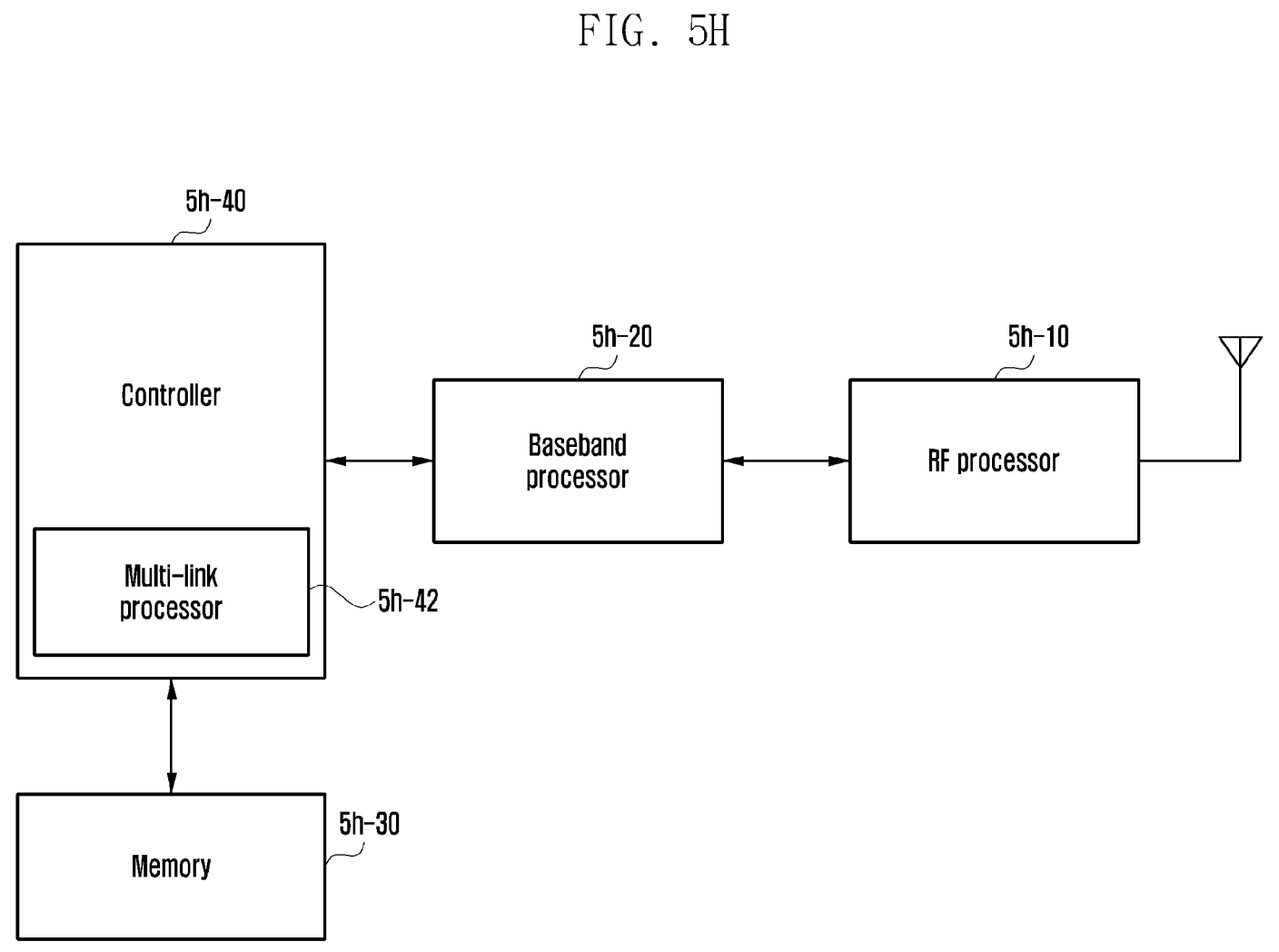

FIG. 5H is a diagram illustrating the internal structure of the terminal according to the fifth embodiment of the present disclosure.

Referring to FIG. 5H, the terminal includes a radio frequency (RF) processor a baseband processor 4h-20, a memory 5h-30, and a controller 4h-40.

The RF processor 5h-10 serves to transmit and receive a signal through a radio channel, such as band conversion and amplification of a signal. That is, the RF processor up-converts a baseband signal provided from the baseband processor 5h-20 into an RF band signal and then transmits the RF band signal through an antenna and down-converts the RF band signal received through the antenna into the baseband signal. For example, the RF processor 5h-10 may include a transmitting filter, a receiving filter, an amplifier, a mixer, an oscillator, a digital to analog converter (DAC), an analog to digital converter (ADC), or the like. FIG. 1M illustrates only one antenna but the terminal may include a plurality of antennas. Further, the RF processor 5h-10 may include a plurality of RF chains. Further, the RF processor 5h-10 may perform beamforming. For the beamforming, the RF processor 5h-10 may adjust a phase and a size of each of the signals transmitted and received through a plurality of antennas or antenna elements. In addition, the RF processor may perform MIMO and may receive a plurality of layers when performing a MIMO operation. The RF processor 5h-10 may perform reception beam sweeping by appropriately configuring a plurality of antennas or antenna elements under the control of the controller or adjust a direction and a beam width of the reception beam so that the reception beam is resonated with the transmission beam.

The baseband processor 5h-20 performs a conversion function between a baseband signal and a bit string according to a physical layer standard of a system. For example, when data are transmitted, the baseband processor 5h-20 generates complex symbols by coding and modulating a transmitted bit string. Further, when data are received, the baseband processor 5h-20 recovers the received bit string by demodulating and decoding the baseband signal provided from the RF processor 5h-10. For example, according to the orthogonal frequency division multiplexing (OFDM) scheme, when data are transmitted, the baseband processor 5h-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 5h-20 divides the baseband signal provided from the RF processor 5h-10 in an OFDM symbol unit and recovers the signals mapped to the sub-carriers by a fast Fourier transform (FFT) operation and then recovers the received bit string by the modulation and decoding.

The baseband processor 5h-20 and the RF processor 5h-10 transmit and receive a signal as described above. Therefore, the baseband processor 5h-20 and the RF processor 5h-10 may be called a transmitter, a receiver, a transceiver, or a communication unit. Further, at least one of the baseband processor 5h-20 and the RF processor 5h-10 may include a plurality of communication modules to support a plurality of different radio access technologies. Further, at least one of the baseband processor 5h-20 and the RF processor 5h-10 may include different communication modules to process signals in different frequency bands. For example, the different wireless access technologies may include an LTE network, an NR network, and the like. Further, different frequency bands may include a super high frequency (SHF) (for example: 2.5 hHz, 5 hHz) band, a millimeter wave (for example: 60 GHz) band.

The memory 5h-30 stores data such as basic programs, application programs, and configuration information for the operation of the terminal. Further, the memory 5h-30 provides the stored data according to the request of the controller 5h-40.

The controller 5h-40 controls the overall operations of the terminal. For example, the controller 5h-40 transmits and receives a signal through the baseband processor 5h-20 and the RF processor 5h-10. Further, the controller 5h-40 records and reads data in and from the memory 5h-40. For this purpose, the controller 5h-40 may include at least one processor. For example, the controller 5h-40 may include a communication processor (CP) performing a control for communication and an application processor (AP) controlling an upper layer such as the application programs.

FIG. 5I is a diagram illustrating an internal structure of the base station in the wireless communication system according to the fifth embodiment of the present disclosure.

As illustrated in FIG. 5I, the base station is configured to include an RF processor 5i-10, a baseband processor 5i-20, a backhaul communication unit 5i-30, a memory 5i-40, and a controller 5i-50.

The RF processor 5i-10 serves to transmit and receive a signal through a radio channel, such as band conversion and amplification of a signal. That is, the RF processor 5i-10 up-converts a baseband signal provided from the baseband processor 5i-20 into an RF band signal and then transmits the RF band signal through an antenna and down-converts the RF band signal received through the antenna into the baseband signal. For example, the RF processor may include a transmitting filter, a receiving filter, an amplifier, a mixer, an oscillator, a DAC, an ADC, or the like. FIG. 5I illustrates only one antenna but the base station may include a plurality of antennas. Further, the RF processor 5i-10 may include a plurality of RF chains. Further, the RF processor 5i-10 may perform the beamforming. For the beamforming, the RF processor 5i-10 may adjust a phase and a size of each of the signals transmitted/received through a plurality of antennas or antenna elements. The RF processor may perform a downward MIMO operation by transmitting one or more layers.

The baseband processor 5i-20 performs a conversion function between the baseband signal and the bit string according to the physical layer standard of the radio access technology. For example, when data are transmitted, the baseband processor 5i-20 generates complex symbols by coding and modulating a transmitted bit string. Further, when data are received, the baseband processor 5i-20 recovers the received bit string by demodulating and decoding the baseband signal provided from the RF processor 5i-10. For example, according to the OFDM scheme, when data are transmitted, the baseband processor 5i-20 generates the complex symbols by coding and modulating the transmitting bit string, maps the complex symbols to the sub-carriers, and then performs the IFFT operation and the CP insertion to configure the OFDM symbols. Further, when data are received, the baseband processor 5i-20 divides the baseband signal provided from the RF processor 5i-10 in the OFDM symbol unit and recovers the signals mapped to the sub-carriers by the FFT operation and then recovers the receiving bit string by the modulation and decoding. The baseband processor 5i-20 and the RF processor 5i-10 transmit and receive a signal as described above. Therefore, the baseband processor 5i-20 and the RF processor 5i-10 may be called a transmitter, a receiver, a transceiver, or a communication unit.

The communication unit 5i-30 provides an interface for performing communication with other nodes within the network.

The memory 5i-40 stores data such as basic programs, application programs, and setting information for the operation of the base station. In particular, the memory 5i-40 may store the information on the bearer allocated to the accessed terminal, the measured results reported from the accessed terminal, etc. Further, the memory 5i-40 may store information that is a determination criterion on whether to provide a multiple connection to the terminal or stop the multiple connection to the terminal. Further, the memory 5i-40 provides the stored data according to the request of the controller 5i-50.

The controller 5i-50 controls the general operations of the base station. For example, the controller 5i-50 transmits/receives a signal through the baseband processor 5i-20 and the RF processor 5i-10 or the backhaul communication unit 5i-30. Further, the controller records and reads data in and from the memory 5i-40. For this purpose, the controller 5i-50 may include at least one processor.

Sixth Embodiment

Figure 6A:
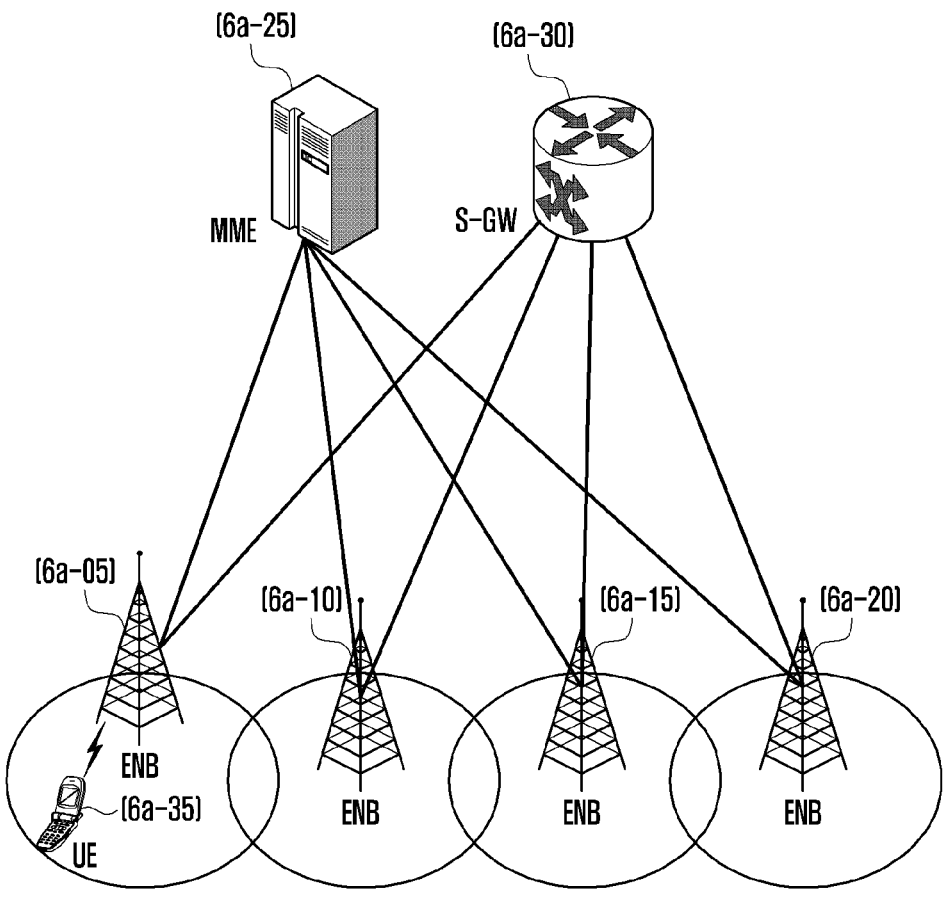
FIG. 6A is a diagram illustrating the structure of the existing LTE system.

FIG. 6A is a diagram illustrating the structure of the existing LTE system.

Referring to FIG. 6A, the wireless communication system is configured to include a plurality of base stations 6a-05, 6a-10, 6a-15, and 6a-20, a mobility management entity (MME) 6a-25, a serving-gateway (S-GW) 6a-30. User equipment (hereinafter, UE or terminal) 6a-35 accesses an external network through the base stations 6a-05, 6a-10, 6a-15, and 6a-20 and the S-GW 6a-30.

The base stations 6a-05, 6a-10, 6a-15, and 6a-20 are access nodes of a cellular network and provide a radio access to terminals that are connected to a network. That is, in order to serve traffic of users, the base stations 6a-05, 6a-10, 6a-15, and 6a-20 collect state information such as a buffer state, an available transmission power state, a channel state, or the like of the terminals to perform scheduling, thereby supporting a connection between the terminals and a core network (CN). The MME 6a-25 is an apparatus for performing various control functions as well as a mobility management function for the terminal and is connected to a plurality of base stations, and the S-GW 6a-30 is an apparatus for providing a data bearer. Further, the MME 6a-25 and the S-GW 6a-30 may further perform authentication, bearer management or the like on the terminal connected to the network and may process packets that are to be received from the base stations 6a-05, 6a-10, 6a-15, and 6a-20 and packets that are to be transmitted to the base stations 6a-05, 6a-10, 6a-15, and 6a-20.

Figure 6B:
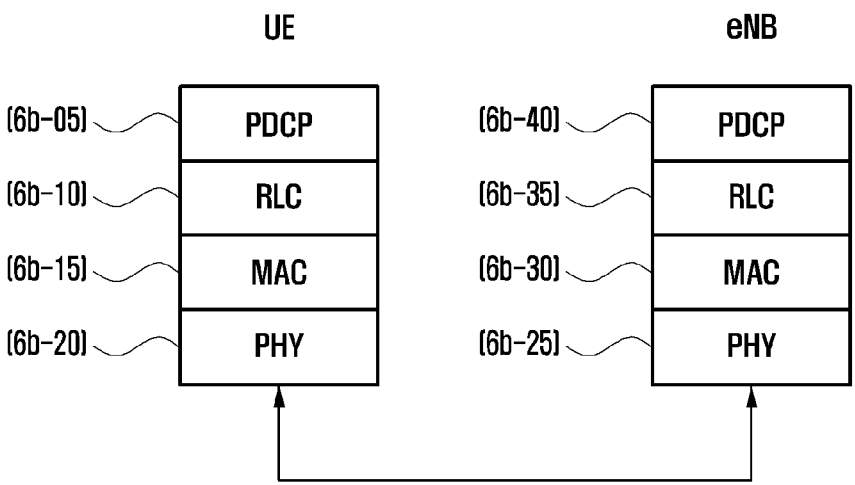
FIG. 6B is a diagram illustrating the radio protocol structure in the existing LTE system.

FIG. 6B is a diagram illustrating the radio protocol structure in the existing LTE system.

Referring to FIG. 6B, the radio protocol of the LTE system is configured to include packet data convergence protocols (PDCPs) 6b-05 and 6b-40, radio link controls (RLCs) 6b-10 and 6b-35, and medium access controls (MACs) 6b-15 and 6b-30 in the terminal and the eNB, respectively. The PDCPs 6b-05 and 6b-40 are in charge of operations such as IP header compression/decompression. The main functions of the PDCP are summarized as follows.

Header compression and decompression function (Header compression and decompression: ROHC only)
    Transfer function of user data (Transfer of user data)
    In-sequence delivery function (In-sequence delivery of upper layer PDUs at PDCP re-establishment procedure for RLC AM)
    Reordering function (For split bearers in DC (only support for RLC AM): PDCP PDU routing for transmission and PDCP PDU reordering for reception)
    Duplicate detection function (Duplicate detection of lower layer SDUs at PDCP re-establishment procedure for RLC AM)

Retransmission function (Retransmission of PDCP SDUs at handover and, for split bearers in DC, of PDCP PDUs at PDCP data-recovery procedure, for RLC AM)

Ciphering and deciphering function (Ciphering and deciphering)

Timer-based SDU discard function (Timer-based SDU discard in uplink)

The radio link controls (hereinafter, referred to as RLCs) 6b-10 and 6b-35 reconfigures the PDCP packet data unit (PDU) to an appropriate size to perform the ARQ operation or the like. The main functions of the RLC are summarized as follows.

Data transfer function (Transfer of upper layer PDUs)

ARQ function (Error Correction through ARQ (only for AM data transfer))

Concatenation, segmentation, reassembly functions (Concatenation, segmentation and reassembly of RLC SDUs (only for UM and AM data transfer))

Re-segmentation function (Re-segmentation of RLC data PDUs (only for AM data transfer))

Reordering function (Reordering of RLC data PDUs (only for UM and AM data transfer)

Duplicate detection function (Duplicate detection (only for UM and AM data transfer))

Error detection function (Protocol error detection (only for AM data transfer))

RLC SDU discard function (RLC SDU discard (only for UM and AM data transfer))

RLC re-establishment function (RLC re-establishment)

The MACs 6b-15 and 6b-30 are connected to several RLC layer devices configured in one terminal and perform an operation of multiplexing RLC PDUs into an MAC PDU and demultiplexing the RLC PDUs from the MAC PDU. The main functions of the MAC are summarized as follows.

Mapping function (Mapping between logical channels and transport channels)

Multiplexing/demultiplexing function (Multiplexing/demultiplexing of MAC SDUs belonging to one or different logical channels into/from transport blocks (TB) delivered to/from the physical layer on transport channels)

Scheduling information reporting function (Scheduling information reporting)

HARQ function (Error correction through HARQ)

Priority handling function between logical channels (Priority handling between logical channels of one UE)

Priority handling function between terminals (Priority handling between UEs by means of dynamic scheduling)

MBMS service identification function (MBMS service identification)

Transport format selection function (Transport format selection)

Padding function (Padding)

Physical layers 6b-20 and 6b-25 perform an operation of channel-coding and modulating higher layer data, making the higher layer data as an OFDM symbol and transmitting them to a radio channel, or demodulating and channel-decoding the OFDM symbol received through the radio channel and transmitting the demodulated and channel-decoded OFDM symbol to the higher layer.

Although not illustrated in the present figure, a radio resource control (hereinafter, referred to as RRC) layer is present at each of the upper parts of the PDCP layer of the terminal and the base station, and the RRC layer may receive and transmit connection and measurement related control messages for a radio resource control.

Figure 6C:
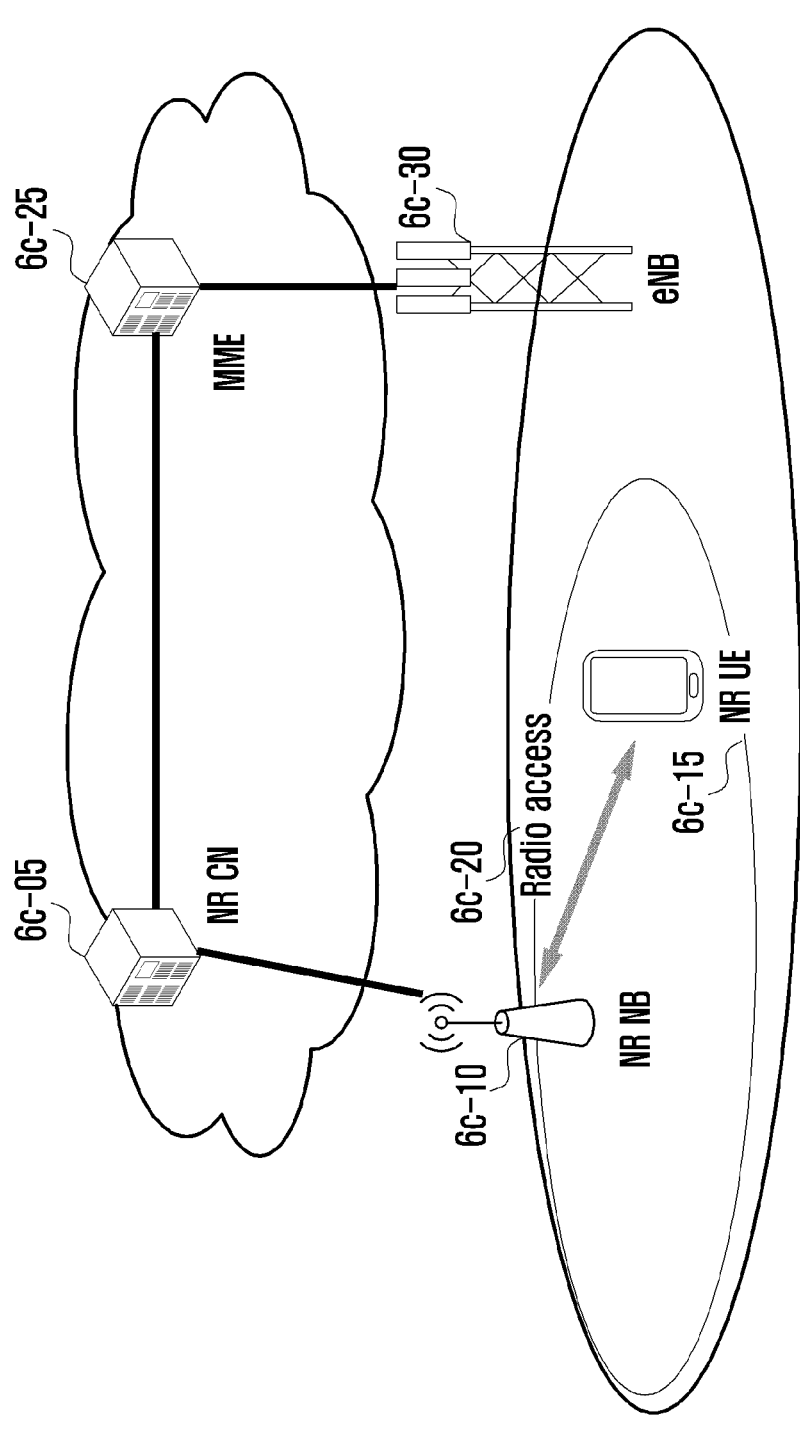
FIG. 6C is a diagram illustrating the structure of the next generation mobile communication system according to a sixth embodiment of the present disclosure.

FIG. 6C is a diagram illustrating the structure of the next generation mobile communication system according to a sixth embodiment of the present disclosure.

Referring to FIG. 6C, a radio access network of a next generation mobile communication system is configured to include a next generation base station (New radio node B, hereinafter NR gNB or NR base station) 6c-10 and a new radio core network (NR CN) 6c-05. The user terminal (new radio user equipment, hereinafter, NR UE or UE) 6c-15 accesses the external network through the NR gNB 6c-10 and the NR CN 6c-05.

In FIG. 6C, the NR gNB 6c-10 corresponds to an evolved node B (eNB) of the existing LTE system. The NR gNB 6c-10 is connected to the NR UE 6c-15 via a radio channel and may provide a service superior to the existing node B. In the next generation mobile communication system, since all user traffics are served through a shared channel, an apparatus for collecting state information such as a buffer state, an available transmission power state, and a channel state of the UEs to perform scheduling is required. The NR gNB 6c-10 may serve as the device. One NR gNB 6c-10 typically includes a central unit (CU) for controlling a plurality of cells and supervising a control and signaling, and a distributed unit (DU) for taking charge of transmitting/receiving a signal. In order to realize the high-speed data transmission compared with the existing LTE, the NR gNB may have the existing maximum bandwidth or more, and may be additionally incorporated into a beam-forming technology by using orthogonal frequency division multiplexing (hereinafter, referred to as OFDM) as a radio access technology. Further, an adaptive modulation & coding (hereinafter, referred to as AMC) scheme for determining a modulation scheme and a channel coding rate depending on a channel state of the terminal is applied. The NR CN 6c-05 may perform functions such as mobility support, bearer setup, QoS setup, and the like. The NR CN is an apparatus for taking charging of various control functions as well as a mobility management function for the terminal and is connected to a plurality of base stations. In addition, the next generation mobile communication system can interwork with the existing LTE system, and the NR CN is connected to the MME 6c-25 through the network interface. The MME is connected to the eNB 6c-30 which is the existing base station.

Figure 6D:
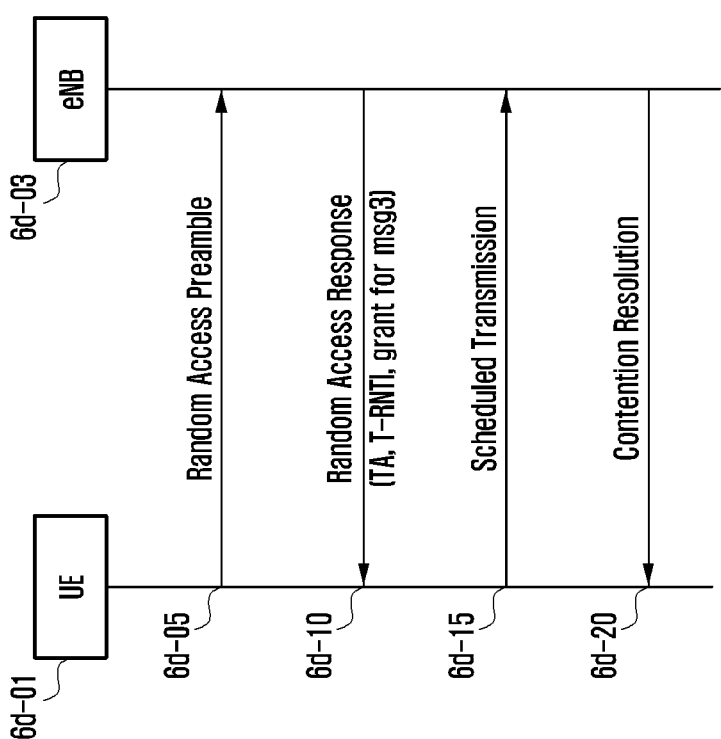
FIG. 6D is a diagram for explaining a 4-step random access procedure in the existing LTE system.

FIG. 6D is a diagram for explaining a 4-step random access procedure in the existing LTE system.

The random access is performed when adjusting the uplink synchronization or transmitting data to the network. More specifically, it may be performed when switching from the standby mode to the connected mode, performing the RRC re-establishment, performing the handover, and starting the uplink and downlink data. When the terminal 6d-01 receives a dedicated preamble from the base station 6d-03, the terminal 6d-01 applies the preamble and transmits the corresponding preamble to the msg 1. Otherwise, the terminal selects one of two preamble groups and selects a preamble belonging to the selected group. These groups are referred to as group A and group B. If the channel quality state is better than a certain threshold value and the size of the msg3 is larger than a certain threshold value, the preamble belonging to the group A is selected, and otherwise, the preamble belonging to the group B is selected. If the preamble is transmitted in an n-th subframe (6d-05), an RAR window is started from an (n+3)-th subframe and it is monitored whether the RAR is transmitted within the window time interval (6d-10). The scheduling information of the RAR is indicated by the RA-RNTI of the PDCCH. The RA-RNTI is derived using the time used to transmit the preamble and the radio resource position on the frequency axis. The RAR includes a Timing Advance (TA) Command, an UL grant, and a temporary C-RNTI. If the RAR is successfully received in the RAR window, the msg3 is transmitted using the UL grant included in the RAR (6d-15). The Msg3 includes other information depending on the purpose of the random access. The following table is an example of the information contained in the msg3.

TABLE 5

| Example of information included in msg3 | |
|---|---|
| CASE | Message 3 Contents |
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicate preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicate preamble) | BSR, PHR, (part of) DCCH/DTCH SDU |

The Msg3 is transmitted in the (n+6)-th subframe if the RAR is received in the nth subframe. The HARQ is applied from the Msg3. After the Msg3 transmission, the terminal drives a specific timer and monitors a Contention Resolution (CR) message until the timer expires (6d-20). The CR message includes the MAC CE consisting of "UE contention resolution identity" having a length of 6 bytes or includes an RRC Connection Setup message, an RRC Connection Reestablishment message or the like which are received in the msg3 according to the random access purpose.

Figure 6E:
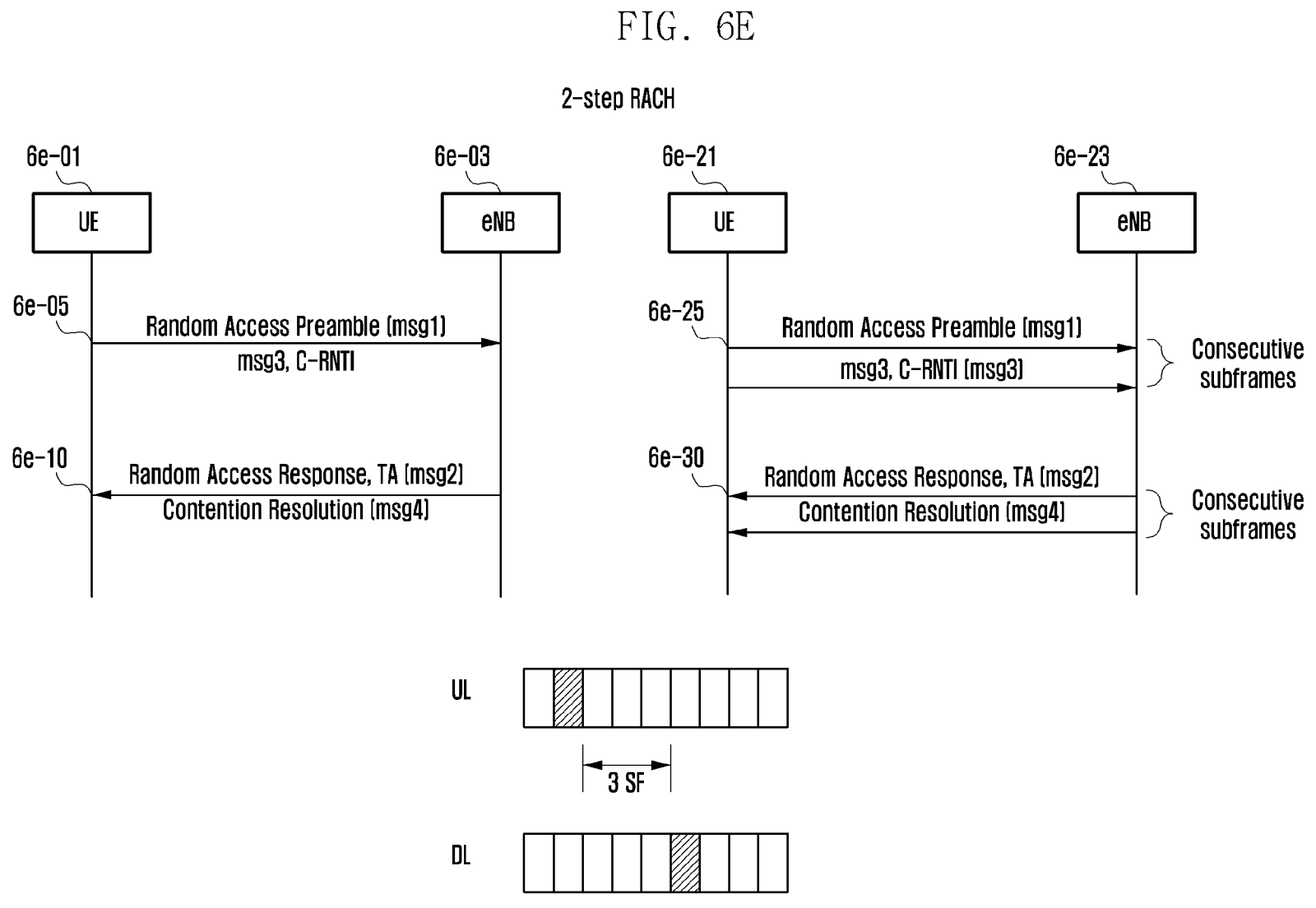

FIG. 6E is a diagram for explaining a 2-step random access process according to a sixth embodiment of the present disclosure.

In the existing 4-step random access (hereinafter, referred to as the RACH concatenation), the random access process is performed in 4 steps, so that the delay time due to the message exchange between the terminal and the base station is required to some extent. As shown in FIG. 6D, at least 13 subframes, that is, 13 m are required until the terminal transmits msg1 and receives msg4. If the low latency is required for a particular situation or service, the 2-step random access may be used to reduce the latency in the random access.

The 2-step random access is a method for transmitting a message corresponding to msg1 and msg3 which are a preamble transmission in a 4-step random access of terminals 6e-01 and 6e-21 in the same subframe or a consecutive subframe (i.e., in the at least same transmission time interval (TTI)) (6e-05 and 6e-25). The PRACH in the physical layer or a new physical channel may be defined for simultaneous transmission of the msg1 and the msg3. To this end, this is a method for ensuring performance to make time/frequency resources of msg1 and msg3 transmitted to base stations 6e-03 and 6e-23 different for each preamble. If a collision occurs, since both of the msg1 and msg3 are lost, more data is lost compared with the 4-step random access.

When the base stations 6e-03 and 6e-23 receive messages corresponding to the msg1 and the msg3 from the terminals 6e-01 and 6e-21, they transmit messages including msg2 and msg4 (6e-10 and 6e-30). The above message may also be transmitted in the same subframe or the consecutive subframes (i.e., the least the same TTI). Here, the random access response of the msg2 and the contention resolution (CR) message of the msg4 may include or modify the contents to be transmitted to the 4-step random access in the existing LTE. That is, since it has already received msg3, there is no need to transmit the UL grant for the msg3 transmission. That is, the message may include a timing advance (TA) command and CR information. The CR message includes the MAC CE consisting of "UE contention resolution identity" having a length of 6 bytes or includes an RRC Connection Setup message, an RRC Connection Reestablishment message or the like which are received in the msg3 according to the random access purpose.

If the 2-step random access as described above is performed without collision, a considerable delay time gain is obtained as compared with the 4-step random access. For example, processing may be possible in four subframes even if more processing time is applied than in the LTE. Since the 2-step random access has obvious advantages and disadvantages compared to the 4-step random access, there is a need for the procedure of performing an operation under the condition that no collision occurs.

Figure 6F:
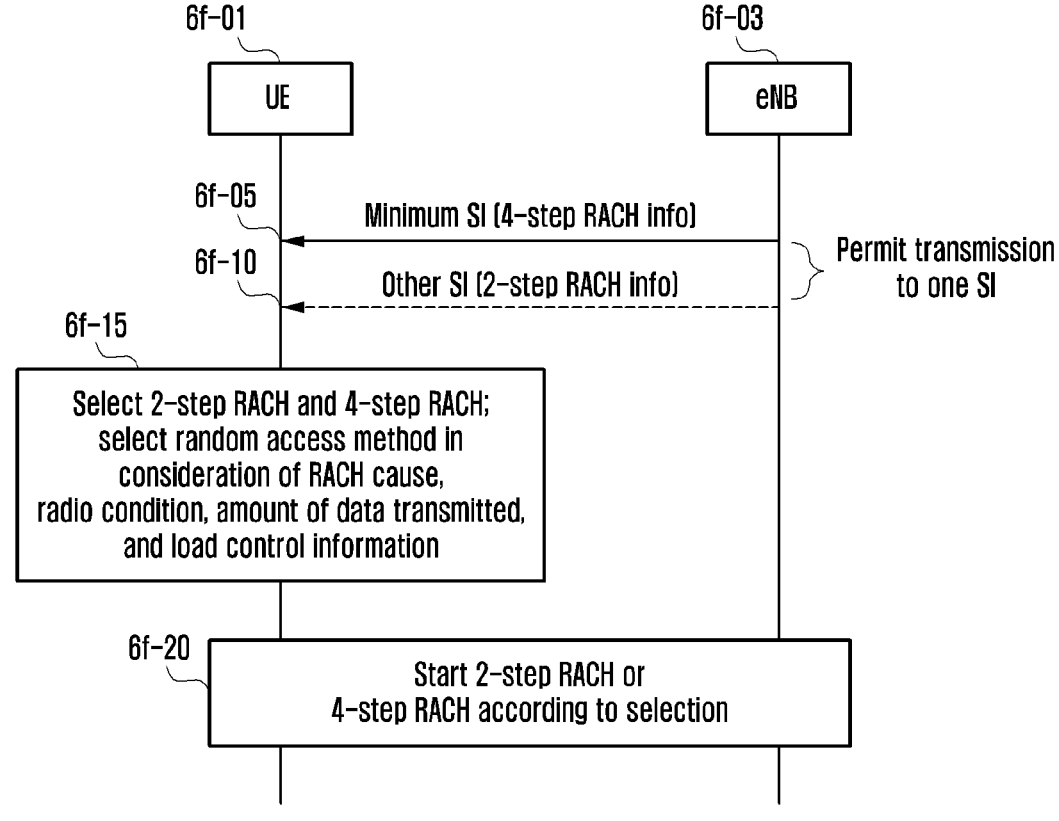
FIG. 6F is a diagram illustrating the overall operation of selecting a 2-step RACH and a 4-step RACH according to the sixth embodiment of the present disclosure.

FIG. 6F is a diagram illustrating the overall operation of selecting a 2-step RACH and a 4-step RACH according to the sixth embodiment of the present disclosure.

The base station 6f-03 transmits the information for the 2-step RACH and the 4-step RACH to the terminal 6f-01 through the system information (SI). The information for the 4-step RACH may be transferred to the minimum SI as basic information (6f-05), and the information for the 2-step RACH may be transferred to other SI as additional information (6f-10). That is, if the 2-step RACH information is not provided in the corresponding cell, the 2-step RACH is not supported in the corresponding cell. This is the case where the system information of the next generation mobile communication system is divided according to the kind of information and transmitted. Conversely, the information for the 2-step RACH and the 4-step RACH may be simultaneously transmitted by one system information transmission. In addition, the 4-step RACH information refers to the information (PRACH resource, RAR window information, contention resolution information, or the like) for the random access transmitted from the system information block 2 (SIB2) in the LTE, and the 2-step RACH information includes probability information for the 2-step RACH operation, msg3 size information, initial transmission power information of the msg3, transmission parameter information including MCS configuration information of the msg3, or the like.

Thereafter, when an event requiring a random access is generated based on the system information received from the base station 6f-03, the terminal 6f-01 selects a random access method in consideration of the RACH cause, the radio condition, the amount of data to be transmitted, and the load control information (6f-15). The description of the considerations and respective conditions for selecting the 2-step RACH is listed in the following Table 6.

TABLE 6

| Consideration for 2-step RACH | |
|---|---|
| Consideration | Description |
| RACH cause | Some cases are not suitable for the 2-step RACH (ex. when there is no msg 3 to be transmitted; if the msg1 and the msg2 are transmitted in the handover, the complete is to be considered. In this case, since there is no msg3, the 2-step RACH is not suitable for use) |
| | The RACH by the PDCCH order always uses the 4-step RACH |
| | Alternatively, if the use of the 2-step RACH is explicitly indicated in the PDCCH order, the 2-step RACH is used but the 4-step RACH is used. |
| Radio condition | If a large msg transmission is possible through the 2-step RACH based on the msg3 size information (the base station transmits the msg3 side information as the system information), the 2-step RACH is used only when the radio condition is equal of or more than a certain reference (or the 2-step RACH is used only when the power headroom is equal to or more than a certain reference) |
| Load control information | The 2 step RACH use probability information (value between 0 and 1) is broadcast through the system information |
| | If the success possibility of the 2 step RACH is high, the 2 step RACH is always higher than the 4 step RACH |

The terminal 6f-01 reflects the above considerations to perform the 2-step random access or the 4-step random access with the base station 6f-03 (6f-20).

Figure 6G:
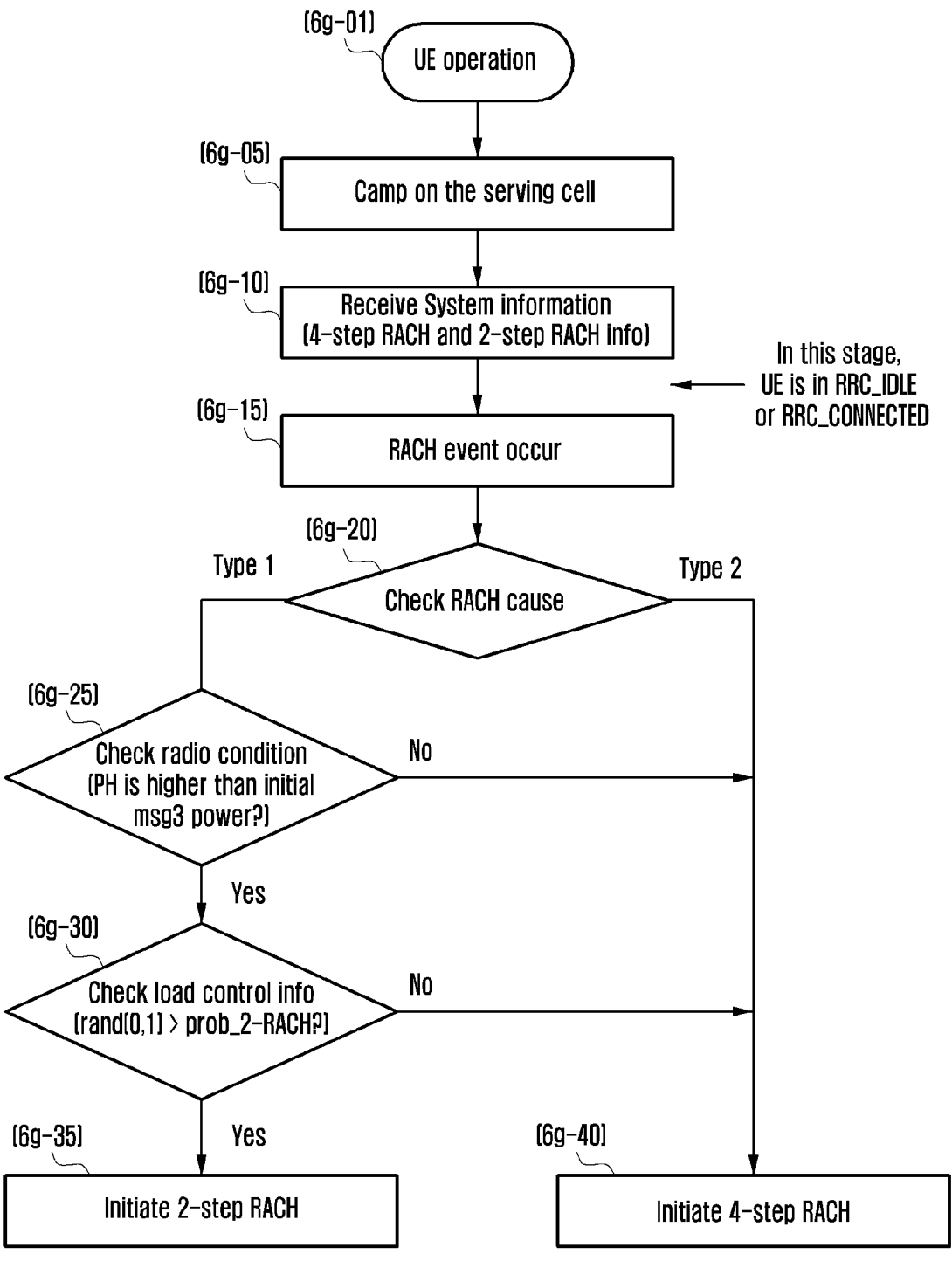
FIG. 6G is a diagram illustrating an internal operation of the terminal for determining 2-step RACH and 4-step RACH operations according to the sixth embodiment of the present disclosure.

FIG. 6G is a diagram illustrating an internal operation of the terminal for determining 2-step RACH and 4-step RACH operations according to the sixth embodiment of the present disclosure.

The terminal camps on the serving cell (6g-05) and receives system information (6g-10). Thereafter, the terminal may perform the RRC connection with the base station or maintain the RRC IDLE state. If the terminal generates the event to perform the random access with the base station (when switching from the standby mode to the connected mode, performing the RRC re-establishment, performing the handover, and starting the uplink and downlink data) (6g-15), the terminal identifies the cause of the random access (6g-20). If the cause of the random access is type 2, the terminal performs the 4-step random access (6g-40). On the other hand, if the cause of the random access is type 1, the terminal identifies the additional conditions for using the 2-step random access. Here, if there is no msg3 to be transmitted to the cause corresponding to the type 2 (for example, if the msg1 and the msg2 are transmitted in the handover, the random access is determined to be completed). In this case, since there is no msg3, the 2-step random access is not suitable for use. That is, the type 1 may be the case excluding the case selected in the type 2.

When the cause of the random access is the type 1, the terminal identifies the state of the radio link to determine whether to select the 2-step random access (6g-25). In the above step, since the terminal determines that the larger msg3 transmission is possible through the 2-step random access based on the msg3 size information received from the base station (already identified in the RACH cause), the 2-step random access use is determined only when the radio condition is above a certain reference. For this purpose, the use of 2-step random access may be determined only when the power headroom (PH) is above a certain reference. That is, if the PH is higher than the initial transmission power of the msg3, the terminal may identify the additional conditions for using the 2-step random access and perform the 4-step random access when the PH is lower than the initial transmission power of the msg3 (6g-40).

Thereafter, the terminal performs the 2-step random access if the random value is larger by comparing the random values randomly generated between 0 and 1 for the load control with the 2 step RACH use possibility information received from the base station (value between Prob_2-RACH 0-1) (6g-35), and the terminal performs the 4-step random access if the random value is smaller than the received probability information (6g-40).

The operation may also be made while all the considerations 6g-20, 6g-25, and 6g-30 for the 2-step random access selection may be considered or some thereof may be excluded.

Figure 6H:
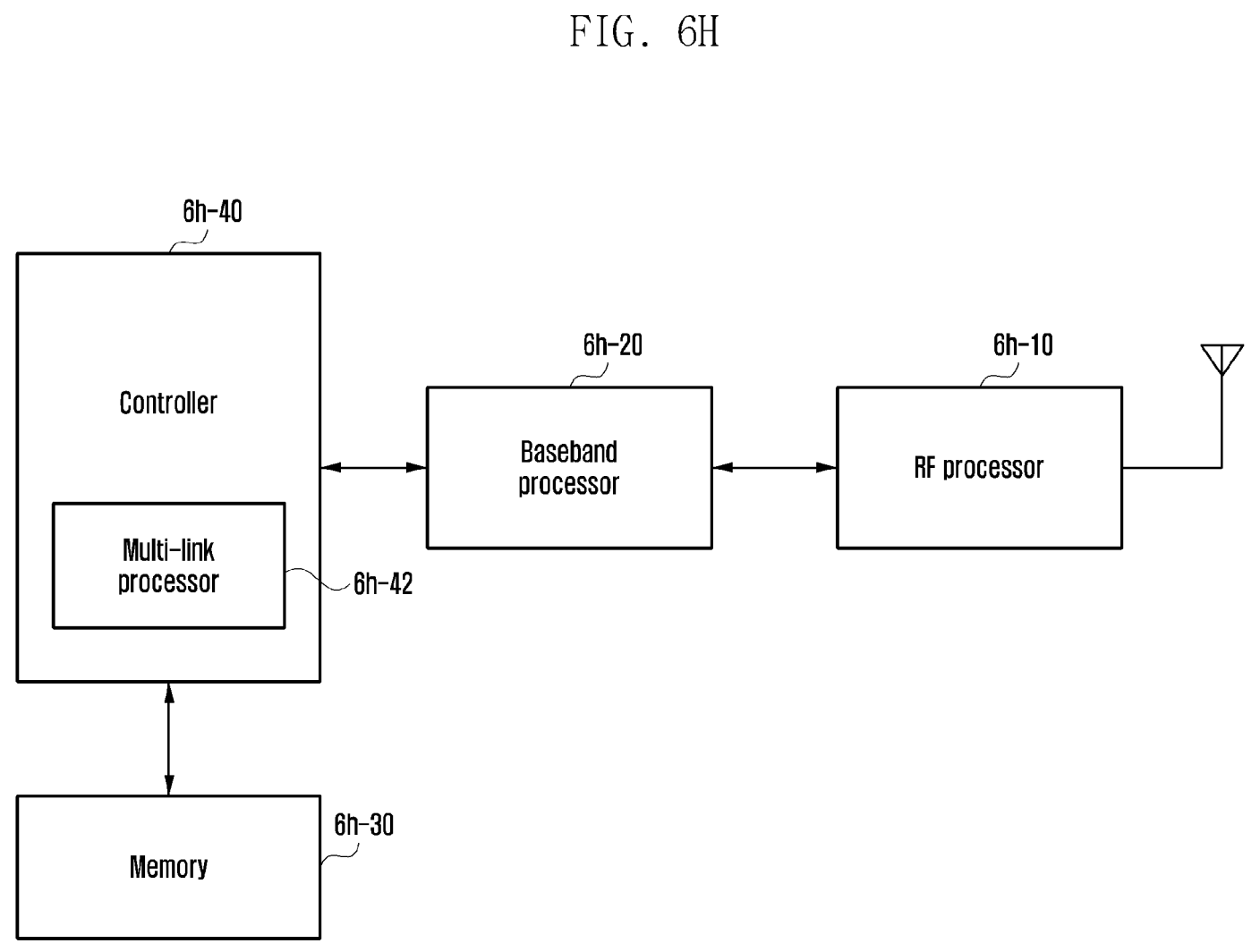

FIG. 6H is a block diagram illustrating the internal structure of the terminal according to the sixth embodiment of the present disclosure.

Referring to FIG. 6H, the terminal includes a radio frequency (RF) processor 6h-10, a baseband processor 6h-20, a memory 6h-30, and a controller 6h-40.

The RF processor 6h-10 serves to transmit and receive a signal through a radio channel, such as band conversion and amplification of a signal. That is, the RF processor 6h-10 up-converts a baseband signal provided from the baseband processor 6h-20 into an RF band signal and then transmits the RF band signal through an antenna and down-converts the RF band signal received through the antenna into the baseband signal. For example, the RF processor 6h-10 may include a transmitting filter, a receiving filter, an amplifier, a mixer, an oscillator, a digital to analog converter (DAC), an analog to digital converter (ADC), or the like. FIG. 6H illustrates only one antenna but the terminal may include a plurality of antennas. Further, the RF processor 6h-10 may include a plurality of RF chains. Further, the RF processor 6h-10 may perform beamforming. For the beamforming, the RF processor 6h-10 may adjust a phase and a size of each of the signals transmitted and received through a plurality of antennas or antenna elements. In addition, the RF processor may perform MIMO and may receive a plurality of layers when performing a MIMO operation.

The baseband processor 6h-20 performs a conversion function between a baseband signal and a bit string according to a physical layer standard of a system. For example, when data are transmitted, the baseband processor 6h-20 generates complex symbols by coding and modulating a transmitted bit string. Further, when data are received, the baseband processor 6h-20 recovers the received bit string by demodulating and decoding the baseband signal provided from the RF processor 6h-10. For example, according to the orthogonal frequency division multiplexing (OFDM) scheme, when data are transmitted, the baseband processor 6h-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 6h-20 divides the baseband signal provided from the RF processor 6h-10 in an OFDM symbol unit and recovers the signals mapped to the subcarriers by a fast Fourier transform (FFT) operation and then recovers the received bit string by the modulation and decoding.

The baseband processor 6h-20 and the RF processor 6h-10 transmit and receive a signal as described above. Therefore, the baseband processor 6h-20 and the RF processor 6h-10 may be called a transmitter, a receiver, a transceiver, or a communication unit. Further, at least one of the baseband processor 6h-20 and the RF processor 6h-10 may include a plurality of communication modules to support a plurality of different radio access technologies. Further, at least one of the baseband processor 6h-20 and the RF processor 6h-10 may include different communication modules to process signals in different frequency bands. For example, different radio access technologies may include the wireless LAN (for example: IEEE 802.11), a cellular network (for example: LTE), or the like. Further, the different frequency bands may include a super high frequency (SHF) (for example: 2 NRHz, NRhz) band, a millimeter wave (for example: 60 GHz) band.

The memory 6h-30 stores data such as basic programs, application programs, and configuration information for the operation of the terminal. In particular, the memory 6h-30 may store information associated with an access node performing wireless communication using a radio access technology. Further, the memory 6h-30 provides the stored data according to the request of the controller 6h-40.

The controller 6h-40 controls the overall operations of the terminal. For example, the controller 6h-40 transmits and receives a signal through the baseband processor 6h-20 and the RF processor 6h-10. Further, the controller 6h-40 records and reads data in and from the memory 6h-40. For this purpose, the controller 6h-40 may include at least one processor. For example, the controller 6h-40 may include a communication processor (CP) performing a control for communication and an application processor (AP) controlling an upper layer such as the application programs.

Figure 6I:
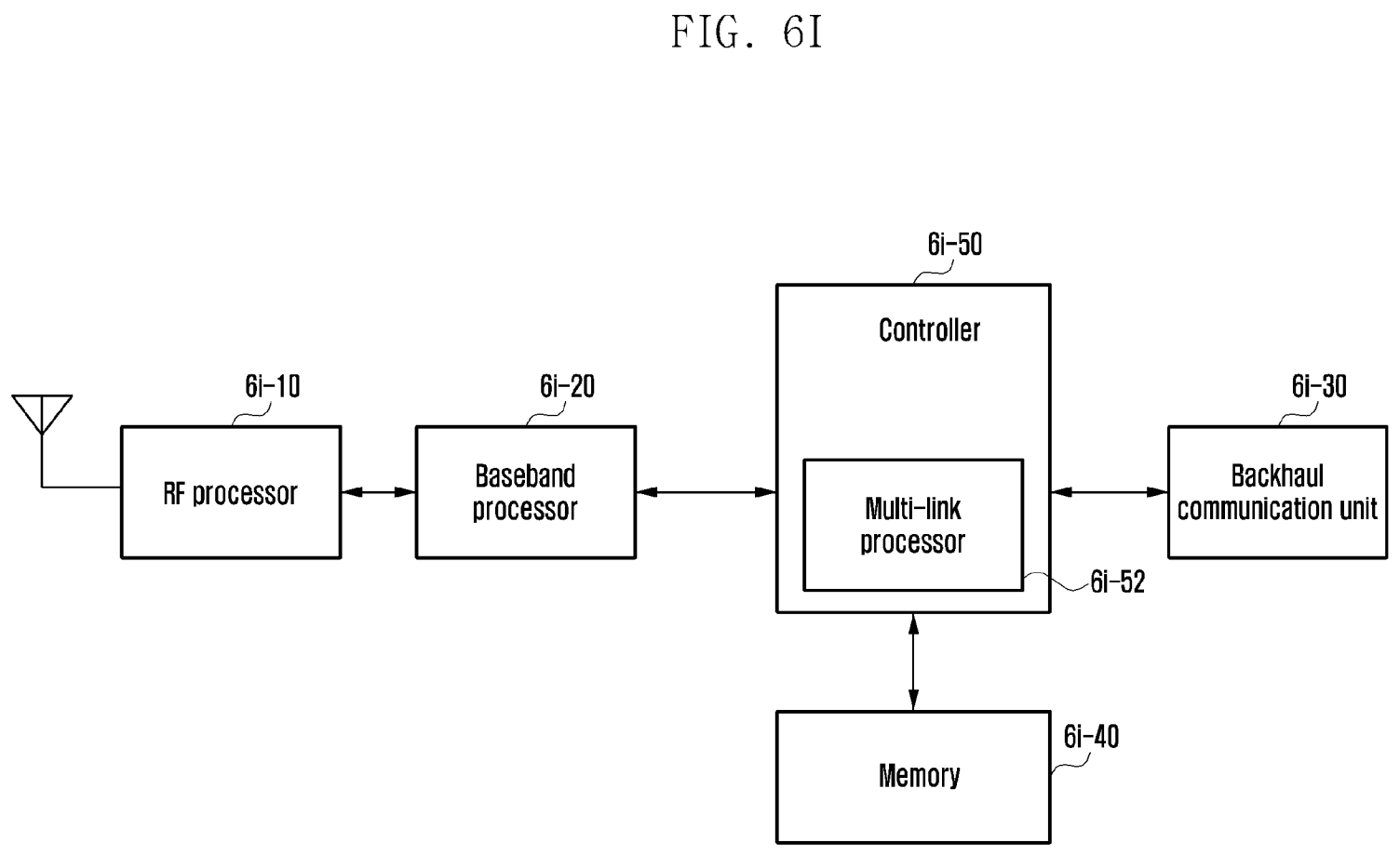

FIG. 6I is a block diagram illustrating the internal structure of the NR base station according to the sixth embodiment of the present disclosure.

As illustrated in FIG. 6I, the base station is configured to include an RF processor 6i-10, a baseband processor 6i-20, a backhaul communication unit 6i-30, a memory 6i-40, and a controller 6i-50.

The RF processor 6i-10 serves to transmit and receive a signal through a radio channel, such as band conversion and amplification of a signal. That is, the RF processor 6i-10 up-converts a baseband signal provided from the baseband processor 6i-20 into an RF band signal and then transmits the RF band signal through an antenna and down-converts the RF band signal received through the antenna into the baseband signal. For example, the RF processor 6i-10 may include a transmitting filter, a receiving filter, an amplifier, a mixer, an oscillator, a DAC, an ADC, or the like. FIG. 6I illustrates only one antenna but the base station may include a plurality of antennas. Further, the RF processor 6i-10 may include a plurality of RF chains. Further, the RF processor 6i-10 may perform the beamforming. For the beamforming, the RF processor 6i-10 may adjust a phase and a size of each of the signals transmitted/received through a plurality of antennas or antenna elements. The RF processor may perform a downward MIMO operation by transmitting one or more layers.

The baseband processor 6i-20 performs a conversion function between the baseband signal and the bit string according to the physical layer standard of the radio access technology. For example, when data are transmitted, the baseband processor 6i-20 generates complex symbols by coding and modulating a transmitted bit string. Further, when data are received, the baseband processor 6i-20 recovers the received bit string by demodulating and decoding the baseband signal provided from the RF processor 6i-10. For example, according to the OFDM scheme, when data are transmitted, the baseband processor 6i-20 generates the complex symbols by coding and modulating the transmitting bit string, maps the complex symbols to the sub-carriers, and then performs the IFFT operation and the CP insertion to configure the OFDM symbols. Further, when data are received, the baseband processor 6i-20 divides the baseband signal provided from the RF processor 6i-10 in the OFDM symbol unit and recovers the signals mapped to the sub-carriers by the FFT operation and then recovers the receiving bit string by the modulation and decoding. The baseband processor 6i-20 and the RF processor 6i-10 transmit and receive a signal as described above. Therefore, the baseband processor 6i-20 and the RF processor 6i-10 may be called a transmitter, a receiver, a transceiver, or a communication unit.

The backhaul communication unit 6i-30 provides an interface for performing communication with other nodes within the network. That is, the backhaul communication unit 6i-30 converts bit strings transmitted from the base station to other nodes, for example, an auxiliary base station, a core network, etc., into physical signals and converts the physical signals received from other nodes into the bit strings.

The memory 6i-40 stores data such as basic programs, application programs, and setting information for the operation of the base station. In particular, the memory 6i-40 may store the information on the bearer allocated to the accessed terminal, the measured results reported from the accessed terminal, etc. Further, the memory 6i-40 may store information that is a determination criterion on whether to provide a multiple connection to the terminal or stop the multiple connection to the terminal. Further, the memory 6i-40 provides the stored data according to the request of the controller 6i-50.

The controller 6i-50 controls the general operations of the base station. For example, the controller 6i-50 transmits/receives a signal through the baseband processor 6i-20 and the RF processor 6i-10 or the backhaul communication unit 6i-30. Further, the controller 6i-50 records and reads data in and from the memory 6i-40. For this purpose, the controller 6i-50 may include at least one processor. A method for selecting, by a terminal, a 2 step RACH and a 4 step RACH Consider RACH cause, radio condition, the amount of data to be transmitted, load control information According to the sixth embodiment of the present disclosure, the terminal may select the 2-step RACH or the 4-step RACH in consideration of at least one of the RACH cause, the radio condition, the amount of data to be transmitted and the load control information. An example of an operation of selecting the 2-step RACH or the 4-step RACH considering the RACH cause, the radio condition, and the load control information is as follows.

i) Load Control Information

If the success possibility of the 2 step RACH is high, the 2 step RACH is always higher than the 4 step RACH.

However, when the collision occurs, the loss (loss of both preamble and msg3) due to the 2 step RACH is larger than the loss (loss of preamble only) due to the 4 step RACH.

The base station should be able to adjust the 2 step RACH load and the 4 step RACH load.

Broadcast the 2 step RACH use probability information through the system information.

ii) Radio Condition

If the larger msg3 transmission is possible through the 2 step RACH, the 2-RACH is used if the radio condition is above a certain reference (or the 2-RACH is used only if the power headroom is above a certain reference)

iii) RACH Cause

Some of the causes are not suitable to use the 2 step RACH (in particular, when there is no msg3 to be transmitted)

The RACH based on the PDCCH order always uses the 4 step RACH.

Alternatively, if the 2-RACH is explicitly indicated in the PDCCH order, 2-RACH or otherwise 4-RACH.

Seventh Embodiment

Figure 7A:
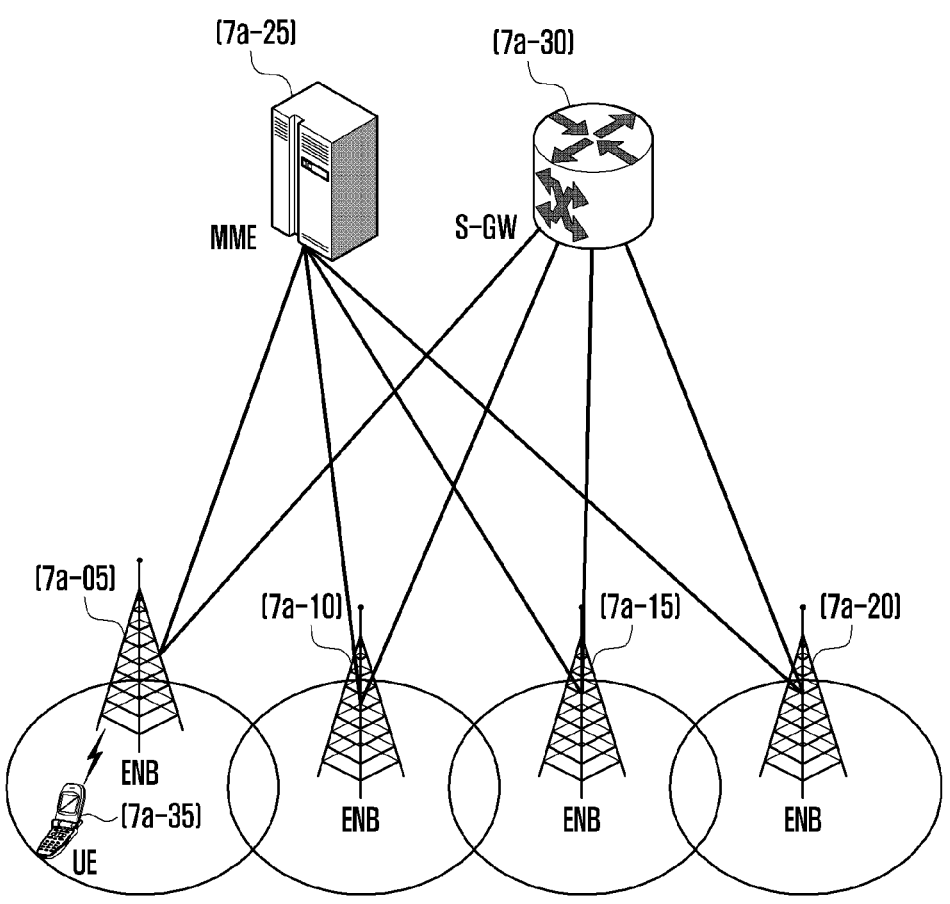
FIG. 7A is a diagram illustrating the structure of the existing LTE system.

FIG. 7A is a diagram illustrating the structure of the existing LTE system.

As illustrated in FIG. 7A, a radio access network of an LTE system is configured to include next generation base stations (evolved node B, hereinafter, ENB, Node B, or base station) 7a-05, 7a-10, 7a-15, and 7a-20, a mobility management entity (MME) 7a-25, and a serving-gateway (S-GW) 7a-30. User equipment (hereinafter, UE or terminal) 7a-35 accesses an external network through the ENBs 7a-05 to 7a-20 and the S-GW 7a-30.

In FIG. 7A, the ENBs 7a-05 to 7a-20 correspond to the existing node B of the UMTS system. The ENB is connected to the UE 7a-35 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel state of the terminals is required. Here, the ENBs 7a-05 to 7a-20 take charge of the collecting and scheduling. One ENB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz. Further, an adaptive modulation & coding (hereinafter, referred to as AMC) scheme for determining a modulation scheme and a channel coding rate depending on a channel state of the terminal is applied. The S-GW 7a-30 is an apparatus for providing a data bearer and generates or removes the data bearer according to the control of the MME 7a-25. The MME is an apparatus for performing a mobility management function for the terminal and various control functions and is connected to a plurality of base stations.

Even the next generation mobile communication system may have the structure similar to the existing LTE system.

Figure 7B:
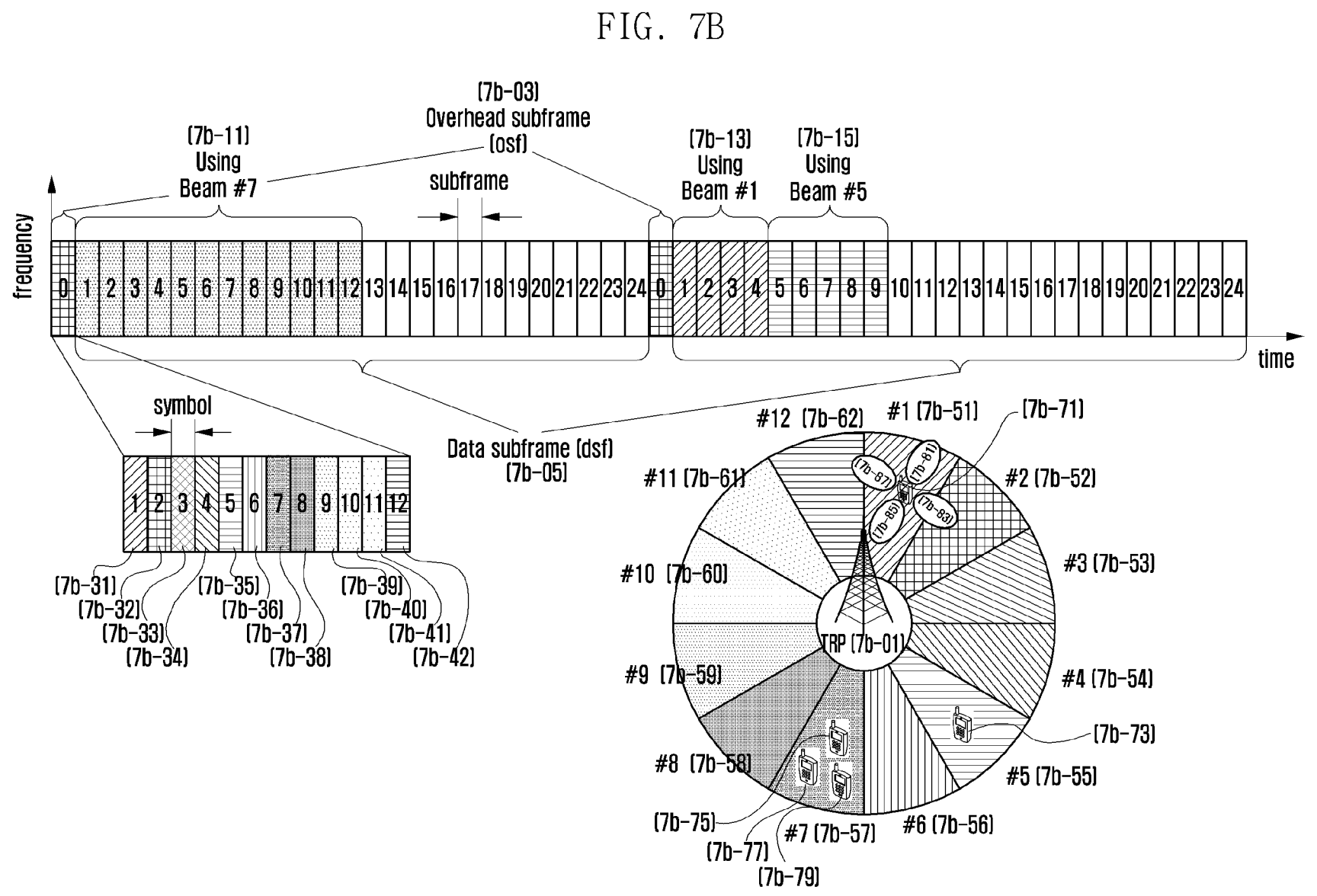

FIG. 7B is a diagram illustrating an example of a frame structure used in the next generation mobile communication according to a seventh embodiment of the present disclosure.

The NR system may consider a scenario that is operated at a high frequency to secure a wide frequency bandwidth for a high transmission speed and a scenario that generates a beam to transmit data because of difficulty in a signal transmission at a high frequency.

Accordingly, a scenario of performing communication using different beams when the base station or a transmission/reception point (TRP) 7b-01 communicates with terminals 7b-71, 7b-73, 7b-75, 7b-77, and 7b-79 in a cell may be considered. That is, in FIG. 7B, a scenario to allow the terminal 1 7b-71 to perform communication using beam #1 7b-51 and the terminal 2 7b-73 to perform communication using beam #5 7b-55, and the terminal 3, 4, and 5 7b-75, 7b-77, and 7b-79 to perform communication using beam #7 7b-57 is assumed.

To measure which beam the terminal uses to communicate with the TRP, an overhead subframe (osf) 7b-03 exists in time. In the osf, the base station transmits symbols transmits a reference signal using different beams by symbol (or over several symbols). A beam index value for identifying each beam from the reference signal may also be derived. In FIG. 7B, it is assumed that the beam transmitted by the base station includes 12 beams from #1 7b-51 to #12 7b-62 and in the osf, different beams are transmitted while being swept every symbol (7b-31 to 7b-42). That is, each beam is transmitted by each symbol (for example, transmission of the beam #1 7b-51), and thus the terminal may measure which of the signals from which of the beams transmitted within the osf is strongest.

In FIG. 7B, a scenario in which the corresponding osf is repeated every 25 subframes is assumed, and the remaining 24 subframes are a data subframe (dsf) 7b-05 in which general data are transmitted and received.

A scenario to allow the terminals 3, 4, 5 7b-75, 7b-77, and 7b-79 to perform communication using the beam #7 in common according to the scheduling of the base station (7b-11), the terminal 7b-71 to perform communication using the beam #1, the terminal 2 7b-73 to perform communication using the beam 35 is assumed (7b-15).

FIG. 7B mainly illustrates the transmission beam #1 7b-51 to the transmission beam #12 7b-62 of the base station, but may additionally consider the reception beam (for example, (7b-81) (7b-83) (7b-85) and (7b-87) of the terminal 1 7b-71) of the terminal for receiving the transmission beam of the base station. In FIG. 7B, the terminal 1 has four beams 7b-81, 7b-83, 7b-85, and 7b-87 and may perform beam sweeping to determine which beam has the best reception performance. At this time, if a plurality of beams may not be used at the same time, one reception beam may be used for each osf and thus several osf are received as many as the number of reception beams, such that the transmission beam of the base station and the reception beam of the terminal may be found.

When reviewing the frame structure in which the plurality of beams are configured, it takes a long time to measure both the beams of the same TRP and the beams of the adjacent TRP or the cell. Therefore, a delay may occur in initiating an operation performed based on the cell measurement result.

Figure 7C:
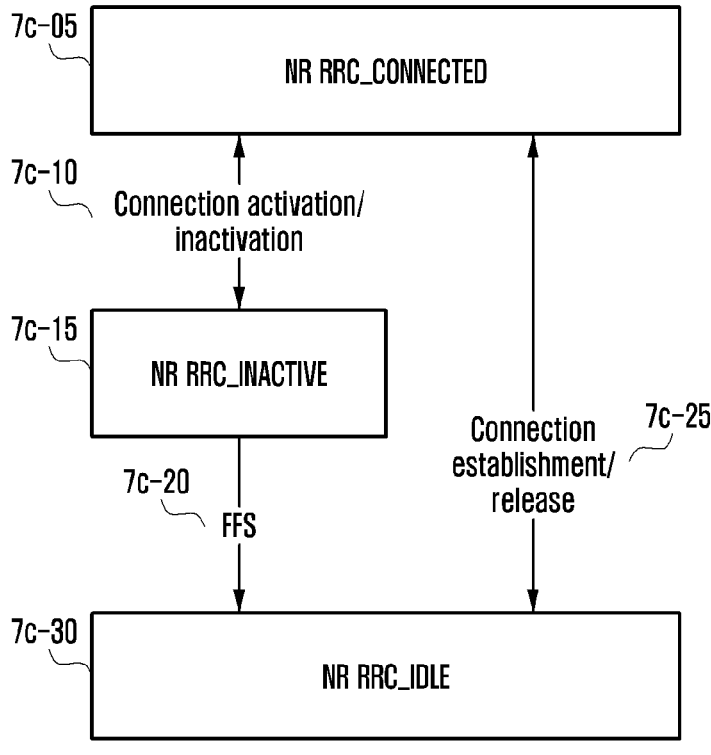
FIG. 7C is a diagram for explaining a radio connection state transition in the next generation mobile communication system according to a seventh embodiment of the present disclosure.

FIG. 7C is a diagram for explaining a radio connection state transition in the next generation mobile communication system according to a seventh embodiment of the present disclosure.

In the next generation mobile communication system, there are three radio connection states (RRC states). The connected mode (RRC_CONNECTED, 7c-05) is the radio connection state in which the terminal may transmit and receive data. The standby mode (RRC IDLE, 7c-30) is the radio connection state in which the terminal monitors whether paging is transmitted to the terminal itself. The above two modes are the radio connection state applied to the existing LTE system, and the detailed description thereof is the same as that of the existing LTE system. In the next generation mobile communication system, a new RRC INACTIVE radio connection state 7c-15 is defined. In the radio connection state, the UE context is maintained in the base station and the terminal, and the RAN based paging is supported. The features of the new radio connection state are listed below.

Cell re-selection mobility;

CN-NR RAN connection (both C/U-planes) has been established for UE;

The UE AS context is stored in at least one gNB and the UE;

Paging is initiated by NR RAN;

RAN-based notification area is managed by NR RAN;

NR RAN knows the RAN-based notification area which the UE belongs to;

The new INACTIVE radio connection state may a specific procedure and thus may be transited to the connected mode or the standby mode. According to the connection activation, the mode is switched from the INACTIVE mode to the connected mode, and is switched from the connected mode to the INACTIVE mode using the connection inactivation procedure (7c-10). The Connection activation/inactivation procedure transmits/receives at least one RRC message between the terminal and the base station and includes at least step. In addition, according to the specific procedure, the INACTIVE MODE can be switched to the standby mode (7c-20). The above-mentioned specific procedures may take into account various methods such as a specific message exchange or timer based or event based. The switching between the connected mode and the standby mode follows the existing LTE technology. That is, the switching between the connected mode and the standby mode is performed through the connection establishment or release procedure (7c-25).

Figure 7D:
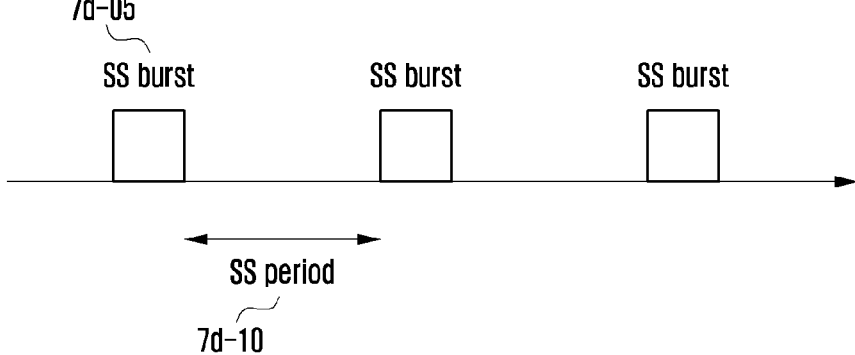
FIG. 7D is a diagram for explaining a synchronization signal transmission in the next generation mobile communication system according to a seventh embodiment of the present disclosure.

FIG. 7D is a diagram for explaining a synchronization signal transmission in the next generation mobile communication system according to a seventh embodiment of the present disclosure.

In the next generation mobile communication system, the base station transmits a dedicated synchronization signal for synchronization between the terminal and the base station. The difference from the existing LTE technology is that the synchronization signal may also be used as the reference signal for the cell measurement. The synchronization signal is transmitted through an SS burst consisting of one or more synchronization signal, and the SS burst 7d-05 is periodically transmitted with a specific period 7d-10. In the figure, the SS bursts are concatenated, but the synchronization signal belonging to the SS burst may be configured with a specific time interval.

Figure 7E:
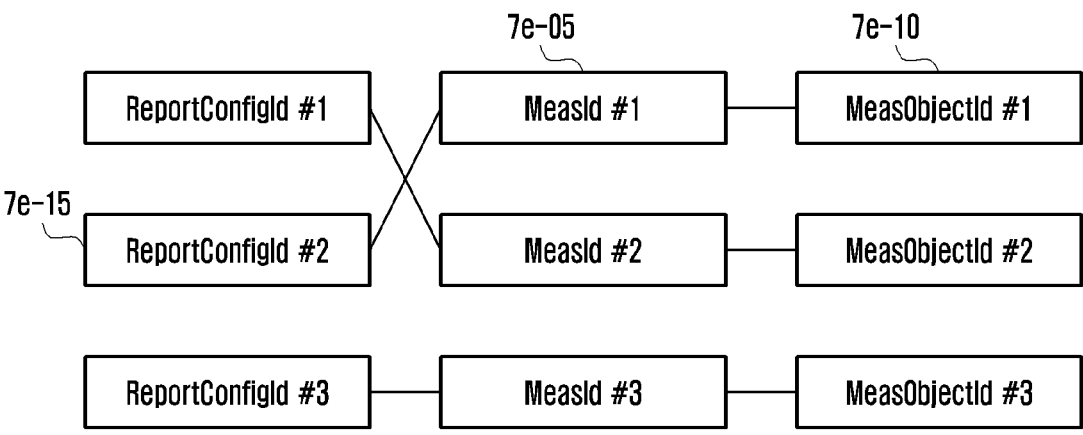
FIG. 7E is a diagram for explaining a method for configuring cell measurement setup information in the existing LTE system.

FIG. 7E is a diagram for explaining a method for configuring cell measurement setup information in then existing LTE system.

In the existing LTE system, the cell measurement may be set in the terminal in the connected mode. In this case, the configuration information is formed using measId 7e-05, measObjectId 7e-10, and reportConfigId 7e-15. The measId is linked to one measObjectId and one reportConfigId. The following shows information to allow the base station to set a plurality of measId in a specific terminal. It may be identified that each measId is linked to one measObjecId and reportConfigId. The following information is described in the 3GPP standard document TS36.331.

```
MeasIdToAddModList ::=    SEQUENCE (SIZE (1..maxMeasId)) OF MeasIdToAddMod
MeasIdToAddMod ::= SEQUENCE {
        measId                          MeasId,
        measObjectId                    MeasObjectId,
        reportConfigId                  ReportConfigId
}
```

The measObjectId indicates frequency information to be measured, and the reportConfigId indicates information related to the measurement report. The measObjecId corresponds to one of measObjectEUTRA, measObjectUTRA, measObjectGERAN, and measObjectCDMA2000 IE (Information Element). For example, the measObjectEUTRA IE related to the LTE frequency has the following configuration information. The measObjectEUTRA IE includes the center frequency information (carrierFreq IE), the maximum measurement frequency bandwidth (allowdMeasBandwidth), and the like. The following information is described in the 3GPP standard document TS36.331.

```
MeasObjectEUTRA ::=        SEQUENCE {
        carrierFreq                     ARFCN-ValueEUTRA,
        allowedMeasBandwidth AllowedMeasBandwidth,
        presence AntennaPort1  Presence AntennaPort1,
        neighCellConfig            NeighCellConfig,
        offsetFreq                      Q-OffsetRange          DEFAULT dB0,
        -- Cell list
        cellsToRemoveList               CellIndexList                OPTIONAL,
        -- Need ON
        cellsToAddModList               CellsToAddModList            OPTIONAL,
        -- Need ON
        -- Black list
        blackCellsToRemoveList          CellIndexList                OPTIONAL,
        -- Need ON
```

-continued

| blackCellsToAddModList -- Need ON | BlackCellsToAddModList | OPTIONAL, |
|---|---|---|
| cellForWhichToReportCGI -- Need ON | PhysCellId | OPTIONAL, |
| } | | |

The reportConfigId corresponds to one of reportConfigEUTRA and reportConfigInterRAT, and the reportConfigEUTRA IE related to the LTE has the following configuration information. The following information is described in the 3GPP standard document TS36.331.

```
ReportConfigEUTRA ::=        SEQUENCE {
        triggerType                  CHOICE {
              event                          SEQUENCE {
                        eventId                            CHOICE {
                                eventA1                               SEQUENCE {
                                        a1-Threshold
        ThresholdEUTRA
                                },
                                eventA2                               SEQUENCE {
                                        a2-Threshold
        ThresholdEUTRA
                                },
                                eventA3                               SEQUENCE {
                                        a3-Offset                              INTEGER (-
30..30),
                                        reportOnLeave             BOOLEAN
                                },
                                eventA4                               SEQUENCE {
                                        a4-Threshold
        ThresholdEUTRA
                                },
                                eventA5                               SEQUENCE {
                                        a5-Threshold1
        ThresholdEUTRA,
                                        a5-Threshold2
        ThresholdEUTRA
                                },
                                ...,
                                eventA6-r10                          SEQUENCE {
                                        a6-Offset-r10                         INTEGER (-
30..30),
                                        a6-ReportOnLeave-r10      BOOLEAN
                                },
                                eventC1-r12                          SEQUENCE {
                                        c1-Threshold-r12
        ThresholdEUTRA-v1250,
                                        c1-ReportOnLeave-r12                  BOOLEAN
                                },
                                eventC2-r12                          SEQUENCE {
                                        c2-RefCSI-RS-r12                      MeasCSI-
RS-Id-r12,
                                        c2-Offset-r12                         INTEGER (-
30..30),
                                        c2-ReportOnLeave-r12      BOOLEAN
                                }
                        },
                        hysteresis                         Hysteresis,
                        timeToTrigger                      TimeToTrigger
              },
              periodical                                   SEQUENCE {
                        purpose                            ENUMERATED {
        reportStrongestCells, reportCGI}
              }
        },
        triggerQuantity              ENUMERATED {rsrp, rsrq},
        reportQuantity                ENUMERATED { sameAsTriggerQuantity,
both},
```

-continued

```
    maxReportCells        INTEGER (1 .. maxCellReport),
    reportInterval            ReportInterval,
    reportAmount            ENUMERATED {r1, r2, r4, r8, r16, r32, r64,
infinity},
}
```

The configuration information includes additionally defined IEs according the LTE version as one example, and the description thereof is omitted in the present disclosure. The base station may provide one or more measObjecId and reportConfigId to the terminal.

If the report condition indicated in the ReportConfigId is satisfied, the terminal reports the measured information to the base station. In this case, the measId is included together with the measurement information. Since the measId is linked to one measObjectId and one reportConfigId, the base station may easily understand the collected measurement information based on any reference at any frequency only by the reported measId.

In the embodiment of the present disclosure, in the next generation mobile communication system, the cell measurement is performed in the newly defined INACTIVE state, and when the connected mode is switched, it is reported to the base station and the cell measurement based operations may be performed without delay. As described above, in the beam based operation, the cell measurement requires the longer time compared with the LTE system, which may cause the delay phenomenon on the operations performed based on the cell measurement information such as carrier aggregation (CA). Therefore, in the present disclosure, the terminal is set to measure the frequency designated in the INACTIVE state, and when the connected mode is switched, reports the measured frequency. The reported cell measurement information will be utilized to quickly determine and set the operations that require cell measurement information such as CA.

Figure 7F:
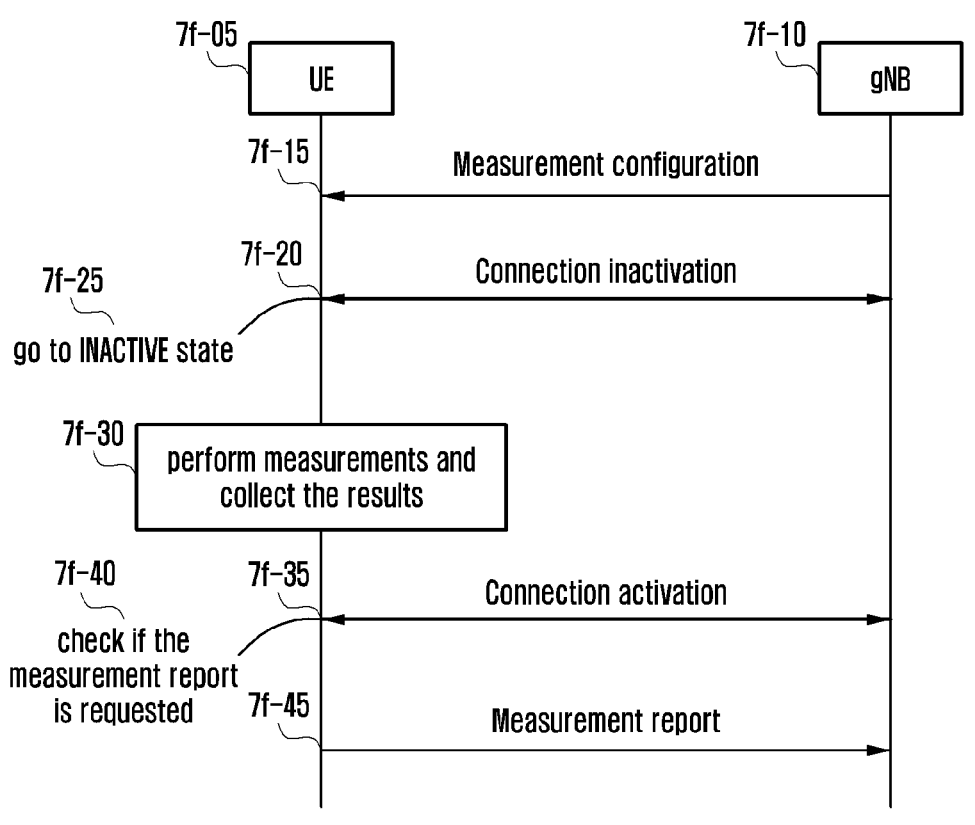
FIG. 7F is a diagram for describing a signaling flow chart according to a seventh embodiment of the present disclosure.

FIG. 7F is a diagram for describing a signaling flow chart according to a seventh embodiment of the present disclosure.

When the terminal is switched to the INACTIVE state from the base station 7f-10 to the INACTIVE state, the connected mode terminal 7f-05 receives the configuration information related to the cell measurement to be performed in the state (7f-15). The configuration information is transmitted through a specific RRC message and may be included in a specific RRC message used in the Connection inactivation procedure. The specific configuration of the configuration information will be described later in detail. The configuration information includes one validity timer. The base station switches the terminal from the connected mode to the INACTIVE mode through the connection inactivation procedure (7f-20). The connection inactivation procedure uses one or more RRC messages, and includes one or more steps. The base station switches the terminal from the connected mode to the INACTIVE mode through the connection inactivation procedure (7f-25). The terminal measures and stores the beams of the serving and neighboring TRPs or the cell for a specific time interval (7f-30). The measurement is performed by measuring the intensity of the synchronization signal described above. The terminal determines at least one best beam for each frequency indicated by the measObject, measures the best beam, and stores the result processed by a predetermined method. The stored information is retained by the terminal until the validity timer expires, but is deleted after the expiration. Alternatively, the previous measurement results may be retained until a new valid measurement result is collected. The base station switches the terminal from the INACTIVE mode to the connected mode through the connection activation procedure (7f-35). The connection inactivation procedure uses one or more RRC messages, and includes one or more steps. The base station may use the specific RRC message in the connection activation procedure to request the terminal to report the cell measurement information collected in the INACTIVE mode. The terminal determines whether there is the request from the base station in the connection activation procedure (7f-40). The terminal reports the collected cell measurement result to the base station (7f-45). At this time, the report includes at least one measId together with the cell measurement result.

Figure 7G:
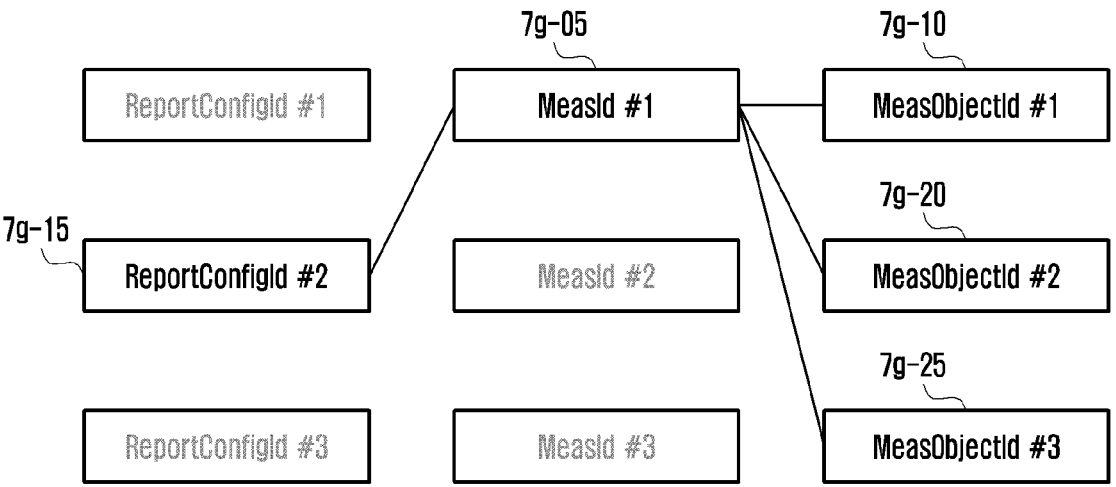
FIG. 7G is a diagram for explaining a method for configuring cell measurement setup information according to the seventh embodiment of the present disclosure.

FIG. 7G is a diagram for explaining a method for configuring cell measurement setup information according to the seventh embodiment of the present disclosure.

In the embodiment of the present disclosure, one measId (7g-05) is linked with a plurality of measObjectId 7g-10, 7g-20, and 7g-25. In the INACTIVE mode, a plurality of frequencies will be measured while the same reportConfigId is applied (7g-15). Therefore, allocating the measId for each frequency like the existing LTE system causes only the signaling overhead. Therefore, if one measId links a plurality of measObjectId and one reportConfigId, unnecessary signaling overhead may be reduced.

Figure 7H:
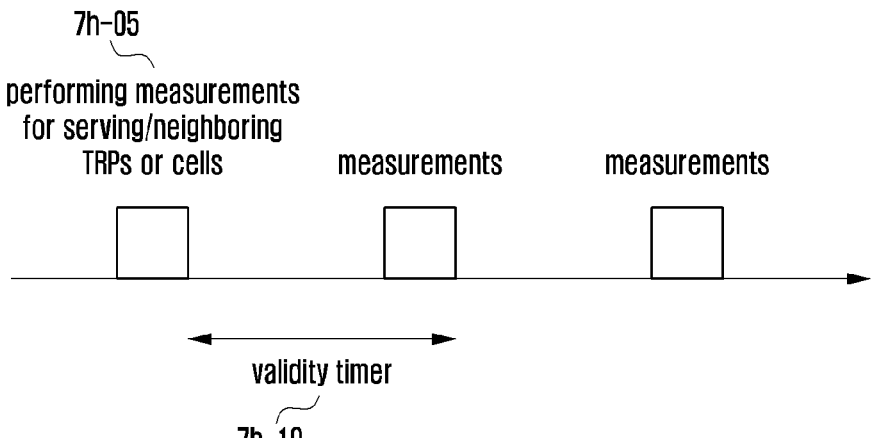
FIG. 7H is a diagram for explaining a method for managing cell measurement setup information according to the seventh embodiment of the present disclosure.

FIG. 7H is a diagram for explaining a method for managing cell measurement setup information according to the seventh embodiment of the present disclosure.

The terminal measures the beams of the serving/neighboring TRPs or the cells for the frequency indicated by the measObjectId for a particular measurement time interval (7h-05). At least one best beam is measured for each frequency and processed according to a predetermined method to derive the final measurement result. The predetermined method may be a signal intensity average value of a plurality of beams, a weighted average, a sum or the like, and the processing method may be applied or not applied to each layer such as L1 and L3. If the collection of the measurement result is completed, the result is stored, and one validity timer is operated (7h-10). The stored result is retained until the timer expires, and the result is deleted upon the expiration. Since the measurement time period is repeated periodically, a new measurement result is generated. Therefore, if the new measurement result is generated, the previous result may be deleted even if the timer does not expire. Alternatively, the previous results may be maintained without being deleted until the new measurement result is generated. The validity timer is predefined or set from the base station.

Figure 7I:
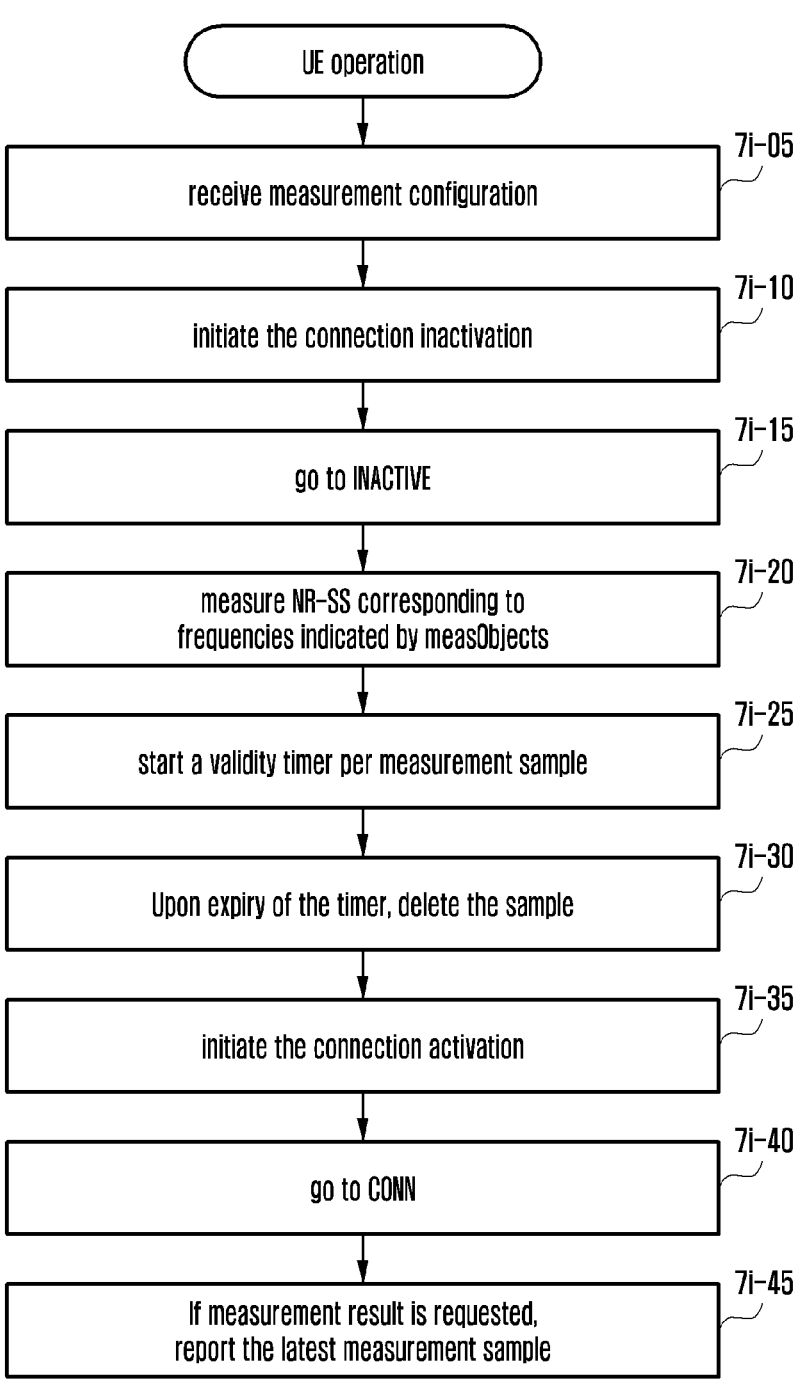
FIG. 7I is a diagram for explaining the operation of the terminal according to the seventh embodiment of the present disclosure.

FIG. 7I is a diagram for explaining the operation of the terminal according to the seventh embodiment of the present disclosure.

In step 7i-05, the connected mode terminal receives the configuration information related to the cell measurement from the base station. In step 7i-10, the terminal receives the connection inactivation procedure from the base station. In step 7*i*-15, the terminal is switched from the connected mode to the INACTIVE mode. In step 7*i*-20, the terminal performs the cell measurement on the frequency indicated by the measObjectId. In step 7*i*-25, the cell measurement result is recorded, and at the same time one validity timer is driven. In step 7*i*-30, if the validity timer expires or the new cell measurement result is derived, the previous recorded result is deleted. In step 7*i*-35, the connection activation procedure is set from the base station. In step 7*i*-40, the terminal is switched from the INACTIVE mode to the connected mode. In step 7*i*-45, the terminal determines whether there is the report request for the cell measurement information from the base station, and reports the most recently stored measurement result to the base station.

Figure 7J:
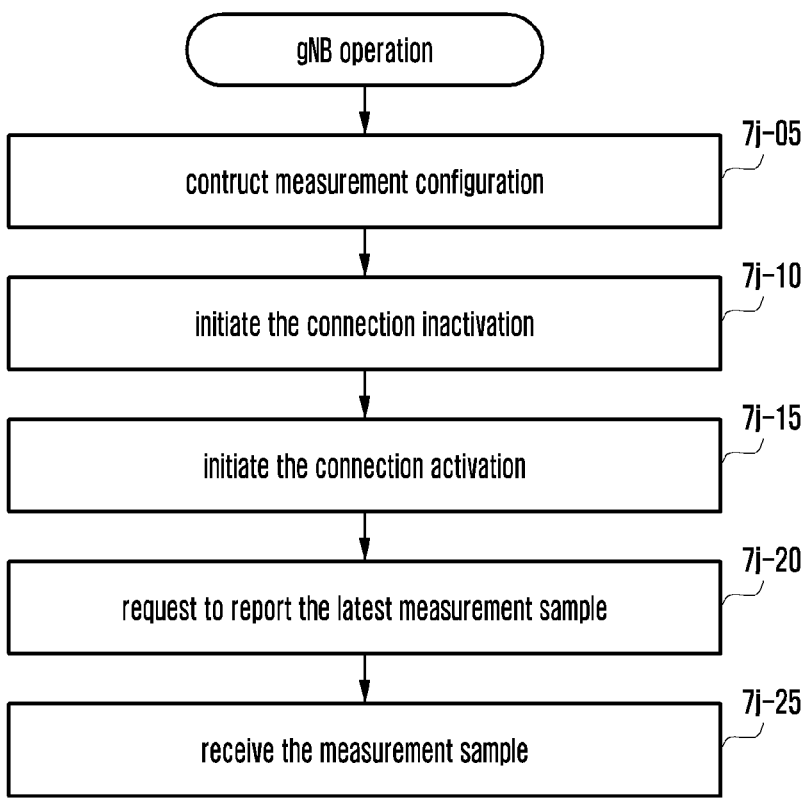
FIG. 7J is a diagram for explaining the operation of the base station according to the seventh embodiment of the present disclosure.

FIG. 7J is a diagram for explaining the operation of the base station according to the seventh embodiment of the present disclosure.

In step 7*j*-05, the base station forms the configuration information related to the cell measurement to be performed by the specific terminal in the INACTIVE state, as described with reference to FIG. 7G. In step 7*j*-10, the base station initiates the connection inactivation procedure to switch the terminal in the connected mode state to the INACTIVE state. In step 7*j*-15, the base station initiates the connection inactivation procedure to switch the terminal in the connected mode state to the connected mode. In step 7*j*-20, the base station requests the terminal to report the collected cell measurement result. In step 7*j*-25, the base station reports the cell measurement result from the terminal.

Figure 7K:
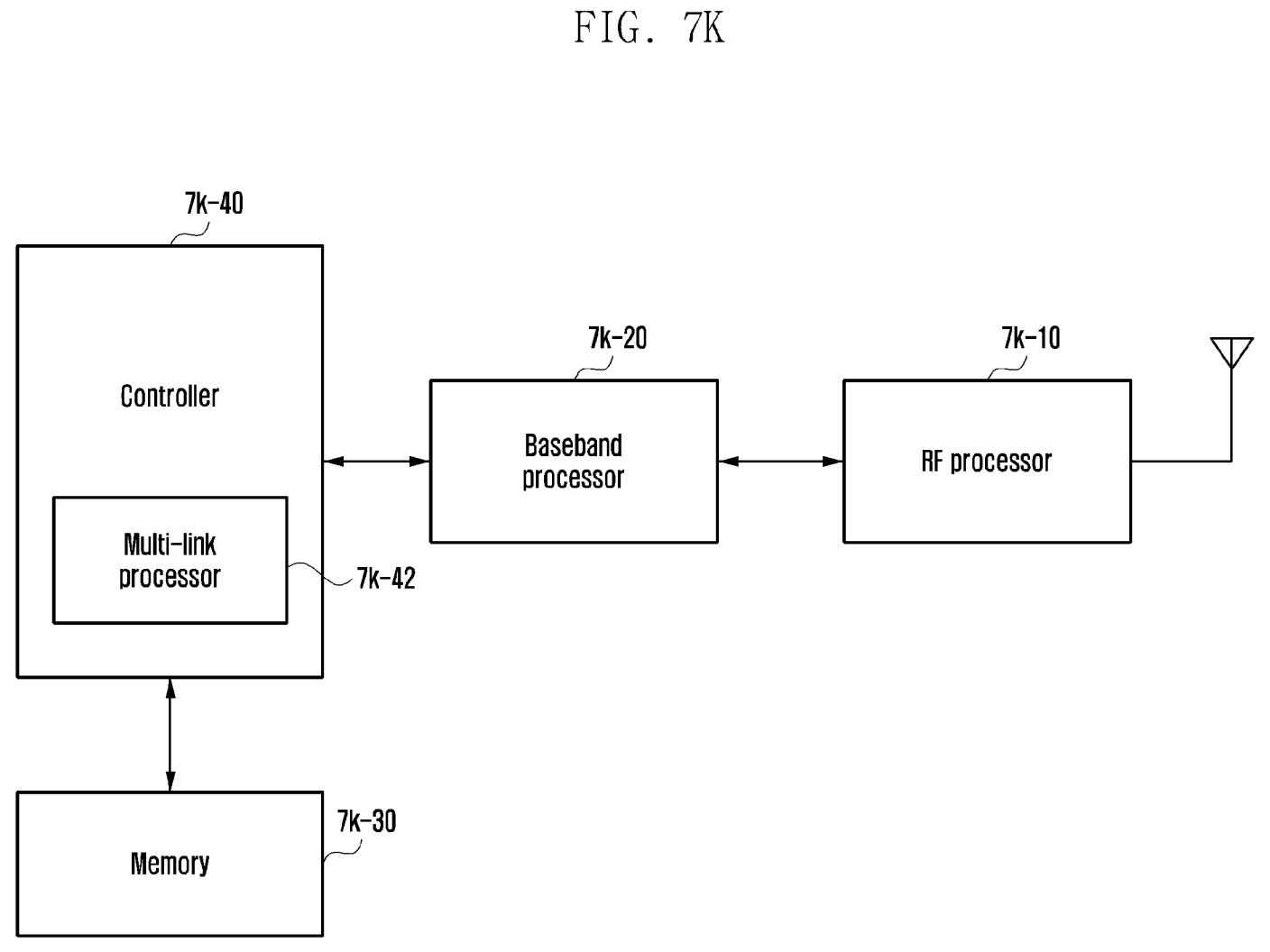

FIG. 7K illustrates the internal structure of the terminal according to the seventh embodiment of the present disclosure.

Referring to FIG. 7K, the terminal includes a radio frequency (RF) processor 7*k*-10, a baseband processor 7*k*-20, a memory 7*k*-30, and a controller 7*k*-40.

The RF processor 7*k*-10 serves to transmit and receive a signal through a radio channel, such as band conversion and amplification of a signal. That is, the RF processor 7*k*-10 up-converts a baseband signal provided from the baseband processor 7*k*-20 into an RF band signal and then transmits the RF band signal through an antenna and down-converts the RF band signal received through the antenna into the baseband signal. For example, the RF processor 7*k*-10 may include a transmitting filter, a receiving filter, an amplifier, a mixer, an oscillator, a digital to analog converter (DAC), an analog to digital converter (ADC), or the like. FIG. 7K illustrates only one antenna but the terminal may include a plurality of antennas. Further, the RF processor 7*k*-10 may include a plurality of RF chains. Further, the RF processor 7*k*-10 may perform beamforming. For the beamforming, the RF processor 7*k*-10 may adjust a phase and a size of each of the signals transmitted and received through a plurality of antennas or antenna elements. In addition, the RF processor may perform MIMO and may receive a plurality of layers when performing a MIMO operation.

The baseband processor 7*k*-20 performs a conversion function between a baseband signal and a bit string according to a physical layer standard of a system. For example, when data are transmitted, the baseband processor 7*k*-20 generates complex symbols by coding and modulating a transmitted bit string. Further, when data are received, the baseband processor 7*k*-20 recovers the received bit string by demodulating and decoding the baseband signal provided from the RF processor 7*k*-10. For example, according to the orthogonal frequency division multiplexing (OFDM) scheme, when data are transmitted, the baseband processor 7*k*-20 generates the complex symbols by coding and modulating the transmitting bit string, maps the complex symbols to sub-carriers, and then performs an inverse fast Fourier transform (IFFT) operation and a cyclic prefix (CP) insertion to construct the OFDM symbols. Further, when data are received, the baseband processor 7*k*-20 divides the baseband signal provided from the RF processor 7*k*-10 in an OFDM symbol unit and recovers the signals mapped to the sub-carriers by a fast Fourier transform (FFT) operation and then recovers the received bit string by the modulation and decoding.

The baseband processor 7*k*-20 and the RF processor 7*k*-10 transmit and receive a signal as described above. Therefore, the baseband processor 7*k*-20 and the RF processor 7*k*-10 may be called a transmitter, a receiver, a transceiver, or a communication unit. Further, at least one of the baseband processor 7*k*-20 and the RF processor 7*k*-10 may include a plurality of communication modules to support a plurality of different radio access technologies. Further, at least one of the baseband processor 7*k*-20 and the RF processor 7*k*-10 may include different communication modules to process signals in different frequency bands. For example, different radio access technologies may include the wireless LAN (for example: IEEE 802.11), a cellular network (for example: LTE), or the like. Further, different frequency bands may include a super high frequency (SHF) (for example: 2.5 GHz, 5 GHz) band, a millimeter wave (for example: 60 GHz) band.

The memory 7*k*-30 stores data such as basic programs, application programs, and configuration information for the operation of the terminal. In particular, the memory 7*k*-30 may store information associated with an access node performing wireless communication using a radio access technology. Further, the memory 7*k*-30 provides the stored data according to the request of the controller 7*k*-40.

The controller 7*k*-40 controls the overall operations of the terminal. For example, the controller 7*k*-40 transmits and receives a signal through the baseband processor 7*k*-20 and the RF processor 7*k*-10. Further, the controller 7*k*-40 records and reads data in and from the memory 7*k*-50. For this purpose, the controller 7*k*-40 may include at least one processor. For example, the controller 7*k*-40 may include a communication processor (CP) performing a control for communication and an application processor (AP) controlling a higher layer such as the application programs.

Figure 7L:
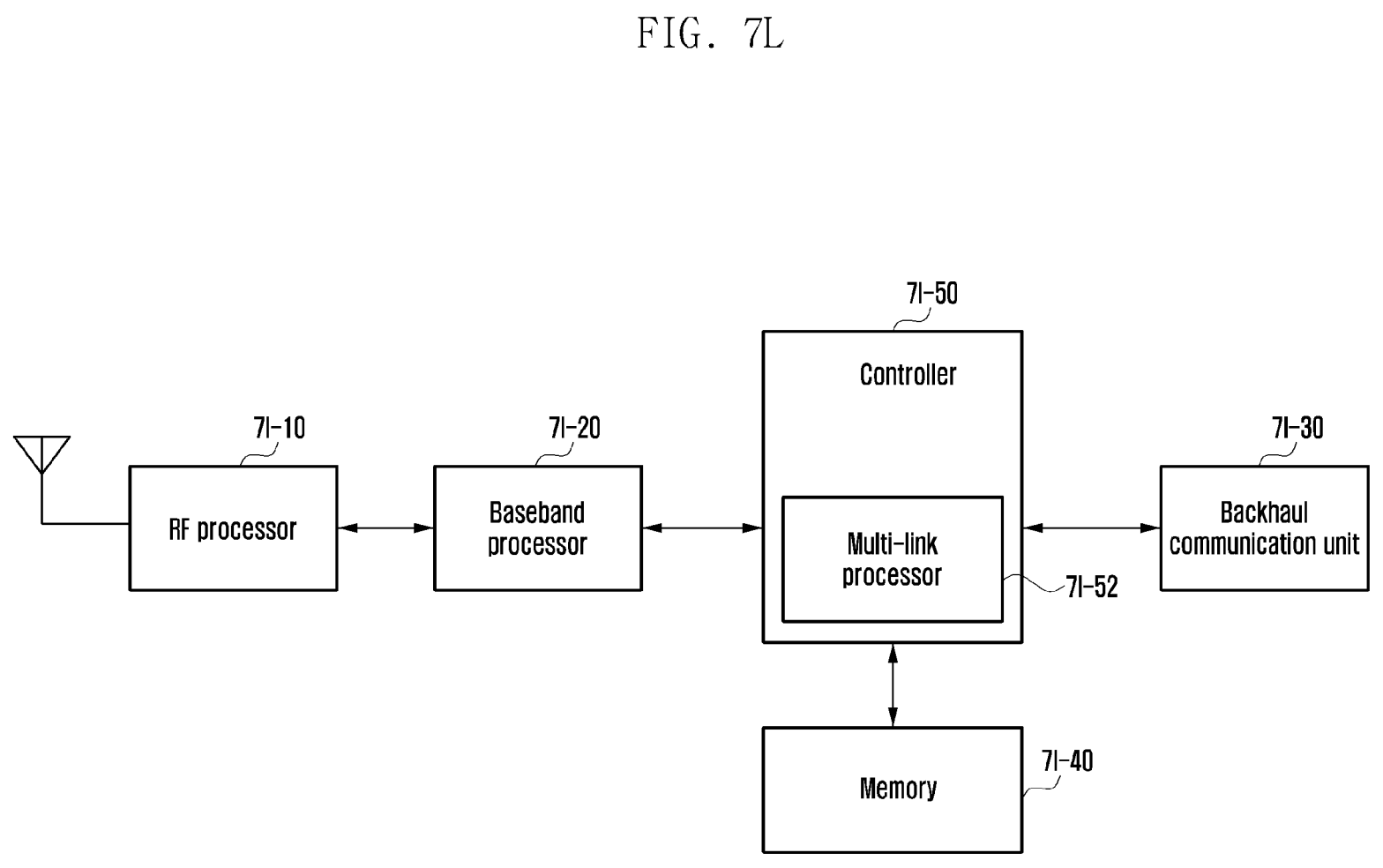

FIG. 7L is a diagram for explaining the operation of the terminal according to the seventh embodiment of the present disclosure.

As illustrated in FIG. 7L, the base station is configured to include an RF processor 7*l*-10, a baseband processor 7*l*-20, a backhaul communication unit 7*l*-30, a memory 7*l*-40, and a controller 7*l*-50.

The RF processor 7*l*-10 serves to transmit/receive a signal through a radio channel, such as band conversion and amplification of a signal. That is, the RF processor 7*l*-10 up-converts a baseband signal provided from the baseband processor 7*l*-20 into an RF band signal and then transmits the baseband signal through an antenna and down-converts the RF band signal received through the antenna into the baseband signal. For example, the RF processor 7*l*-10 may include a transmitting filter, a receiving filter, an amplifier, a mixer, an oscillator, a DAC, an ADC, etc. FIG. 7I illustrates only one antenna but the base station may include a plurality of antennas. Further, the RF processor 7*l*-10 may include the plurality of RF chains. Further, the RF processor 7*l*-10 may perform the beamforming. For the beamforming, the RF processor 7*l*-10 may adjust a phase and a size of each of the signals transmitted and received through a plurality of antennas or antenna elements. The RF processor may perform a downward MIMO operation by transmitting one or more layers.

The baseband processor 7*l*-20 performs a conversion function between the baseband signal and the bit string according to the physical layer standard of the first radio access technology. For example, when data are transmitted, the baseband processor 7*l*-20 generates complex symbols by coding and modulating a transmitting bit string. Further, when data are received, the baseband processor 7*l*-20 recovers the received bit string by demodulating and decoding the baseband signal provided from the RF processor 7*l*-10. For example, according to the OFDM scheme, when data are transmitted, the baseband processor 7*l*-20 generates the complex symbols by coding and modulating the transmitting bit string, maps the complex symbols to the sub-carriers, and then performs the IFFT operation and the CP insertion to configure the OFDM symbols. Further, when data are received, the baseband processor 7*l*-20 divides the baseband signal provided from the RF processor 7*l*-10 in an OFDM symbol unit and recovers the signals mapped to the sub-carriers by an FFT operation and then recovers the receiving bit string by the modulation and decoding. The baseband processor 7*l*-20 and the RF processor 7*l*-10 transmit and receive a signal as described above. Therefore, the baseband processor 7*l*-20 and the RF processor 7*l*-10 may be called a transmitter, a receiver, a transceiver, a communication unit, or a wireless communication unit.

The backhaul communication unit 7*l*-30 provides an interface for performing communication with other nodes within the network. That is, the backhaul communication unit 7*l*-30 converts bit strings transmitted from the main base station to other nodes, for example, an auxiliary base station, a core network, etc., into physical signals and converts the physical signals received from other nodes into the bit strings.

The memory 7*l*-40 stores data such as basic programs, application programs, and setting information for the operation of the main base station. In particular, the memory 7*l*-40 may store the information on the bearer allocated to the accessed terminal, the measured results reported from the accessed terminal, etc. Further, the memory 7*l*-40 may store information that is a determination criterion on whether to provide a multiple connection to the terminal or stop the multiple connection to the terminal. Further, the memory 7*l*-40 provides the stored data according to the request of the controller 7*l*-50.

The controller 7*l*-50 controls the general operations of the main base station. For example, the controller 7*l*-50 transmits/receives a signal through the baseband processor 7*l*-20 and the RF processor 7*l*-10 or the backhaul communication unit 7*l*-30. Further, the controller 7*l*-50 records and reads data in and from the memory 7*l*-40. For this purpose, the controller 7*l*-50 may include at least one processor.

In the detailed embodiments of the present disclosure, components included in the present disclosure are represented by a singular number or a plural number according to the detailed embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural.

Although the exemplary embodiments of the present disclosure have been disclosed for illustrative purposes, various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a source base station, a first message comprising conditional handover configuration information, the conditional handover configuration information comprising information on at least one candidate target cell, information on at least one execution condition for a conditional handover of the at least one candidate target cell, and information on a T304 timer;
   identifying a target cell in case that the at least one execution condition for the target cell among the at least one candidate target cell is fulfilled;
   starting the T304 timer, in case that the at least one execution condition is fulfilled; and
   transmitting, to a target base station to which the target cell belongs, a second message for completion of the conditional handover to the target cell.

2. The method of claim 1,
   wherein the at least one candidate target cell belongs to at least one candidate target base station.

3. The method of claim 1, further comprising:
   stopping the T304 timer based on a successful completion of the conditional handover.

4. The method of claim 1,
   wherein the first message includes a radio resource control (RRC) reconfiguration message, and
   wherein the at least one execution condition comprises at least one of at least one measurement result of the at least one candidate target cell becomes a predetermined offset better than a measurement result of a primary cell, or the measurement result of the primary cell becomes worse than a first threshold and the at least one measurement result of the at least one candidate target cell becomes better than a second threshold.

5. The method of claim 1, further comprising:
   receiving, from the source base station, a third message including measurement configuration information for a measurement; and
   transmitting, to the source base station, a fourth message including measurement result based on the measurement configuration information,
   wherein the measurement configuration information comprises information on at least one measurement object and information on at least one measurement report configuration, and
   wherein the third message includes a radio resource control (RRC) reconfiguration message.

6. A method performed by a source base station in a wireless communication system, the method comprising:
   transmitting, to a terminal, a first message comprising conditional handover configuration information, the conditional handover configuration information comprising information on at least one candidate target cell, information on at least one execution condition for a conditional handover of the at least one candidate target cell, and information on a T304 timer;

receiving, from a target base station to which a target cell belongs, a second message indicating that the terminal has successfully accessed the target cell; and releasing resources associated to a terminal context, wherein the T304 timer is started on the terminal, in case that the at least one execution condition for the target cell among the at least one candidate target cell is fulfilled.

7. The method of claim 6, wherein the first message includes a radio resource control (RRC) reconfiguration message, and wherein the at least one execution condition comprises at least one of at least one measurement result of the at least one candidate target cell becomes a predetermined offset better than a measurement result of a primary cell, or the measurement result of the primary cell becomes worse than a first threshold and the at least one measurement result of the at least one candidate target cell becomes better than a second threshold.

8. The method of claim 6, wherein the at least one candidate target cell belongs to at least one candidate target base station.

9. The method of claim 6, wherein the transmitting the first message further comprises:

transmitting, to the terminal, a third message including measurement configuration information for a measurement;

receiving, from the terminal, a fourth message including measurement result based on the measurement configuration information;

determining whether to use the conditional handover based on the measurement result;

transmitting, to at least one candidate target base station, a fifth message for requesting the conditional handover of the terminal;

receiving, from the at least one candidate target base station, a sixth message as a response to the fifth message; and transmitting, to the terminal, the first message comprising the conditional handover configuration information, wherein the at least one candidate target cell belongs to the at least one candidate target base station, wherein the measurement configuration information comprises information on at least one measurement object and information on at least one measurement report configuration, and wherein the third message includes a radio resource control (RRC) reconfiguration message.

10. The method of claim 6, wherein the T304 timer is a stopped based on a successful completion of the conditional handover.

11. A terminal in a wireless communication system, the terminal comprising:

a transceiver; and a controller configured to:

receive, from a source base station via the transceiver, a first message comprising conditional handover configuration information, the conditional handover configuration information comprising information on at least one candidate target cell, information on at least one execution condition for a conditional handover of the at least one candidate target cell, and information on a T304 timer, identify a target cell in case that the at least one execution condition for the target cell among the at least one candidate target cell is fulfilled, start the T304 timer, in case that the at least one execution condition is fulfilled, and transmit, to a target base station to which the target cell belongs via the transceiver, a second message for completion of the conditional handover to the target cell.

12. The terminal of claim 11, wherein the at least one candidate target cell belongs to at least one candidate target base station.

13. The terminal of claim 11, wherein the controller is further configured to:

stop the T304 timer based on a successful completion of the conditional handover.

14. The terminal of claim 11, wherein the first message includes a radio resource control (RRC) reconfiguration message, and wherein the at least one execution condition comprises at least one of at least one measurement result of the at least one candidate target cell becomes a predetermined offset better than a measurement result of a primary cell, or the measurement result of the primary cell becomes worse than a first threshold and the at least one measurement result of the at least one candidate target cell becomes better than a second threshold.

15. The terminal of claim 11, wherein the controller is further configured to:

receive, from the source base station via the transceiver, a third message including measurement configuration information for a measurement, and transmit, to the source base station via the transceiver, a fourth message including measurement result based on the measurement configuration information, wherein the measurement configuration information comprises information on at least one measurement object and information on at least one measurement report configuration, and wherein the third message includes a radio resource control (RRC) reconfiguration message.

16. A source base station in a wireless communication system, the source base station comprising:

a transceiver; and a controller configured to:

transmit, to a terminal via the transceiver, a first message comprising conditional handover configuration information, the conditional handover configuration information comprising information on at least one candidate target cell, information on at least one execution condition for a conditional handover of the at least one candidate target cell, and information on a T304 timer, receive, from a target base station to which a target cell belongs via the transceiver, a second message indicating that the terminal has successfully accessed the target cell, and release resources associated to a terminal context, wherein the T304 timer is started on the terminal, in case that the at least one execution condition for the target cell among the at least one candidate target cell is fulfilled.

17. The source base station of claim 16, wherein the first message includes a radio resource control (RRC) reconfiguration message, and wherein the at least one execution condition comprises at least one of at least one measurement result of the at least one candidate target cell becomes a predetermined offset better than a measurement result of a primary cell, or the measurement result of the primary cell becomes worse than a first threshold and the at least one measurement result of the at least one candidate target cell becomes better than a second threshold.

18. The source base station of claim 16, wherein the at least one candidate target cell belongs to at least one candidate target base station.

19. The source base station of claim 16, wherein the controller is further configured to:

transmit, to the terminal via the transceiver, a third message including measurement configuration information for a measurement, receive, from the terminal via the transceiver, a fourth message including measurement result based on the measurement configuration information, determine whether to use the conditional handover based on the measurement result, transmit, to at least one candidate target base station via the transceiver, a fifth message for requesting the conditional handover of the terminal, receive, from the at least one candidate target base station via the transceiver, a sixth message as a response to the fifth message, and transmit, to the terminal via the transceiver, the first message comprising the conditional handover configuration information, wherein the at least one candidate target cell belongs to the at least one candidate target base station, wherein the measurement configuration information comprises information on at least one measurement object and information on at least one measurement report configuration, and wherein the third message includes a radio resource control (RRC) reconfiguration message.

20. The source base station of claim 16, wherein the T304 timer is a stopped based on a successful completion of the conditional handover.

\* \* \* \* \*